(12) United States Patent
Yap et al.

(10) Patent No.: US 12,393,094 B2
(45) Date of Patent: Aug. 19, 2025

(54) OPTICAL WAVEGUIDE STRUCTURE WITH PARTIALLY OVERLAPPING LOOPS IN DIRECTION DEPENDENT MATERIAL

(71) Applicant: The Boeing Company, Chicago, IL (US)

(72) Inventors: Daniel Yap, Malibu, CA (US); Brett Yurash, Venice, CA (US)

(73) Assignee: The Boeing Company, Chicago, IL (US)

( * ) Notice: Subject to any disclaimer, the term of this patent is extended or adjusted under 35 U.S.C. 154(b) by 212 days.

(21) Appl. No.: 18/059,624

(22) Filed: Nov. 29, 2022

(65) Prior Publication Data
US 2023/0185156 A1  Jun. 15, 2023

Related U.S. Application Data

(63) Continuation-in-part of application No. 17/450,038, filed on Oct. 5, 2021, now Pat. No. 11,561,454.

(60) Provisional application No. 63/088,220, filed on Oct. 6, 2020, provisional application No. 63/201,661, filed on May 7, 2021, provisional application No. 63/201,664, filed on May 7, 2021.

(51) Int. Cl.
| | | |
|---|---|---|
| G02F 1/35 | (2006.01) | |
| G02F 1/365 | (2006.01) | |
| G02F 1/39 | (2006.01) | |

(52) U.S. Cl.
CPC .......... *G02F 1/3503* (2021.01); *G02F 1/3536* (2013.01); *G02F 1/365* (2013.01); *G02F 1/395* (2013.01)

(58) Field of Classification Search
CPC ...... G02F 1/3503; G02F 1/3536; G02F 1/365; G02F 1/395
See application file for complete search history.

(56) References Cited

U.S. PATENT DOCUMENTS

| | | |
|---|---|---|
| 3,842,289 A | 10/1974 | Yariv et al. |
| 5,002,349 A | 3/1991 | Cheung et al. |
| 5,206,868 A | 4/1993 | Deacon |
| 5,295,218 A | 3/1994 | Agostinelli et al. |
| 5,875,272 A | 2/1999 | Kewitsch et al. |
| 5,999,548 A | 12/1999 | Mori |

(Continued)

FOREIGN PATENT DOCUMENTS

| | | |
|---|---|---|
| CN | 110333637 A | 10/2019 |
| JP | H01134309 A | 5/1989 |

(Continued)

OTHER PUBLICATIONS

Lumerical, "Lithium Niobate Nonlinear Thermal Waveguide," ANSYS, available at https://optics.ansys.com/hc/en-us/articles/360047509134-Lithium-Niobate-Nonlinear-Thermal-Waveguide, last accessed on Dec. 5, 2022, 19 pages.

(Continued)

*Primary Examiner* — Daniel Petkovsek
(74) *Attorney, Agent, or Firm* — Yee & Associates, P.C.

(57) ABSTRACT

An optical waveguide structure comprises a nonlinear optical waveguide comprising a set of segments, a set of extension optical waveguides, and a set of wavelength selective couplers that couples light between set of segments in the nonlinear optical waveguide and the set of extension optical waveguides based on a wavelength of light.

14 Claims, 30 Drawing Sheets

(56) References Cited

U.S. PATENT DOCUMENTS

| | | | |
|---|---|---|---|
| 6,078,717 | A | 6/2000 | Nashimoto et al. |
| 6,081,632 | A | 6/2000 | Yoshimura et al. |
| 6,269,205 | B1 | 7/2001 | Peral et al. |
| 6,438,291 | B1 | 8/2002 | Duck et al. |
| 6,445,848 | B1 | 9/2002 | Islam et al. |
| 6,483,953 | B1 | 11/2002 | McBrien et al. |
| 6,721,481 | B2 | 4/2004 | Terahara et al. |
| 6,888,667 | B2 * | 5/2005 | Nicolaescu ........ H01S 3/094061 359/332 |
| 7,046,714 | B2 * | 5/2006 | Nicolaescu ......... G02B 6/12004 372/92 |
| 7,262,902 | B2 | 8/2007 | Burns et al. |
| 7,266,258 | B2 | 9/2007 | Liu et al. |
| 7,489,439 | B2 * | 2/2009 | Kuo .................. H04B 10/2916 359/344 |
| 7,495,823 | B2 | 2/2009 | Kanner et al. |
| 8,173,982 | B2 | 5/2012 | Edamatsu et al. |
| 9,291,837 | B1 | 3/2016 | Yap |
| 9,798,219 | B2 | 10/2017 | Pant et al. |
| 10,372,014 | B1 | 8/2019 | Vidrighin et al. |
| 10,451,951 | B1 | 10/2019 | Yap et al. |
| 10,698,292 | B1 | 6/2020 | Nagano |
| 11,003,046 | B2 * | 5/2021 | Liscidini ............ G02B 6/29343 |
| 11,092,875 | B2 | 8/2021 | Xu et al. |
| 11,221,540 | B2 | 1/2022 | Srinivasan et al. |
| 11,226,538 | B2 * | 1/2022 | Marandi ................. G02F 1/39 |
| 11,307,484 | B2 | 4/2022 | Zhang et al. |
| 11,550,201 | B2 | 1/2023 | Yap et al. |
| 11,561,454 | B2 * | 1/2023 | Yap ...................... G02F 1/3501 |
| 2003/0048527 | A1 | 3/2003 | Kimerling et al. |
| 2005/0047702 | A1 | 3/2005 | Parker et al. |
| 2006/0132901 | A1 | 6/2006 | Miller |
| 2012/0093459 | A1 | 4/2012 | Mathai et al. |
| 2014/0193155 | A1 * | 7/2014 | Popovic .............. H04J 14/0307 29/428 |
| 2015/0016767 | A1 | 1/2015 | Akiyama |
| 2017/0199443 | A1 | 7/2017 | Vermeulen et al. |
| 2018/0031949 | A1 | 2/2018 | Mookherjea et al. |
| 2019/0361315 | A1 | 11/2019 | Zhou |
| 2020/0256722 | A1 | 8/2020 | Najafi et al. |
| 2021/0026222 | A1 | 1/2021 | Nagano |
| 2021/0157177 | A1 | 5/2021 | Kharel et al. |
| 2022/0107548 | A1 | 4/2022 | Yap |
| 2022/0236621 | A1 | 7/2022 | Kashiwazaki et al. |

FOREIGN PATENT DOCUMENTS

| | | |
|---|---|---|
| JP | H01134310 A | 5/1989 |
| JP | H05107577 A | 4/1993 |
| JP | H05216079 A | 8/1993 |
| JP | H10319444 A | 12/1998 |
| JP | 2014222331 A | 11/2014 |
| JP | 2017078786 A | 4/2017 |
| JP | 7160194 B2 | 10/2022 |
| WO | WO2019208582 A1 | 5/2021 |

OTHER PUBLICATIONS

Notice of Allowance, dated Nov. 23, 2022, regarding U.S. Appl. No. 17/450,046, 10 pages.

Bosshard, "Cascading of second-order nonlinearities in polar materials," Advanced Materials, vol. 8, No. 5, May 1, 1996, pp. 385-397.

Biaggio, "Coupling-length phase matching for nonlinear optical frequency conversion in parallel waveguides," Physical Review A, vol. 90, Oct. 13, 2014, pp. 043816, 11 pages.

Boyd, "Nonlinear Optics," Third Edition, Academic Press, Mar. 28, 2008, pp. 69-133.

Cai et al., "Integrated optics on single-crystal lithium niobate thin film: some recent progress," 18th International Conference on Transparent Optical Networks ICTON, Jul. 2016, paper Tu.D5.5, pp. 1-4.

Chen et al., "Modal phase matched lithium niobate nanocircuits for integrated nonlinear photonics," OSA Continuum, vol. 1, No. 1, Sep. 2018, pp. 229-242.

Clark et al., "Depositing Light in a Photonic Stop Gap by Use of Kerr Nonlinear Microresonators," Optics Letters, vol. 28, No. 10, 2003, pp. 1966-1968.

Doerr, "Planar Lightwave Devices for WDM," Optical Fiber Telecommunications, vol. IVA, Jan. 1, 2002, pp. 405-476.

Dong et al., "Nonlinear frequency conversion in waveguide directional couplers," Phys. Rev. Lett., vol. 93, No. 13, Sep. 20, 2004, pp. 133901, 4 pages.

Dong et al., "Observation of continuous-wave second-harmonic generation in semiconductor waveguide directional couplers," Optics Express, vol. 14, No. 6, Mar. 20, 2006, pp. 2256-2262 (2006).

Fan et al., "290 Hz intrinsic linewidth from an integrated optical chip-based widely tunable InP-Si3N4 hybrid laser," Digest 2017 Conference on Lasers and Electro-Optics CLEO, May 2017, paper JTh5C.9, pp. 1-2.

Fejer et al., "Quasi-phase-matched second harmonic generation tuning and tolerances," IEEE Journal of Quantum Electronics, vol. 28, No. 11, Nov. 1992, pp. 2631-2654.

Gad et al., "Compound ring resonator circuit for integrated optics applications," Journal Optical Society America A, vol. 26, No. 9, Sep. 9, 2009, pp. 2023-2032.

Halir et al., "Compact High-Performance Multimode Interference Couplers in Silicon-on-Insulator," IEEE Photonics Technology Letters, vol. 21, No. 21, Nov. 1, 2009, pp. 1600-1602.

Helt et al., "How does it scale Comparing quantum and classical nonlinear optical processes in integrated devices," Journal of the Optical Society of America B, vol. 29, No. 8, Aug. 1, 2012, pp. 2199-2212.

Huang et al., "A novel quasi-phase-matching frequency doubling technique," Optics Communications, vol. 150, May 1, 1998, pp. 235-238.

Lin et al., "Broadband Quasi-Phase-Matched Harmonic Generation in an On-Chip Monocrystalline Lithium Niobate Microdisk Resonator," Phys. Rev. Lett., vol. 122, No. 17, May 3, 2019, pp. 173903, 5 pages.

Lin et al., "Characterization of hybrid InP-TriPlex photonic integrate tunable lasers based on silicon nitride (Si3N4/SiO2) microring resonators for optical coherent systems," IEEE Photonics Journal, vol. 10, No. 3, Jun. 2018, pp. 1400108, 9 pages.

Luo et al., "On-chip second-harmonic generation and broadband parametric down-conversion in a lithium niobate microresonator," Optics Express, vol. 25, No. 20, Oct. 2, 2017, pp. 24531-24539.

Luo et al., "Semi-nonlinear nanophotonic waveguides for highly efficient second-harmonic generation," Sep. 17, 2018, 8 pages, accessed Mar. 30, 2022, available at https://arxiv.org/abs/1809.06476.

Lu et al., "Chip-integrated visible-telecom entangled photon pair source for quantum communication," Nature Physics, vol. 15, Jan. 21, 2019, pp. 373-381, available at https://doi.org/10.1038/s41567-018-0394-3.

Matsushita et al., "Quasi-phase-matched parametric fluorescence in a periodically inverted GaP waveguide," Applied Physics Express, vol. 2, No. 6, May 22, 2009, pp. 061101.

May et al., "Second-harmonic generation in AlGaAs-on-insulator waveguides," Optics Letters, vol. 44, No. 6, Mar. 15, 2019, pp. 1339-1342.

Pasiskevicius et al., "Quasi-phase matched nonlinear media: Progress towards nonlinear optical engineering," Optical Materials, vol. 34, No. 3, Jul. 22, 2011, pp. 513-523.

Pernice et al., "Second harmonic generation in phase matched aluminum nitride waveguides and micro-ring resonators," Applied Physics Letters, vol. 100, No. 22, May 30, 2012, pp. 223501.

Rao et al., "Second-harmonic generation in periodically-poled thin film lithium niobate wafer-bonded on silicon," Optics Express, vol. 24, No. 26, Dec. 26, 2016, pp. 29941-29947.

Rao et al., "Second-harmonic generation in single-mode integrated waveguides based on mode-shape modulation," Applied Physics Letters, vol. 110, No. 11, Jan. 19, 2017, pp. 111109.

(56) References Cited

OTHER PUBLICATIONS

Schunemann et al., "Optical parametric oscillation in quasi-phase-matched GaP," Proc SPIE, Nonlinear Frequency Generation and Conversion: Materials, Devices, and Applications XIV, vol. 9347, Mar. 24, 2015, pp. 93470J.

Spencer et al., "Low kappa, narrow bandwidth Si3N4 Bragg gratings," Optics Express, vol. 23, No. 23, Nov. 16, 2015, pp. 30329-30336.

Thomson et al., "Low Loss MMI Couplers for High Performance MZI Modulators," IEEE Photonics Technology Letters, vol. 22, No. 20, Oct. 15, 2010, pp. 1485-1487.

Tison et al., "Path to increasing the coincidence efficiency of integrated resonant photon sources," Optics Express, vol. 25, No. 26, Dec. 25, 2017, pp. 33088-33096.

Wang et al., "Ultrahigh-efficiency wavelength conversion in nanophotonic periodically poled lithium niobate waveguides," Optica, vol. 5, No. 11, Nov. 7, 2018, pp. 1438-1441.

Wang et al., "Second harmonic generation in nano-structured thin-film lithium niobate waveguides," Optics Express, vol. 25, No. 6, Mar. 2017, pp. 6963-6973.

Yang et al., "Realization of controllable photonic molecule based on three ultrahigh-Q microtoroid cavities", Laser Photonics Reviews, vol. 11, No. 2, Jan. 16, 2017, paper 1600178, 8 pages.

Yoo et al., "Wavelength conversion by difference frequency generation in AlGaAs waveguides with periodic domain inversion achieved by wafer bonding," Applied Physics Letters, vol. 68, No. 19, May 6, 1996, pp. 2609-2611.

Yu et al., "Efficient continuous wave second harmonic generation pumped at 1.55 m in quasi-phasematched AlGaAs waveguides," Optics Express, vol. 13, No. 26, Dec. 26, 2005, pp. 10742-10748.

International Search Report dated Jan. 11, 2022, regarding application No. PCT/US2021/071721, 4 pages.

Written Opinion of the International Searching Authority dated Jan. 11, 2022, regarding application No. PCT/US2021/071721, 7 pages.

International Search Report dated Jan. 14, 2022, regarding application No. PCT/US2021/071722, 5 pages.

Written Opinion of the International Searching Authority dated Jan. 14, 2022, regarding application No. PCT/US2021/071722, 6 pages.

International Search Report dated Feb. 8, 2022, regarding application No. PCT/US2021/071723, 5 pages.

Written Opinion of the International Searching Authority dated Feb. 8, 2022, regarding application No. PCT/US2021/071723, 8 pages.

International Search Report and Written Opinion of the International Searching Authority dated Feb. 9, 2022, regarding application No. PCT/US2021/071725, 24 pages. 021/071725, 24 pages.

Non-Final Office Action dated Jul. 8, 2022, regarding U.S. Appl. No. 17/450,046, 23 pages.

Non-Final Office Action dated Aug. 10, 2022, regarding U.S. Appl. No. 17/450,031, 29 pages.

Office Action, dated Jun. 11, 2024, regarding U.S. Appl. No. 17/655,930, 33 pages.

Final Office Action dated Oct. 10, 2024, regarding U.S. Appl. No. 17/655,930, 22 pages.

PCT International Search Report and Written Opinion, dated Mar. 28, 2023, regarding Application No. PCT/US2021/071721, 8 pages.

PCT International Search Report and Written Opinion, dated Mar. 28, 2023, regarding Application No. PCT/US2021/071723, 9 pages.

Office Action dated Mar. 5, 2025, regarding U.S. Appl. No. 18/059,605, 29 pages.

\* cited by examiner

OPTICAL WAVEGUIDE STRUCTURE WITH PARTIALLY OVERLAPPING LOOPS IN DIRECTION DEPENDENT MATERIAL

CROSS-REFERENCE TO RELATED APPLICATIONS

This application is a continuation in part application of U.S. patent application Ser. No. 17/450,038, U.S. Pat. No. 11,561,454, filed Oct. 5, 2021, and entitled "Optical Waveguide Structure With Partially Overlapping Loops In Direction Dependent Material," which is related to and claims the benefit of priority of provisional U.S. Patent Application Ser. No. 63/088,220, entitled "Directional Phase Matching (DPM) Optical Waveguide", filed on Oct. 6, 2020; provisional U.S. Patent Application Ser. No. 63/201,661, entitled "Directional Phase Matching Optical Waveguide", filed on May 7, 2021; and provisional U.S. Patent Application Ser. No. 63/201,664, entitled "Nonlinear Optical Waveguide Structures for Light Generation and Conversion", filed on May 7, 2021, all of which are hereby incorporated herein by reference.

This application is related to U.S. patent application Ser. No. 17/450,031 filed on Oct. 5, 2021, entitled "Optical Waveguide Structure With Triple Partially Overlapping Loops," and U.S. patent application Ser. No. 18/059,605 filed on Nov. 29, 2022, entitled "Optical Waveguide Structure With Partially Overlapping Loops In Direction Dependent Material," assigned to the same assignee, and incorporated herein by reference in their entirety.

BACKGROUND INFORMATION

1. Field

The present disclosure relates generally to optical waveguide structures and, in particular, to phase matching optical waveguide structures with partially overlapping loops to generate light using non-linear optical processes.

2. Background

Optical waveguides are physical structures that guide electromagnetic waves in an optical spectrum. Optical waveguides can be used as components in integrated optical circuits. With respect to quantum communications and processing, nonlinear optical material structures can be used to create photon transmitters, repeaters, and other quantum devices for communications. Nonlinear optical structures can be used to change the light passing through them depending on factors such as orientation, temperature, wavelength of light, polarization of light, and other factors. For example, a waveguide with light of a blue wavelength passing through the waveguide can generate one or more photons of light that has a longer wavelength, such as green or red, and a correspondingly lower photon energy. This type of conversion can be performed using waveguides that incorporate a material having a second order nonlinear optical susceptibility or a third order nonlinear optical susceptibility.

Current waveguides and structures that implement second order nonlinear optical processes are not as efficient as desired. Therefore, it would be desirable to have a method and apparatus that take into account at least some of the issues discussed above, as well as other possible issues. For example, it would be desirable to have a method and apparatus that overcome a technical problem with increasing efficiency in generating light in nonlinear optical waveguide structures.

SUMMARY

In one illustrative embodiment, an optical waveguide structure comprises a nonlinear optical waveguide comprising a set of segments, a set of extension optical waveguides, and a set of wavelength selective couplers couples light between set of segments in the nonlinear optical waveguide and the set of extension optical waveguides based on a wavelength of light.

In another illustrative embodiment, an optical waveguide structure comprises a nonlinear optical waveguide comprising a first segment having a first starting point and a first ending point, wherein a nonlinear optical interaction results in a generation of a second wavelength light from a first wavelength light traveling through the first segment; a second segment having a second starting point and a second ending point; a third segment having third starting point and third ending point. The optical waveguide structure further comprises an extension optical waveguide, a first wavelength selective coupler that couples the second wavelength light from the first segment at the first ending point into the extension optical waveguide, and a second wavelength selective coupler that couples the second wavelength light from the extension optical waveguide into the third segment at the third starting point. Wherein, the first wavelength light travels from the first ending point to the third starting point through the second segment; the second wavelength light travels from the first ending point to the third starting point through the extension optical waveguide; both the first wavelength light and the second wavelength light travel from the third starting point of the third segment to the third ending point.

In yet another illustrative embodiment, a method facilitates a non-linear optical process. A first wavelength light traveling through a first segment is routed in a nonlinear optical waveguide having a first starting point and a first ending point. A second wavelength light and a third wavelength light are generated by a nonlinear optical interaction of the first wavelength light between the starting point and the first ending point in the first segment. A first wavelength selective coupler couples the first wavelength light from the first ending point to a second starting point for a second segment in the nonlinear optical waveguide. The first wavelength selective coupler couples the second wavelength light and the third wavelength light from the first ending point to an extension starting point for an extension optical waveguide. A second wavelength selective coupler couples the second wavelength light and the third wavelength light from the extension ending point for the extension optical waveguide to a third starting point for a third segment in the nonlinear optical waveguide. The second wavelength selective coupler couples the first wavelength light from the second segment in the nonlinear optical waveguide to the third starting point for the third segment in the nonlinear optical waveguide.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
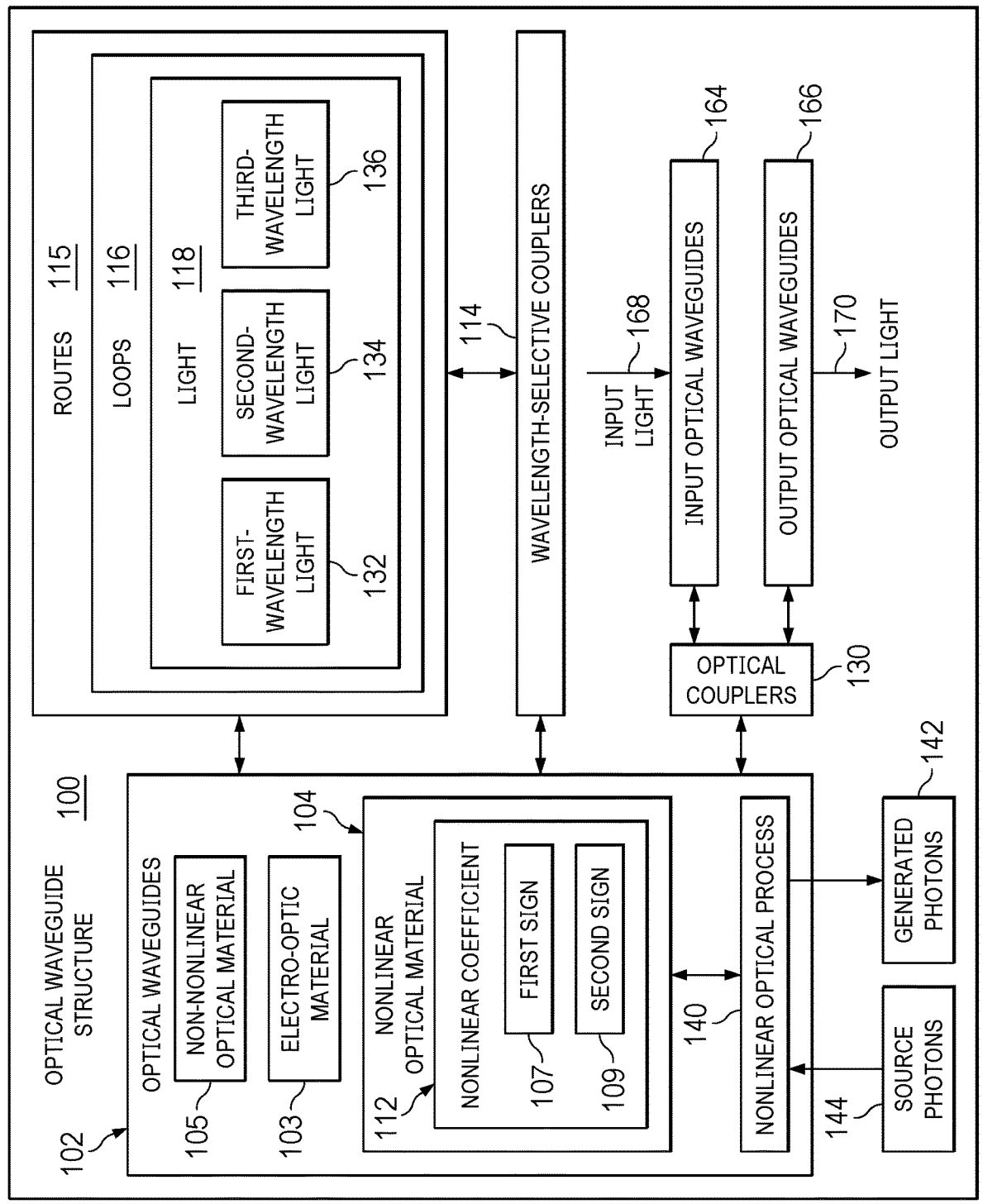
FIG. 1 is an illustration of a high level block diagram of an optical waveguide structure in accordance with an illustrative embodiment.

The illustrative embodiments recognize and take into account one or more different considerations. For example, the illustrative embodiments recognize and take into account that a nonlinear optical structure can function as a resonator such that light of a particular wavelength in resonance with the resonator can travel over a longer distance in a nonlinear optical waveguide of the nonlinear optical structure as compared to light of other wavelengths that are not in resonance with the resonator.

The illustrative embodiments recognize and take into account that the loss of light from a resonator occurs when some of the light exits the resonator instead of continuing to travel in the resonator. The resonator selects certain wavelengths of light to continue traveling in the resonator. The illustrative embodiments recognize and take into account that different resonators can have different resonances that match to different wavelengths of light. The illustrative embodiments recognize and take into account that the same resonator can have multiple resonances, with different resonances matching to different wavelengths of the light.

The illustrative embodiments recognize and take into account that currently used nonlinear optical waveguide structures employ a resonator that implements three-wave mixing and four-wave mixing processes to generate light of one wavelength from light of a different wavelength. In other words, the process changes the wavelength of the light. The illustrative embodiments recognize and take into account that spontaneous parametric down conversion (SPDC) is an example of a three-wave mixing process for generating certain wavelengths of light, such as a signal light and an idler light, in response to the introduction of source light of a different wavelength, such as a pump light, into the nonlinear optical waveguide structure. The illustrative embodiments recognize and take into account that spontaneous parametric down conversion can generate a pair of photons, such as a signal photon and an idler photon, from a pump photon.

The illustrative embodiments recognize and take into account that the nonlinear optical waveguide structure, in forming a ring-shaped route for the travel by the light, can employ a nonlinear optical waveguide in which light of three wavelengths involved in spontaneous parametric down conversion and spontaneous four-wave mixing propagates within the nonlinear optical waveguide structure. The illustrative embodiments recognize and take into account that the ring-shaped route formed from the nonlinear optical waveguide structure can be a closed path of a ring resonator. The illustrative embodiments recognize and take into account that for current nonlinear optical waveguides structures, different wavelengths of the light must match resonances of the same resonator. The illustrative embodiments recognize and take into account that this requirement results in severe limitation on allowable wavelengths for the signal light and the idler light that are generated.

The illustrative embodiments recognize and take into account that current optical waveguide structures can have optical structures to input and output light from the ring resonator. The illustrative embodiments recognize and take into account that the addition of these input and output optical structures is unhelpful for achieving the resonance match because the three wavelengths for the pump light, the signal light, and the idler light propagate through the ring resonator and are constrained to match the modes of the same ring resonator.

The illustrative embodiments recognize and take into account that current nonlinear optical waveguide structures can employ two coupled ring resonators having different values for their circumferences. The illustrative embodiments recognize and take into account that these different values can result in different sets of resonance modes for the two resonators. The illustrative embodiments recognize and take into account that a first resonator can have all three wavelengths for the pump light, the signal light, and the idler light matched to the modes for the first resonator. The illustrative embodiments recognize and take into account that the second resonator can have modes matched to the wavelengths of the signal light and the idler light. The illustrative embodiments recognize and take into account that these two coupled resonators still have the same limitations on resonance matching as a single ring resonator since wavelengths of the signal light and of the idler light must match with resonances of both resonators. The illustrative embodiments recognize and take into account that the use of three coupled ring resonators may provide some improvement, but still have limitations because at least some of the light from all of the three wavelengths travels through all three rings in the current nonlinear optical waveguide structures.

The illustrative embodiments recognize and take into account that current nonlinear optical waveguide structures employ multiple resonators that are coupled together directly through common wavelengths and not through a nonlinear optical process. The illustrative embodiments recognize and take into account that at least some light for all of the wavelengths travel through all of these multiple resonators. In other words, the illustrative embodiments recognize and take into account that the light with different wavelengths and traveling through all of the resonators is resonant with each of the individual resonators that are coupled together.

With currently used spontaneous parametric down conversion or spontaneous four-wave mixing, all three wavelengths involved in the nonlinear optical process are adjusted to match resonances of the same ring resonator or to match common resonances of multiple coupled rings. However, this type of adjustment of the wavelengths may not be possible if an entangled photon pair, such as entangled pair of idler and signal photons, is used in a quantum photonic circuit that also contains other sources of such photon pairs. The need in quantum photonics to perform optical interference functions involving photons produced by different sources of entangled photons may require those photons to have the same wavelength, so that photons can be indistinguishable.

As a result, adjusting the wavelengths associated with a first ring resonator whose output photons are involved in an optical interference function can cause a need to also adjust the wavelengths associated with a second ring resonator whose output photons are interfered with the photons from the first ring resonator. However, if those two ring resonators are not identical, such adjustment may be beyond what is permitted by the spectral width of the resonances of the two ring resonators.

For example, a departure of a dimension of the fabricated waveguide, such as the waveguide width, by only 1-2 nm would shift the resonance wavelength beyond the spectral width associated with a quality factor (Q) of $10^3$. Resonators with a higher Q have resonances with narrower spectral width, thereby making them impractical for use in quantum photonic circuits. Thus, if multiple currently available ring resonators are used in a quantum photonic circuit, those resonators would need to have a low Q.

As a result, the nonlinear optical interaction distance for producing the entangled photon pairs by spontaneous parametric down conversion or spontaneous four-wave mixing would be much shorter and the photon-pair generation rates would be much lower.

The optical waveguide structure in the illustrative examples provides design flexibility to enable three loops through the waveguides to have resonances that correspond to three pre-specified wavelengths. Also, if multiple optical waveguide structures are used together in a quantum photonic circuit, these optical waveguide structures can be adjusted to make the resonances of the optical waveguide structures correspond to specified wavelengths. This type of adjustment is in contrast to having all of the wavelengths adjusted to correspond to one resonator. Thus, the loops in the optical waveguide structures in a quantum photonic circuit can have a higher Q, enabling those optical waveguide structures to generate photon pairs at higher generation rates.

In an illustrative example, the optical waveguide structure can be a triple partially overlapping loops for entanglement (TriPOLE) optical waveguide structure that is used in illustrative examples to produce entangled photon pairs by nonlinear optical (NLO) processes. These nonlinear optical processes can be, for example, spontaneous parametric down conversion and spontaneous four-wave mixing. The two entangled photons produced by spontaneous parametric down conversion can be entangled when those photons are produced from the same pump photon. In a similar fashion, the two entangled photons produced by spontaneous four-wave mixing can be entangled when those photons are produced from the same two degenerate pump photons.

In this illustrative example, nonlinear optical waveguides in the form of ring resonators can be used to increase the generation rate of these entangled photon pairs, comprising a signal photon and an idler photon. In a high-Q ring resonator, light can travel many times around the circumference of the ring resonator. Thus, the interaction length of a ring resonator can be many times greater than its physical size. In implementing spontaneous parametric down conversion or spontaneous four-wave mixing with three partially overlapping ring resonators as in this example, all three wavelengths of light involved in the nonlinear optical process correspond to resonances of their individual resonators.

In an illustrative example, the optical waveguide structure is configured such that light of a particular wavelength can travel on a particular loop through the optical waveguide structure in which the loop is present for that particular wavelength of the light. In the illustrative examples, the loops are partially overlapping such that light of two different wavelengths are not required to travel along the same exact loop.

In one illustrative example, an optical waveguide structure comprises a main nonlinear optical waveguide; an extension optical waveguide; a secondary optical waveguide; a first wavelength-selective coupler; and a second wavelength-selective coupler. The first wavelength-selective coupler optically couples a first main location in the main nonlinear optical waveguide and a primary location in the extension optical waveguide to each other. The second wavelength-selective coupler optically couples a second main location in the main nonlinear optical waveguide and a secondary location in the extension optical waveguide to each other. The first wavelength-selective coupler also optically couples a first main location in the main nonlinear optical waveguide and a first location in the secondary optical waveguide to each other. The second wavelength-selective coupler also optically couples a second main location in the main nonlinear optical waveguide and a second location in the secondary optical waveguide to each other.

With this example, light of different wavelengths travels on different loops in the optical waveguide structure. A route is a path in which the light travels. In this illustrative example, a loop is a closed route. For example, a first loop can be present in which light of a first wavelength (a first-wavelength light) travels on a first loop having a first length. This first loop can extend through the main nonlinear optical waveguide and a portion of an extension optical waveguide. A second loop can extend through a portion of the main nonlinear optical waveguide and a portion of a secondary optical waveguide. Light of a second wavelength (a second-wavelength light) can travel in the second loop having a second length. The second length can be different from the first length.

In this example, the first wavelength-selective coupler and the second wavelength-selective coupler can be selected to cause light of a particular wavelength to travel from one optical waveguide to another optical waveguide. For example, the first wavelength-selective coupler can cause the second-wavelength light to be coupled from the main nonlinear optical waveguide to the secondary optical waveguide. The second wavelength-selective coupler can cause the second-wavelength light to be coupled from the secondary optical waveguide back to the main nonlinear optical waveguide. The second length is determined by the first-main and second-main locations and by the first-secondary and second-secondary locations as well as by the length of the secondary optical waveguide portion (or portions) between these first-secondary and second-secondary locations. The length of the secondary optical waveguide portion (or portions) between the first-secondary and second-secondary locations can be selected to obtain a desired value for the second length.

The length of the portions of secondary optical waveguide are selected to achieve a desired value for the second length. This desired value can be selected to achieve a resonance condition for a particular wavelength of light.

In this example, the first wavelength-selective coupler also can cause the first-wavelength light to be coupled from the main nonlinear optical waveguide to the extension optical waveguide. The second wavelength-selective coupler can cause the first-wavelength light to be coupled from the extension optical waveguide back to the main nonlinear optical waveguide. The first length is determined by first main location and the second main location in the main nonlinear optical waveguide, the primary-extension location and secondary-extension location in the extension waveguide as well as by the length of the primary optical waveguide portion between these primary-extension and secondary-extension locations. The length of the primary optical waveguide portion between these primary-extension and secondary-extension locations can be selected to obtain a desired value for the first length.

In the illustrative example, with this optical waveguide structure, the loops for the different light of different wavelengths in the optical waveguides can have lengths that can be selected such that at least one of resonance or round-trip phase matching is present for the different light of different wavelengths traveling on the different routes.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In other words, the length can be selected for a loop such that resonance is achieved for the light traveling in a loop.

This type of selection of the length can be made for each loop independently of the lengths for other loops in the optical waveguide structure. In the illustrative example, resonance occurs for each wavelength of the light separately from the other wavelengths of the light.

Round-trip phase matching can be achieved for the combination of three loops in which three wavelengths of light travel. Round-trip phase matching involves all three wavelengths of the light. In the illustrative example, the lengths of all three loops are selected jointly such that round-trip phase matching is achieved for the nonlinear optical interaction between the three wavelengths of the light.

In some illustrative examples, an optical waveguide structure can be a resonator-enhanced structure for nonlinear optical (NLO) three-wave mixing processes. These nonlinear optical three-wave mixing processes can include difference frequency generation, sum frequency generation, and spontaneous parametric down conversion (SPDC). In other illustrative examples, an optical structure can be a resonator-enhanced structure for degenerately pumped or degenerate output nonlinear optical (NLO) four-wave mixing processes. These degenerate output nonlinear optical four-wave mixing processes can be, for example, difference frequency generation, sum frequency generation, and spontaneous four-wave mixing (SFWM). In these illustrative examples, degenerate means at least two of the waves participating in the nonlinear optical process have the same wavelength. Further, a degenerate three-wave mixing process, such as second harmonic generation, can be used. With second harmonic generation, the two input waves have the same wavelength and produce an output wave of a different wavelength.

In the illustrative examples, the nonlinear optical processes can involve three distinct wavelengths of light, a first wavelength, a second wavelength, and a third wavelength. The nonlinear optical waveguide structure in the different illustrative examples comprises triple partially overlapping loops for entanglement (TriPOLE). This optical waveguide structure comprises a main nonlinear optical waveguide, a first extension optical waveguide, a second extension optical waveguide, and a third extension optical waveguide in which light of different wavelengths travels in loops that extend through different combinations of these different optical waveguides. A first loop extends through the main nonlinear optical waveguide and a first extension optical waveguide. This first loop is overlapped by parts of two other loops, which are a second loop and a third loop. A second loop extends through the main nonlinear optical waveguide and a second extension optical waveguide. A third loop extends through the main nonlinear optical waveguide and a third extension optical waveguide. These loops can be closed routes that define optical resonators having resonances at specific sets of wavelengths.

The parts of the first loop, the second loop and the third loop that are in common with or that extend through the main nonlinear optical waveguide in the optical waveguide structure are the portions of the optical waveguide structure in which the nonlinear optical three-wave mixing or four-wave mixing processes can occur. In the illustrative examples, the first extension optical waveguide is physically separate from the main nonlinear optical waveguide and is connected to the main nonlinear optical waveguide by a first wavelength-selective coupler that selectively couples only the first-wavelength light into that first extension optical waveguide, but does not couple the second-wavelength light or the third-wavelength light into that first extension optical waveguide. In other words, the first wavelength-selective coupler optically connects the first extension optical waveguide to the main nonlinear optical waveguide only for the first-wavelength light. A second wavelength-selective coupler can couple the first-wavelength light from the first extension optical waveguide back into the main nonlinear optical waveguide.

In this illustrative example, the second extension optical waveguide and the third extension optical waveguide are connected to the main nonlinear optical waveguide through a segment of a secondary optical waveguide. In this example, the first wavelength-selective coupler couples the second-wavelength light and the third-wavelength light into a first segment of the secondary optical waveguide. A third wavelength-selective coupler selectively couples the second-wavelength light into the second extension optical waveguide, but the third wavelength-selective coupler does not couple the third-wavelength light into that second extension optical waveguide.

In other words, the third wavelength-selective coupler optically connects the second extension optical waveguide to the secondary optical waveguide. The third wavelength-selective coupler also selectively couples the third-wavelength light into the third extension optical waveguide, but the third wavelength-selective coupler does not couple the second-wavelength light into that third extension optical waveguide. In other words, this third wavelength-selective coupler optically connects the third extension optical waveguide to the secondary optical waveguide. As a result, the selection is between the second wavelength and the third wavelength. The first wavelength is assumed to not be present in the secondary optical waveguide in this example.

In an illustrative example, the first wavelength-selective coupler couples the second-wavelength light from the main nonlinear optical waveguide to travel in the second extension optical waveguide of the second loop, via a third wavelength-selective coupler, but does not couple light of the first wavelength from the main nonlinear optical waveguide to travel in the second extension optical waveguide. The first wavelength-selective coupler also couples the third-wavelength light from the main nonlinear optical waveguide to travel in the third extension optical waveguide of the third loop, via the third wavelength-selective coupler, but does not couple light of the first wavelength from the main nonlinear optical waveguide to travel in the third extension optical waveguide.

The third wavelength-selective coupler couples the light of the second wavelength from the main nonlinear optical waveguide, via the first waveguide-selective coupler, to the second extension optical waveguide of the second loop but does not couple light of the first or third wavelengths into the second extension optical waveguide. The third wavelength-selective coupler also couples the light of the third wavelength from the main nonlinear optical waveguide, via the first wavelength-selective coupler, to travel in the third extension optical waveguide of the third loop but does not couple the light of the first or second wavelengths into the third extension optical waveguide. Thus, only the second-wavelength light travels a second length through the entire second loop. Also, only the third-wavelength light travels a third length through the entire third loop. The first-wavelength light travels only a first length through the first loop that includes the main nonlinear optical waveguide and the first extension optical waveguide, but does not include the second extension optical waveguide or the third extension optical waveguide.

The main nonlinear optical waveguide is common to all three loops. The first-wavelength light travels in a first loop that includes the main nonlinear optical waveguide and the first extension optical waveguide. In this example, the first loop also can include the first wavelength-selective coupler and the second wavelength-selective coupler. The second-wavelength light travels in a loop that includes the main nonlinear optical waveguide and the second extension optical waveguide. The third-wavelength light travels in a third loop that includes the main nonlinear optical waveguide and the third extension optical waveguide. Each of the three loops has a length that is designed to be resonant for the light that travels in the loop. The three loops can have different lengths.

The length of the first loop for the light of the first wavelength can be selected such that the first-wavelength light is at a resonance of a first resonator comprising the main nonlinear optical waveguide and the first extension optical waveguide. The length of the second loop for the light of the second wavelength can be selected such that the second-wavelength light is at a resonance of a second resonator comprising the main nonlinear optical waveguide and the second extension optical waveguide. The length of the third loop for the light of the third wavelength can be selected so that the third-wavelength light is at a resonance of a third resonator formed by the main nonlinear optical waveguide and the third extension nonlinear optical waveguide.

In the illustrative example, a loop may traverse one or more of these optical waveguides. The loops through these optical waveguides can partially overlap with each other. In other words, the different loops are not identical to each other but may have overlaps within the optical waveguide structures.

Thus, although the propagation constants or wave vectors for the three wavelengths may be different from each other, the light at the three different wavelengths can still be at resonances when propagating in their respective loops in the optical waveguide structure. The propagation can occur such that the light of the three wavelengths can propagate constructively over many cycles through loops within the optical waveguide structure. This type of propagation can occur because the three loops have different lengths. Furthermore, the relative lengths of the three loops can be selected to meet the phase-matching requirement to sustain the nonlinear optical process over an interaction distance that is greater than the length of the main nonlinear optical waveguide in the optical waveguide structure.

The phase matching can be a feature distinct from the resonance that occurs for a resonator in the optical waveguide structure. Thus, five constraints may be applied to the nonlinear optical interaction that occurs in the optical waveguide structure. One constraint is on "energy conservation" which constrains the relationship between the three wavelengths. The other four constraints relate to the propagation constants or wave vectors of the light of the three different wavelengths.

The phase-matching condition for the nonlinear optical process occurring in the main nonlinear optical waveguide can be described by a phase walk-off and by a constructive interaction distance. The constructive interaction distance is the distance at which a phase walk-off for the nonlinear optical interaction between the light of the three wavelengths equals 180 degrees or $\pi$ radians.

When the phase walk-off has a value between 0 and $\pi$ radians, the nonlinear optical interaction is "constructive" and transfers power from the pump into the signal and idler. This transfer of power increases the generation of signal and idler light. However, when the phase walk-off has a value between n and $2\pi$ radians, the nonlinear optical interaction is "destructive" and transfers power from the signal and idler back to the pump, thereby reducing the generation of signal and idler light.

Constructive generation of signal and idler light occurs for values of the phase walk-off between 0 and $\pi$, between $2\pi$ and $3\pi$, between $4\pi$ and $5\pi$, etc. Destructive generation of signal and idler occurs for values of the phase walk-off between $\pi$ and $2\pi$, between $3\pi$ and $4\pi$, between $5\pi$ and $6\pi$, etc.

Whether the nonlinear optical generation is constructive or destructive can also depend on the sign of the nonlinear optical coefficient of the nonlinear optical material involved in that nonlinear optical process. For the same value of the phase walk-off, if the sign of the nonlinear optical coefficient changes, the generation can change from being constructive to being destructive, and vice versa.

In some illustrative examples, the length of the main nonlinear optical waveguide, in which all three wavelengths of light travel, can be set to be no greater than the constructive interaction distance. This length of the main nonlinear optical waveguide can be the length of multiple separate segments.

The length of the first extension optical waveguide, the length of the second extension optical waveguide, and the length of the third extension optical waveguide (when present) can be set such that that the roundtrip phase walk-off for the nonlinear optical interaction between the light of the three wavelengths is a specified value. This round-trip phase walk-off can be set equal to zero or as close to being zero as possible, or can be set as close as possible to being a multiple of $2\pi$ radians or 360 degrees.

In some examples, tuning electrodes can be located at optical waveguides. For example, the first extension optical waveguide can have a set of tuning electrodes that operates to adjust the roundtrip phase of the light of the first wavelength. The second extension optical waveguide can have a set of tuning electrodes that operate to adjust the roundtrip phase of the light of the second wavelength. The third extension optical waveguide can have a set of tuning electrodes that operate to adjust the roundtrip phase of the light of the third wavelength. The main nonlinear optical waveguide can have a set of phase shifters, such as a set of tuning electrodes, that operate to adjust the roundtrip phase of the light of all three wavelengths, and in particular of the first wavelength. Thus, these tuning electrodes can enable adjusting the resonance conditions to compensate for changes in at least one of the wavelengths of the light, the cross-sectional dimensions of the optical waveguides, and environmental conditions, such as temperature, or other factors. These tuning electrodes can also allow the optical waveguide structure to adjust the phase walk-off for the nonlinear optical interaction occurring in the main nonlinear optical waveguide.

For example, a structure for spontaneous parametric down conversion can have the light such as, the pump light, supplied to the main nonlinear optical waveguide through an input optical coupler and travel in the first loop. The optical coupler can be connected to an input optical waveguide that receives the pump light. The signal light and the idler light generated by the spontaneous parametric down conversion process would travel in the second loop and the third loop, respectively.

A nonlinear optical generation process such as spontaneous parametric down conversion can result in generation of lower intensity light from higher intensity light. A nonlinear optical generation process also can result in the generation of a higher intensity light from a lower intensity light.

However, since the efficiency of a nonlinear optical generation process depends on the intensity of the input or source light for that process, which typically is the pump light, a nonlinear optical process typically results in generation of additional lower intensity light from the higher intensity light. Typically, the pump light has an intensity that is at least twice the intensity of the signal light and at least twice the intensity of the idler light. In some examples, such as many examples as spontaneous parametric down conversion, the intensity of the pump light is at least ten times greater than the intensity of the signal light or of the idler light. Thus, even when a phase-matched condition is present, if the pump light is absent from an optical waveguide comprising nonlinear optical material, and only signal and idler light are present, there is much less generation of pump light from that weaker signal and idler light.

In the illustrative examples, an optical waveguide structure can comprise a first nonlinear optical waveguide segment, a second nonlinear optical waveguide segment, an extension optical waveguide, a first wavelength-selective coupler, and a second wavelength-selective coupler. A first-wavelength light and a second-wavelength light travel in the first nonlinear optical waveguide segment. A second-order nonlinear optical process such as spontaneous parametric down conversion can occur in the first and second nonlinear optical waveguide segments. The first nonlinear optical waveguide segment has a nonlinear optical coefficient of a first sign. The second nonlinear optical waveguide segment has a nonlinear optical coefficient of a second sign, which is opposite from the first sign. In this illustrative example, this second nonlinear optical segment is part of the second extension waveguide or the third extension waveguide. It is desirable to divert the pump light away from these extension segments for the signal and idler light. In this example these extension segments comprise electro-optic material to enable them to provide voltage-controlled phase shifts.

The first wavelength-selective coupler can optically couple a first location in the first nonlinear optical waveguide segment and a primary extension location in the extension optical waveguide to each other such that the first-wavelength light is coupled from the first nonlinear optical waveguide at the first location to the extension optical waveguide at the primary extension location. The second wavelength-selective coupler can optically couple a second location in the first nonlinear optical waveguide segment and a secondary extension location in the extension optical waveguide to each other such that the first-wavelength light is coupled from the extension optical waveguide at the secondary extension location to the main nonlinear optical waveguide at a location in the first nonlinear optical waveguide segment. Thus, the first-wavelength light bypasses the second nonlinear optical waveguide segment that has a nonlinear optical coefficient of a second sign, which is opposite from the first sign. Instead, the first-wavelength light travels only through the first nonlinear optical waveguide segment that has a nonlinear optical coefficient of the first sign.

In the illustrative examples, the wavelength-selective couplers enable selective coupling of light in a manner that directs light of different wavelengths to either travel through or to bypass two different nonlinear optical waveguide segments that have nonlinear optical coefficients of opposite sign.

Some examples of the optical waveguide structures can avoid undesired effects of the sign reversal in the nonlinear optical coefficient by removing the pump light or by having an absence of a non-linear optical material in part of the loop traversed by the pump light. Other examples of the optical waveguide structures can take advantage of a sign reversal in the nonlinear optical coefficient by adjusting the phase walk-off to compensate for the sign reversal in the nonlinear optical coefficient for two different segments of nonlinear optical waveguide.

With reference now to the figures and, in particular, with reference to FIG. 1, an illustration of a high level block diagram of an optical waveguide structure is depicted in accordance with an illustrative embodiment. In this illustrative example, optical waveguide structure 100 comprises optical waveguides 102 in which at least one of optical waveguides 102 is comprised of nonlinear optical material 104. One or more other optical waveguides in optical waveguides 102 can be comprised of at least one of non-linear optical material 104 or non-nonlinear optical material 105. In this example, nonlinear optical material 104 can have first sign 107 and second sign 109 for nonlinear optical coefficient 112 for a nonlinear optical interaction of light with nonlinear optical material 104. As depicted, first sign 107 is opposite of second sign 109. Nonlinear optical coefficient 112 is a coefficient that quantifies the strength of the nonlinear optical interaction. Nonlinear optical coefficient 112 can be a second order nonlinear optical coefficient or a third order nonlinear optical coefficient depending on the type of optical process implemented in optical waveguide structure 100. One or more optical waveguides in optical waveguides 102 also can be comprised of an electro-optic material 103. The refractive index of an electro-optic material 103 can be changed by applying a DC or low-frequency (as compared to the optical frequency) electric field to the material. In some cases, a material can be both a nonlinear optical material 104 as well as an electro-optic material 103.

In this illustrative example, optical waveguide structure 100 can also include at least one of input optical waveguides 164 or output optical waveguides 166. In this illustrative example, input optical waveguides 164 and output optical waveguides 166 are connected to one or more of optical waveguides 102 using optical couplers 130.

For example, a set of input optical waveguides 164 can input input light 168 into one or more of optical waveguides 102. As another example, a set of output optical waveguides 166 can output output-light 170 from one or more of optical waveguides 102. The input of input light 168 and output of output light 170 can be facilitated by a set of optical couplers 130 that connect the set of input optical waveguides or the set of output optical waveguides to one or more of optical waveguides 102.

As used herein, a "set of" when used with reference items means one or more items. For example, a set of input optical waveguides 164 is one or more of input optical waveguides 164.

In this illustrative example, light generation can be improved for optical waveguide structure 100 using optical waveguides 102 arranged as loops 116 through optical waveguides 102. In the illustrative example, loops 116 are defined as the course of travel of light 118 within one or more of optical waveguides 102. In other words, loops 116 are defined as where light 118 travels within optical waveguides 102.

The manner in which optical waveguides 102 are coupled to each other is through mechanisms such as wavelength-selective couplers 114, which can be used to define loops 116 along which light 118 can travel within optical waveguides 102. In the illustrative example, loops 116 can use different portions of optical waveguides 102 and wavelength-selective couplers 114 in optical waveguide structure 100.

As depicted, optical waveguide structure 100 also includes wavelength-selective couplers 114 that can be used to define routes 115 in the form of loops 116 for light 118 traveling within optical waveguide structure 100. These wavelength-selective couplers can selectively direct light 118 from one optical waveguide to another optical waveguide in optical waveguides 102.

Wavelength-selective couplers 114 can take a number of different forms. For example, wavelength-selective couplers 114 can be selected from at least one of a two-waveguide coupler, a multi-mode interference coupler, a pulley coupler, a Mach-Zehnder interferometer, a 4-port micro-ring resonator coupler, or some other suitable wavelength-selective coupler that can couple light and determine which wavelengths of light are directed through coupling from one optical waveguide to another optical waveguide.

As used herein, a "number of" when used with reference items means one or more items. For example, a number of different forms is one or more different forms.

In this illustrative example, optical waveguides 102 in optical waveguide structure 100 can support the propagation of light 118 through routes 115 in the form of loops 116, which are closed routes. Light 118 travels within optical waveguides 102 along routes 115. In the illustrative example, a closed route is a route for which a starting point and ending point are common or for which no distinct starting point that is separate from an ending point is present. The closed route is also referred to as a loop.

In this illustrative example, loops 116 can traverse multiple optical waveguides 102 in optical waveguide structure 100. Loops 116 also can traverse one or more of wavelength-selective couplers 114 in optical waveguide structure 100. Loops 116 can comprise multiple loops that overlap each other in portions of some of optical waveguides 102 in optical waveguide structure 100 but do not overlap each other for other optical waveguides 102 traversed by a loop of loops 116. Different wavelengths of light 118 can travel through different loops. In other words, overlap is present between portions of loops 116 for the different wavelengths of light 118 traveling through optical waveguides 102.

As depicted, wavelength-selective couplers 114 can operate to define different loops in loops 116 for the different wavelengths of light 118, with these different loops having different lengths.

As depicted in this illustrative example, nonlinear optical material 104 has nonlinear optical coefficient 112. In the illustrative example, nonlinear optical coefficient 112 can be a second order nonlinear optical coefficient or a third order nonlinear optical coefficient depending on the type of optical process implemented in optical waveguide structure 100.

Nonlinear polarization can occur in nonlinear optical material 104 in which the material polarization no longer varies linearly with the electric field amplitude. This nonlinear relationship can be expressed as follows:

$$P = \chi^{(1)}E + \chi^{(2)}EE + \chi^{(3)}EEE + \ldots$$

where E is the electric field, $\chi(1)$ is the linear optical susceptibility, $\chi(2)$ is the second order nonlinear optical susceptibility, etc. The nonlinear susceptibilities, such as $\chi(2)$ and $\chi(3)$, represent the nonlinear parts of the material dipolar characteristics.

In this example, the electric field amplitude is the electric field amplitude of the light wave, which is an electromagnetic field. An electromagnetic field has a traveling (or propagating) electric field and a traveling (or propagating) magnetic field.

In this illustrative example, nonlinear optical process 140 can be nonlinear optical mixing processes that can occur within optical waveguide structure 100. These nonlinear optical mixing processes can be used to generate light 118. For example, the propagation of first-wavelength light 132 can result in the generation of at least one of second-wavelength light 134 or third-wavelength light 136 using one or more nonlinear optical waveguides employing nonlinear optical mixing processes in optical waveguides 102.

In the illustrative example, nonlinear optical mixing processes can include nonlinear optical three-wave mixing processes and nonlinear optical four-wave mixing processes. In this illustrative example, the nonlinear optical three-wave mixing processes and the nonlinear optical four-wave mixing processes can include difference frequency generation (DFG) and sum frequency generation (SFG). The nonlinear optical three-wave mixing processes can also include spontaneous parametric down conversion (SPDC). The nonlinear optical four-wave mixing can also include spontaneous four-wave mixing (SFWM).

In this illustrative example, nonlinear optical wave-mixing processes can include three types of light with three distinct wavelengths such as first-wavelength light 132, second-wavelength light 134, and third-wavelength light 136.

For example, nonlinear optical process 140 such as spontaneous three-wave mixing is a second-order nonlinear optical process that can occur in an optical waveguide having nonlinear optical material 104 in optical waveguides 102. In this process, pair of generated photons 142 are generated from source photons 144 in optical waveguides 102 that have nonlinear optical material 104. Generated photons 142 of a pair can have different wavelengths from each other, such as of second-wavelength light 134 and third-wavelength light 136 and have wavelengths different from the wavelength, such as first-wavelength light 132 of source photons 144.

In this illustrative example, "resonance matching" means a given wavelength is matched to a resonance of a resonator. A resonator can have many resonances. Also, a resonator can be designed such that different lengths can still produce resonance matching for a particular wavelength of light. Resonance is achieved every time the round-trip phase is a multiple of $2\pi$. In this illustrative example, lengths for loops 116 can be selected such that at least one of resonance matching or roundtrip phase matching is present for different wavelengths of light 118.

The lengths for loops 116 can be selected based on the locations where wavelength-selective couplers 114 connect to optical waveguides 102.

Thus, optical waveguide structure 100 can have multiple optical waveguides in optical waveguides 102 that are configured or constructed to enable the propagation of light 118 of different wavelengths to travel within optical waveguide structure 100 in a constructive manner. In one illustrative example, the light 118 of the different wavelengths can travel on loops 116 in which each loop is selected to enable light 118 of a particular wavelength to travel in a constructive manner. For example, a loop in loops 116 can traverse through both a main nonlinear optical waveguide and extension optical waveguides in optical waveguides 102 that extend the length of the loop in loops 116 for different wavelengths of light beyond that provided by the main nonlinear optical waveguide.

Additionally, some loops in loops 116 can extend through both the main nonlinear optical waveguide and one or more parts of a secondary waveguide in addition to or in place of the extension optical waveguides. As a result, a loop in loops 116 for a light of a particular wavelength can traverse one or more of optical waveguides 102.

Thus, although the propagation constants or wave vectors for the light of three wavelengths may be different from each other, the light at the three different wavelengths can still be at resonances when propagating on their respective loops in optical waveguides 102. The propagation can occur such that light 118 of the three wavelengths can propagate constructively over many cycles through loops 116 within the optical waveguide structure 100. This type of propagation can occur because loops 116 have different lengths that are selected to be constructive for light of a particular wavelength.

Figure 2:
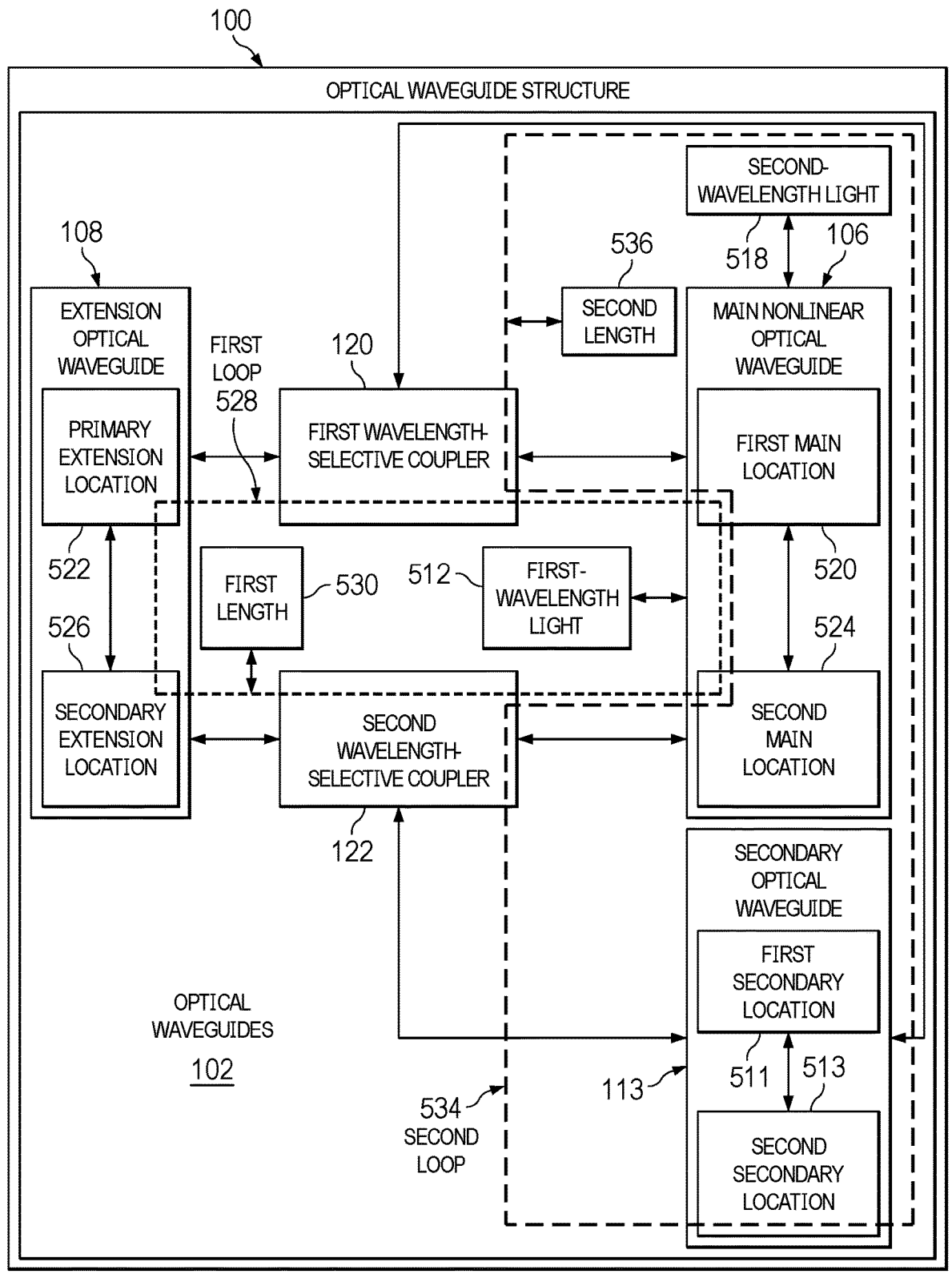
FIG. 2 is another illustration of an optical waveguide structure in accordance with an illustrative embodiment.

Turning next to FIG. 2, another illustration of an optical waveguide structure is depicted in accordance with an illustrative embodiment. In the illustrative examples, the same reference numeral may be used in more than one figure. This reuse of a reference numeral in different figures represents the same element in the different figures.

As depicted in this illustrative example, optical waveguide structure 100 comprises optical waveguides 102. As depicted, optical waveguides 102 include main nonlinear optical waveguide 106, first extension optical waveguide 108, secondary optical waveguide 113, and first wavelength-selective coupler 120, and second wavelength-selective coupler 122. In this example, main nonlinear optical waveguide 106 comprises a nonlinear optical material 104. Main nonlinear optical waveguide 106 also can comprise an electro-optic material 103. First extension optical waveguide 108 and secondary optical waveguide 113 can comprise a nonlinear optical material 104, a non-nonlinear optical material 105, or a combination of a nonlinear optical material and one or more non-nonlinear optical materials. Main nonlinear optical waveguide 106 can comprise a single optical waveguide segment or can comprise multiple optical waveguide segments that are physically separate from each other. Secondary optical waveguide 113 likewise can comprise a single optical waveguide segment or can comprise multiple optical waveguide segments that are physically separate from each other.

In this example, first-wavelength light 512 of a first wavelength and second-wavelength light 518 of a second wavelength travel in the main nonlinear optical waveguide 106. As an example, first-wavelength light 512 can be a pump light with second-wavelength light 518 being at least one of a signal light or an idler light.

In this illustrative example, first wavelength-selective coupler 120 optically couples first main location 520 in main nonlinear optical waveguide 106 and primary extension location 522 in first extension optical waveguide 108 to each other. First wavelength-selective coupler 120 optically couples these two optical waveguides such that first-wavelength light 512 is coupled from main nonlinear optical waveguide 106 at first main location 520 to first extension optical waveguide 108 at primary extension location 522.

Second wavelength-selective coupler 122 optically couples second main location 524 in main nonlinear optical waveguide 106 and secondary extension location 526 in first extension optical waveguide 108 to each other. In this example, second wavelength-selective coupler 122 optically couples these two optical waveguides such that first-wavelength light 512 is coupled from first extension optical waveguide 108 at secondary extension location 526 to main nonlinear optical waveguide 106 at second main location 524.

In this example, first-wavelength light 512 travels in first loop 528 that traverses through portions of main nonlinear optical waveguide 106, portions of first extension optical waveguide 108, first wavelength-selective coupler 120 and second wavelength-selective coupler 122. In this example, first loop 528 has first length 530.

In this illustrative example, first wavelength-selective coupler 120 also optically couples first main location 520 in main nonlinear optical waveguide 106 and first secondary location 511 in secondary optical waveguide 113 to each other. First wavelength-selective coupler 120 optically couples these two optical waveguides such that second-wavelength light 518 is coupled from main nonlinear optical waveguide 106 at first main location 520 to secondary optical waveguide 113 at first secondary location 511.

In this example, second wavelength-selective coupler 122 also optically couples second main location 524 in main nonlinear optical waveguide 106 and second secondary location 513 in secondary optical waveguide 113 to each other. In this example, second wavelength-selective coupler 122 optically couples these two optical waveguides such that second-wavelength light 518 is coupled from secondary optical waveguide 113 at second secondary location 513 to main nonlinear optical waveguide 106 at second main location 524.

In this illustrative example, second-wavelength light 518 travels in main nonlinear optical waveguide 106 and is coupled from main nonlinear optical waveguide 106 at first main location 520 to secondary optical waveguide 113 at first secondary location 511 and travels in secondary optical waveguide 113 to second secondary location 513. Second-wavelength light 518 is coupled from secondary optical waveguide 113 at second secondary location 513 to main nonlinear optical waveguide 106 at second main location 524 by second wavelength-selective coupler 122 such that second-wavelength light 518 travels in second loop 534 having second length 536 for second-wavelength light 518.

Second loop 534 includes portions of main nonlinear optical waveguide 106, portions of secondary optical waveguide 113, first wavelength-selective coupler 120 and second wavelength-selective coupler 122.

Figure 3:
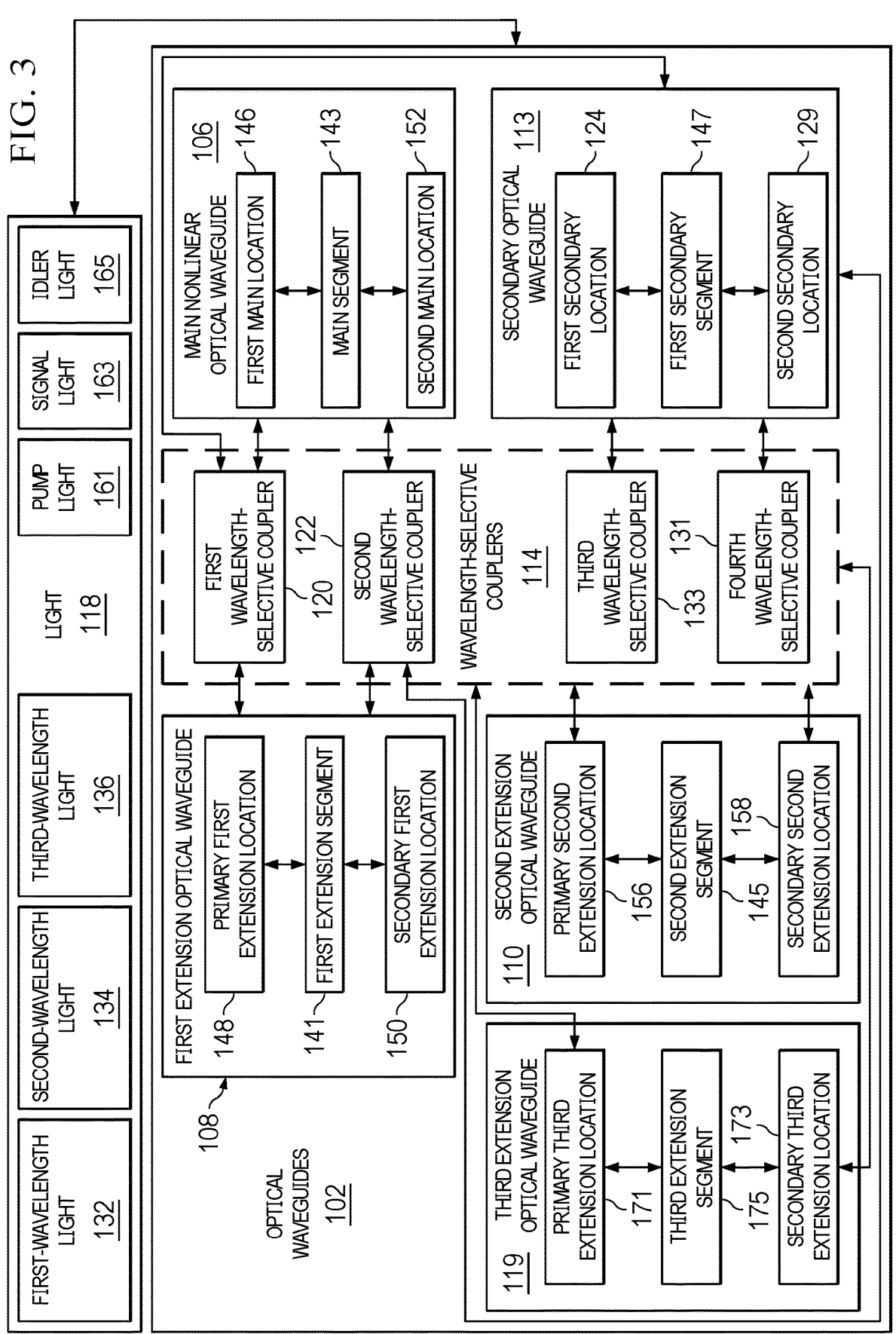
FIG. 3 is an illustration of a block diagram of optical waveguides in accordance with an illustrative example.

With reference next to FIG. 3, an illustration of a block diagram of optical waveguides is depicted in accordance with an illustrative embodiment. In this illustrative example, optical waveguides 102 comprise main nonlinear optical waveguide 106, secondary optical waveguide 113, first extension optical waveguide 108, second extension optical waveguide 110, and third extension optical waveguide 119. Each of these waveguides, main nonlinear optical waveguide 106, secondary optical waveguide 113, first extension optical waveguide 108, second extension optical waveguide 110, and third extension optical waveguide 119 can comprise one or more segments.

As depicted in this example, main nonlinear optical waveguide 106 is an optical waveguide in the set of optical waveguides 102 and is comprised of nonlinear optical material 104. Additionally, secondary optical waveguide 113 is another optical waveguide in the set of optical waveguides 102 and can be comprised of nonlinear optical material 104 or non-nonlinear optical material 105. Secondary optical waveguide 113 can comprise a single optical waveguide segment or can comprise multiple optical waveguide segments that are physically separate from each other. First extension optical waveguide 108 is an example of first extension optical waveguide 108 depicted in FIG. 2.

In this example, light 118 of three different wavelengths can travel through main nonlinear optical waveguide 106. For example, first-wavelength light 132, second-wavelength light 134, and third-wavelength light 136 can travel in main nonlinear optical waveguide 106.

Light of two different wavelengths can travel through secondary optical waveguide 113. For example, second-wavelength light 134 and third-wavelength light 136 can travel in secondary optical waveguide 113.

As depicted in this example, light 118 traveling through optical waveguides 102 can comprise at least one of first-wavelength light 132, second-wavelength light 134, or third-wavelength light 136. In this particular example, first-wavelength light 132, second-wavelength light 134, and third-wavelength light 136 can refer to a pump light 161, a signal light 163, and an idler light 165, but not necessarily in any particular order.

For example, first-wavelength light 132 can also be the signal light 163, second-wavelength light 134 can be the pump light 161, and third-wavelength light 136 can be idler light 165. As another example, first-wavelength light 132 can also be pump light 161, second-wavelength light 134 can be signal light 163, and third-wavelength light 136 can be idler light 165.

Typically, pump light 161 has an intensity that is at least twice the intensity of signal light 163 and at least twice the intensity of idler light 165. In some examples, the intensity of pump light 161 is at least ten times greater than the intensity of signal light 163 or of idler light 165. Typically, pump light 161 is supplied as an input to optical waveguide structure 100. In some cases, either of signal light 163 and idler light 165 also can be supplied as a second input to optical waveguide structure 100. Either or both of signal light 163 and idler light 165 can be generated through nonlinear optical process 140 that occurs in portions of optical waveguide structure 100 that comprise a nonlinear optical material 104.

First extension optical waveguide 108 can be comprised of one at least one of nonlinear optical material 104 or a non-nonlinear optical material 105. In this example, a light such as a pump light 161 can travel through first extension optical waveguide 108.

Second extension optical waveguide 110 can be comprised of at least one of nonlinear optical material 104 or non-nonlinear optical material 105. A light such as signal light 163 can travel through second extension optical waveguide 110.

Third extension optical waveguide 119 can also be comprised of one of nonlinear optical material 104 and a non-nonlinear optical material 105. In this example, a light such as idler light 165 can travel through third extension optical waveguide 119, which can be a nonlinear optical waveguide.

In one illustrative example, first extension optical waveguide 108, second extension optical waveguide 110, and third extension optical waveguide 119 are not constructed using nonlinear optical material 104. In another illustrative example, at least one of first extension optical waveguide 108, second extension optical waveguide 110 and third extension optical waveguide 119 can be constructed using nonlinear optical material 104. In yet another illustrative example, at least one of first extension optical waveguide 108, second extension optical waveguide 110 and third extension optical waveguide 119 can be constructed using electro-optic material 103. Main nonlinear optical waveguide 106 also can be constructed using electro-optic material 103.

In this illustrative example, wavelength-selective couplers 114 include first wavelength-selective coupler 120, second wavelength-selective coupler 122, third wavelength-selective coupler 133, and fourth wavelength-selective coupler 131. Wavelength-selective couplers 114 can couple light 118 of different wavelengths to different optical waveguides based on the wavelengths in light 118. For example, wavelength-selective couplers 114 can be configured to couple first-wavelength light 132, second-wavelength light 134 and third-wavelength light 136 to selected different routes for travel of light 118 through optical waveguides in optical waveguides 102 based on the wavelengths of the light. For another example, wavelength-selective couplers 114 can be configured to couple at least one of second-wavelength light 134 or third-wavelength light 136 to different selected optical waveguides in optical waveguides 102 based on the wavelengths of the light.

For example, first wavelength-selective coupler 120 optically couples first main location 146 in main nonlinear optical waveguide 106 and primary first extension location 148 in first extension optical waveguide 108 to each other such that first-wavelength light 132 is coupled from main nonlinear optical waveguide 106 at the first main location 146 to first extension optical waveguide 108 at primary first extension location 148.

First-wavelength light 132 can travel from primary first extension location 148 to secondary first extension location 150 through first extension segment 141. In this illustrative example, locations at which first wavelength-selective coupler 120 and second wavelength-selective coupler 122 connect to main nonlinear optical waveguide 106 define the extent of main segment 143 of main nonlinear optical waveguide 106. Further, main nonlinear optical waveguide 106 also can include additional segments. These additional segments can be defined by additional locations in main nonlinear optical waveguide 106 at which those segments are coupled to wavelength-selective couplers.

In this example, second wavelength-selective coupler 122 optically couples second main location 152 in main nonlinear optical waveguide 106 and secondary first extension location 150 in first extension optical waveguide 108 to each other such that first-wavelength light 132 is coupled from first extension optical waveguide 108 at secondary first extension location 150 to main nonlinear optical waveguide 106 at second main location 152.

First-wavelength light 132 can travel from second main location 152 to first main location 146 through main segment 143 in main nonlinear optical waveguide 106.

In this illustrative example, first main location 146 and second main location 152 define main segment 143, which is the portion of main nonlinear optical waveguide 106 through which first-wavelength light 132, second-wavelength light 134, and third-wavelength light 136 can travel. In this example, main segment 143 is comprised of a nonlinear optical material 104 and nonlinear optical processes can occur within main segment 143.

In this example, third wavelength-selective coupler 133 optically couples third secondary location 123 in secondary optical waveguide 113 and primary second extension location 156 in second extension optical waveguide 110 to each other such that second-wavelength light 134 is coupled from secondary optical waveguide 113 at third secondary location 123 to second extension optical waveguide 110 at primary second extension location 156.

In this example, second-wavelength light 134 can travel from primary second extension location 156 to secondary second extension location 158 through second extension segment 145 in second extension optical waveguide 110.

Illustration of waveguide configurations for optical waveguides 102 in FIG. 1, FIG. 2 and FIG. 3 are presented as illustrations of some configurations for optical waveguides 102. These illustrations are not meant to limit the manner in which other illustrative examples can be implemented. For example, one or more waveguide segments can be present in addition to or in place of main segment 143. As yet another example, additional ones of wavelength-selective couplers 114 can be connected to additional segments of main nonlinear optical waveguide 106, additional segments of secondary optical waveguide 113 and additional extension optical waveguides in optical waveguide 102. In other illustrative examples, optical waveguide 102 can omit at least one of second extension optical waveguide 110 or third extension optical waveguide 119.

Figure 4:
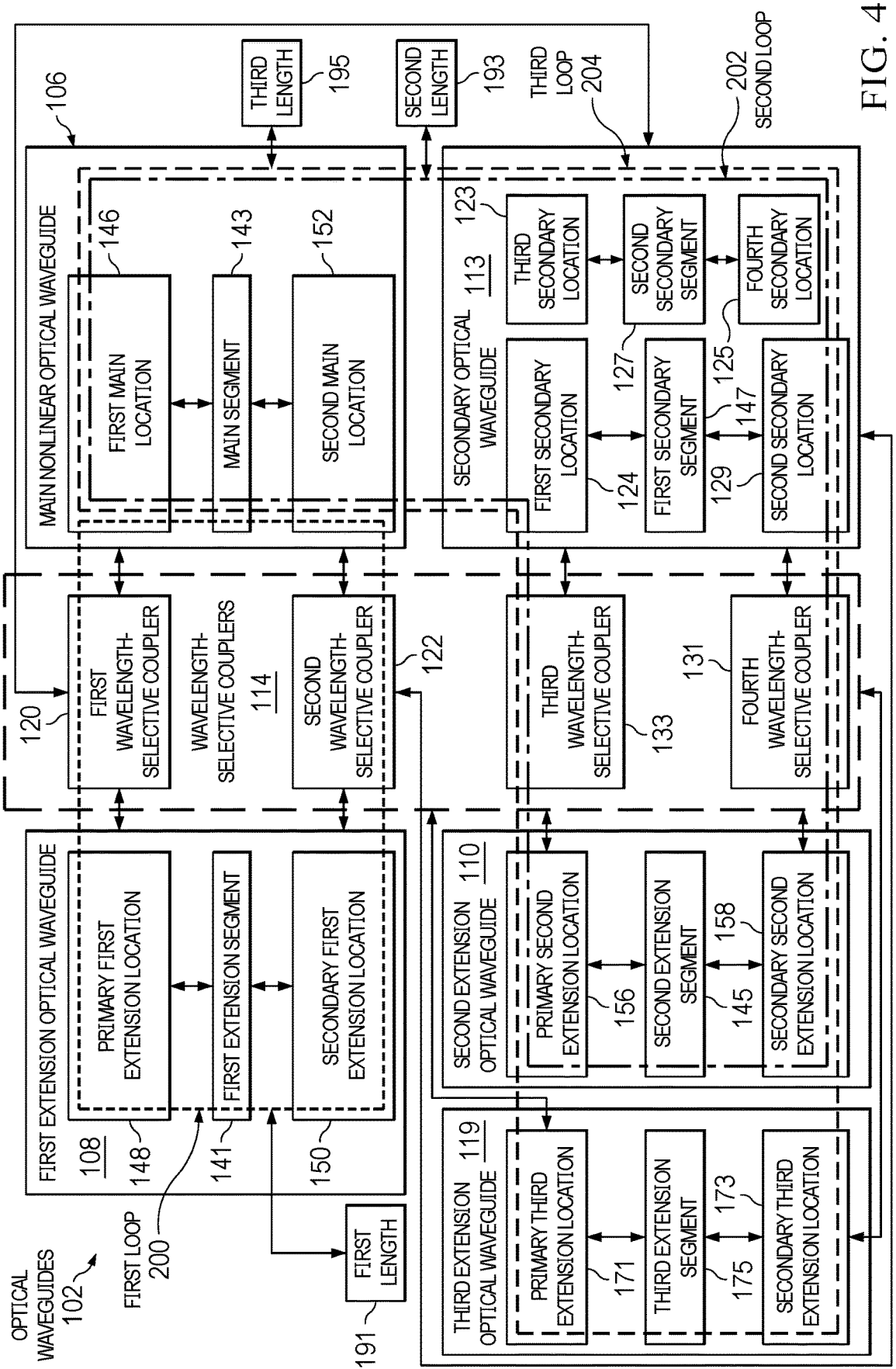
FIG. 4 is an illustration of loops in optical waveguides in accordance with an illustrative embodiment.

Turning to FIG. 4, fourth wavelength-selective coupler 131 optically couples fourth secondary location 125 in the secondary optical waveguide 113 and secondary second extension location 158 in second extension optical waveguide 110 to each other such that second-wavelength light 134 is coupled from second extension optical waveguide 110 at secondary second extension location 158 to secondary optical waveguide 113 at fourth secondary location 125. Second-wavelength light 134 can travel from primary second extension location 156 to secondary second extension location 158 through second extension segment 145 in second extension optical waveguide 110.

Second-wavelength light 134 can travel from first secondary location 124 to third secondary location 123 through first secondary segment 147 (in FIG. 4). Second-wavelength light 134 can travel from fourth secondary location 125 to second secondary location 129 through second secondary segment 127 (in FIG. 4). Similarly, third-wavelength light 136 can travel from first secondary location 124 to third secondary location 123 through second secondary segment 127 (in FIG. 4). Third-wavelength light 136 can travel from fourth secondary location 125 to second secondary location 129 through second secondary segment 127 (in FIG. 4). In this illustrative example, first-wavelength light 132 can be pump light 161, second-wavelength light 134 can be one of signal light 163 and idler light 165.

Additionally, third wavelength-selective coupler 133 can optically couple third secondary location 123 in secondary optical waveguide 113 and primary third extension location 171 in third extension optical waveguide 119 to each other such that third-wavelength light 136 is coupled from secondary optical waveguide 113 at third secondary location 123 to third extension optical waveguide 119 at primary third extension location 171.

Furthermore, fourth wavelength-selective coupler 131 can optically couple fourth secondary location 125 in secondary optical waveguide 113 and secondary third extension location 173 in the third extension optical waveguide 119 to each other such that third-wavelength light 136 is coupled from third extension optical waveguide 119 at secondary third extension location 173 to secondary optical waveguide 113 at fourth secondary location 125. Third-wavelength light 136 can travel from primary third extension location 171 to secondary third extension location 173 through third extension segment 175 in third extension optical waveguide 119. Third-wavelength light 136 can travel from third secondary location 123 to fourth secondary location 125 through second secondary segment 127 (in FIG. 4).

When second extension optical waveguide 110 and third extension optical waveguide 119 are present and coupled to secondary optical waveguide 113, both second-wavelength light 134 and third-wavelength light 136 can travel through secondary optical waveguide 113. In this example, first-wavelength light 132 can be pump light 161, second-wavelength light 134 can be signal light 163, and third-wavelength light 136 can be idler light 165.

With reference now to FIG. 4, an illustration of loops in optical waveguides is depicted in accordance with an illustrative embodiment. In this example, first loop 200, second loop 202, and third loop 204 are examples of loops 116 in FIG. 1.

In this illustrative example, first-wavelength light 132 travels in first loop 200 through main segment 143 between first main location 146 and second main location 152 within the main nonlinear optical waveguide 106 and first extension segment 141 between primary first extension location 148 and secondary first extension location 150 in the first extension optical waveguide 108. In this example, first loop 200 has first length 191.

Second-wavelength light 134 travels in second loop 202 through first secondary segment 147 between first secondary location 124 and third secondary location 123 in secondary optical waveguide 113, second extension segment 145 between primary second extension location 156 and secondary second extension location 158 in second extension optical waveguide 110, second secondary segment 127 between third secondary location 123 and second secondary location 129 in secondary optical waveguide 113, and main segment 143 in main nonlinear optical waveguide 106. In this illustrative example, second loop 202 has second length 193 for second-wavelength light 134.

Third-wavelength light 136 travels in third loop 204 through first secondary segment 147 between first secondary location 124 and third secondary location 123 in secondary optical waveguide 113, third extension segment 175 between primary third extension location 171 and secondary third extension location 173 in third extension optical waveguide 119, second secondary segment 127 between fourth secondary location 125 and second secondary location 129 in secondary optical waveguide 113, and main segment 143 in main nonlinear optical waveguide 106. In this example, third loop 204 as third length 195.

As depicted, first-wavelength light 132 travels within main segment 143 in main nonlinear optical waveguide 106 and first extension segment 141 in first extension optical waveguide 108 in first loop 200. In this example, first loop 200 has first length 191.

As depicted, first length 191 can also comprise the length of first wavelength-selective coupler 120 and the length of second wavelength-selective coupler 122. Second length 193 can also comprise the lengths of third wavelength-selective coupler 133 and fourth wavelength-selective coupler 131 as well as the lengths of first wavelength-selective coupler 120 and second wavelength-selective coupler 122. Third length 195 of third loop 204 can also comprise the lengths of third wavelength-selective coupler 133 and the length of fourth wavelength-selective coupler 131 as well as the lengths of first wavelength-selective coupler 120 and second wavelength-selective coupler 122.

The lengths of first loop 200, second loop 202, and third loop 204 can be selected based on the locations where wavelength-selective couplers 114 connect optical waveguides 102 to each other. First length 191 for first loop 200, second length 193 for second loop 202, and third length 195 for third loop 204 can have different lengths from each other.

For example, first length 191 of first loop 200 can be selected based on a selection of first main location 146 and primary first extension location 148 for first wavelength-selective coupler 120 connecting main nonlinear optical waveguide 106 to first extension optical waveguide 108 and based on a selection of secondary second extension location 158 and second main location 152 for second wavelength-selective coupler 122 connecting first extension optical waveguide 108 to main nonlinear optical waveguide 106.

As another example, second length 193 of second loop 202 can be selected based on a selection of first secondary location 124 in secondary optical waveguide 113, and second secondary location 129 and primary second extension location 156 for third wavelength-selective coupler 133 connecting secondary optical waveguide 113 to second extension optical waveguide 110; and based on a selection of secondary second extension location 158 and third secondary location 123 for fourth wavelength-selective coupler 131 connecting second extension optical waveguide 110 to secondary optical waveguide 113, and fourth secondary location 125 in secondary optical waveguide 113.

As yet another example, third length 195 of third loop 204 can be selected based on a selection of first secondary location 124 in secondary optical waveguide 113, and second secondary location 129 and primary third extension location 171 for third wavelength-selective coupler 133 connecting secondary optical waveguide 113 to third extension optical waveguide 119 and based on a selection of secondary third extension location 173 and third secondary location 123 for fourth wavelength-selective coupler 131 connecting third extension optical waveguide 119 to secondary optical waveguide 113, and fourth secondary location 125 in secondary optical waveguide 113.

Figure 5:
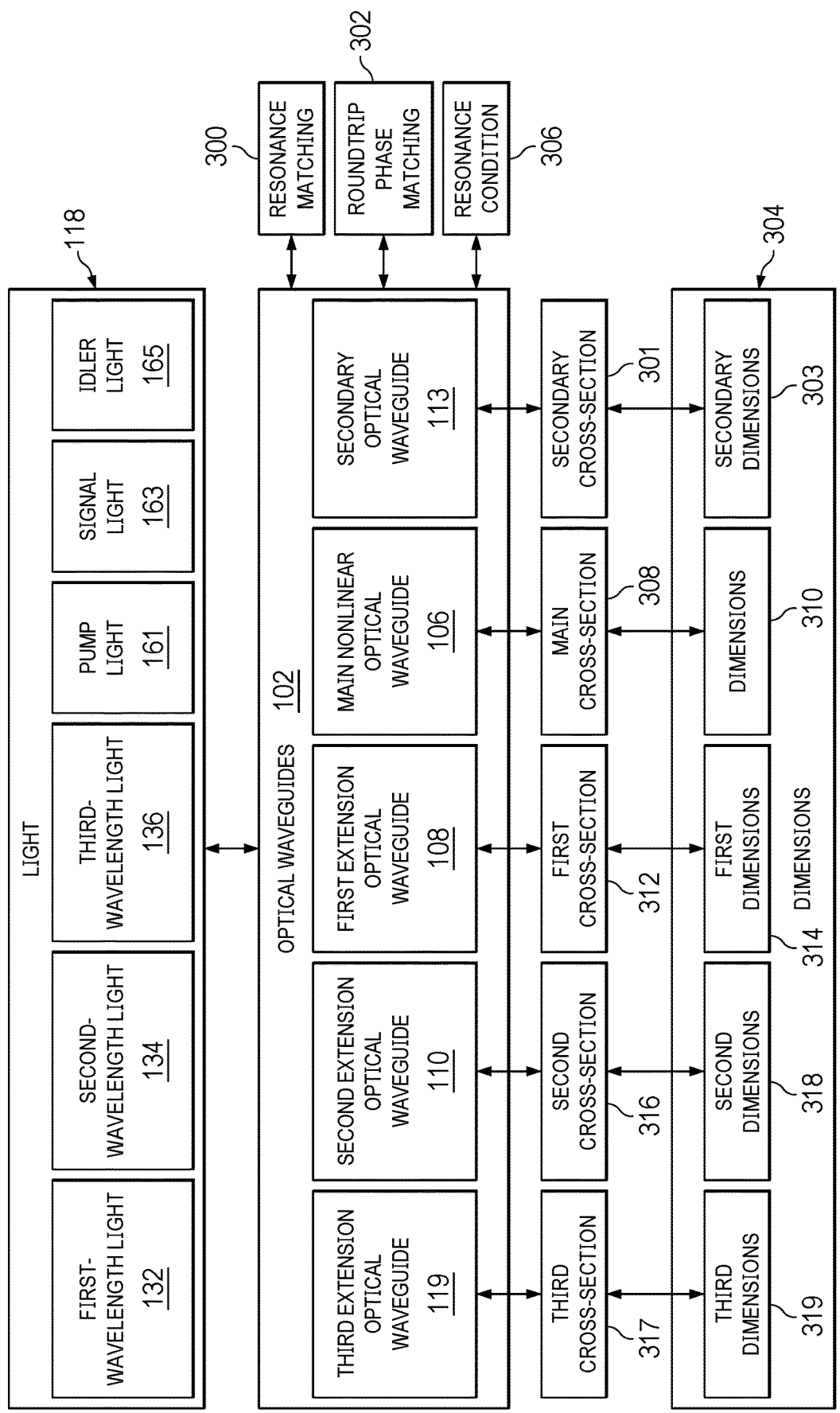
FIG. 5 is an illustration of a block diagram of a configuration for nonlinear optical waveguides in accordance with an illustrative embodiment.

With reference next to FIG. 5, an illustration of a block diagram of a configuration for nonlinear optical waveguides is depicted in accordance with an illustrative embodiment. In illustrative example, at least one of resonance matching 300 or roundtrip phase matching 302 for optical waveguides 102 can be achieved through the selection of dimensions 304 for optical waveguides 102. This selection of dimensions 304 can be made in addition to the selection of lengths, such as first length 191, second length 193, and second length 193 for loops 116 optical waveguides 102 to achieve at least one of resonance matching 300 or roundtrip phase matching 302 for optical waveguides 102.

For example, main nonlinear optical waveguide 106 can have main cross-section 308 with a set of dimensions 310 in dimensions 304 selected to achieve resonance condition 306 for first-wavelength light 132 traveling in main nonlinear optical waveguide 106. In this example, secondary optical waveguide 113 can have secondary cross-section 301 with secondary dimensions 303 selected to achieve resonance condition 306 for one of first-wavelength light 132 and second-wavelength light 134 traveling in secondary optical waveguide 113.

As another example, first extension optical waveguide 108 can have first cross-section 312 with first dimensions 314 selected to achieve resonance condition 306 for first-wavelength light 132 traveling in first extension optical waveguide 108. Further, second extension optical waveguide 110 can have second cross-section 316 with a set of second dimensions 318 selected to achieve resonance condition 306 for second-wavelength light 134 traveling in second extension optical waveguide 110. Also, third extension optical waveguide 119 can have third cross-section 317 with a set of third dimensions 319 selected to achieve resonance condition 306 for third-wavelength light 136 traveling in second extension optical waveguide 110.

Figure 6:
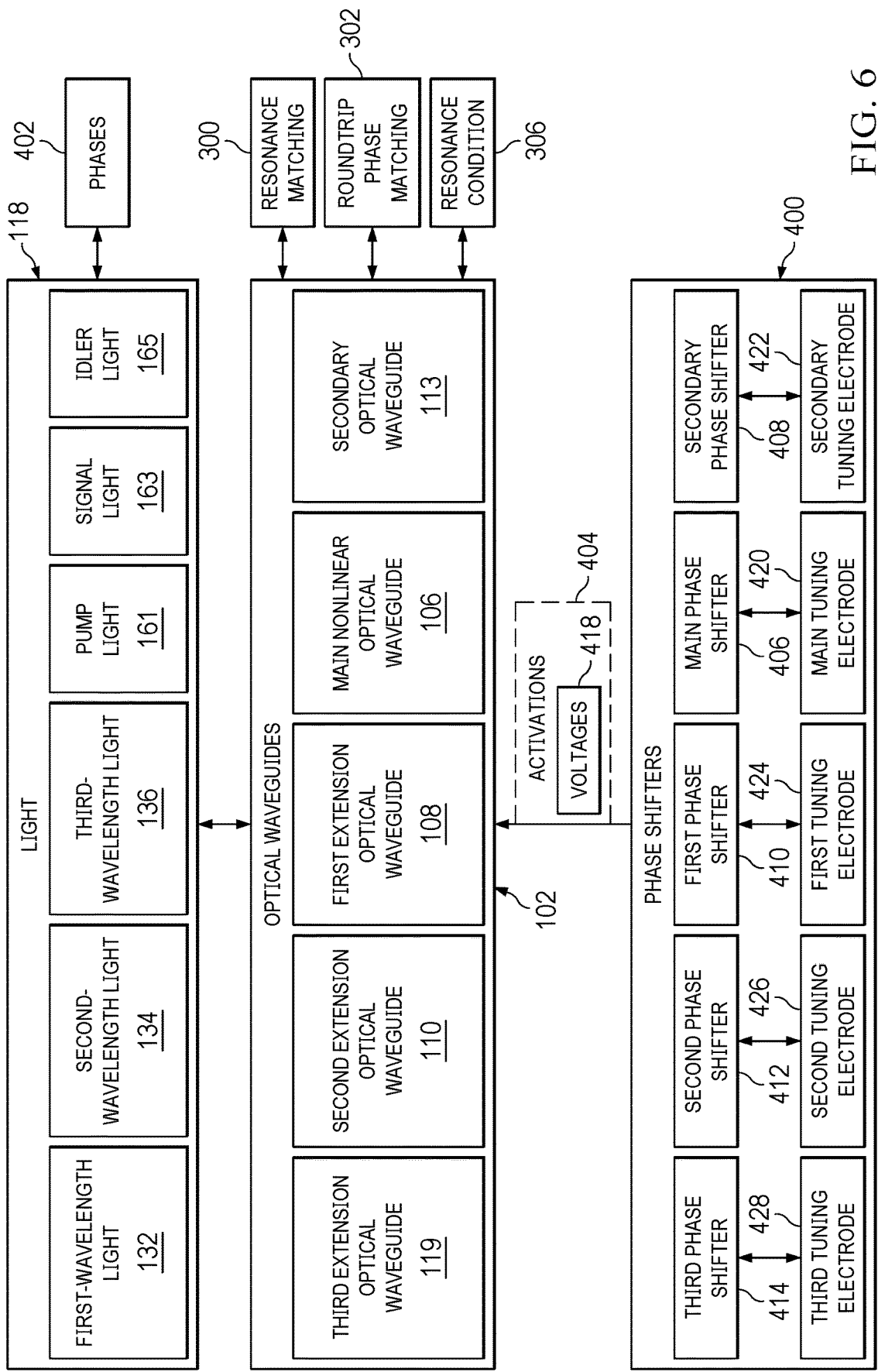
FIG. 6 is an illustration of phase shifters used to obtain at least one of resonance matching or roundtrip phase matching in accordance with an illustrative embodiment.

With reference now to FIG. 6, an illustration of phase shifters used to obtain at least one of resonance matching or roundtrip phase matching is depicted in accordance with an illustrative embodiment. At least one of manufacturing deviations from specifications, environmental factors, or other influences can affect whether a resonance condition is present during the operation of optical waveguide structure 100.

When roundtrip phase matching 302 in FIG. 5 is not present during operation of optical waveguide structure 100, a set of phase shifters 400 can be used to adjust a set of phases 402 for light 118 propagating within optical waveguides 102. In one illustrative example, the set of phase shifters 400 can be structures that are located adjacent to one or more of optical waveguides 102; connected to one or more of optical waveguides 102; include part of one or more of optical waveguides 102; or a combination thereof.

The set of phase shifters 400 can operate to ensure a desired level of roundtrip phase matching 302 is achieved for light 118 that is generated within optical waveguides 102 in optical waveguide structure 100. As depicted, light 118 can be generated in an optical waveguide in optical waveguides 102 that is comprised of nonlinear optical material 104. In the illustrative example, main nonlinear optical waveguide 106 is comprised of nonlinear optical material 104. Optionally, at least one of first extension optical waveguide 108, second extension optical waveguide 110 or third extension optical waveguide 119 can be comprised of nonlinear optical material 104. In an illustrative example, at least one of first extension optical waveguide 108, second extension optical waveguide 110 or third extension optical waveguide 119 can be comprised of electro-optic material 103.

In one illustrative example, a set of phase shifters 400 can be connected to a set of optical waveguides 102 comprising at least one of main nonlinear optical waveguide 106, first extension optical waveguide 108 second extension optical waveguide 110, or third extension optical waveguide 119. The set of phase shifters 400 can apply a set of activations 404 to achieve a change or shift in the phase of at least one of first-wavelength light 132, second-wavelength light 134, or third-wavelength light 136 in light 118 traveling in the set of optical waveguides 102 to which the set of activations 404 is applied.

In one illustrative example, the set of phase shifters 400 comprises a set of elements that can be located adjacent to a waveguide. The set of phase shifters 400 can take a number of different forms. For example, the set of phase shifters 400 can be selected from at least one of a tuning electrode, a thermal element, shape memory alloy element, piezo electric element, or some other element that can change the phase of light of a particular wavelength propagating through the optical waveguide. These elements for the set of phase shifters 400 can be at least one of adjacent to part of an optical waveguide, connected to part of an optical waveguide, or include part of an optical waveguide.

The set of activations 404 can take a number of different forms. For example, the set of activations 404 can be selected from at least one of a voltage, a current, a thermal energy, an electrically induced strain, or some other type of energy that can be applied to an optical waveguide to affect the manner in which light propagates through the optical waveguide. In particular, the energy can be used to affect the phase of light of a particular wavelength propagating through the optical waveguide.

In other words, the set of phase shifters 400 can selectively apply the set of activations 404 to adjust the phase for a particular wavelength of light 118 traveling within loops 116 in optical waveguides 102. This adjustment can be made by applying the activations 404 using a particular phase shifter located adjacent to an optical waveguide in the set of optical waveguides 102 in a loop in loops 116 for a particular wavelength of light to maintain or reach resonance matching 300 for that particular wavelength of light.

For example, a phase shifter, such as main phase shifter 406, can be located adjacent to a portion of main nonlinear optical waveguide 106. Main phase shifter 406 can apply an activation in activations 404 such that a phase shifts in first-wavelength light 132 to achieve resonant condition 306 for first-wavelength light 132 for light traveling in first loop 200.

Another phase shifter, such as secondary phase shifter 408 can be located adjacent to a portion of secondary optical waveguide 113. Secondary phase shifter 408 can apply an activation in activations 404 such that a phase shifts in one or both of second-wavelength light 134 and third-wavelength light 136 to achieve a roundtrip phase matching 302 for the nonlinear optical process.

A phase shifter, such as first phase shifter 410, can be located adjacent to a portion of first extension optical waveguide 108. First phase shifter 410 can apply an activation in activations 404 such that a phase shifts in first-wavelength light 132 to achieve a resonance condition 306 for first-wavelength light 132 in first loop 200. First phase shifter 410 also can apply an activation in activations 404 such that a phase shifts in first-wavelength light 132 to achieve a roundtrip phase matching 302 for the nonlinear optical process.

In another illustrative example, a phase shifter, such as second phase shifter 412, can be located adjacent to a portion of second extension optical waveguide 110. Second phase shifter 412 can apply an activation in activations 404 such that a phase shifts in second-wavelength light 134 to achieve a resonance condition 306 for second-wavelength light 134 in second loop 202.

As another illustrative example, a phase shifter, such as third phase shifter 414, can be located adjacent to a portion of third extension optical waveguide 119. Third phase shifter 414 can an activation in activations 404 such that a phase shifts in third-wavelength light 136 to achieve resonance condition 306 for third-wavelength light 136 in third loop 204.

In one illustrative example, the set of phase shifters 400 can be a set of tuning electrodes that apply a set of activations 404 as a set of voltages 418. With this type of phase shifters in the form of tuning electrodes that apply activations 404 in the form of voltages 418, the optical waveguides associated with the tuning electrodes can be comprised of an electro-optic material 103. One example of an electro-optical material 103 is lithium niobate. This material does not have to be use throughout the entire optical waveguide. Lithium niobate can be used in the sections that are associated with or adjacent to the tuning electrodes.

Lithium niobate is an electro-optic material for which the material refractive index can be changed by applying an electric field to the lithium niobate material. Lithium niobate has a second order nonlinear optical coefficient that is large enough to result in undesired light generation. As a result, in some illustrative examples the regions in a nonlinear optical waveguide containing the lithium niobate containing regions used for electro-optic tuning from the lithium niobate can be separated from regions containing lithium niobate used for the nonlinear optical generation of signal photons and idler photons.

With this example, main phase shifter 406 in the set of phase shifters 400 can be main tuning electrode 420 located adjacent to a portion of main nonlinear optical waveguide 106. Secondary phase shifter 408 in the set of phase shifters 400 can be secondary tuning electrode 422 located adjacent to a portion of secondary optical waveguide 113.

In this illustrative example, first phase shifter 410 can be first tuning electrode 424 located adjacent to a portion of first extension optical waveguide 108. Second phase shifter 412 can be second tuning electrode 426 located adjacent to a portion of second extension optical waveguide 110, and third phase shifter 414 in the set of phase shifters 400 can be third tuning electrode 428 located adjacent to a portion of third extension optical waveguide 119.

First tuning electrode 424, second tuning electrode 426, and third tuning electrode 428 can apply the set of activations 404 in the form of a set of voltages 418 to adjust the set of phases 402 in at least one of first-wavelength light 132, second-wavelength light 134, or third-wavelength light 136 traveling in a set of loops 116 through optical waveguides 102. This shift in the set of phases 402 can be made to maintain or reach resonance condition 306 for one or more of the wavelengths of light 118. These wavelengths of light can be for example, at least one of first-wavelength light 132, second-wavelength light 134, or third-wavelength light 136. This shift in the set of phases 402 also can be made to achieve or maintain roundtrip phase matching 302.

In the illustrative example, when an optical waveguide in the set of optical waveguides 102 comprises an electro-optic material 103, the activation can take the form of a voltage. When the optical waveguide does not comprise an electro-optic material, other forms of energy such as, for example, thermal energy, such as heat, or strain can be used as the set of activations 404. In this illustrative example, heat can be generated by applying electrical current to a resistor that forms a phase shifter in the set of phase shifters 400 such that heat is generated. As another example, a voltage can be applied to a piezo electric element for phase shifter in the set of phase shifters 400 to change the dimensions of the tuning electrode to cause strain in the portion of the optical waveguide adjacent to the phase shifter in the set of phase shifters 400.

The illustration of optical waveguide structure 100 and the different components in FIGS. 1-6 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, additional extension waveguides can be present in optical waveguide structure 100. For example, another extension waveguide can be optically coupled to second extension optical waveguide 110. This coupling can be performed using another pair of wavelength-selective couplers to form a third extension segment for third-wavelength light.

In another illustrative example, fewer components can be present than depicted in optical waveguide structure 100 in FIGS. 1-6. In another illustrative example, third extension optical waveguide 119 can be omitted from optical waveguides 111. In other illustrative examples, phase shifters 400 may be used with some but not all of optical waveguides 102. In one example, only main phase shifter 406 may be present.

Figure 7:
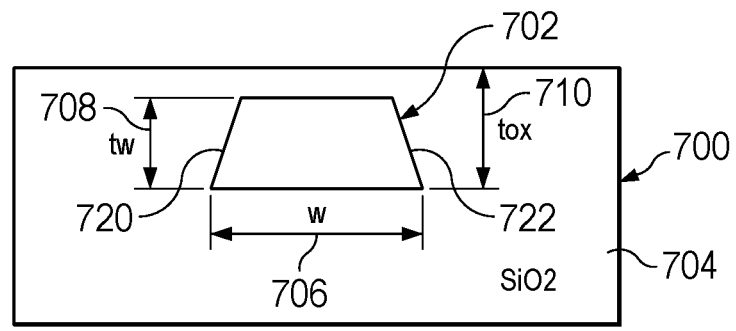
FIG. 7 is an illustration of a cross-section of an optical waveguide in accordance with an illustrative embodiment.

With reference now to FIG. 7, an illustration of a cross-section of an optical waveguide is depicted in accordance with an illustrative embodiment. In this illustrative example, optical waveguide 700 is shown in a cross-sectional view. This cross-section can be used in the optical waveguides in optical waveguide structure 100 in FIGS. 1-6.

As depicted, optical waveguide 700 comprises core region 702 and cladding region 704. Core region 702 can be comprised of a material such as silicon nitride ($Si_3N_4$), silicon (Si) or silicon carbide (SiC) for optical processes based on four wave mixing. Core region 702 can be comprised of a material such as lithium niobate ($LiNbO_3$), gallium phosphide (GaP), aluminum nitride (AlN), aluminum gallium arsenide (AlGaAs), or silicon carbide (SiC) for optical processes based on three-wave mixing. Cladding region 704 can be comprised of silicon dioxide ($SiO_2$) or other material whose refractive index is lower than the refractive index of the material comprising core region 702. The particular material used in optical waveguide 700 can vary in other illustrative examples depending on the optical process used.

In this illustrative example, core region 702 has width w 706 and height tw 708. Cladding region 704 has height tox 710. Cladding region 704 can cover any combination of the top, the two sides and the bottom of core region 702.

Optical waveguide 700 can be adjusted to achieve values for the effective refractive indices (neff) of the wavelengths of light 118 traveling through optical waveguide 700. The effective refractive indices can be adjusted through the selection of the material refractive index at a specific wavelength and varying the waveguide dimensions such as width w 706, height tw 708, and top oxide thickness, height tox 710.

The selection of at least one of the material and dimensions for optical waveguide 700 can be based on the conditions for momentum conservation and phase matching. In the illustrative example, momentum conservation is an automatic consequence of the nonlinear optical interaction. Whether the phase matching associated with the particular waveguide structure is consistent with momentum conservation determines the degree of phase walk-off that results as the light travels in the waveguide over some distance.

For example, an effective refractive index can be a function of the height and width of core region 702. The constructive nonlinear generation length is the propagation length at which the phase walk-off equals $\pi$ radians. The constructive nonlinear generation length is inversely proportional to the phase mismatch. In an illustrative example, the length of the main nonlinear optical waveguide should be no larger than the constructive nonlinear generation length that can be achieved for the main nonlinear optical waveguide. In illustrative examples, the nonlinear optical interaction occurs in all three loops.

Additionally, the cross-section shown for optical waveguide 700 is provided as an example and is not meant to limit the manner in which other illustrative examples can implement cross-sections for waveguides. For example, optical waveguide 700 is shown with side 720 and side 722 that are angled for core region 702. In other illustrative examples, these two sides can be parallel to each other rather than angled. As another example, other components may be present in this cross-section such as side regions that may be located adjacent to side 720 and side 722. In yet another illustrative example, the cross-section of optical waveguide 700 may also include a phase shifter such as a tuning electrode. As another example, optical waveguide 700 can include a second core region in addition to core region 702 when optical waveguide 700 is used to implement a two-waveguide optical coupler.

Figure 8:
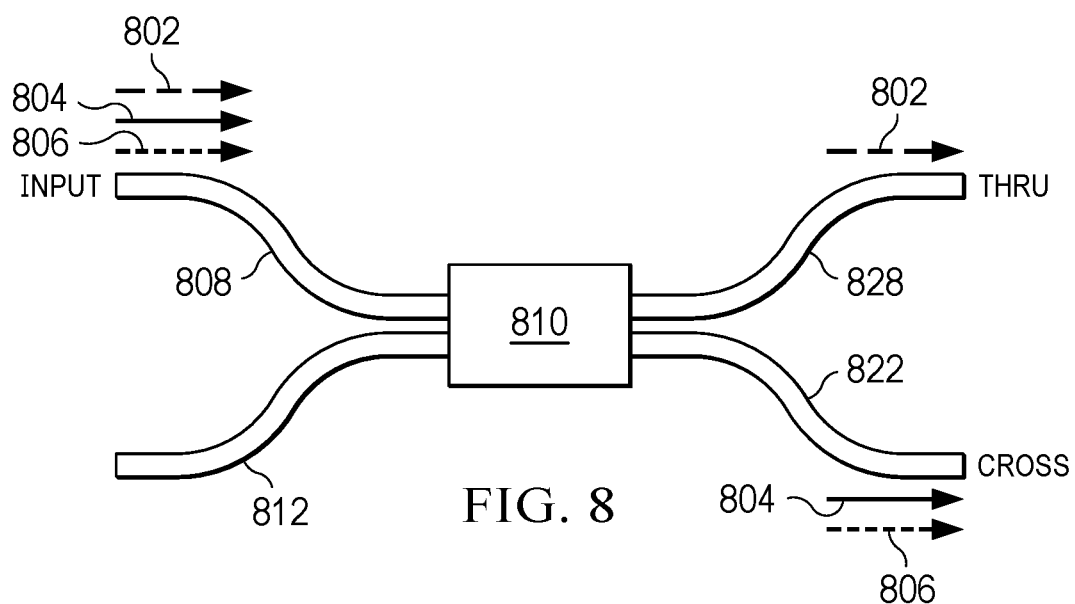
FIG. 8 is an illustration of light coupling by a wavelength-selective coupler in accordance with an illustrative embodiment.

Turning to FIG. 8, an illustration of light coupling by a wavelength-selective coupler is depicted in accordance with an illustrative embodiment. In this illustrative example, pump light 802, signal light 804, and idler light 806 travel through optical waveguide 808 and are input into wavelength-selective coupler 810. Signal light 804 and idler light 806 also travel through optical waveguide 808 and are input into wavelength-selective coupler 810. As depicted, at the output of wavelength-selective coupler 810, pump light 802 continues through to optical waveguide 828. In this example, signal light 804 and idler light 806 cross over from optical waveguide 808 to optical waveguide 822 at the output of wavelength-selective coupler 810. Signal light 804 and idler light 806 also cross over from optical waveguide 812 at the input of wavelength-selective coupler 810 to optical waveguide 828 at the output of wavelength-selective coupler 810. Wavelength-selective coupler 810 is an illustration of an implementation for first wavelength-selective coupler 1220 and second wavelength-selective coupler 1222 in optical waveguide structure 1200 in FIG. 16 and for first wavelength-selective coupler 1320 and second wavelength-selective coupler 1322 in optical waveguide structure 1300 in FIG. 17.

Figure 9:
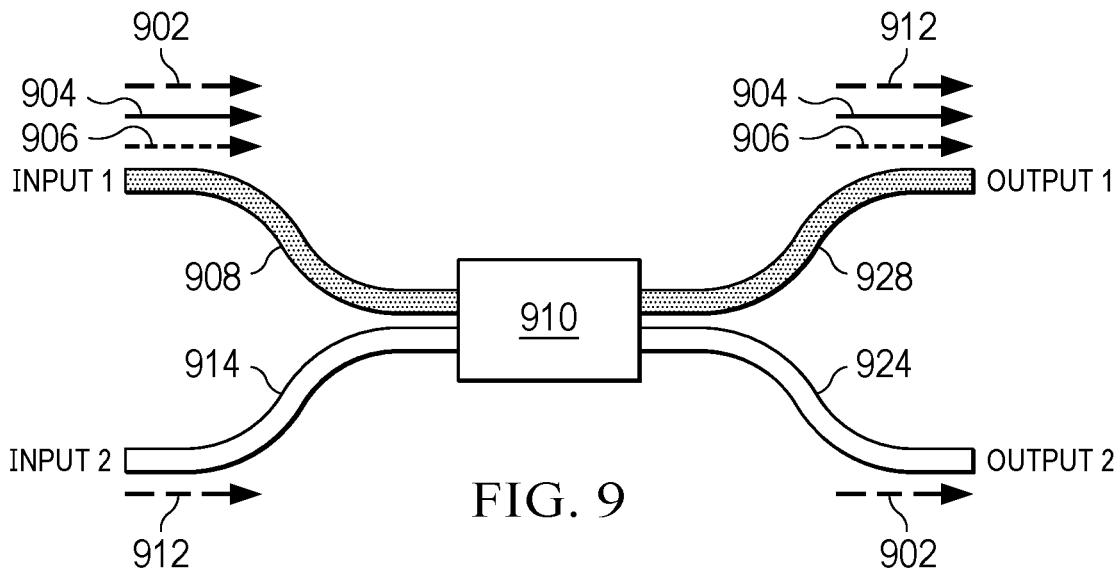
FIG. 9 is an illustration of light coupling by a wavelength-selective coupler in accordance with an illustrative embodiment.

With reference next to FIG. 9, an illustration of light coupling by a wavelength-selective coupler is depicted in accordance with an illustrative embodiment. In this illustrative example, pump light 902, signal light 904, and idler light 906 travel through optical waveguide 908 into wavelength-selective coupler 910. Pump light 912 also travels through optical waveguide 914 and is input into wavelength-selective coupler 910.

As depicted, at the output of wavelength-selective coupler 910, signal light 904 and idler light 906 continues through into optical waveguide 928. Pump light 902 traveling into wavelength-selective coupler 910 from optical waveguide 908 crosses over to optical waveguide 924 at the output of wavelength-selective coupler 910. In a similar fashion, pump light 912 traveling through optical waveguide 914 into wavelength-selective coupler 910 crosses over to optical waveguide 928 at the output of wavelength-selective coupler 910. Wavelength-selective coupler 910 is illustrative of first wavelength-selective coupler 1120 and second wavelength-selective coupler 1122 in optical waveguide structure 1100 in FIG. 13, first wavelength-selective coupler 1020 and second wavelength-selective coupler 1022 in optical waveguide structure 1000 in FIG. 14, first wavelength-selective coupler 1420, second wavelength-selective coupler 1422 in optical waveguide structure 1400 in FIG. 15, and first wavelength-selective coupler 1580, second wavelength-selective coupler 1586, third wavelength-selective coupler 1584 and fourth wavelength-selective coupler 1582 in optical waveguide structure 1500 in FIG. 18, described below.

Figure 10:
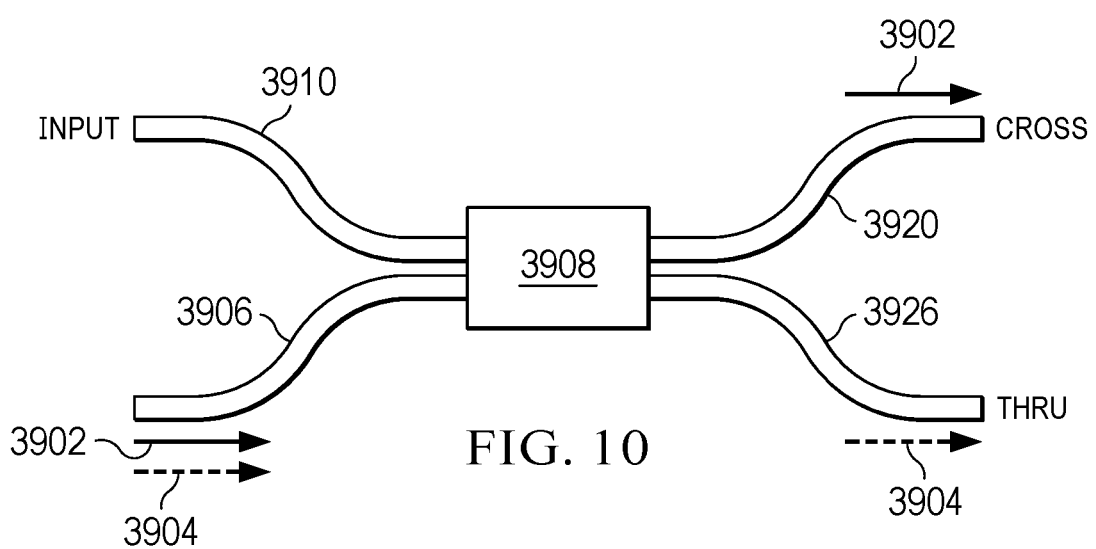
FIG. 10 is an illustration of light coupling by a wavelength-selective coupler in accordance with an illustrative embodiment.

With reference to FIG. 10, an illustration of light coupling by a wavelength-selective coupler is depicted in accordance with an illustrative embodiment. In this illustrative example, signal light 3902 and idler light 3904 travel through optical waveguide 3906 and are input into wavelength-selective coupler 3908. In this depicted example, light is not input into optical waveguide 3910 which is connected to wavelength-selective coupler 3908. As depicted, at the output of wavelength-selective coupler 3908, idler light 3904 continues through into optical waveguide 3926 and signal light 3902 crosses over into optical waveguide 3920.

This crossover of signal light 3902 is caused by the design of wavelength-selective coupler 3908. In illustrative examples, wavelength-selective coupler 3908 can be used for a signal wavelength-selective coupler to selectively couple signal light from a secondary optical waveguide to a signal extension optical waveguide. Wavelength-selective coupler 3908 can also be used to selectively couple signal light from a signal extension optical waveguide to the secondary optical waveguide. Wavelength-selective coupler 3908 is illustrative of wavelength-selective couplers used in optical waveguide structure 1500 in FIG. 18.

Figure 11:
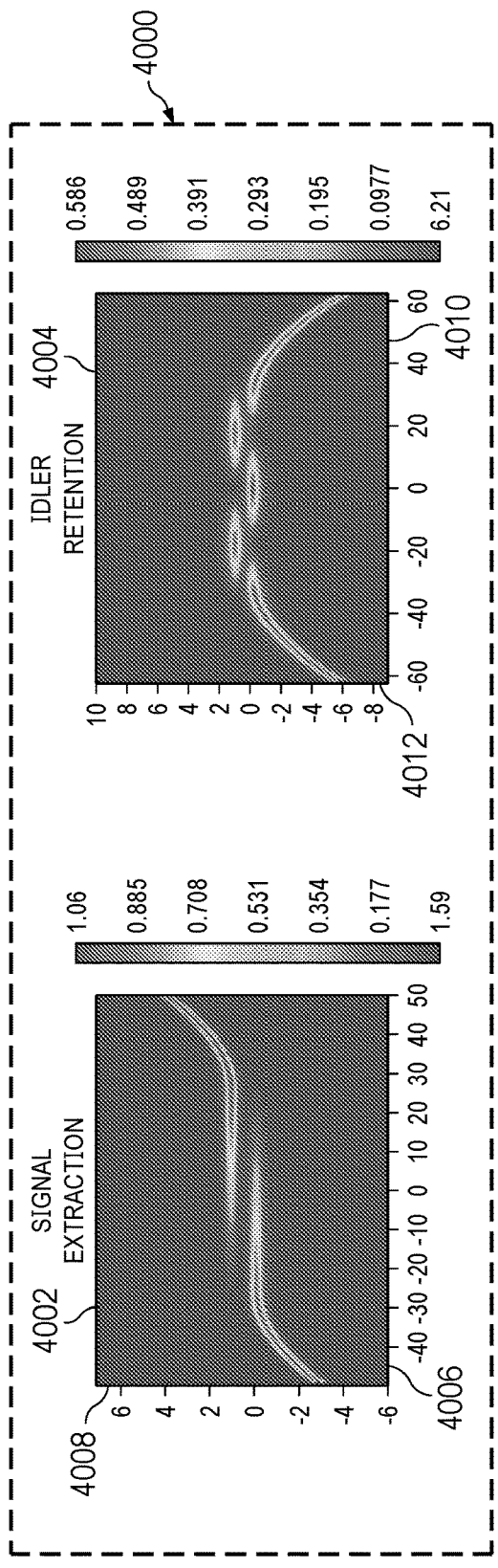
FIG. 11 is an illustration of simulation results of light coupling by a wavelength-selective coupler in accordance with an illustrative embodiment.

In FIG. 11, an illustration of simulation results of light coupling by a wavelength-selective coupler is depicted in accordance with an illustrative embodiment. As depicted, simulation results 4000 comprises plots and. Simulation results 4000 comprise signal extraction plot 4002 for a signal extraction result and idler retention plot 4004 for an idler retention result. These plots are of the optical-field distributions for a signal light and an idler light having different wavelengths from each other.

Simulation results 4000 are generated using a wavelength-selective coupler such as wavelength-selective coupler 3908 in FIG. 10. This wavelength-selective coupler can be implemented as a two-waveguide optical coupler. In this illustrative example, simulation results 4000 are for a case in which signal light 3902, that is coupled and exits from the "cross" output of wavelength-selective coupler 3908, has a larger guided-mode effective index of refraction $n_{eff}$ and is confined more strongly than the idler light 3904, that exits from the "through" output of wavelength-selective coupler 3908.

As depicted, signal extraction plot 4002 depicts the electric-field magnitude of the signal light. Plot 4002 has x-axis 4006 that represents the longitudinal direction of the two-guide wavelength-selective coupler structure and y-axis 4008 that represents the transverse direction of the two-guide wavelength-selective coupler structure. Signal extraction plot 4002 in simulation results 4000 shows that signal light is coupled from the lower left waveguide to the upper right waveguide and is illustrative of the cross-state of a coupler.

In this illustrative example, idler retention plot 4004 depicts the electric-field magnitude of the idler light. Idler retention plot 4004 has x-axis 4010 that represents the longitudinal direction of the two-guide wavelength-selective coupler structure and y-axis 4012 that represents the transverse direction of the two-guide wavelength-selective coupler structure. As depicted, idler retention plot 4004 shows that the idler light couples from the lower waveguide to the upper waveguide in a few portions of the coupling region but eventually remains in the lower waveguide away from that coupling section and exits from the lower right waveguide, illustrative of the thru-state of a coupler.

In this example, these simulation results can be obtained using a wavelength-selective coupler that comprises two curved waveguides that are coupled by a section of a straight waveguide of a length and a gap for wavelength-selective coupler that are selected to result in the coupling of the signal light from a first optical waveguide to a second optical waveguide when passing through the wavelength-selective coupler.

Thus, if light of both signal light 3902 and idler light 3904 are supplied to wavelength-selective coupler 3908 through optical waveguide 3906, signal light 3902 exits wavelength-selective coupler 3908 via optical waveguide 3920 and idler light 3904 exits wavelength-selective coupler 3908 via optical waveguide 3926.

For this example, an example length $d_{s|i}$ for the coupling section for wavelength-selective coupler 3908 can be described by the following relation: $\kappa_{s|i}(\lambda_S) \cdot d_{s|i} = \pi$, where $\kappa_{s|i}$ is the coupling coefficient. To achieve the desired wavelength selectivity, wavelength-selective coupler 3908 can also be constrained by another relation: $\kappa_{s|i}(\lambda_I) \cdot d_{s|i} = 2 \cdot \pi \cdot X$, where $\lambda_I$ is the longer wavelength and X is an integer. In the illustrative example, the value of X is 2, such that the photons of signal light wavelength $\lambda_S$ have approximately 100% coupling between the two waveguides being coupled, while the photons of idler light wavelength $\lambda_I$ are coupled back again to the starting waveguide.

Figure 12:
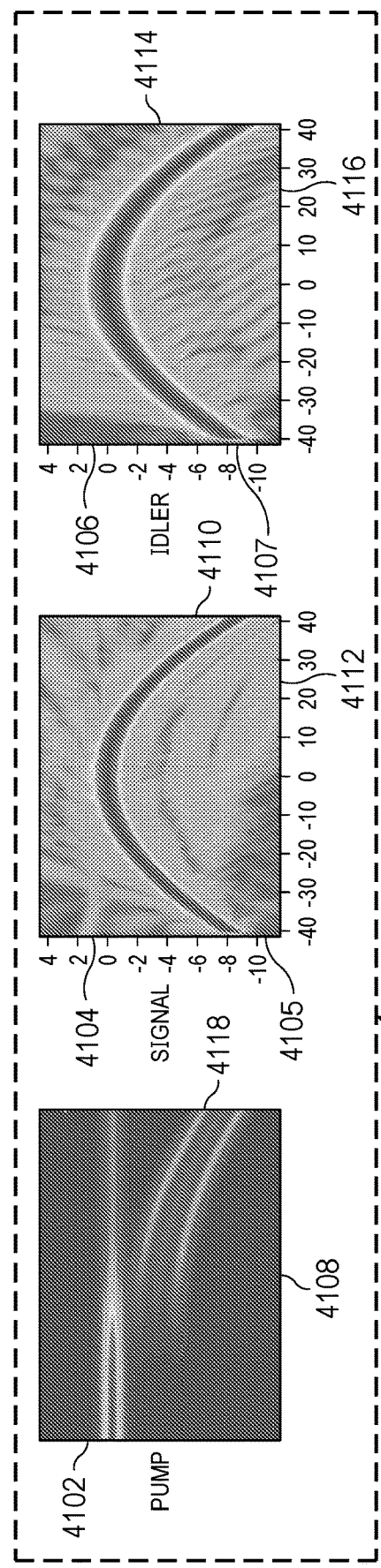
FIG. 12 is an illustration of simulation results of light coupling by a wavelength-selective coupler is in accordance with an illustrative embodiment.

With reference now to FIG. 12, an illustration of simulation results of light coupling by a wavelength-selective coupler is depicted in accordance with an illustrative embodiment. Simulation results 4100 comprise plots that illustrate light coupling using a wavelength-selective coupler such as a two-waveguide optical coupler.

As depicted, simulation results 4100 are for pump light in pump plot 4118, signal light in signal plot 4110, and idler light in idler plot 4114. These simulation results are plots of the electric field magnitude distributions of light at the pump, signal and idler wavelengths. Pump plot 4118 is a plot for field magnitude distribution in linear scale. As depicted, pump plot 4118 has x-axis 4108 that represents the longitudinal direction of the two-guide wavelength-selective coupler structure and y-axis 4102 that represents the transverse direction of the two-guide wavelength-selective coupler structure.

In this illustrative example, signal plot 4110 and idler plot 4114 are plots for the signal and idler field magnitude distributions in a logarithmic scale. As depicted, signal plot 4110 has x-axis 4112 that represents the longitudinal direction of the two-guide wavelength-selective coupler structure and y-axis 4105 that represents the transverse direction of the two-guide wavelength-selective coupler structure. Idler plot 4114 has x-axis 4116 that represents the longitudinal direction of the two-guide wavelength-selective coupler structure and y-axis 4107 that represents the transverse direction of the two-guide wavelength-selective coupler structure.

In this depicted example, the optical waveguide at the lower portion of the plots for simulation results 4100 has a smaller radius of curvature than the optical waveguide at the upper portion of those plots. The light travels from left to right in these plots for simulation results 4100. Pump light enters in the upper guide from the upper left of pump plot 4118. Signal light and idler light enter in the lower, curved guide from the lower left of signal plot 4104 and idler plot 4106.

In this example, the pump light experiences primarily the "cross" state of this coupler and is coupled into the curved, lower guide and exits from the lower right of the plot. The signal and idler light experience the "through" state of this coupler and remain in the curved guide to also exit from the lower right of the plots. For this example, the pump light is carried by a higher-order transverse mode of the lower, curved guide. Thus, the field magnitude distribution of the pump light in that curved guide has several brighter regions. The signal and idler light, however, are carried by the fundamental transverse modes at those wavelengths. Thus, the intensity distributions for the signal and idler light have just one bright region that is brighter near the center of the guide. In this illustrative example, the pump light is carried in the upper guide by the fundamental transverse mode at the pump wavelength. Thus, the intensity distribution for the pump light in the upper waveguide has just one bright region that is brighter near the center of that upper guide. The simulation results 4100 can be examples of the performance of some implementations of wavelength-selective coupler 910 illustrated in FIG. 9.

The examples of FIGS. 13-18 illustrate different aspects of optical waveguide structure 100 as shown in FIGS. 1-6. These illustrations are intended to be inclusive rather than exclusive. Thus, although only some features are illustrated in one example and other features are illustrated in another example, this difference in features in different figures is used only for the purpose of clarity and to simplify the description of features in the illustrative examples.

Figure 13:
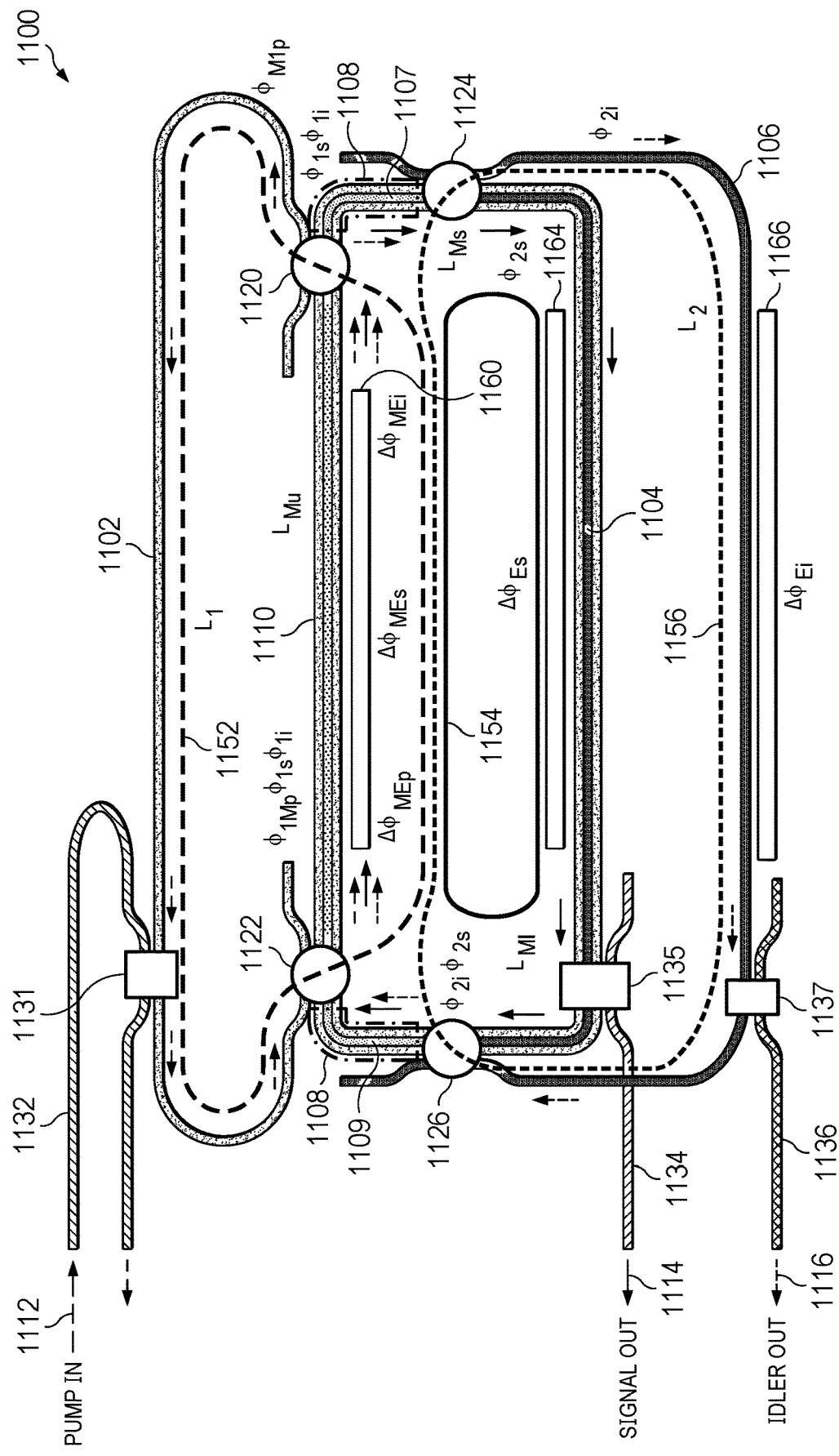
FIG. 13 is an illustration of an optical waveguide structure with five optical waveguides in accordance with an illustrative embodiment.

With reference to FIG. 13, an illustration of an optical waveguide structure with five optical waveguides is depicted in accordance with an illustrative embodiment. In this illustrative example, optical waveguide structure 1100 is an example of an implementation for optical waveguide structure 100 as shown in FIGS. 1-6. More specifically, FIG. 13 is an implementation for optical waveguides 102 as depicted in FIG. 3.

In this illustrative example, optical waveguide structure 1100 can be designed to achieve the concurrent requirements that the three wavelengths are at resonances of their respective resonator loops and also that the phase match condition is met for sustaining the nonlinear optical process over many cycles of travel through the loops.

In this illustrative example, optical waveguide structure 1100 comprises optical waveguides in the form of main nonlinear optical waveguide 1110, segment 1107 in secondary optical waveguide 1108, segment 1109 in secondary optical waveguide 1108, pump loop extension 1102, signal loop extension 1104, and idler loop extension 1106. Main nonlinear optical waveguide 1110 is an example of main nonlinear optical waveguide 106 in FIG. 3 and main nonlinear optical waveguide 106 in FIG. 2. Pump loop extension 1102 is an example of an implementation for first extension optical waveguide 108 in FIG. 3 and first extension optical waveguide 108 in FIG. 2. Signal loop extension 1104 and idler loop extension 1106 are optical waveguides that can be coupled to segments of secondary optical waveguide 113 in FIG. 3 or secondary optical waveguide 113 in FIG. 2. Signal loop extension 1104 and idler loop extension 1106 are examples of second extension optical waveguide 110 and third extension optical waveguide 119, respectively, in FIGS. 3-6.

In these illustrative examples, the individual optical waveguides can be portions or segments from which loops can be established through the use of wavelength selective optical couplers to connect those segments or portions to other segments or portions.

In this illustrative example, main nonlinear optical waveguide 1110 of optical waveguide structure 1100 is comprised of a nonlinear optical material 104. For some second-order nonlinear optical materials, such as x-cut lithium niobate, the nonlinear optical coefficient is much larger for light whose electric-field vector is aligned parallel to one crystallographic axis than for light whose electric-field vector is aligned perpendicular to that crystallographic axis. Thus, for x-cut lithium niobate, a larger second-order nonlinear optical coefficient applies for a nonlinear optical waveguide aligned parallel to the material Y-axis, with the electric-field vector of the propagating transverse-electric (TE) polarized light aligned parallel to the material Z-axis. In this illustrative example, main nonlinear optical waveguide 1110 has a linear shape and is aligned parallel to the lithium niobate material Y-axis. Thus, the propagation direction would be in the +y direction or the −y direction of the lithium niobate crystalline material.

In this illustrative example, pump loop extension 1102 is comprised of a non-nonlinear optical material 105. As depicted, idler loop extension 1106 is comprised of an electro-optic material 103. As depicted, signal loop extension 1104 is comprised of a nonlinear optical material 104 as well as an electro-optic material 103. An electro-optic material is a material with a large electro-optic coefficient. Examples of electro-optic materials that can be used are lithium niobate, gallium arsenide, gallium phosphide and silicon carbide.

In an illustrative example, the use of an electro-optic material can provide desired propagation properties for light. Electro-optical materials often also are nonlinear optical materials having nonlinear optical coefficient.

As depicted, optical waveguide structure 1100 also includes pump input optical waveguide 1132 that inputs pump light 1112. Optical waveguide structure 1100 also includes signal output optical waveguide 1134 and idler output optical waveguide 1136. Signal output optical waveguide 1134 can output signal light 1114. Idler output optical waveguide 1136 can output idler light 1116.

As depicted, first wavelength-selective coupler 1120 and second wavelength-selective coupler 1122 connect pump loop extension 1102 to main nonlinear optical waveguide 1110. In this illustrative example, third wavelength-selective coupler 1124 and fourth wavelength-selective coupler 1126 connect signal loop extension 1104 and idler loop extension 1106 to segment 1107 and segment 1109 of secondary optical waveguide 1108.

In this illustrative example, pump optical coupler 1131 couples pump input optical waveguide 1132 to pump loop extension 1102. Signal optical coupler 1135 couples signal output optical waveguide 1134 to signal loop extension 1104. Idler optical coupler 1137 couples idler output optical waveguide 1136 to idler loop extension 1106.

In this illustrative example, pump light 1112 travels in pump loop 1152 which extends through main nonlinear optical waveguide 1110 and pump loop extension 1102. Signal light 1114 travels in signal loop 1154 which extends through main nonlinear optical waveguide 1110, secondary optical waveguide 1108 and signal loop extension 1104. Idler light 1116 travels in idler loop 1156 which extends through main nonlinear optical waveguide 1110, secondary optical waveguide 1108 and idler loop extension 1106.

As depicted, optical waveguide structure 1100 also includes phase shifters in the form of tuning electrodes. In this illustrative example, tuning electrode 1160 is located adjacent to a portion of main nonlinear optical waveguide 1110. Tuning electrode 1164 is located adjacent to a portion of signal loop extension 1104. Tuning electrode 1166 is located adjacent to a portion of idler loop extension 1106.

In this illustrative example, each wavelength-selective coupler in optical waveguide structure 1100 produces a phase shift for each given wavelength of light at its "thru" state output and a possibly different phase shift for each given wavelength of light at its "cross" state output. For example, first wavelength-selective coupler 1120 extracts pump light 1112 from main nonlinear optical waveguide 1110 into pump loop extension 1102. First wavelength-selective coupler 1120 also extracts signal light 1114 and idler light 1116 from main nonlinear optical waveguide 1110 into segment 1107 of secondary optical waveguide 1108.

In this illustrative example, first wavelength-selective coupler 1120 produces a phase shift of $\phi_{M1p}$ for the pump light 1112 coupled from main nonlinear optical waveguide 1110 to pump loop extension 1102 via a "cross" state output of first wavelength-selective coupler 1120. First wavelength-selective coupler 1120 produces a phase shift of $\phi_{1s}$ for signal light 1114 that is coupled from main nonlinear optical waveguide 1110 into segment 1107 of secondary optical waveguide 1108, and a phase shift of P for idler light 1116 that is coupled from main nonlinear optical waveguide 1110 into segment 1107 of secondary optical waveguide 1108 via a "thru" state output of first wavelength-selective coupler 1120.

Furthermore, second wavelength-selective coupler 1122 causes a phase shift of $\phi_{1Mp}$ for pump light 1112 coupled from pump loop extension 1102 back to main nonlinear optical waveguide 1110. Second wavelength-selective coupler 1122 produces a phase shift of $\phi_{1s}$ for signal light 1114 that is coupled from segment 1109 of secondary optical waveguide 1108 into main nonlinear optical waveguide 1110 and produces a phase shift of $\phi_{1i}$ for idler light 1116 that is coupled from segment 1109 of secondary optical waveguide 1108 into main nonlinear optical waveguide 1110.

In this illustrative example, third wavelength-selective coupler 1124 and fourth wavelength-selective coupler 1126 between the secondary optical waveguide 1108 and idler loop extension 1106 produce phase shifts of $\phi_{2i}$ and $\phi_{2i}$ for idler light 1116 coupled in their "cross" state output. Third wavelength-selective coupler 1124 and fourth wavelength-selective coupler 1126 between the secondary optical waveguide 1108 and signal loop extension 1104 produce phase shifts of $\phi_{2s}$ and $\phi_{2s}$ for signal light 1114 that exits from their "thru" state outputs.

The light propagating in a waveguide can experience a phase shift associated with the length of the waveguide and with the effective refractive index of the wave-guided mode. For transverse-electric (TE) polarized light in x-cut lithium niobate, the material index depends on the direction of propagation. Thus, the phase shift can be estimated by performing a numerical simulation. The phase shifters, such as tuning electrodes, can contribute an additional phase shift that can either advance the phase or retard the phase, depending on the sign of the applied voltage, for an electro-optic phase shifter.

For the example in optical waveguide structure 1100 in FIG. 13, tuning electrode 1164 for signal loop extension 1104 in signal loop 1154 and tuning electrode 1166 for idler loop extension 1106 in idler loop 1156 can contribute additional phase shifts of $\Delta\phi_{Es}$ and $\Delta\phi_{Ei}$, respectively. These phase shifts can have a positive or negative value.

In this illustrative example, tuning electrode 1160 for main nonlinear optical waveguide 1110 affects pump light 1112, signal light 1114, and idler light 1116 and can produce additional phase shifts of $\Delta\phi_{MEp}$, $\Delta\phi_{MEs}$, and $\Delta\phi_{MEi}$ to the pump light 1112, signal light 1114, and idler light 1116, respectively.

The resonator for pump light 1112 is comprised of components of optical waveguide structure 1100 in pump loop 1152. This pump loop comprises main nonlinear optical waveguide 1110, the cross-state of first wavelength-selective coupler 1120, the cross-state of second wavelength-selective coupler 1122, and pump loop extension 1102. The round-trip phase shift $\phi_{RTp}$ for pump light 1112 at the pump wavelength should be equal to a multiple of $2\pi$ for pump light 1112 to remain circulating for many round-trips through pump loop 1152 and thus circulate for many passes through main nonlinear optical waveguide 1110.

In this illustrative example, the phase shift of the pump light 1112 due to propagation in the pump loop extension 1102 can be described by the expression:

$$\phi_{1p} = 2\pi n_{1p} L_1 / \lambda_p,$$

where $n_{1p}$ is a net or equivalent effective refractive index of the wave-guided pump light in the pump loop extension 1102; $L_1$ is the length of pump loop extension 1102; and $\lambda_p$ is the wavelength of pump light 1112.

The phase shift of pump light 1112 from propagation through the main nonlinear optical waveguide 1110 can be described as follows:

$$\phi_{Mup} = 2\pi n_{Mp} L_M / \lambda_p$$

where $n_{Mp}$ is the effective refractive index of the wave-guided pump mode in main nonlinear optical waveguide 1110, $L_M$ is the length of main nonlinear optical waveguide 1110, which is located between first wavelength-selective coupler 1120 and second wavelength-selective coupler 1122; and $\lambda_p$ is the wavelength of pump light 1112.

Next, the resonance requirement for pump light 1112 can be given by the expression:

$$\phi_{RTp} = \phi_{1p} + \phi_{1Mp} + \phi_{Mup} + \phi_{M1p} + \Delta\phi_{MEp} = 2\pi P$$

where P is an integer. In an illustrative example, P can have values that also result in phase matching to maintain constructive generation of signal and idler from pump light.

This resonance requirement can be met by designing optical waveguide structure 1100 to have suitable values for the length $L_1$ and the phase shift $\phi_{1p}$. The phase shift $\phi_{M1p}$ is due to the first wavelength-selective coupler and the phase shift $\phi_{1Mp}$ is due to the second wavelength-selective coupler.

In this illustrative example, signal loop 1154 extends through main nonlinear optical waveguide 1110. More specifically signal loop 1154 extends through main nonlinear optical waveguide 1110, first wavelength-selective coupler 1120 (in its thru state) and second wavelength-selective coupler 1122 (in its thru state); segment 1107 and segment 1109 of secondary optical waveguide 1108, in which both signal light 1114 and idler light 1116 propagate; third wavelength-selective coupler 1124 (in its thru state) and fourth wavelength-selective coupler 1126 (in its thru state); and signal loop extension 1104. As depicted, only signal light 1114 propagates through signal loop extension 1104.

In this example, main nonlinear optical waveguide 1110 can have length $L_{Mu}$. Pump light 1112, signal light 1114, and idler light 1116 propagate through main nonlinear optical waveguide 1110. Segment 1107 and segment 1109 have a total length of $L_{Mc}$. In this illustrative example, signal loop extension 1104 has a total length of $L_2$.

Signal loop 1154 is a resonator loop in which the signal light 1114 travels. The round-trip phase shift $\phi_{RTs}$ of signal light 1114 traveling in signal loop 1154 can be given by:

$$\phi_{RTs} = 2\phi_{1s} + \phi_{Mus} + \Delta\phi_{MEs} + 2\phi_{2s} + \phi_{MCs} + \phi_{Ss} + \Delta\phi_{SEs} = 2\pi S.$$

For signal light 1114 to remain circulating for many round-trips in signal loop 1154 and thus circulate for many passes through main nonlinear optical waveguide 1110, the round-trip phase shift should be as close as possible to a multiple of $2\pi$, that is, with S being an integer.

The phase shift of signal light 1114 propagating in main nonlinear optical waveguide 1110 can be described by the expression:

$$\phi_{Mus} = 2\pi n_{Ms} L_{Mu} / \lambda_s$$

where $n_{Ms}$ is the effective refractive index of signal light 1114 in the main nonlinear optical waveguide 1110; $L_{Mu}$ is the length of main nonlinear optical waveguide 1110; and $\lambda_s$ is the wavelength of signal light 1114.

Each of the two wavelength-selective couplers coupled to main nonlinear optical waveguide 1110, first wavelength-selective coupler 1120 and second wavelength-selective coupler 1122, in signal loop 1154 operate in its "cross" state for the signal wavelength and produces a phase shift of $\phi_{1s}$ for the signal wavelength. In a similar fashion, each of the two wavelength-selective couplers coupled to signal loop extension 1104, third wavelength-selective coupler 1124 and fourth wavelength-selective coupler 1126, in signal loop 1154 operate in its "thru" state for the signal wavelength and produces a phase shift of $\phi_{2s}$ for the signal light 1114. The net phase shift from the two corner portions, segment 1107 and segment 1109 of the secondary optical waveguide 1108 in signal loop 1154, in which both signal light 1114 and idler light 1116 propagate can be given by $\phi_{Mcs}$. The phase shift from signal loop extension 1104 in signal loop 1154, in which only the signal light propagates, can be given by $\phi_{Ss}$.

In an illustrative example, tuning electrode 1160 used to adjust the phase shift for pump light 1112 in its resonator loop also produces a phase shift for signal light 1114 of $\Delta\phi_{MEs}$. However, tuning electrode 1164 in signal loop extension 1104 affects only signal light 1114. Tuning electrode 1166 produces a phase shift of $\Delta\phi_{SEs}$.

Idler loop 1156 in which idler light 1116 extends through main nonlinear optical waveguide 1110 and idler loop extension 1106. In this depicted example, idler loop 1156 comprises segment 1107 in secondary optical waveguide 1108, first wavelength-selective coupler 1120 and third wavelength-selective coupler 1124; segment 1109 in secondary optical waveguide 1108, fourth wavelength-selective coupler 1126 and second wavelength-selective coupler 1122; and idler loop extension 1106.

Each of the two wavelength-selective couplers, first wavelength-selective coupler 1120 and second wavelength-selective coupler 1122, in idler loop 1156 have a "cross" state for the pump wavelength and a "thru" state for the idler wavelength and produces a phase shift of $\phi_{1i}$ at the "thru" state output of the wavelength-selective coupler. Likewise, each of the two wavelength-selective couplers, third wavelength-selective coupler 1124 and fourth wavelength-selective coupler 1126, have a "cross" state for the idler wavelength and produces a phase shift of $\phi_{2i}$ at its "cross" state output for idler light 1116.

The total phase shift of idler light 1116 from the two corner portions, segment 1107 and segment 1109, in which both signal light 1114 and idler light 1116 propagate, can be given by $\phi_{Mci}$. The phase shift from idler loop extension 1106, in which only idler light 1116 propagates, can be given by $\phi_{Iei}$.

In this illustrative example, tuning electrode 1160 for main nonlinear optical waveguide 1110 used to adjust the phase shift for pump light 1112 will also produce a phase shift for idler light 1116 of $\Delta\phi_{MEi}$. Tuning electrode 1166 for idler loop extension 1106 affects only idler light 1116. Tuning electrode 1166 can produce a phase shift of $\Delta\phi_{IEi}$.

Thus, the round-trip phase shift $\phi_{RTi}$ of idler light 1116 can be given by:

$$\phi_{RTi} = 2\phi_{1i} + \phi_{Mui} + \Delta\phi_{MEi} = 2\phi_{2i} + \phi_{Mci} + \phi_{Ii} + \Delta\phi_{IEi} = 2\pi I.$$

For idler light 1116 to remain circulating for many round-trips in idler loop 1156 extending through main nonlinear optical waveguide 1110 and thus making many passes through main nonlinear optical waveguide 1110, the round-trip phase shift should be a close as possible to a multiple of $2\pi$, that is, with I being an integer. The length and waveguide cross-sectional structure in main nonlinear optical waveguide 1110 can be designed to achieve phase matching for the nonlinear optical interaction.

Thus, the value for $\phi_{Mui}$ can be determined by the design of the waveguide cross-sectional structure in main nonlinear optical waveguide 1110. However, the length $L_3$ of idler loop extension 1106 can be selected to achieve the desired resonance condition for the idler wavelength in its resonator loop, idler loop 1156. Also, the additional phase shift $\Delta\phi_{IEi}$ produced by the tuning electrode 1166 in the idler loop extension 1106 can be used to further adjust that round-trip phase shift for idler light 1116.

In the illustrative example, main nonlinear optical waveguide 1110 is the location where the desired nonlinear optical photon generation occurs in optical waveguide structure 1100. Main nonlinear optical waveguide 1110 can be designed to achieve a phase matched condition for the nonlinear optical process. This phase matched condition can be achieved through the selection of dimensions of the cross-sectional waveguide structure.

The cross-sectional structure of main nonlinear optical waveguide 1110 as well as the propagation direction of the light determines the effective refractive index of the pump light 1112, signal light 1114 and idler light 1116 in a given portion of main nonlinear optical waveguide 1110. The propagation direction for light guided in main nonlinear optical waveguide 1110, in which the desired nonlinear optical interaction occurs, can be chosen to increase the nonlinear optical generation. For example, a waveguide comprising x-cut lithium niobate could be aligned parallel to the material Y-axis. Thus, the propagation direction would be in the +y direction or the −y direction of the lithium niobate crystalline material.

For the nonlinear optical process to occur constructively over a long interaction distance so that the generation rate or generation efficiency of the signal photons and idler photons from the pump photons continues to increase as the physical interaction distance is increased, the phase matching condition of the nonlinear optical process also should be maintained. This condition includes the round-trip phase shift of pump light 1112 traveling in the main nonlinear optical waveguide 1110 as well as in pump loop extension 1102, the round-trip phase shift of signal light 1114 traveling in main nonlinear optical waveguide 1110, in segment 1107 and segment 1109 of secondary optical waveguide 1108, as well as in signal loop extension 1104, and the round-trip phase shift of idler light 1116 traveling in main nonlinear optical waveguide 1110, in segment 1107 and segment 1109 of secondary optical waveguide 1108, as well as in idler loop extension 1106.

Thus:

$$\phi_{RTp} - \phi_{RTs} - \phi_{RTi} = 2\pi A$$

where A is an integer and can be zero.

Furthermore, to increase the nonlinear optical generation of signal and idler light that occurs in a given round-trip, meeting another phase matching condition is desirable for propagation of the three wavelengths of light through main nonlinear optical waveguide 1110, which is the portion where the nonlinear optical generation occurs. This phase matching condition can be described as follows:

$0 \leq \phi_{Mup} - \phi_{Mus} + \phi_{Mui} \leq \pi$, or $-\pi \leq \phi_{Mup} - \phi_{Mus} - \phi_{Mui} \leq 0$, and is close to zero.

The additional phase shifts that can be achieved by applying bias voltages to the tuning electrodes for optical waveguide structure 1100 can be used to adjust the round-trip phase shifts for pump light 1112 (by adjusting $\Delta\phi_{MEp}$), for the signal light 1114 (by adjusting $\Delta\phi_{SEs}$) and for idler light 1116 (by adjusting $\Delta\phi_{IEi}$). These adjustments can be used to correct or to compensate for departures of the other parameters from their as-designed values in actually fabricated and operating devices.

The phase shift that can be obtained for a given electric field in the electro-optic material (due to a voltage applied to a set of tuning electrodes) can be described by the relation:

$$\Delta\phi_{KEj}=2\pi r_j n_j^3 E\Gamma_j L_E/\lambda_j$$

where j=p, s, i, and where p indicates pump light 1112, s indicates signal light 1114, and i indicates idler light 1116. Also, K=M, S or P and indicates the optical waveguide with the tuning electrode, such as K=M for main nonlinear optical waveguide 1110, K=S for signal loop extension 1104 and K=I for idler loop extension 1106. Other parameters in this expression are: the electric field E, the electro-optic coefficient, $r_j$, the refractive index $n_j$, the overlap of the optical field of pump light 1112, signal light 1114, or idler light 1116 with the electro-optic material $\Gamma_j$, the electrode length (or electro-optic interaction distance) $L_E$, and the wavelength $\lambda_j$ of the pump light 1112, signal light 1114, or idler light 1116. As an example, for an electro-optic material such as lithium niobate and for an electric field applied across the waveguide of $10^6$ V/m, the electrode length needed to achieve a phase shift of $2\pi$ is about 3-10 mm.

Figure 14:
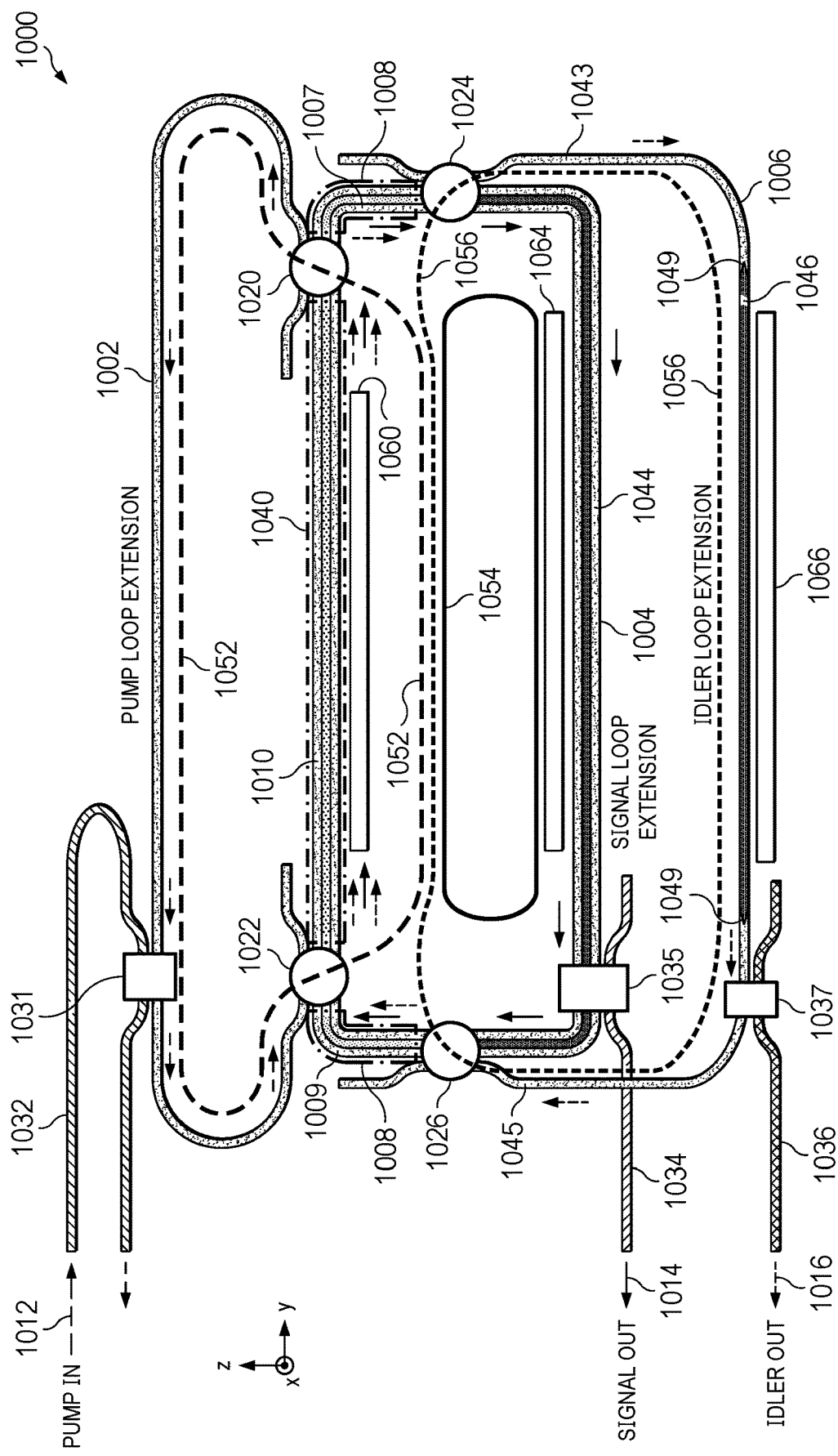
FIG. 14 is an illustration of an optical waveguide structure with five optical waveguides in accordance with an illustrative embodiment.

Turning to FIG. 14, an illustration of an optical waveguide structure with five optical waveguides is depicted in accordance with an illustrative embodiment. In this illustrative example, optical waveguide structure 1000 is an example of an implementation for optical waveguide structure 100 as shown in FIGS. 1-6.

In this illustrative example, optical waveguide structure 1000 comprises optical waveguides. These waveguides include main nonlinear optical waveguide 1010, secondary optical waveguide 1008 having segment 1007 and segment 1009, pump loop extension 1002, signal loop extension 1004, and idler loop extension 1006.

Main nonlinear optical waveguide 1010 is an example of main nonlinear optical waveguide 106 in FIG. 3 and main nonlinear optical waveguide 106 in FIG. 2. Secondary optical waveguide 1008 is an example of an implementation for secondary optical waveguide 113 in FIG. 3 and secondary optical waveguide 113 in FIG. 2.

Pump loop extension 1002 is an example of an implementation for first extension optical waveguide 108 in FIG. 3 and first extension optical waveguide 108 in FIG. 2. Signal loop extension 1004 and idler loop extension 1006 are examples of second extension optical waveguide 110 and third extension optical waveguide 119, respectively, in FIGS. 3-6.

In this illustrative example, main nonlinear optical waveguide 1010 is comprised of a nonlinear optical material, such as nonlinear optical material 104. Secondary optical waveguide 1008 can be comprised of a nonlinear optical material, such as nonlinear optical material 104 or a non-nonlinear optical material, such as non-nonlinear optical material 105.

As depicted, pump loop extension 1002 is comprised of a non-nonlinear optical material. Signal loop extension 1004 is comprised of both a nonlinear optical material and an electro-optic material, such as electro-optic material 103, in this illustrative example. Idler loop extension 1006 has portions comprised of a nonlinear optical material 104 and other portions comprised of a non-nonlinear optical material. In this example, a taper 1049 can join an optical waveguide portion comprising nonlinear optical material and an optical waveguide portion comprising a non-nonlinear optical material. In this illustrative example, section 1043 and section 1045 of idler loop extension 1006 are comprised of a non-nonlinear optical material. Section 1046 of idler loop extension 1006 is comprised of a nonlinear optical material that also is an electro-optic material. Examples of material that have a large second-order nonlinear optical coefficient as well as a large electro-optic coefficient include lithium niobate and gallium arsenide.

In this illustrative example, segment 1007 and segment 1009 of secondary optical waveguide 1008 is comprised of a nonlinear optical material that also is an electro-optic material. In this example, signal loop extension 1004 likewise is comprised of a nonlinear optical material that also is an electro-optic material.

As depicted, optical waveguide structure 1000 also includes pump input optical waveguide 1032 that inputs pump light 1012. Optical waveguide structure 1000 also includes signal output optical waveguide 1034 and idler output optical waveguide 1036. Signal output optical waveguide 1034 can output signal light 1014. Idler output optical waveguide 1036 can output idler light 1016.

As shown in this figure, first wavelength-selective coupler 1020 and second wavelength-selective coupler 1022 connect pump loop extension 1002 to main nonlinear optical waveguide 1010. In this illustrative example, third wavelength-selective coupler 1024 and fourth wavelength-selective coupler 1026 connect idler loop extension 1006 to segment 1007 and segment 1009 of secondary optical waveguide 1008. Third wavelength-selective coupler 1024 and fourth wavelength-selective coupler 1026 also connect signal loop extension 1004 to segment 1007 and segment 1009 of secondary optical waveguide 1008.

In this illustrative example, pump optical coupler 1031 couples pump input optical waveguide 1032 to pump loop extension 1002. Signal optical coupler 1035 couples signal output optical waveguide 1034 to signal loop extension 1004. Idler optical coupler 1037 couples idler output optical waveguide 1036 to idler loop extension 1006.

In this illustrative example, pump light 1012 travels in pump loop 1052 which extends through main nonlinear optical waveguide 1010 and pump loop extension 1002. Signal light 1014 travels in signal loop 1054 which extends through main nonlinear optical waveguide 1010, segment 1007 and segment 1009 in secondary optical waveguide 1008, and signal loop extension 1004. Idler light 1016 travels in idler loop 1056, which extends through main nonlinear optical waveguide 1010, segment 1007 and segment 1009 of secondary optical waveguide 1008, and idler loop extension 1006.

As depicted, optical waveguide structure 1000 also includes phase shifters in the form of tuning electrodes. In this illustrative example, tuning electrode 1060 is located adjacent to a portion of main nonlinear optical waveguide 1010. In this example, the portion of main nonlinear optical waveguide 1010 is segment 1040. Tuning electrode 1064 is located adjacent to a portion of signal loop extension 1004. As depicted, the portion of signal loop extension 1004 is segment 1044. Tuning electrode 1066 is located adjacent to section 1046 of idler loop extension 1006. These tuning electrodes can apply voltages to obtain a desired level of resonance to achieve a resonant condition for the three wavelengths of light traveling within optical waveguide structure 1000. For example, tuning electrode 1060 can adjust the phase for pump light 1012. Tuning electrode 1064 can adjust the phase of signal light 1014. Tuning electrode 1066 can adjust the phase of idler light 1016.

A nonlinear optical process for the generation of photons for signal light 1014 and idler light 1016 from photons of pump light 1012 occurs in main nonlinear optical waveguide 1010 in optical waveguide structure 1000. In this example, the nonlinear optical process does not occur, or negligibly occurs, in other parts of optical waveguide structure 1000. In this depicted example, pump light 1012 supplied through pump input optical waveguide 1032 travels only through main nonlinear optical waveguide 1010, first wavelength-selective coupler 1020, second wavelength-selective coupler 1022 and pump loop extension 1002. Nonlinear optical generation of signal photons and idler photons from pump photons occurs only where pump light travels and interacts with nonlinear optical material in a waveguide. Thus, both pump light and nonlinear optical material must be present for nonlinear optical generation of signal photons and idler photons from pump photons to occur.

In this illustrative example, pump loop extension 1002 is comprised of a material having a negligible second order nonlinear optical coefficient such as $Si_3N_4$ and $SiO_2$. The other portions of optical waveguide structure 1000 through which pump light 1012 does not propagate can contain a material such as lithium niobate, which has a large electro-optic coefficient and also has a large second-order nonlinear optical coefficient. This material is useful for electro-optic tuning.

Additionally, signal light 1014 travels in signal loop 1054 that traverses through main nonlinear optical waveguide 1010, segment 1007 and segment 1009 of secondary optical waveguide 1008 and signal loop extension 1004, as well as through first wavelength-selective coupler 1020 and second wavelength-selective coupler 1022 and third wavelength-selective coupler 1024 and fourth wavelength-selective coupler 1026. In this example, this combination of optical waveguides can also serve as a resonator for signal light 1014. Tuning electrode 1064 for signal loop extension 1004 is located along signal loop 1054 and can operate to achieve electrically controlled optical phase shifting for signal light 1014.

In this depicted example, idler light 1016 travels in idler loop 1056. Idler loop 1056 extends through idler loop extension 1006, and tuning electrode 1066 for idler loop extension 1006 can operate to achieve an electrically controlled optical phase shifting for idler light 1016. Lithium niobate is an electro-optic material for which the material refractive index can be changed by applying an electrical field. A material such as lithium niobate can be used in the segment 1044 of signal loop extension 1004 adjacent to tuning electrode 1064 and in the section 1046 of idler loop extension 1006 adjacent to tuning electrode 1066.

In this illustrative example, pump loop extension 1002 does not have a tuning electrode. Tuning electrode 1060 can be used adjacent to main nonlinear optical waveguide 1010 and can operate to achieve some electrical control of the optical phase shift for pump light 1012. However, the use of tuning electrode 1060 can affect the round-trip phase shift of pump light 1012, as well as the round-trip phase shifts of signal light 1014 and idler light 1016.

These tuning electrodes in optical waveguide structure 1000 can apply voltages to obtain desired levels of phase shifts for the pump light 1012, signal light 1014 and idler light 1016 to achieve resonance matching 300 in FIG. 5 for those three wavelengths of light traveling within optical waveguide structure 1000. These tuning electrodes in optical waveguide structure 1000 also can apply voltages to obtain desired levels of phase shifts for the pump light 1012, signal light 1014 and idler light 1016 to achieve roundtrip phase matching 302 for the combination of those three wavelengths of light traveling within optical waveguide structure 1000.

Figure 15:
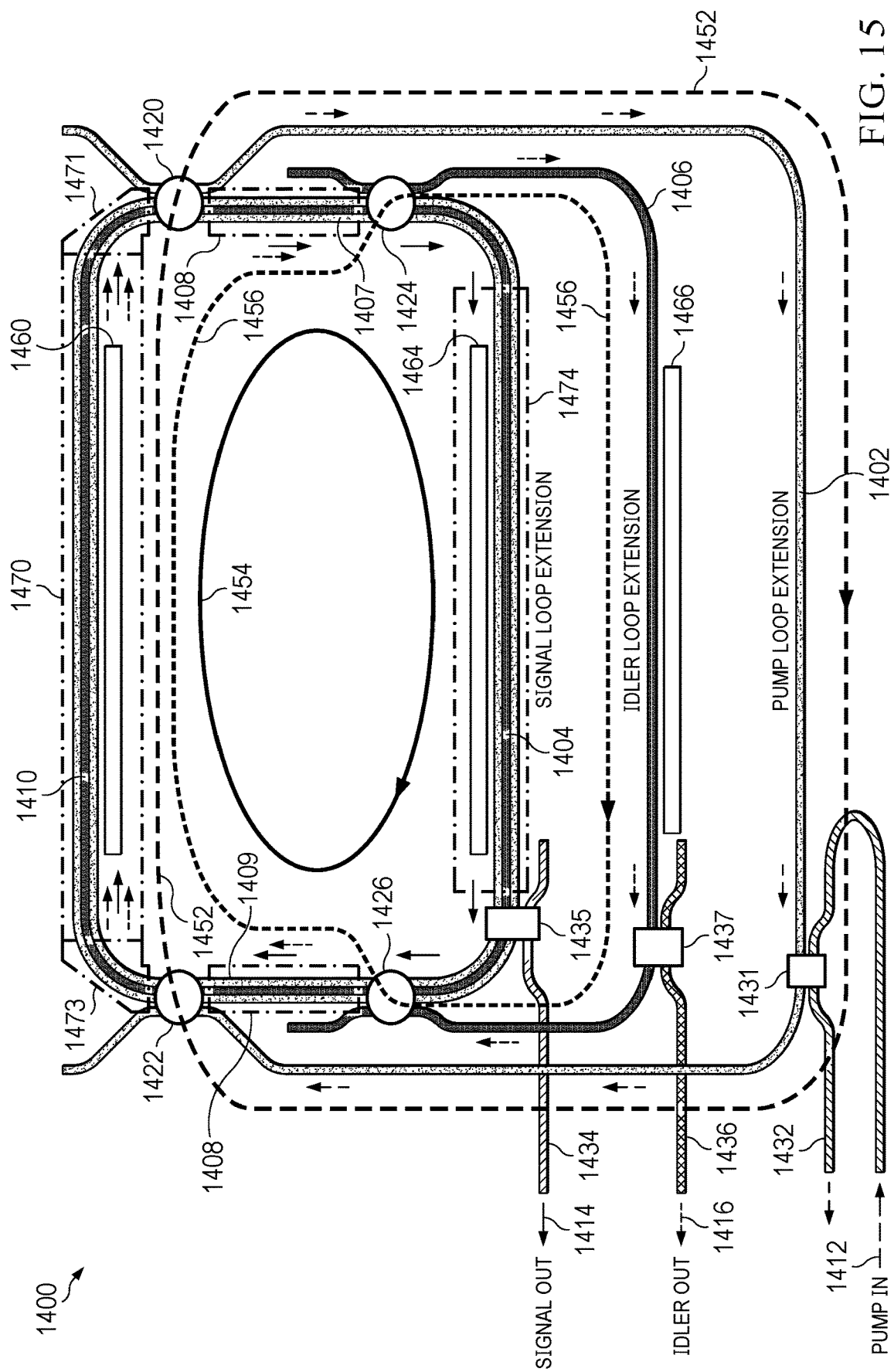
FIG. 15 is an illustration of an optical waveguide structure with five optical waveguides in accordance with an illustrative embodiment.

With reference now to FIG. 15, an illustration of an optical waveguide structure with five optical waveguides is depicted in accordance with an illustrative embodiment. In this illustrative example, optical waveguide structure 1400 is an example of an implementation for optical waveguide structure 100 as shown in FIGS. 1-6. As depicted, optical waveguide structure 1400 comprises optical waveguides in the form of main nonlinear optical waveguide 1410, segments of secondary optical waveguide 1408, pump loop extension 1402, signal loop extension 1404, and idler loop extension 1406.

In this illustrative example, main nonlinear optical waveguide 1410 is comprised of a nonlinear optical material 104.

As depicted, pump loop extension 1402 is comprised of a non-nonlinear optical material, such as non-nonlinear optical material 105. In this example, idler loop extension 1406 is comprised of an electro-optic material 103 that also can have a large second-order nonlinear optical coefficient. In this example, signal loop extension 1404 is comprised of a nonlinear optical material, such as nonlinear optical material 104, that also has a large electro-optic coefficient.

As depicted, optical waveguide structure 1400 includes pump input optical waveguide 1432 that inputs pump light 1412. Optical waveguide structure 1400 also includes signal output optical waveguide 1434 and idler output optical waveguide 1436. Signal output optical waveguide 1434 can output signal light 1414. Idler output optical waveguide 1436 can output idler light 1416.

As depicted, first wavelength-selective coupler 1420 and second wavelength-selective coupler 1422 connect pump loop extension 1402 to main nonlinear optical waveguide 1410. In this illustrative example, third wavelength-selective coupler 1424 and fourth wavelength-selective coupler 1426 connect idler loop extension 1406 to segment 1407 and segment 1409 of secondary optical waveguide 1408. In this illustrative example, third wavelength-selective coupler 1424 and fourth wavelength-selective coupler 1426 also connect signal loop extension 1404 to segment 1407 and segment 1409 of secondary optical waveguide 1408.

In this illustrative example, pump input coupler 1431 couples pump input optical waveguide 1432 to pump loop extension 1402. Signal output coupler 1435 couples signal output optical waveguide 1434 to signal loop extension 1404. Idler output coupler 1437 couples idler output optical waveguide 1436 to idler loop extension 1406.

In this depicted example, pump loop 1452 is present for pump light 1412. This pump loop 1452 is a resonator loop in which pump light 1412 travels in pump loop extension 1402 and in main nonlinear optical waveguide 1410.

In this example, signal light 1414 travels in signal loop 1454. As depicted, signal loop 1454 extends through main nonlinear optical waveguide 1410, through segments 1407 and 1409 of secondary optical waveguide 1408, and through signal loop extension 1404. As shown in the figure, idler light 1416 travels in idler loop 1456. Further, in this example, idler loop 1456 extends through main nonlinear optical waveguide 1410, through segments 1407 and segment 1409 of secondary optical waveguide 1408, and through idler loop extension 1406.

As depicted, optical waveguide structure 1400 also includes phase shifters in the form of tuning electrodes. In this illustrative example, tuning electrode 1460 is located adjacent to main nonlinear optical waveguide 1410. Tuning electrode 1464 is located adjacent to signal loop extension 1404. Tuning electrode 1466 is located adjacent to idler loop extension 1406.

In this illustrative example, a nonlinear optical process occurs in main nonlinear optical waveguide 1410 in optical waveguide structure 1400. Main nonlinear optical waveguide 1410 is constructed using a material such as x-cut lithium niobate, which can have both a large second order nonlinear optical coefficient and a large electro-optic coefficient.

As depicted, main nonlinear optical waveguide 1410 has a straight segment 1470 and two corner segments, corner segment 1471 and corner segment 1473. In this illustrative example, straight segment 1470 is aligned parallel to the y-axis of the x-cut lithium niobate crystal. Segment 1407 and segment 1409 are part of secondary optical waveguide 1408. In this illustrative example, segment 1407 and segment 1409 are aligned parallel to the z-axis of the x-cut lithium niobate crystal.

In this depicted example, transverse-electric (TE) polarized light propagating in main nonlinear optical waveguide 1410 can encounter the largest electro-optic coefficient $r_{33}$ when the light travels in straight segment 1470 in main nonlinear optical waveguide 1410. TE polarized light also encounters the largest electro-optic coefficient $r_{33}$ of x-cut lithium niobate when the light travels in segment 1474 of signal loop extension 1404 adjacent to tuning electrode 1464 and when the light travels in the portion of idler loop extension 1406 adjacent to tuning electrode 1466.

As depicted, light travels in a clockwise direction through main nonlinear optical waveguide 1410, pump loop extension 1402, signal loop extension 1404, and idler loop extension 1406. This direction is selected by the configuration of the input and output couplers, such as pump input coupler 1431, signal output coupler 1435, and idler output coupler 1437. However, these three input and output couplers could be configured to have the light travel in a counter-clockwise direction through main nonlinear optical waveguide 1410, pump loop extension 1402, signal loop extension 1404, and idler loop extension 1406, and by where pump light 1412 is supplied to pump input optical waveguide 1432. Counter-clockwise travel is established by supplying pump light into the opposite end of pump input coupler 1431, extracting signal light out from the opposite end of signal output coupler 1435, and extracting idler light out from the opposite end of idler output coupler 1437.

As depicted, first wavelength-selective coupler 1420 connects corner segment 1471 of main nonlinear optical waveguide 1410 to segment 1407 of secondary optical waveguide 1408. Second wavelength-selective coupler 1422 connects segment 1409 of secondary optical waveguide 1408 to corner segment 1473 of main nonlinear optical waveguide 1410.

As depicted, third wavelength-selective coupler 1424 and fourth wavelength-selective coupler 1426 operate to establish a resonator loop, idler loop 1456, for idler light 1416 and also to establish a resonator loop, signal loop 1454, for signal light 1414. In this illustrative example, third wavelength-selective coupler 1424 extracts idler light 1416 away from segment 1407 of secondary optical waveguide 1408 and into the idler loop extension 1406. Fourth wavelength-selective coupler 1426 returns idler light 1416 back into segment 1409 of secondary optical waveguide 1408 after idler light 1416 has propagated through idler loop extension 1406 while traveling in idler loop 1456.

In this illustrative example, third wavelength-selective coupler 1424 also extracts signal light 1414 away from segment 1407 of secondary optical waveguide 1408 and into the signal loop extension 1404. Fourth wavelength-selective coupler 1426 also returns signal light 1414 back into segment 1409 of secondary optical waveguide 1408 after signal light 1414 has propagated through signal loop extension 1404 while traveling in idler loop 1456. Signal light 1414 travels to a thru-state output of third wavelength-selective coupler 1424 and travels to a thru-state output of fourth wavelength-selective coupler 1426. Idler light 1416 travels to a cross-state output of third wavelength-selective coupler 1424 and travels to a cross-state output of fourth wavelength-selective coupler 1426, as discussed before with reference to FIG. 10.

In this illustrative example, first wavelength-selective coupler 1420 and second wavelength-selective coupler 1422 operate to establish a resonator loop, pump loop 1452 for pump light 1412. As depicted, first wavelength-selective coupler 1420 extracts pump light 1412 away from main nonlinear optical waveguide 1410 and into pump loop extension 1402 to travel in pump loop 1452. Second wavelength-selective coupler 1422 returns pump light 1412 to main nonlinear optical waveguide 1410 after pump light 1412 has propagated through pump loop extension 1402 while traveling in pump loop 1452.

In this illustrative example, the material for idler loop extension 1406 and the material for signal loop extension 1404 can be a material such as lithium niobate for which the electro-optic coefficient is large. The large electro-optic coefficient allows the phase shifters in the signal loop extension and the idler loop extension to be more efficient, producing a larger phase shift for a given applied voltage. But for lithium niobate, the second order nonlinear optical coefficient also is large. However, pump light 1412 is not supplied to these portions of optical waveguide structure 1400, resulting in an absence of undesired nonlinear optical generation of additional signal or idler photons in these portions. In this illustrative example, pump loop extension 1402 is comprised of a non-nonlinear optical material.

As depicted, pump light 1412 propagates primarily only in main nonlinear optical waveguide 1410 and pump loop extension 1402. The second order nonlinear optical coefficient is largest $d_{33}$ for light propagating in straight segment 1470 of main nonlinear optical waveguide 1410 and is smaller for light propagating in corner segment 1471 and corner segment 1473. Also, the sign of a component $d_{22}$ of the second order nonlinear optical coefficient in corner segment 1471 is opposite from the sign of that component of the second order nonlinear optical coefficient in corner segment 1473. As a result, the generation of signal light 1414 and idler light 1416 occurs mainly in straight segment 1470 and occurs much less in other portions of optical waveguide structure 1400 because of the manner in which pump light 1412 is introduced and removed from main nonlinear optical waveguide 1410.

In this illustrative example, pump light 1412 can be extracted from main nonlinear optical waveguide 1410 before idler light 1416 is extracted from main nonlinear optical waveguide 1410 through secondary optical waveguide 1408 into idler loop extension 1406. Also in this example, pump light 1412 is re-supplied to main nonlinear optical waveguide 1410 from pump loop extension 1402 after idler light 1416 is re-supplied to main nonlinear optical waveguide 1410 from idler loop extension 1406 through secondary optical waveguide 1408. A similar arrangement applies for the pump light 1412 in relation to the signal light 1414.

As a result, although the nonlinear optical material is present along the entire length of the signal loop 1054 for signal light 1414 and idler loop 1456 for idler light 1416, the nonlinear optical generation of photons for signal light 1414 and idler light 1416 from photons for pump light 1412 occurs only in main nonlinear optical waveguide 1410. Nonlinear optical generation of signal light 1414 and idler light 1416 is absent in secondary optical waveguide 1408, idler loop extension 1406 and signal loop extension 1404. The absence of nonlinear optical generation is because pump light 1412 is supplied only to main nonlinear optical waveguide 1410.

A nonlinear optical generation process can result in generation of lower intensity light from higher intensity light. A nonlinear optical generation process also can operate in reverse and result in the generation of a higher intensity light from a lower intensity light. The efficiency of the nonlinear optical generation process depends on the intensity of the source light involved in that generation process, or the intensities of the source light of several different wavelengths if source light of multiple wavelengths is involved in that process. For spontaneous parametric down conversion as an illustrative example of a nonlinear optical generation process, the pump light, which is the input or source light, has an intensity that is at least twice the intensity of the generated signal light and at least twice the intensity of the generated idler light.

In many examples of spontaneous parametric down conversion, the intensity of the pump light is at least ten times greater than the intensity of the signal light or of the idler light. Thus, even when a phase-matched condition is present, if the pump light is absent from an optical waveguide comprising nonlinear optical material and only signal and idler light are present, the reverse process in which pump light, or light at the pump wavelength, is generated from the weaker source light at the signal and idler wavelengths is much less efficient and may produce very little or possibly even negligible light at the pump wavelength.

Figure 16:
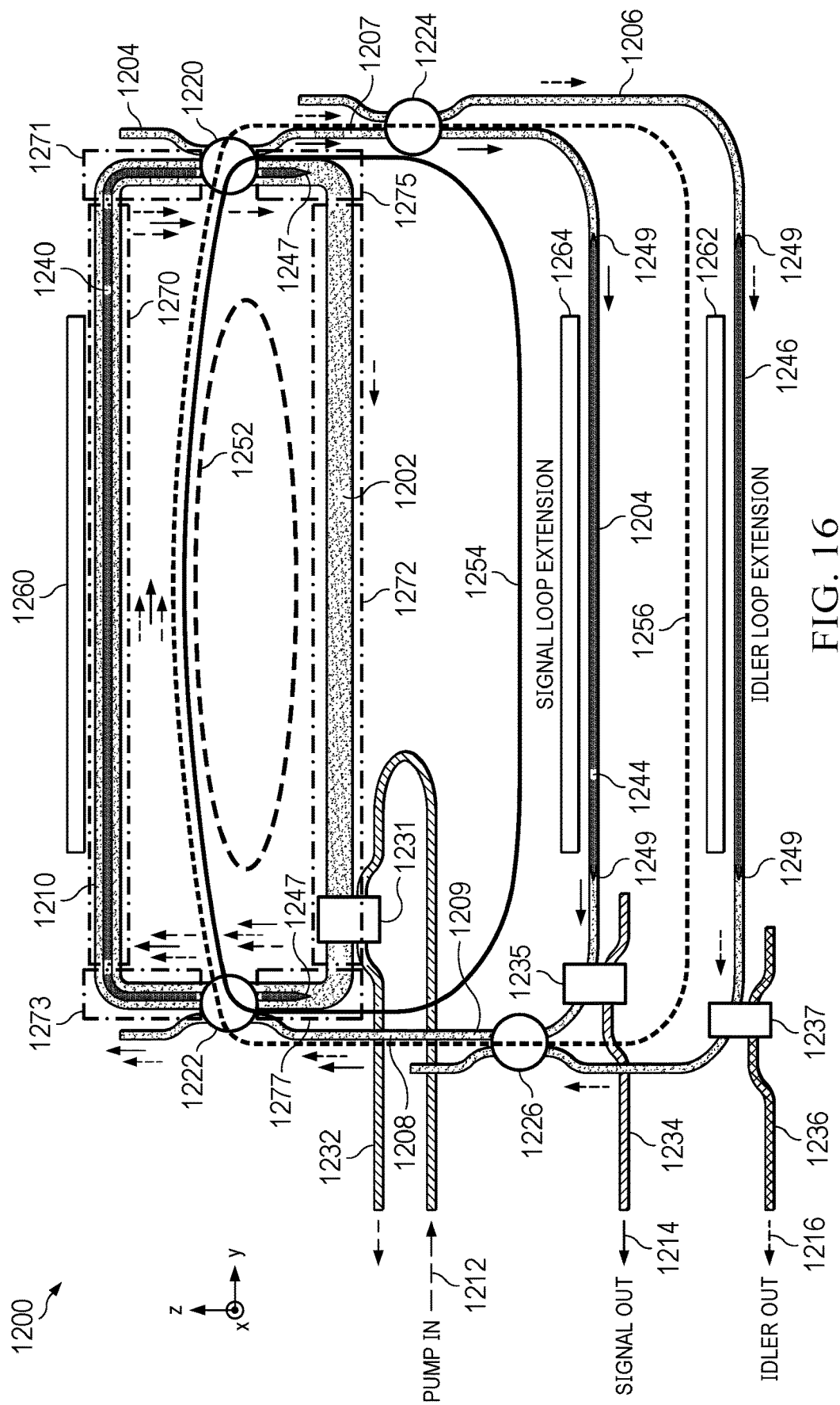
FIG. 16 is an illustration of an optical waveguide structure with five optical waveguides in accordance with an illustrative embodiment

With reference next to FIG. 16, an illustration of an optical waveguide structure with five optical waveguides is depicted in accordance with an illustrative embodiment. In this illustrative example, optical waveguide structure 1200 is an example of an implementation for optical waveguide structure 100 as shown in FIGS. 1-6.

As depicted, optical waveguide structure 1200 comprises optical waveguides in the form of main nonlinear optical waveguide 1210, pump loop extension 1202, secondary optical waveguide 1208, signal loop extension 1204, and idler loop extension 1206. Main nonlinear optical waveguide 1210 is an example of main nonlinear optical waveguide 106 in FIG. 3 and main nonlinear optical waveguide 106 in FIG. 2. Pump loop extension 1202 is an example of an implementation for first extension optical waveguide 108 in FIG. 3 and first extension optical waveguide 108 in FIG. 2. Idler loop extension 1206 and signal loop extension 1204 are optical waveguides that can be coupled to secondary optical waveguide 113 in FIG. 3 or coupled to secondary optical waveguide 113 in FIG. 2.

In this illustrative example, first loop 1252 through main nonlinear optical waveguide 1210 and pump loop extension 1202 has a rectangular shape with curved corners and may also be referred to as a racetrack shape. First loop 1252 for the pump light is a closed path route.

As depicted in this example, first loop 1252 for pump light 1212 through main nonlinear optical waveguide 1210 and through pump loop extension 1202 traverses segments of waveguide comprised of nonlinear optical material 104 and segments of waveguide comprised of non-nonlinear optical material 105. The nonlinear optical material is present in main nonlinear optical waveguide 1210, which includes straight segment 1270 corner segment 1271, and corner segments 1273. The nonlinear optical material also is present in portions of corner segment 1275 and corner segment 1277 of pump loop extension 1202. A non-nonlinear optical material 105 is present in segment 1272 of pump loop extension 1202.

A non-nonlinear optical material also can be present in corner segment 1275 and corner segment 1277 of pump loop extension 1202 instead of the nonlinear optical material. As depicted in this figure, a tapered transition 1247 can be present between the portion of corner segment 1275 and corner segment 1277 that contains a nonlinear optical material and the portion of corner segment 1275 and corner segment 1277 that does not contain a nonlinear optical material but rather comprises only non-nonlinear optical material.

In this illustrative example, both signal loop extension 1204 and idler loop extension 1206 have portions that comprise an electro-optic material 103 that also is a nonlinear optical material 104 and other portions that comprise a non-nonlinear optical material 105. The electro-optic material is located in section 1244 of signal loop extension 1204 and in section 1246 of idler loop extension 1206. To reduce optical losses and reflections, there can be a tapered transition 1249 between a waveguide portion comprising an electro-optic material and a waveguide portion comprising a non-nonlinear optical material.

As depicted, optical waveguide structure 1200 also includes pump input optical waveguide 1232 that inputs pump light 1212. Optical waveguide structure 1200 also includes signal output optical waveguide 1234 and idler output optical waveguide 1236. Signal output optical waveguide 1234 can output signal light 1214. Idler output optical waveguide 1236 can output idler light 1216.

In this illustrative example, pump optical coupler 1231 couples pump input optical waveguide 1232 to pump loop extension 1202. Signal optical coupler 1235 couples signal output optical waveguide 1234 to signal loop extension 1204. Idler optical coupler 1237 couples idler output optical waveguide 1236 to idler loop extension 1206.

In this illustrative example, first wavelength-selective coupler 1220 and second wavelength-selective coupler 1222 connect pump loop extension 1202 to main nonlinear optical waveguide 1210. Pump light 1212 is coupled via the thru-state outputs of first wavelength-selective coupler 1220 and second wavelength-selective coupler 1222. As depicted, first wavelength-selective coupler 1220 and second wavelength-selective coupler 1222 also connect signal light 1214 and idler light 1216 between main nonlinear optical waveguide 1210 and segments of secondary optical waveguide 1208. Signal light 1214 and idler light 1216 are coupled via the cross-state outputs of first wavelength-selective coupler 1220 and second wavelength-selective coupler 1222. In this illustrative example, third wavelength-selective coupler 1224 and fourth wavelength-selective coupler 1226 connect idler loop extension 1206 to segment 1207 and segment 1209 of secondary optical waveguide 1208. Third wavelength-selective coupler 1224 and fourth wavelength-selective coupler 1226 also connect signal loop extension 1204 to segment 1207 and segment 1209 of secondary optical waveguide 1208. Signal light 1214 is coupled via the thru-state outputs of third wavelength-selective coupler 1224 and fourth wavelength-selective coupler 1226. Idler light 1216 is coupled via the cross-state outputs of third wavelength-selective coupler 1224 and fourth wavelength-selective coupler 1226.

In this illustrative example, first loop 1252 is present for pump light 1212. This first loop is a resonator loop in which pump light 1212 travels in main nonlinear optical waveguide 1210 and in pump loop extension 1202. Signal light 1214 travels in second loop 1254. As depicted, second loop 1254 extends through main nonlinear optical waveguide 1210, through segment 1207 and segment 1209 of secondary optical waveguide 1208 and through signal loop extension 1204. In this illustrative example, idler light 1216 travels in third loop 1256. As depicted, third loop 1256 extends through main nonlinear optical waveguide 1210, through segment 1207 and segment 1209 of secondary optical waveguide 1208, and through idler loop extension 1206.

As depicted, optical waveguide structure 1200 also includes phase shifters in the form of tuning electrodes. In this illustrative example, tuning electrode 1260 is located adjacent to section 1240 in main nonlinear optical waveguide 1210. Tuning electrode 1264 is located adjacent to section 1244 in signal loop extension 1204 and tuning electrode 1266 is located adjacent to section 1246 in idler loop extension 1203. These tuning electrodes can apply voltages to obtain a desired level of resonance to achieve a resonant condition for light traveling within optical waveguide structure 1200.

In this illustrative example of optical waveguide structure 1200 having triple partially overlapping loop resonators for entanglement with direction dependent material, pump light 1212, signal light 1214, and idler light 1216 travel in different resonator loops, first loop 1252, second loop 1254, and third loop 1256, respectively. First loop 1252 is a resonator loop for the pump light 1212 and extends through main nonlinear optical waveguide 1210, first wavelength-selective coupler 1220 (via its thru-state output), second wavelength-selective coupler 1222 (via its thru-state output), pump loop extension 1202, and pump optical coupler 1231 (via its thru-state output).

In this illustrative example, second loop 1254 is a resonator loop for signal light 1214. Second loop 1254 extends through main nonlinear optical waveguide 1210, first wavelength-selective coupler 1220 (via its cross-state output), segment 1207 of secondary optical waveguide 1208, third wavelength-selective coupler 1224 (via its thru-state output), signal loop extension 1204, and signal optical coupler 1235 (via its thru-state output) fourth wavelength-selective coupler 1226 (via its thru-state output), segment 1209 of secondary optical waveguide 1208, and second wavelength-selective coupler 1222 (via its cross-state output), looping again to main nonlinear optical waveguide 1210.

As depicted, third loop 1256 is a resonator loop for idler light 1216. This third loop 1256 extends through main nonlinear optical waveguide 1210, first wavelength-selective coupler 1220 (via its cross-state output); segment 1207 of secondary optical waveguide 1208 located between first wavelength-selective coupler 1220 and third wavelength-selective coupler 1224; third wavelength-selective coupler 1224 (via its cross-state output); idler loop extension 1206; idler optical coupler 1237 (via its thru-state output); fourth wavelength-selective coupler 1226 (via its cross-state output); segment 1209 of secondary optical waveguide 1208 located between fourth wavelength-selective coupler 1226 and second wavelength-selective coupler 1222; and second wavelength-selective coupler 1222 (via its cross-state output); looping back to main nonlinear optical waveguide 1210.

In this illustrative example of optical waveguide structure 1200 having triple partially overlapping loop resonators for entanglement constructed from a direction dependent material, main nonlinear optical waveguide 1210 is common to and overlaps all three loop resonators. Also, first wavelength-selective coupler 1220 and second wavelength-selective coupler 1222 are encountered by the light in all three loops. However, first loop 1252 for pump light 1212 encounters the thru-state of these couplers. In this example, second loop 1254 and third loop 1256 for signal light 1214 and idler light 1216, respectively, encounter the cross-state of these couplers.

In this illustrative example, a second-order nonlinear optical process such as spontaneous parametric down conversion occurs in optical waveguide structure 1200. Nonlinear optical generation of signal photons and idler photons from pump photons, which is a result of spontaneous parametric down conversion, occurs when pump light propagates in an optical waveguide comprising nonlinear optical material such as lithium niobate which has a large second-order nonlinear optical coefficient. Optical waveguide structure 1200 includes main nonlinear optical waveguide 1210. Main nonlinear optical waveguide 1210 is the primary part of optical waveguide structure 1200 for which pump light 1212 is present and propagates in a waveguide comprising nonlinear optical material. As result, most of the generation of signal photons and idler photons from pump photons occurs in main nonlinear optical waveguide 1210. Essentially, negligible generation of signal photons and idler photons occurs in other portions of optical waveguide structure 1200. As depicted, main nonlinear optical waveguide 1210 comprises a nonlinear optical material. Most of the pump loop extension 1202, such as portion or segment 1272 of pump loop extension 1202 does not comprise a nonlinear optical material.

The various optical waveguides in optical waveguide structure 1200 can be fabricated using x-cut lithium niobate and in particular, from x-cut thin-film lithium niobate. In this illustrative example, straight segment 1270 in main nonlinear optical waveguide 1210 and segment 1272 in pump loop extension 1202 can be considered long legs of a rectangular-shaped path with curved corners or of a racetrack shaped path. These two segments are oriented to be aligned parallel to the y-axis of the x-cut lithium niobate crystal. As depicted, corner segments 1271 and 1273 of main nonlinear optical waveguide 1210 together with corner segment 1275 and corner segment 1277 of pump loop extension 1202 are the short legs of this rectangular-shaped or racetrack shaped path. The straight portions of corner segment 1271 and corner segment 1275 closest to first wavelength-selective coupler 1220 and the straight portions of corner segment 1273 and corner segment 1277 closest to second wavelength-selective coupler 1222 are aligned parallel to the z-axis of the x-cut lithium niobate crystal. In this example, transverse-electric (TE) polarized light propagating in main nonlinear optical waveguide 1210 encounters the largest second order nonlinear optical coefficient $d_{33}$ when the light travels in straight segment 1270 in main nonlinear optical waveguide 1210.

In this example, when phase matching is achieved, most of the nonlinear optical generation of signal light 1214 and idler light 1216 occurs in straight segment 1270 of main nonlinear optical waveguide 1210. Some nonlinear optical generation of signal and idler photons also occurs in corner segments 1271 and 1273 of main nonlinear optical waveguide 1210. Some generation of signal light 1214 and idler light 1216 also can occur in portions of corner segment 1275 and corner segment 1277 of pump loop extension 1202 because these portions comprise nonlinear optical material, as depicted in FIG. 16. However, the second order nonlinear optical coefficient $d_{22}$ for transverse-electric (TE) polarized light in these portions is more than one order of magnitude smaller than the second order nonlinear optical coefficient $d_{33}$ for transverse-electric (TE) polarized light in straight segment 1270 in this illustrative example. Moreover, the nonlinear optical generation of signal and idler photons that occurs in corner segment 1275 is partially counter-acted by the nonlinear optical generation of signal and idler photons that occurs in corner segment 1277. This is because the second order nonlinear optical coefficient $d_{22}$ in these two segments have opposite sign. Segment 1272 in pump loop extension 1202 comprises a non-nonlinear optical material. Thus, no generation of signal and idler photons occurs in that segment.

Figure 17:
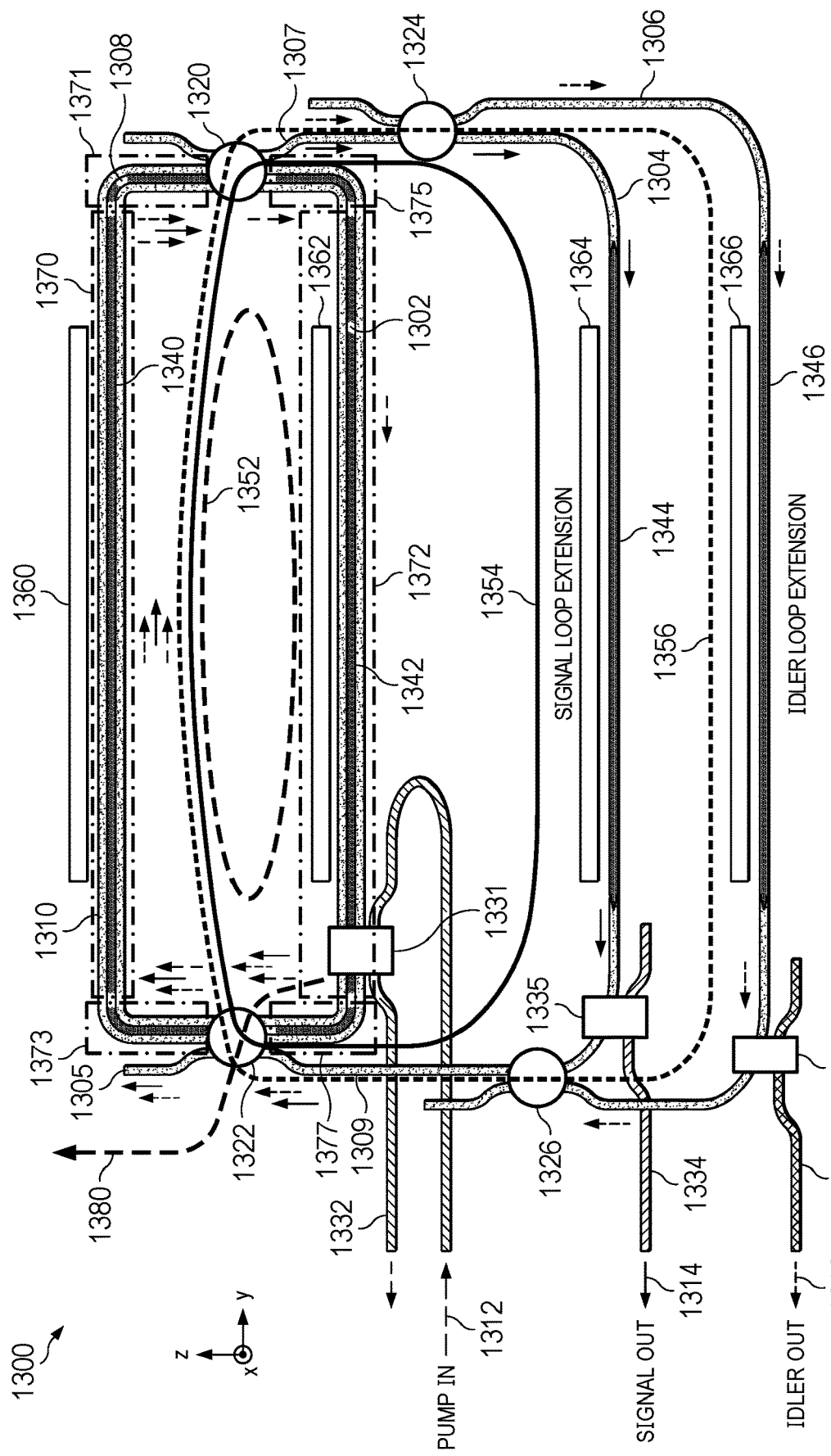
FIG. 17 is an illustration of an optical waveguide structure with five optical waveguides in accordance with an illustrative embodiment.

Turning next to FIG. 17, an illustration of an optical waveguide structure with five optical waveguides is depicted in accordance with an illustrative embodiment. In this illustrative example, optical waveguide structure 1300 is an example of an implementation for optical waveguide structure 100 as shown in FIGS. 1-6. As depicted, optical waveguide structure 1300 comprises optical waveguides in the form of main nonlinear optical waveguide 1310, secondary optical waveguide 1308 having segment 1307 and segment 1309, pump loop extension 1302, signal loop extension 1304, and idler loop extension 1306.

In this illustrative example, main nonlinear optical waveguide 1310 and pump loop extension 1302 form a path that has a rectangular shape with curved corners and may also be referred to as a racetrack shape. Main nonlinear optical waveguide 1310 is comprised of a nonlinear optical material 104. Pump loop extension 1302 also is comprised of a nonlinear optical material 104. Optical waveguide structure 1300 is similar to optical waveguide structure 1200 in FIG. 16 but with the entire length of pump loop extension 1302 being comprised of nonlinear optical material 104 rather than having a portion of its length being comprised of a non-nonlinear optical material 105. In this example, main nonlinear optical waveguide 1310 has at least portion 1340 that comprises an electro-optic material 103. Also, pump loop extension 1302 has at least portion 1342 that comprises an electro-optic material.

As depicted in this illustrative example, both signal loop extension 1304 and idler loop extension 1306 have a portion of their length comprising a nonlinear optical material 104 and another portion of their length comprising a non-nonlinear optical material 105. Nonlinear optical material 104 is included in these waveguides because nonlinear optical material 104 is electro-optic material 103 that is efficient with a large electro-optic coefficient. The portion of waveguide with the electro-optic (and nonlinear optical) material is located in section 1344 of signal loop extension 1304 and in section 1346 of idler loop extension 1306.

As depicted, optical waveguide structure 1300 includes pump input optical waveguide 1332 that inputs pump light 1312. Optical waveguide structure 1300 also includes signal output optical waveguide 1334 and idler output optical waveguide 1336. Signal output optical waveguide 1334 can output signal light 1314. Idler output optical waveguide 1336 can output idler light 1316.

In this illustrative example, pump optical coupler 1331 couples pump input optical waveguide 1332 to pump loop extension 1302. Signal optical coupler 1335 couples signal output optical waveguide 1334 to signal loop extension 1304. Idler optical coupler 1337 couples idler output optical waveguide 1336 to idler loop extension 1306.

As depicted, first wavelength-selective coupler 1320 and second wavelength-selective coupler 1322, operated in their thru-state, connect pump loop extension 1302 to main nonlinear optical waveguide 1310. In this illustrative example, first wavelength-selective coupler 1320 and second wavelength-selective coupler 1322 operated in their cross-state connect the segments of secondary optical waveguide 1308 to main nonlinear optical waveguide 1310. In this illustrative example, third wavelength-selective coupler 1324 and fourth wavelength-selective coupler 1326 operated in their thru-state connect signal loop extension 1304 to segments of secondary optical waveguide 1308. In this illustrative example, third wavelength-selective coupler 1324 and fourth wavelength-selective coupler 1326 operated in their cross-state connect idler loop extension 1306 to segments of secondary optical waveguide 1308.

In this illustrative example, first loop 1352 is present for pump light 1312. This first loop is a resonator loop in which pump light 1312 travels in a route that extends through main nonlinear optical waveguide 1310 and pump loop extension 1302. Signal light 1314 travels in second loop 1354. As depicted, second loop 1354 extends through main nonlinear optical waveguide 1310, through segments of secondary optical waveguide 1308 and through signal loop extension 1304. In this illustrative example, idler light 1316 travels in third loop 1356. As depicted, third loop 1356 extends through main nonlinear optical waveguide 1310, through segments of secondary optical waveguide 1308, and through idler loop extension 1306.

In this illustrative example, first wavelength-selective coupler 1320 operating in its thru-state connects segment 1371 of main nonlinear optical waveguide 1310 and segment 1375 of pump loop extension 1302, and second wavelength-selective coupler 1322 connects segment 1377 of pump loop extension 1302 and segment 1373 of main nonlinear optical waveguide 1310. As depicted, first wavelength-selective coupler 1320, operating in its thru-state, couples pump light 1312 away from main nonlinear optical waveguide 1310 and into pump loop extension 1302 and second wavelength-selective coupler 1322, operating in its thru-state, couples pump light 1312 away from pump loop extension 1302 and into main nonlinear optical waveguide 1310 such that pump light 1312 travels in first loop 1352.

In this illustrative example, first wavelength-selective coupler 1320, operating in its cross-state, extracts signal light 1314 and idler light 1318 away from main nonlinear optical waveguide 1310 and into segment 1307 of secondary optical waveguide 1308 such that signal light 1314 generated in main nonlinear optical waveguide 1310 does not travel in first loop 1352 but instead travels in second loop 1354 and idler light 1316 generated in main nonlinear optical waveguide 1310 does not travel in first loop 1352 but instead travels in third loop 1356. In this illustrative example, second wavelength-selective coupler 1322, operating in its cross-state, returns signal light 1314 traveling in second loop 1354 and idler light 1316 traveling in third loop 1356 back through main nonlinear optical waveguide 1310.

In this illustrative example, signal light 1314 reaches signal loop extension 1304 by passing through a segment 1307 of secondary optical waveguide 1308 before being coupled by third wavelength-selective coupler 1324, operating in its thru-state, into signal loop extension 1304. Additionally, signal light 1314 is returned from signal loop extension 1304 into a segment 1309 of secondary optical waveguide 1308 by fourth wavelength-selective coupler 1326, operating in its thru-state. In this example, signal light 1314 passes through another portion, segment 1309 of secondary optical waveguide 1308 before being coupled back into main nonlinear optical waveguide 1310 by second wavelength-selective coupler 1322, operating in its cross-state.

In this illustrative example, idler light 1316 reaches idler loop extension 1306 by passing through a segment 1307 of secondary optical waveguide 1308 before being coupled by third wavelength-selective coupler 1324, operating in its cross-state, into the idler loop extension 1306. Additionally, idler light 1316 is returned from idler loop extension 1306 into another segment 1309 of secondary optical waveguide 1308 by fourth wavelength-selective coupler 1326, operating in its cross-state. In this example, idler light 1316 passes through another portion of secondary optical waveguide 1308 before being coupled back into main nonlinear optical waveguide 1310 by second wavelength-selective coupler 1322, operating in its cross-state.

In this illustrative example, pump light 1312, signal light 1314, and idler light 1316 travel in different resonator loops. In this illustrative example, first loop 1352 is a resonator loop for pump light 1312. First loop 1352 extends through main nonlinear optical waveguide 1310, pump loop extension 1302, first wavelength-selective coupler 1320, and second wavelength-selective coupler 1322.

Second loop 1354 is resonator loop for signal light 1314. This second loop extends through main nonlinear optical waveguide 1310, first wavelength-selective coupler 1320 and second wavelength-selective coupler 1322; segments 1307, 1309 of secondary optical waveguide 1308, third wavelength-selective coupler 1324; fourth wavelength-selective coupler 1326; and signal loop extension 1304.

Third loop 1356 is a resonator loop for idler light 1316. Third loop 1356 comprises main nonlinear optical waveguide 1310; first wavelength-selective coupler 1320; a segment 1307 of secondary optical waveguide 1308 between first wavelength-selective coupler 1320 and third wavelength-selective coupler 1324; third wavelength-selective coupler 1324; idler loop extension 1306; fourth wavelength-selective coupler 1326; a segment 1309 of secondary optical waveguide 1308 between fourth wavelength-selective coupler 1326 and second wavelength-selective coupler 1322.

As depicted, optical waveguide structure 1300 also includes phase shifters in the form of tuning electrodes. In this illustrative example, tuning electrode 1360 is located adjacent to a portion 1340 of main nonlinear optical waveguide 1310. Tuning electrode 1362 is located adjacent to a portion 1342 of pump loop extension 1302. Tuning electrode 1364 is located adjacent to section 1344 of signal loop extension 1304 and tuning electrode 1366 is located adjacent to section 1346 of idler loop extension 1306. These tuning electrodes can apply voltages to obtain desired level of resonance to achieve a resonant condition for light traveling within optical waveguide structure 1300. These tuning electrodes also can apply voltages to obtain a desired round-trip phase matching condition for the nonlinear optical generation process that occurs in optical waveguide structure 1300.

Compared to optical waveguide structure 1200 of FIG. 16, optical waveguide structure 1300 has four tuning electrodes rather than three tuning electrodes. The additional tuning electrode (or set of tuning electrodes) provides greater flexibility for simultaneously achieving resonance conditions for all three wavelengths of light—pump light 1312, signal light 1314, and idler light 1316 in their respective resonator loops, first loop 1352, second loop 1354 and third loop 1356 as well as to achieve round-trip phase matching. For example, tuning electrode 1360 can be used to adjust the round-trip phase $\phi_{RTp}$ of pump light 1312 in first loop 1352. Tuning electrode 1364 can be used to adjust the round-trip phase $\phi_{RTs}$ of signal light 1314 in second loop 1354, which is a signal loop. Tuning electrode 1366 can be used to adjust the round-trip phase $\phi_{RTi}$ of idler light 1316 in third loop 1356, which is an idler loop. Tuning electrode 1362 can be used to further adjust the round-trip phase $\phi_{RTp}$ of pump light 1312 in order to achieve round-trip phase matching for the nonlinear optical process that occurs in main nonlinear optical waveguide 1310. Using the terminology defined with reference to optical waveguide structure 1100 shown in FIG. 13, the round-trip phase matching condition is achieved when:

$$\phi_{RTp} - \phi_{RTs} - \phi_{RTi} = 2\pi A$$

where A is an integer, and can be zero. This means: P−S−I=A with the integers P, S and I defined earlier with reference to optical waveguide structure 1100 shown in FIG. 13. Thus, for the example of optical waveguide structure 1300, the four conditions for achieving integer values for the parameters P, S, I and A can be satisfied by adjusting the four tuning electrodes, tuning electrode 1360, tuning electrode 1364, tuning electrode 1366 and tuning electrode 1362.

In this illustrative example, electrically controlled phase shifts are provided in optical waveguide structure 1300. In this illustrative example, portions of optical waveguide structure 1300 can be fabricated in x-cut lithium niobate. As depicted, the main nonlinear optical waveguide 1310 and pump loop extension 1302 through which the first loop 1352 extends form a rectangular shape with rounded corners. The orientation of optical waveguide structure 1300 can be such that segment 1370 in main nonlinear optical waveguide 1310 and segment 1372 in pump loop extension 1302 are aligned parallel to the y-axis of the lithium niobate crystal in the x-cut lithium niobate. These two segments—segment 1370 of main nonlinear optical waveguide 1310 and segment 1372 of pump loop extension 1302—can be referred to as the long legs of the rectangular shape.

The other portions of optical waveguides in the rectangular shaped waveguide structure defined by first loop 1352 include segment 1371 and segment 1373 of main nonlinear optical waveguide 1310 as well as segment 1375 and segment 1377 of pump loop extension 1302. These segments are part of what can be referred to as the corners and short legs of the rectangular shaped or race-track shaped path traversed by first loop 1352. In this illustrative example, segment 1371, segment 1373, segment 1375 and segment 1377 together with first wavelength-selective coupler 1320 and second wavelength-selective coupler 1322 are aligned mainly parallel with the z-axis of the x-cut lithium niobate crystal.

In this illustrative example, orientation for optical waveguide structure 1300, transverse-electric (TE) polarized light propagating in the optical waveguides traversed by first loop 1352 encounters the largest electro-optic coefficient of x-cut lithium niobate when the light travels in portion 1340 and portion 1342 of main nonlinear optical waveguide 1310 and pump loop extension 1302, respectively. Portion 1340 and portion 1342 portions in which tunable phase shifts can occur. As depicted, the light travels in a clockwise direction around first loop 1352. Furthermore, TE polarized signal light traversing portion in section 1344 of signal loop extension 1304 and TE polarized idler light traversing portion in section 1346 of idler loop extension 1306 also encounter the largest electro-optic coefficient of x-cut lithium niobate. Thus, the orientation depicted in FIG. 17 for optical waveguide structure 1300 can achieve efficient voltage-controlled electro-optic phase shifting.

In this illustrative example, a nonlinear optical light generation process occurs in main nonlinear optical waveguide 1310. Furthermore, to increase the nonlinear optical generation of signal and idler light that occurs in a given round-trip, it is desirable to meet another phase matching condition for propagation of the three wavelengths of light through segment 1370 of main nonlinear optical waveguide 1310, which is the portion where most of the desired nonlinear optical generation occurs. This phase matching can be as follows:

$0 \cdot \phi_{Mup} - \phi_{Mus} - \phi_{Mui} \leq \pi$, or $-\pi \leq \phi_{Mup} - \phi_{Mus} - \phi_{Mui} \leq 0$, and is close to zero.

Many materials such as lithium niobate that have a large electro-optic coefficient for a certain orientation also have a large second-order nonlinear optical coefficient. In this illustrative example, transverse-electric (TE) polarized light propagating in the optical waveguides traversed by first loop 1352, which is a pump loop, encounters the largest second order nonlinear optical coefficient when the light travels in segment 1370 of main nonlinear optical waveguide 1310 and in segment 1372 of pump loop extension 1302. In this illustrative example, the entire length of the optical waveguides traversed by the light in first loop 1352, which includes main nonlinear optical waveguide 1310 and pump loop extension 1302, comprises a nonlinear optical material. As a result, photons for signal light 1314 and idler light 1316 can be generated both in segment 1370 of main nonlinear optical waveguide 1310 and in segment 1372 of pump loop extension 1302. Some, albeit typically less, generation of signal and idler light also occurs in the corner segments, segment 1371, segment 1373, segment 1375 and segment 1377.

In this illustrative example, the optical fields of signal light 1314 and idler light 1316 generated in an optical waveguide segment that comprises nonlinear optical material can be described by expressions such as:

$$A_i(L) = \frac{\omega_i^2}{k_i c^2} \int_A^B \frac{2id_{\mathit{eff}} A_p A_s}{1} e^{i\Delta k z} dz \sim \frac{2id_{\mathit{eff}} \omega_i^2 A_p A_s L}{k_i c^2} \left( \frac{e^{i(\phi_{Mup} - \phi_{Mus} - \phi_{Mui})} - 1}{i(\phi_{Mup} - \phi_{Mus} - \phi_{Mui})} \right)$$

and $$A_s(L) = \frac{\omega_s^2}{k_s c^2} \int_A^B \frac{2id_{\mathit{eff}} A_p A_i}{1} e^{i\Delta k z} dz \sim \frac{2id_{\mathit{eff}} \omega_s^2 A_p A_i L}{k_s c^2} \left( \frac{e^{i(\phi_{Mup} - \phi_{Mus} - \phi_{Mui})} - 1}{i(\phi_{Mup} - \phi_{Mus} - \phi_{Mui})} \right).$$

In these expression, A and B are the starting and ending points of a segment, such as segment 1370 of main nonlinear optical waveguide 1310 or segment 1372 of pump loop extension 1302, with L being the length of that segment. The subscripts i, s and p indicate pump, signal and idler, respectively. The second order nonlinear optical coefficient $d_{\mathit{eff}}$ in segment 1370 has the opposite sign from the second order nonlinear optical coefficient $d_{\mathit{eff}}$ in segment 1372. As a result, the contributions to the signal and idler optical fields from segment 1370 of main nonlinear optical waveguide 1310 and segment 1372 of pump loop extension 1302 can counteract each other, or the optical fields can interfere in a destructive manner, if the optical fields from these two segments are combined together, assuming the phase matching is perfect.

Optical waveguide structure 1300 avoids the interaction of signal and idler light generated in segment 1370 with signal and idler light generated in segment 1372. First wavelength-selective coupler 1320 functions to couple signal light 1314 and idler light 1316 generated in segment 1370 away from pump loop extension 1302 and thus away from segment 1372 by diverting that light into segment 1307 of secondary optical waveguide 1308. Similarly, second wavelength-selective coupler 1322 functions to couple signal light 1314 and idler light 1316 generated in segment 1372 away from main nonlinear optical waveguide 1310 and thus away from segment 1370, as shown by arrow 1380 into output optical waveguide 1305. This coupling function done by second wavelength-selective coupler 1322 is performed in addition to coupling signal light 1314 in second loop 1354 and idler light 1316 in third loop 1356 from segment 1309 of secondary optical waveguide 1308 into main nonlinear optical waveguide 1310. Thus, the signal light 1314 and idler light 1316 coupled back into main nonlinear optical waveguide 1310 through second wavelength-selective coupler 1322 is generated in a prior pass through main nonlinear optical waveguide 1310 and is not generated in the pump loop extension 1302.

As a result, any destructive interaction between signal light 1314 and idler light 1316 generated in segment 1370 and generated in segment 1372 is absent. Thus, signal light 1314 and idler light 1316 that result from circulation through many round-trips in the optical waveguide structure 1300 are those photons for signal light 1314 and idler light 1316 generated primarily in segment 1370 in main nonlinear optical waveguide 1310.

Figure 18:
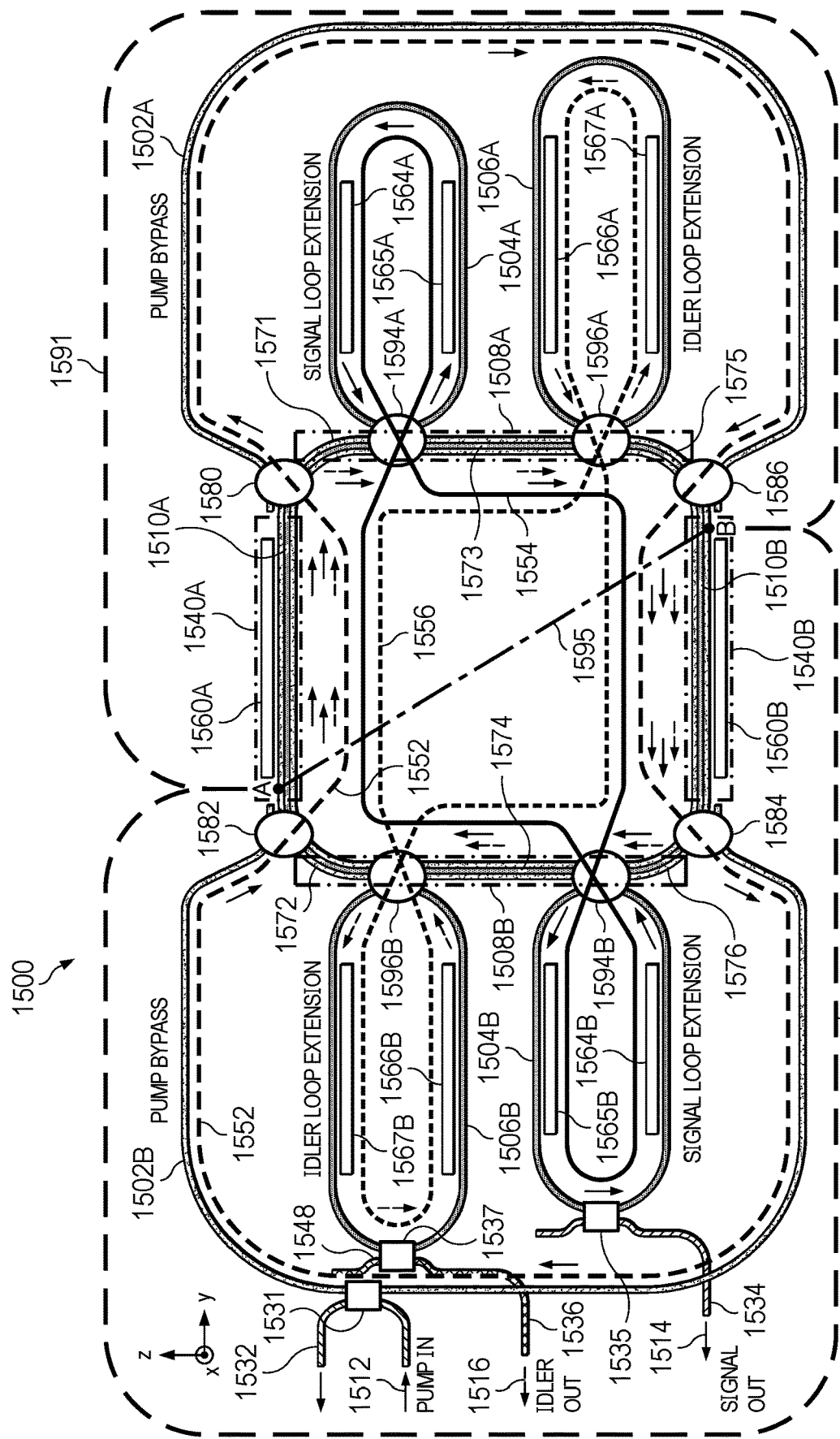
FIG. 18 is an illustration of an optical waveguide structure with ten optical waveguides in accordance with an illustrative embodiment.

Next, FIG. 18 is an illustration of an optical waveguide structure with ten optical waveguides is depicted in accordance with an illustrative embodiment. In this illustrative example, optical waveguide structure 1500 is an example of an implementation for optical waveguide structure 100 as shown in FIGS. 1-6. More specifically, FIG. 18 is an implementation for optical waveguides 102 as depicted in FIG. 2.

As depicted, optical waveguide structure 1500 comprises optical waveguides in the form of first main nonlinear optical waveguide segment 1510A, second main nonlinear optical waveguide segment 1510B, first pump bypass optical waveguide 1502A, second pump bypass optical waveguide 1502B, first secondary optical waveguide portion 1508A, second secondary optical waveguide portion 1508B, first signal loop extension 1504A, second signal loop extension 1504B, first idler loop extension 1506A, and second idler loop extension 1506B. First main nonlinear optical waveguide segment 1510A and second main nonlinear optical waveguide segment 1510B of main nonlinear optical waveguide 1510 are examples of main nonlinear optical waveguide 106 in FIG. 2. First pump bypass optical waveguide 1502A and second pump bypass optical waveguide 1502B are examples of an implementation for first extension optical waveguide 108 in FIG. 2. First secondary optical waveguide portion 1508A and second secondary optical waveguide portion 1508B are examples of an implementation of secondary optical waveguide 113 in FIG. 2.

As depicted in the detailed illustrative example of FIG. 18, main nonlinear optical waveguide 1510 comprises two separate segments, first main nonlinear optical waveguide segment 1510A and second main nonlinear optical waveguide segment 1510B. Secondary optical waveguide 1508 comprises multiple segments that are part of first secondary optical waveguide portion 1508A and second secondary optical waveguide portion 1508B. In this example, extension optical waveguide 1502 has two distinct portions, called pump bypass waveguides. In this illustrative example, first pump bypass optical waveguide 1502A and second pump bypass optical waveguide 1502B are connected to optical couplers at each of the two ends of each of those optical waveguides. These optical waveguides are comprised of a non-nonlinear optical material 105 in this example.

First secondary optical waveguide portion 1508A is connected to first signal loop extension 1504A and first idler loop extension 1506A. Second secondary optical waveguide portion 1508B is connected to second signal loop extension 1504B and second idler loop extension 1506B. These connections from the secondary optical waveguide portions to the various signal loop extensions and idler loop extensions are made through wavelength-selective couplers such as first signal loop coupler 1594A, first idler loop coupler 1596A, second signal loop coupler 1594B, and second idler loop coupler 15963. Connections between first main nonlinear optical waveguide segment 1510A and second main nonlinear optical waveguide segment 15103 of the main nonlinear optical waveguide and first secondary optical waveguide portion 1508A and second secondary optical waveguide portion 15083 of the secondary optical waveguide are made through wavelength selective optical couplers, such as first wavelength-selective coupler 1580, second wavelength-selective coupler 1586, third wavelength-selective coupler 1584, and fourth wavelength-selective coupler 1582.

In this illustrative example, optical waveguide structure 1500 also includes pump input optical waveguide 1532, signal output optical waveguide 1534, and idler output optical waveguide 1536. Pump input optical waveguide 1532 can input pump light 1512 into second pump bypass optical waveguide 15023. Signal output optical waveguide 1534 can output signal light 1514 from second signal loop extension 15043. Idler output optical waveguide 1536 can output idler light 1516 from second idler loop extension 15063.

In this illustrative example, pump optical coupler 1531 couples pump input optical waveguide 1532 to second pump bypass optical waveguide 15023. Signal optical coupler 1535 couples second signal loop extension 15043 to signal output optical waveguide 1534. Idler optical coupler 1537 couples second idler loop extension 15063 to idler output optical waveguide 1536.

As depicted, first wavelength-selective coupler 1580 and second wavelength-selective coupler 1586 connect pump bypass optical waveguide 1502A to two different segments, first main nonlinear optical waveguide segment 1510A and second main nonlinear optical waveguide segment 15103, of main nonlinear optical waveguide 1510. In this illustrative example, third wavelength-selective coupler 1584 and fourth wavelength-selective coupler 1582 connect second pump bypass optical waveguide 15023 to the opposite ends of those two segments, first main nonlinear optical waveguide segment 1510A and second main nonlinear optical waveguide segment 15103, of main nonlinear optical waveguide 1510.

In this illustrative example, pump light 1512 travels in pump loop 1552. Pump loop 1552 is a resonator loop that extends through first main nonlinear optical waveguide segment 1510A of main nonlinear optical waveguide; first wavelength-selective coupler 1580; first pump bypass optical waveguide 1502A; second wavelength-selective coupler 1586; second main nonlinear optical waveguide; 15103 of main nonlinear optical waveguide; third wavelength-selective coupler 1584; second pump bypass optical waveguide 15023; and fourth wavelength-selective coupler 1582; and continues again through first main nonlinear optical waveguide segment 1510A of main nonlinear optical waveguide 1510. The lengths of the various waveguides through which pump light 1512 of pump wavelength travels in pump loop 1552 can be selected so that pump wavelength matches a resonance condition for pump loop 1552.

Pump light 1512, signal light 1514 and idler light 1516 all travel through first main nonlinear optical waveguide segment 1510A and second main nonlinear optical waveguide segment 1510B of main nonlinear optical waveguide 1510. As depicted, first wavelength-selective coupler 1580 couples pump light 1512 into first pump bypass optical waveguide 1502A. First wavelength-selective coupler 1580 also couples signal light 1514 and idler light 1516 into first secondary optical waveguide portion 1508A. Thus, only signal light 1514 and idler light 1516 travel through second secondary optical waveguide portion 1508B. First signal loop coupler 1594A couples signal light from segment 1571 of first secondary optical waveguide portion 1508A into first signal loop extension 1504A. First signal loop coupler 1594A also couples signal light that has propagated through first signal loop extension 1504A into segment 1573 of first secondary optical waveguide portion 1508A. Signal light 1514 then continues to propagate through first secondary optical waveguide portion 1508A, being coupled by first idler loop coupler 1596A from segment 1573 to segment 1575 of first secondary optical waveguide portion 1508A. Second wavelength-selective coupler 1586 couples signal light 1514 from first secondary optical waveguide portion 1508A into second main nonlinear optical waveguide segment 1510B. Second wavelength-selective coupler 1586 also couples pump light from first pump bypass optical waveguide 1502A into second main nonlinear optical waveguide segment 1510B.

As with first main nonlinear optical waveguide segment 1510A of main nonlinear optical waveguide 1510, pump light 1512, signal light 1514 and idler light 1516 all travel through second main nonlinear optical waveguide segment 1510B of main nonlinear optical waveguide 1510. As depicted, third wavelength-selective coupler 1584 couples pump light 1512 into second pump bypass optical waveguide 1502B. Third wavelength-selective coupler 1584 also couples signal light 1514 and idler light 1516 into second secondary optical waveguide portion 1508B. Thus, only signal light 1514 and idler light 1516 travel through second secondary optical waveguide portion 1508B.

Second signal loop coupler 1594B couples signal light from segment 1576 of second secondary optical waveguide portion 1508B into second signal loop extension 1504B. Second signal loop coupler 1594B also couples signal light that has propagated through second signal loop extension 1504B into segment 1574 of second secondary optical waveguide portion 1508B. Signal light 1514 then continues to propagate through second secondary optical waveguide portion 1508B, being coupled by second idler loop coupler 1596B from segment 1574 to segment 1572 of second secondary optical waveguide portion 1508B. Fourth wavelength-selective coupler 1582 couples signal light 1514 from second secondary optical waveguide portion 1508B again into first main nonlinear optical waveguide segment 1510A. Fourth wavelength-selective coupler 1582 also couples pump light 1512 from first pump bypass optical waveguide 1502A into first main nonlinear optical waveguide segment 1510A.

In this illustrative example, signal light 1514 travels in signal loop 1554. Signal loop 1554 is a resonator loop that can be thought of as comprising two halves. One half of signal loop 1554 extends through first main nonlinear optical waveguide segment 1510A of main nonlinear optical waveguide 106; first wavelength-selective coupler 1580 (in its thru state); segment 1571 of first secondary optical waveguide portion 1508A; first signal loop coupler 1594A (in its cross state); first signal loop extension 1504A; a second pass through first signal loop coupler 1594A (again in its cross state); segment 1573 of first secondary optical waveguide portion 1508A; first idler loop coupler 1596A (in its thru state); segment 1575 of first secondary optical waveguide portion 1508A; and second wavelength-selective coupler 1586 (in its thru state). A second half of signal loop 1554 extends through second main nonlinear optical waveguide segment 1510B of main nonlinear optical waveguide 1510; third wavelength-selective coupler 1584 (in its thru state); segment 1576 of second secondary optical waveguide portion 1508B; second signal loop coupler 1594B (in its cross state); second signal loop extension 1504B; a second pass through second signal loop coupler 1594B (again in its cross state); segment 1574 of second secondary optical waveguide portion 1508B; second idler loop coupler 1596B (in its thru state); segment 1572 of second secondary optical waveguide portion 1508B; and fourth wavelength-selective coupler 1582 (in its thru state). The lengths of the various waveguides through which signal light 1514 of a signal wavelength travels in signal loop 1554 can be selected so that signal wavelength matches a resonance condition for signal loop 1554.

Additionally, besides coupling signal light 1514, first wavelength-selective coupler 1580 also couples idler light 1516 into first secondary optical waveguide portion 1508A. Thus, only signal light 1514 and idler light 1516 travel through first secondary optical waveguide portion 1508A. Idler light 1516 then continues to propagate through first secondary optical waveguide portion 1508A, being coupled by first signal loop coupler 1594A from segment 1571 to segment 1573 of first secondary optical waveguide portion 1508A.

In this illustrative example, first idler loop coupler 1596A couples idler light 1516 from segment 1573 of first secondary optical waveguide portion 1508A into first idler loop extension 1506A. First idler loop coupler 1596A also couples idler light that has propagated through first idler loop extension 1506A into segment 1575 of first secondary optical waveguide portion 1508A. Second wavelength-selective coupler 1586 couples idler light 1516 from first secondary optical waveguide portion 1508A into second main nonlinear optical waveguide segment 1510B. Pump light 1512, signal light 1514 and idler light 1516 all travel through second main nonlinear optical waveguide segment 1510B of main nonlinear optical waveguide 1510. Besides coupling pump light 1512 into second pump bypass optical waveguide 1502B, third wavelength-selective coupler 1584 also couples idler light 1516 and signal light 1514 into second secondary optical waveguide portion 1508B. Thus, only idler light 1516 and signal light 1514 travel through second secondary optical waveguide portion 1508B. Idler light 1516 then continues to propagate through second secondary optical waveguide portion 1508B, being coupled by second signal loop coupler 1594B from segment 1576 to segment 1574 of second secondary optical waveguide portion 1508B.

As depicted, second idler loop coupler 1596B couples idler light 1516 from segment 1574 of second secondary optical waveguide portion 1508B into second idler loop extension 1506B. Second idler loop coupler 1596B also couples idler light that has propagated through second idler loop extension 1506B into segment 1572 of second secondary optical waveguide portion 1508B. Fourth wavelength-selective coupler 1582 couples idler light 1516 from second secondary optical waveguide portion 1508B into first main nonlinear optical waveguide segment 1510A.

In this illustrative example, idler light 1516 travels in idler loop 1556. Idler loop 1556 is a resonator loop that can be thought of as comprising two halves. One half of idler loop 1556 extends through first main nonlinear optical waveguide segment 1510A of main nonlinear optical waveguide 1510; first wavelength-selective coupler 1580 (in its thru state); segment 1571 of first secondary optical waveguide portion 1508A; first signal loop coupler 1594A (in its thru state); segment 1573 of first secondary optical waveguide portion 1508A; first idler loop coupler 1596A (in its cross state); first idler loop extension 1506A; a second pass through first idler loop coupler 1596A (again in its cross state); segment 1575 of first secondary optical waveguide portion 1508A; and second wavelength-selective coupler 1586 (in its thru state). A second half of idler loop 1556 extends through second main nonlinear optical waveguide segment 1510B of main nonlinear optical waveguide 1510; third wavelength-selective coupler 1584 (in its thru state); segment 1576 of second secondary optical waveguide portion 1508B; second signal loop coupler 1594B (in its thru state); segment 1574 of second secondary optical waveguide portion 1508B; second idler loop coupler 1596B (in its cross state); second idler loop extension 1506B; a second pass through second idler loop coupler 1596B (again in its cross state); segment 1572 of second secondary optical waveguide portion 1508B; and fourth wavelength-selective coupler 1582 (in its thru state). The lengths of the various waveguides through which idler light 1516 of idler wavelength travels in idler loop 1556 can be selected so that the idler wavelength matches a resonance condition for idler loop 1556.

As depicted, the resonator loops, pump loop 1552, signal loop 1554, and idler loop 1556, have portions that overlap each other and portions that do not overlap each other. All three loops include nonlinear optical waveguide segments, such as first main nonlinear optical waveguide segment 1510A and second main nonlinear optical waveguide segment 1510B. Signal loop 1554 and idler loop 1556 further overlap each other through portions, such as first secondary optical waveguide portion 1508A and second secondary optical waveguide portion 1508B. Phase shifters can be placed at the non-overlapping portions of pump loop 1552, signal loop 1554, and idler loop 1556 to produce phase shifts for pump light 1512, idler light 1516, and signal light 1514 that can be adjusted separately from each other.

The signal loop 1554, idler loop 1556, and pump loop 1552 can each be considered as having two halves. These halves can be distinguished in the illustration of FIG. 18 by their location relative to the reference line 1595. A first half includes the components to the right of reference line 1595. A second half includes the components to the left of reference line 1595.

As depicted, optical waveguide structure 1500 includes phase shifters in the form of tuning electrodes. In this example, tuning electrode 1564A and tuning electrode 1565A are located adjacent to first signal loop extension 1504A. These tuning electrodes enable adjustment of the phase of signal light 1514 in the first half of signal loop 1554. Tuning electrode 1566A and tuning electrode 1567A are located adjacent to first idler loop extension 1506A. These tuning electrodes enable adjustment of the phase of idler light 1516 in the first half of idler loop 1556. Tuning electrode 1564B and tuning electrode 1565B are located adjacent to second signal loop extension 1504B. These tuning electrodes enable adjustment of the phase of signal light 1514 in the second half of signal loop 1554. Tuning electrode 1566B and tuning electrode 1567B are located adjacent to second idler loop extension 1506B. These tuning electrodes enable adjustment of the phase of idler light 1516 in the second half of idler loop 1556.

Tuning electrode 1560A is located adjacent to first main nonlinear optical waveguide segment 1510A. Tuning electrode 1560A can be used to adjust the phase of pump light 1512 in the first half of pump loop 1552. Tuning electrode 1560B is located adjacent to second main nonlinear optical waveguide segment 1510B. Tuning electrode 1560B can be used to adjust the phase of pump light 1512 in the second half of pump loop 1552. Since signal light 1514 and idler light 1516 also propagate through first main nonlinear optical waveguide segment 1510A and second main nonlinear optical waveguide segment 1510B for main nonlinear optical waveguide 1510, tuning electrode 1560A and tuning electrode 1560B also affect the phase of signal light 1514 and idler light 1516. The use of tuning electrodes to accomplish resonance matching and round-trip phase matching was described with reference to FIG. 13, as an example.

In optical waveguide structure 1500, nonlinear optical generation of signal light 1514 and idler light 1516 from pump light 1512 occurs only in first main nonlinear optical waveguide segment 1510A and second main nonlinear optical waveguide segment 1510B of main nonlinear optical waveguide 1510. First main nonlinear optical waveguide segment 1510A can be considered as part of the first half of optical waveguide structure 1500. Second main nonlinear optical waveguide segment 1510B can be considered as part of the second half of optical waveguide structure 1500.

In this example, signal light 1514 and idler light 1516 propagate in first secondary optical waveguide portion 1508A and second secondary optical waveguide portion 1508B of secondary optical wavelength and in first signal loop extension 1504A and second signal loop extension 1504B as well as in first idler loop extension 1506A and second idler loop extension 1506B without further nonlinear optical generation of signal photons or idler photons. Pump light 1512, from which the signal light 1514 and idler light 1516 are generated, is absent from those waveguides.

In this illustrative example, the phases of the pump light 1512, signal light 1514 and idler light 1516 in the two halves of optical waveguide structure 1500 can be adjusted to achieve a constructive interaction between the signal light and idler light generated in the first half of optical waveguide structure 1500 and the signal light and idler light generated in the second half of optical waveguide structure 1500. This constructive interaction can be achieved even though the nonlinear optical coefficient can have a first sign in first main nonlinear optical waveguide segment 1510A of the first half and a second sign, opposite to the first sign, in second main nonlinear optical waveguide segment 15103 of the second half.

In this illustrative example, the nonlinear optical coefficient for light propagating in the first main nonlinear optical waveguide segment 1510A of the upper-right half-structure 1591 of optical waveguide structure 1500 has one sign for the nonlinear optical coefficient 112. The light propagating in second main nonlinear optical waveguide segment 15103 in lower-left half-structure 1592 of optical waveguide structure 1500 has an opposite sign for the nonlinear optical coefficient.

In other words, the two segments, first main nonlinear optical waveguide segment 1510A and second main nonlinear optical waveguide segment 15103, of main nonlinear optical waveguide 1510 can be considered as part of two half-structures, upper-right half-structure 1591 and lower-left half-structure 1592. As depicted, these two half-structures are separated by reference line 1595 extending from the upper left corner of optical waveguide structure 1500 to the lower right corner of optical waveguide structure 1500. As shown, reference line 1595 intersects optical waveguide structure 1500 at a location A between second wavelength-selective coupler 1586 for reinserting pump light 1512 in second main nonlinear optical waveguide segment 1510B of main nonlinear optical waveguide 1510 and the tuning electrode 1560B in second main nonlinear optical waveguide segment 1510B and at another location B between fourth wavelength-selective coupler 1582 for reinserting pump light 1512 into first main nonlinear optical waveguide segment 1510A of main nonlinear optical waveguide 1510 and tuning electrode 1560A in first main nonlinear optical waveguide segment 1510A.

For the upper-right half-structure 1591, the relative phase walk-off for travel from upper left to lower right (i.e., from location A to location B) of upper-right half-structure 1591 should preferably be an odd multiple of $\pi$ radians. Also, the relative phase walk-off from travel through first main nonlinear optical waveguide segment 1510A of main nonlinear optical waveguide 1510, where the nonlinear optical generation occurs, is preferably less than $\pi$ radians and as close to zero as possible. The cross-sectional structure of first main nonlinear optical waveguide segment 1510A can be designed to achieve the desired phase match (and minimal relative phase walk-off) for travel through first main nonlinear optical waveguide segment 1510A. Similarly, for lower-left half-structure 1592, the relative phase walk-off for travel from lower right to upper left (i.e., from location B to location A) of lower-left half-structure 1592 should be an odd multiple of $\pi$ radians. Also, the relative phase walk-off from travel through the second main nonlinear optical waveguide segment 1510B, where the nonlinear optical generation occurs, is less than $\pi$ radians and as close to zero as possible. The cross-sectional structure of second main nonlinear optical waveguide segment 1510B can be designed to achieve the desired phase match (and minimal relative phase walk-off) for travel through second main nonlinear optical waveguide segment 1510B.

Thus, the lengths of the pump loop 1552, the signal loop 1554, and idler loop 1556 in each of the upper-right half-structure 1591 and the lower-left half-structure 1592, as well as the cross-sectional structures of the waveguides in each of those two half-structures can be designed to achieve the desired relative phase walk-off that is preferably an odd multiple of $\pi$ radians. Also, the relative phase walk-off from travel through first main nonlinear optical waveguide segment 1510A for main nonlinear optical waveguide 1510, where additional nonlinear optical generation occurs, is preferably less than $\pi$ radians and ideally is zero. Similarly, the relative phase walk-off from travel through second main nonlinear optical waveguide segment 1510B, where additional nonlinear optical generation again occurs, is preferably less than $\pi$ radians and ideally is zero. Furthermore, the lengths and the cross-sectional structure of the waveguides traversed in both upper-right half-structure 1591 and the lower-left half-structure 1592 can be selected to also achieve round-trip phase matching for the nonlinear optical generation that occurs in the combination of two halves of optical waveguide structure 1500. Thus, the round-trip phase for the nonlinear optical interaction of the pump, signal and idler light is preferably a multiple of 360 degrees or $2\pi$ radians.

Making the phase walk-off for each half-structure, such as upper-right half-structure 1591 and lower-left half-structure 1592, have a value that is an odd multiple of 180 degrees or π radians compensates for the reversal in sign of the nonlinear optical coefficient of the nonlinear optical material in the nonlinear optical waveguide segments, such as first main nonlinear optical waveguide segment 1510A and second main nonlinear optical waveguide segment 15103, of those two half-structures. First main nonlinear optical waveguide segment 1510A is in upper-right half-structure 1591 and second main nonlinear optical waveguide segment 15103 is in lower-left half-structure 1592. The nonlinear optical coefficient 112 in first main nonlinear optical waveguide segment 1510A has a first sign 107 and the nonlinear optical coefficient 112 in second main nonlinear optical waveguide segment 15103 has a second sign 109 that is opposite from the first sign. The configuration of two half-structures is especially useful for optical waveguide structures 1500 that comprise second-order nonlinear optical material. An example of such material is x-cut lithium niobate. This configuration of two half-structures is especially useful when the nonlinear optical waveguide segments, such as first main nonlinear optical waveguide segment 1510A and second main nonlinear optical waveguide segment 15103 containing x-cut lithium niobate are oriented parallel to the material Y-axis, with the propagating optical fields of the pump light 1512, signal light 1514 and idler light 1516 having transverse electric (TE) components that are aligned parallel to the material X-axis.

Besides meeting the phase matching conditions for the two half-structures, upper-right half-structure 1591 and lower-left half-structure 1592 that form optical waveguide structure 1500, the other optical waveguides in optical waveguide structure 1500 can be designed to enable the pump light 1512, signal light 1514, and idler light 1516 to match resonances of their respective resonator loops, pump loop 1552, signal loop 1554, and idler loop 1556.

Figure 19:
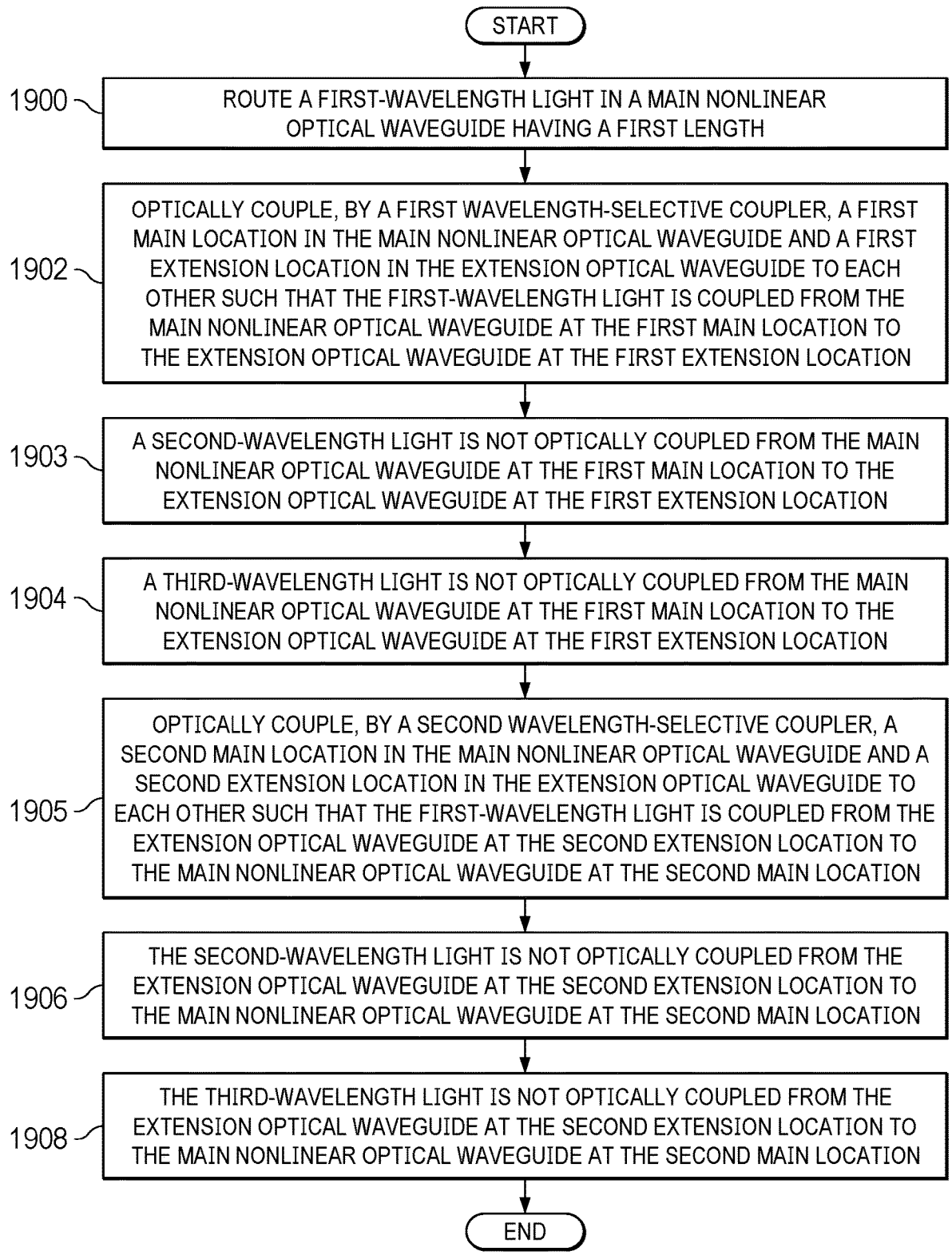
FIG. 19 is an illustration of a flowchart of a process for a non-linear optical process in accordance with an illustrative embodiment.

Turning next to FIG. 19, an illustration of a flowchart of a process for a non-linear optical process is depicted in accordance with an illustrative embodiment. The process in this flowchart can be implemented in optical waveguide structure 100 in FIG. 1 as well the other optical waveguide structures depicted in other figures.

The process begins by routing a first-wavelength light in a main nonlinear optical waveguide having a first length (operation 1900). The process optically couples, by a first wavelength-selective coupler, a first main location in the main nonlinear optical waveguide and a first extension location in the extension optical waveguide to each other such that the first-wavelength light is coupled from the main nonlinear optical waveguide at the first main location to the extension optical waveguide at the first extension location (operation 1902). The process does not optically couple a second-wavelength light from the main nonlinear optical waveguide at the first main location to the extension optical waveguide at the first extension location (operation 1903). The process does not optically couple a third-wavelength light from the main nonlinear optical waveguide at the first main location to the extension optical waveguide at the first extension location (operation 1904).

The process optically couples, by a second wavelength-selective coupler, a second main location in the main nonlinear optical waveguide and a second extension location in the extension optical waveguide to each other such that the first wavelength-light is coupled from the extension optical waveguide at the second extension location to the main nonlinear optical waveguide at the second main location (operation 1905). The process does not optically couple the second-wavelength light from the extension optical waveguide at the second extension location to the main nonlinear optical waveguide at the second main location (operation 1906). The process does not optically couple the third-wavelength light from the extension optical waveguide at the second extension location to the main nonlinear optical waveguide at the second main location (operation 1908). The process terminates thereafter.

Figure 20:
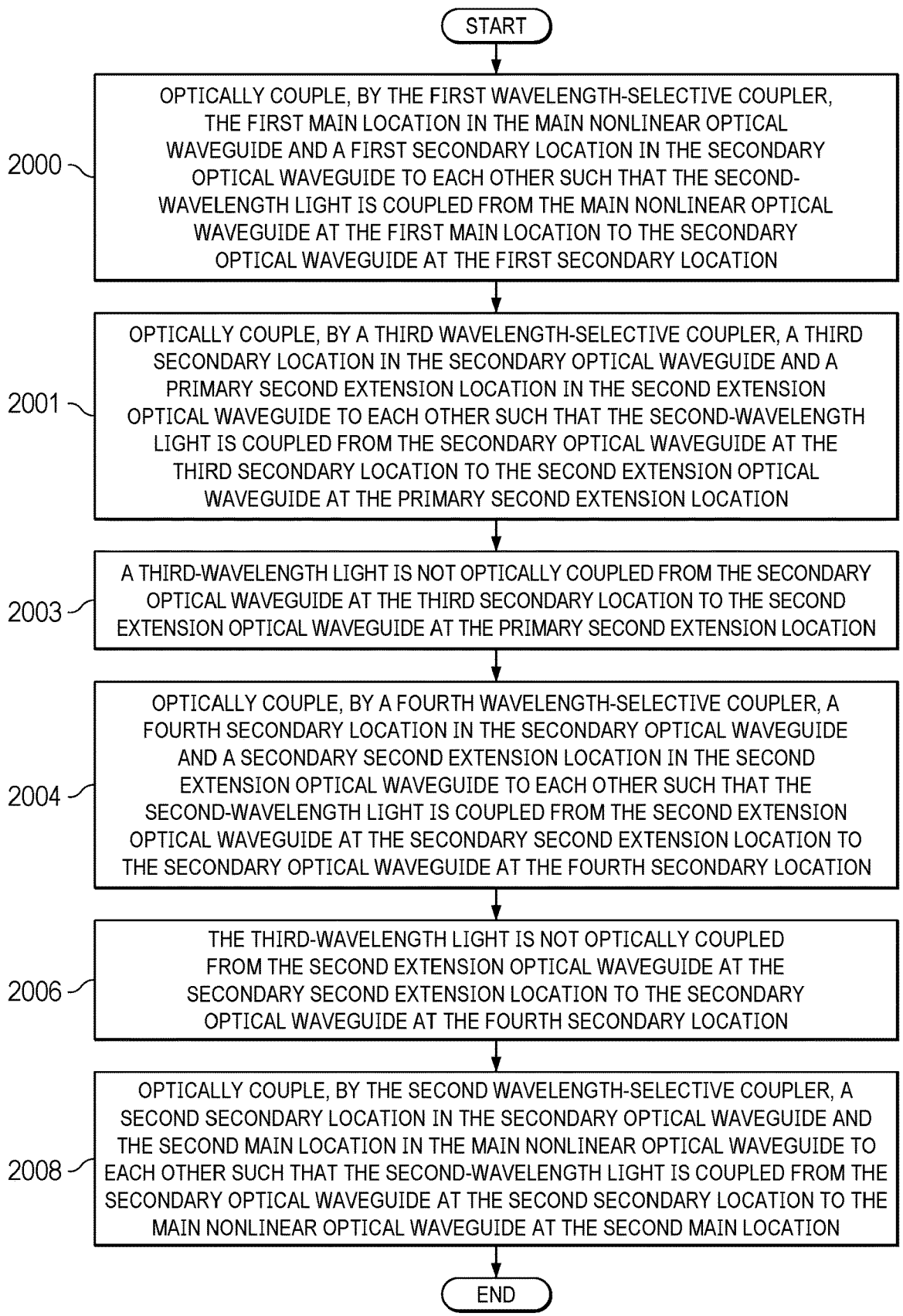
FIG. 20 is an illustration of a flowchart of additional operations for a process for a non-linear optical process in accordance with an illustrative embodiment.

With reference to FIG. 20, an illustration of a flowchart of additional operations for a process for a non-linear optical process is depicted in accordance with an illustrative embodiment. The process in this flowchart depicts additional operations that can be performed in addition to the operations in FIG. 19.

The process optically couples, by the first wavelength-selective coupler the first main location in the main nonlinear optical waveguide and a first secondary location in the secondary optical waveguide to each other such that the second-wavelength light is coupled from the main nonlinear optical waveguide at the first main location to the secondary optical waveguide at the first secondary location (operation 2000). The process optical couples, by a third wavelength-selective coupler, a third secondary location in the secondary optical waveguide and a primary second extension location in the second extension optical waveguide to each other such that the second-wavelength light is coupled from the secondary optical waveguide at the third secondary location to the second extension optical waveguide at the primary second extension location (operation 2001). The process does not optically couple a third-wavelength light from the secondary optical waveguide at the third secondary location to the second extension optical waveguide at the primary second extension location (operation 2003). The process optically couples, by a fourth wavelength-selective coupler, a fourth secondary location in the secondary optical waveguide and a secondary second extension location in the second extension optical waveguide to each other such that the second-wavelength light is coupled from the second extension optical waveguide at the secondary second extension location to the secondary optical waveguide at the fourth secondary location (operation 2004). The process does not optically couple the third-wavelength light from the second extension optical waveguide at the secondary second extension location to the secondary optical waveguide at the fourth secondary location (operation 2006). The process optically couples, by the second wavelength-selective coupler, a second secondary location in the secondary optical waveguide and the second main location in the main nonlinear optical waveguide to each other such that the second-wavelength light is coupled from the secondary optical waveguide at the second secondary location to the main nonlinear optical waveguide at the second main location (operation 2008). The process terminates thereafter.

Figure 21:
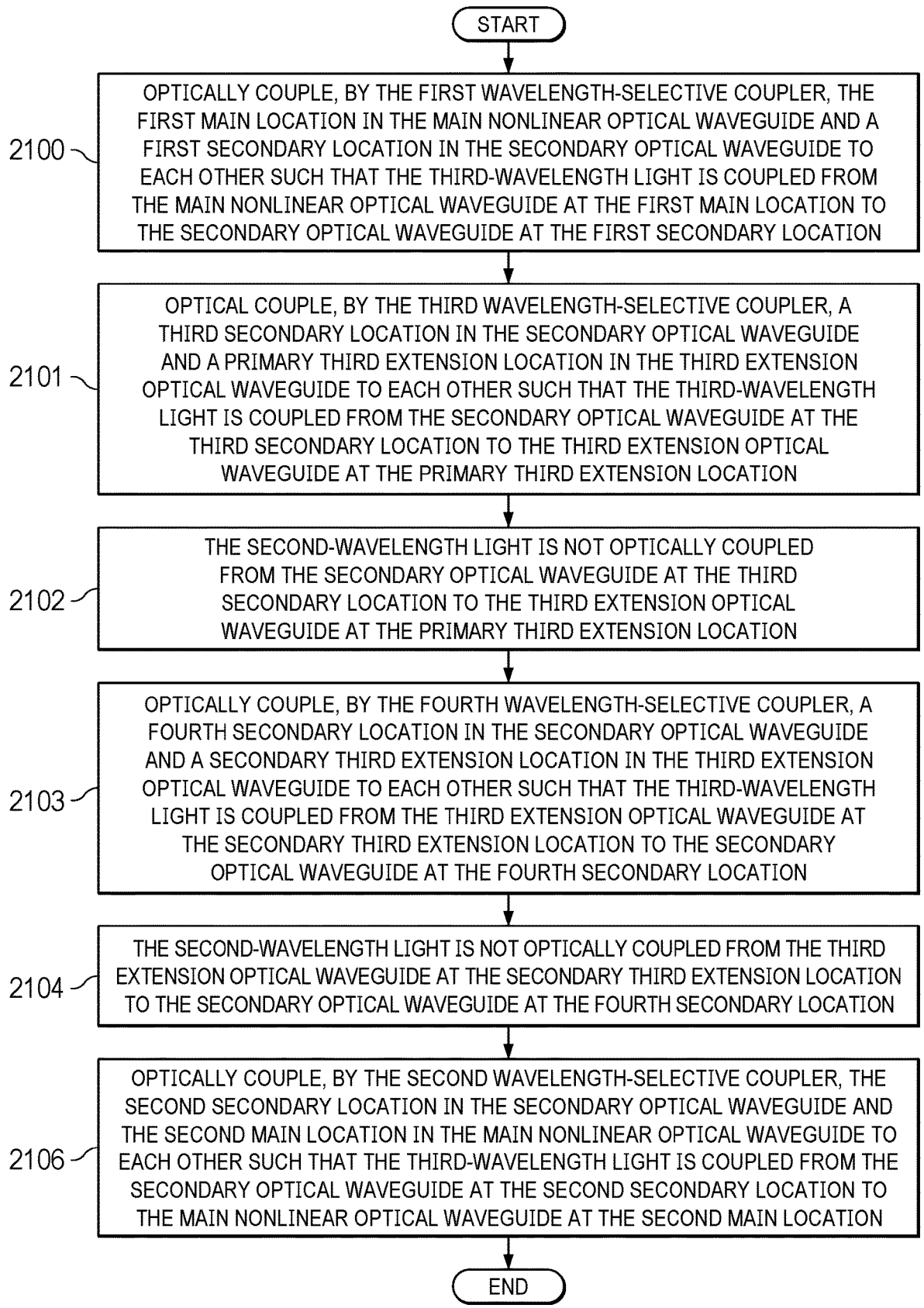
FIG. 21 is an illustration of a flowchart of additional operations for a process for a non-linear optical process in accordance with an illustrative embodiment.

Turning to FIG. 21, an illustration of a flowchart of additional operations for a process for a non-linear optical process is depicted in accordance with an illustrative embodiment. The process in this flowchart depicts additional operations that can be performed in addition to the operations in FIG. 19.

The process optically couples, by the first wavelength-selective coupler, the first main location in the main nonlinear optical waveguide and a first secondary location in the secondary optical waveguide to each other such that the third-wavelength light is coupled from the main nonlinear optical waveguide at the first main location to the secondary optical waveguide at the first secondary location (operation

2100). Also, the process optical couples, by the third wavelength-selective coupler, a third secondary location in the secondary optical waveguide and a primary third extension location in the third extension optical waveguide to each other such that the third-wavelength light is coupled from the secondary optical waveguide at the third secondary location to the third extension optical waveguide at the primary third extension location (operation 2101). The process does not optically couple the second-wavelength light from the secondary optical waveguide at the third secondary location to the third extension optical waveguide at the primary third extension location (operation 2102). The process optically couples, by the fourth wavelength-selective coupler, a fourth secondary location in the secondary optical waveguide and a secondary third extension location in the third extension optical waveguide to each other such that the third-wavelength light is coupled from the third extension optical waveguide at the secondary third extension location to the secondary optical waveguide at the fourth secondary location (operation 2103). The process does not optically couple the second-wavelength light from the third extension optical waveguide at the secondary third extension location to the secondary optical waveguide at the fourth secondary location (operation 2104). The process optically couples, by the second wavelength-selective coupler, the second secondary location in the secondary optical waveguide and the second main location in the main nonlinear optical waveguide to each other such that the third-wavelength light is coupled from the secondary optical waveguide at the second secondary location to the main nonlinear optical waveguide at the second main location (operation 2106). The process terminates thereafter.

Figure 22:
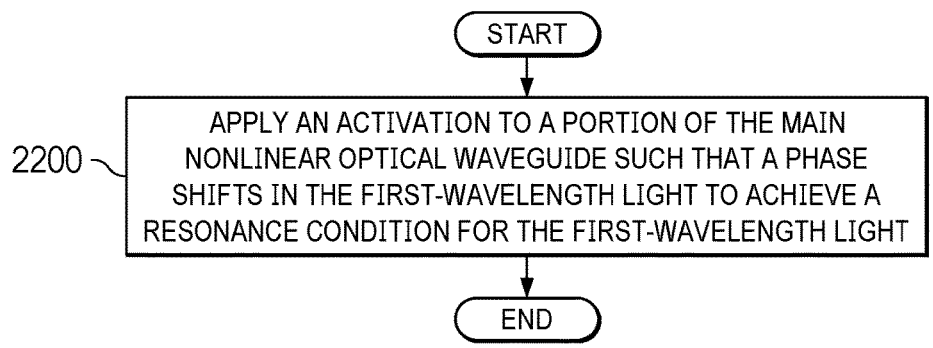
FIG. 22 is an illustration of a flowchart of an additional operation for a process for a non-linear optical process in accordance with an illustrative embodiment.

Turning to FIG. 22, an illustration of a flowchart of an additional operation for a process for a non-linear optical process is depicted in accordance with an illustrative embodiment. The process in this flowchart depicts additional operations that can be performed in addition to the operations in FIGS. 19-21.

The process applies an activation to a portion of the main nonlinear optical waveguide such that a phase shifts in the first-wavelength light to achieve a resonance condition for the first-wavelength light (operation 2200). The process terminates thereafter.

Figure 23:
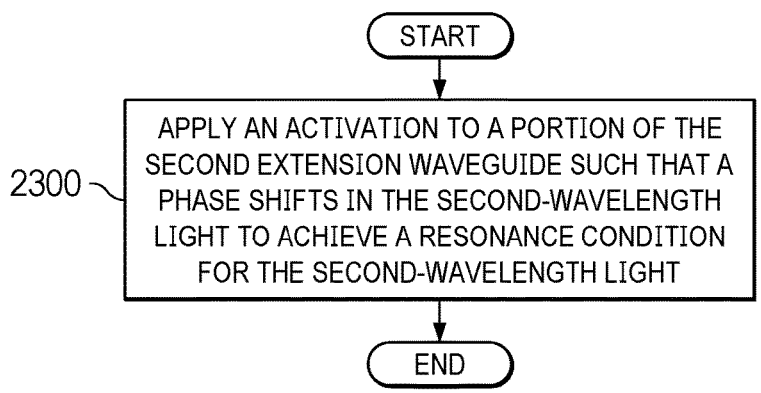
FIG. 23 is an illustration of a flowchart of additional operation for a process for a non-linear optical process in accordance with an illustrative embodiment.

With reference next to FIG. 23, an illustration of a flowchart of an additional operation for a process for a non-linear optical process is depicted in accordance with an illustrative embodiment. The process in this flowchart depicts additional operations that can be performed in addition to the operations in FIG. 21 and FIG. 22.

The process applies an activation to a portion of the second extension waveguide such that a phase shifts in the second-wavelength light to achieve a resonance condition for the second-wavelength light (operation 2300). The process terminates thereafter.

Figure 24:
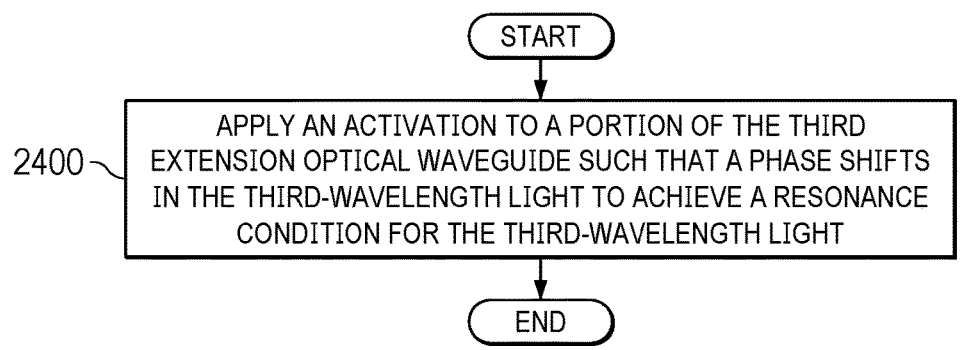
FIG. 24 is an illustration of a flowchart of an additional operation for a process for a non-linear optical process in accordance with an illustrative embodiment.

Turning now to FIG. 24, an illustration of a flowchart of an additional operation for a process for a non-linear optical process is depicted in accordance with an illustrative embodiment. The process in this flowchart depicts additional operations that can be performed in addition to the operations in FIG. 21 and FIG. 23.

The process applies an activation to a portion of the third extension optical waveguide such that a phase shifts in the third-wavelength light to achieve a resonance condition for the third-wavelength light (operation 2400). The process terminates thereafter.

Figure 25:
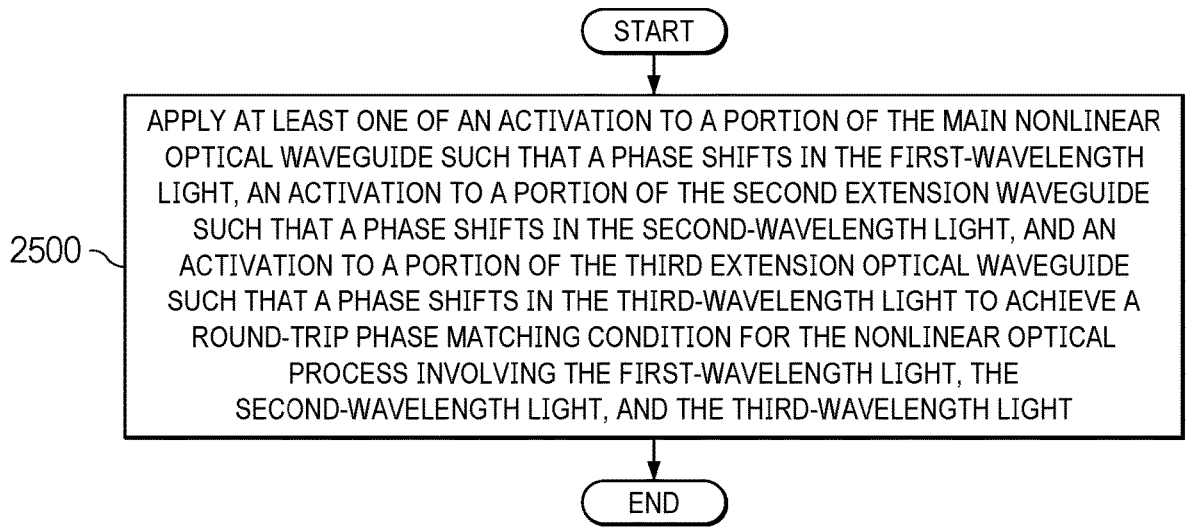
FIG. 25 is an illustration of a flowchart of an additional operation for a process for a non-linear optical process in accordance with an illustrative embodiment.

Turning now to FIG. 25, an illustration of a flowchart of an additional operation for a process for a non-linear optical process is depicted in accordance with an illustrative embodiment. The process in this flowchart depicts additional operations that can be performed in addition to the operations in FIGS. 22-24.

The process applies at least one of an activation to a portion of the main nonlinear optical waveguide such that a phase shifts in the first-wavelength light, an activation to a portion of the second extension waveguide such that a phase shifts in the second-wavelength light, and an activation to a portion of the third extension optical waveguide such that a phase shifts in the third-wavelength light to achieve a round-trip phase matching condition for the nonlinear optical process involving the first-wavelength light, the second-wavelength light, and the third-wavelength light (operation 2500). The process terminates thereafter.

To achieve phase matching, the activation does not necessarily need to be applied to all three of the main nonlinear optical waveguide, the second extension waveguide, and the third extension waveguide. The activation can be applied to one of some combination of the three waveguides or waveguide portions.

Figure 26:
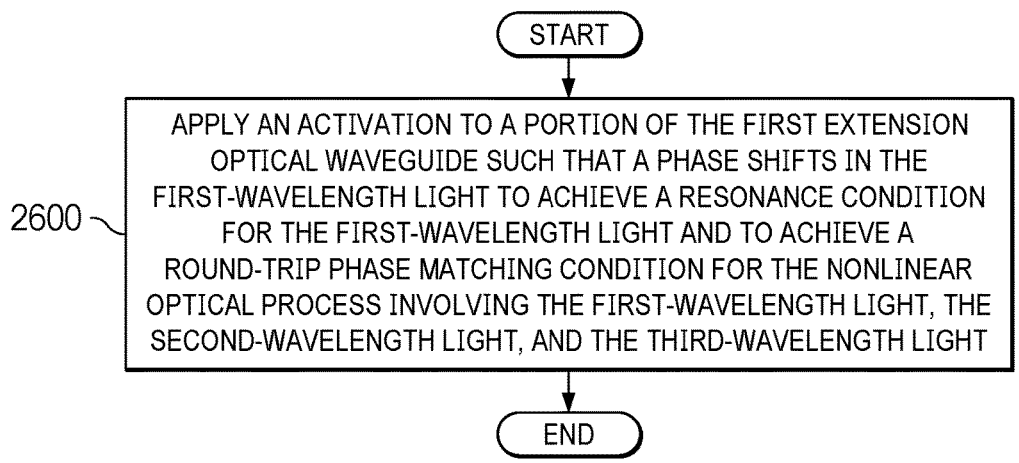
FIG. 26 is an illustration of a flowchart of an additional operation for a process for a non-linear optical process in accordance with an illustrative embodiment.

Turning now to FIG. 26, an illustration of a flowchart of an additional operation for a process for a non-linear optical process is depicted in accordance with an illustrative embodiment. The process in this flowchart depicts additional operations that can be performed in addition to the operations in FIGS. 22-25.

The process applies an activation to a portion of the first extension optical waveguide such that a phase shifts in the first-wavelength light to achieve a resonance condition for the first-wavelength light and to achieve a round-trip phase matching condition for the nonlinear optical process involving the first-wavelength light, the second-wavelength light, and the third-wavelength light (operation 2600). The process terminates thereafter. In operation 2600, this activation can be accomplished by tuning electrode 1362 in FIG. 17.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 27:
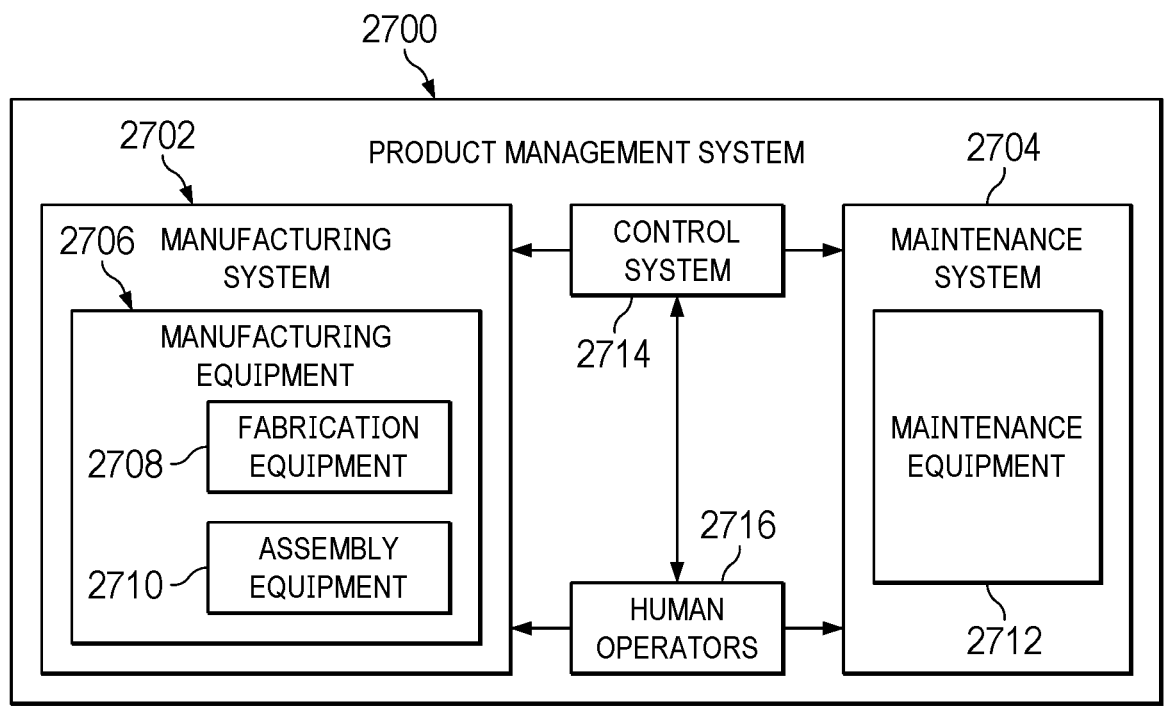
FIG. 27 is an illustration of a block diagram of a product management system in accordance with an illustrative embodiment.

Turning now to FIG. 27, an illustration of a block diagram of a product management system is depicted in accordance with an illustrative embodiment. Product management system 2700 is a physical hardware system. In this illustrative example, product management system 2700 includes at least one of manufacturing system 2702 or maintenance system 2704.

Manufacturing system 2702 is configured to manufacture products. As depicted, manufacturing system 2702 includes manufacturing equipment 2706. Manufacturing equipment 2706 includes at least one of fabrication equipment 2708 or assembly equipment 2710.

Fabrication equipment 2708 is equipment that used to fabricate the nonlinear optical waveguide structure. Multiple copies or multiple versions of nonlinear optical waveguide structures can be fabricated on a substrate wafer.

The substrate wafer can comprise a material such as silicon, lithium niobate, quartz, sapphire, silicon carbide, or some other suitable substrate. Fabrication equipment 2708 can be used to fabricate at least one of optical waveguide structures, nonlinear optical waveguides, optical couplers, optical waveguide segments, laser transmitters, ultraviolet transmission systems, point-to-point communication devices, laser infrared countermeasure sources, through water optical communication devices, or other suitable devices, antennas, or other suitable types of parts. For example, fabrication equipment 2708 can include machines and tools.

With respect to fabricating semiconductor components and optical waveguide components, fabrication equipment 2708 can comprise at least one of an epitaxial reactor, an oxidation system, a diffusion system, an etching system, a cleaning system, a bonding machine, a dicing machine, a wafer saw, an ion implantation system, a physical vapor deposition system, a chemical vapor deposition system, a photolithography system, an electron-beam lithography system, a plasma etcher, a die attachment machine, a wire bonder, a die overcoat system, molding equipment, a hermetic sealer, an electrical tester, a burn-in oven, a retention bake oven, a UV erase system, or other suitable types of equipment that can be used to manufacture semiconductor structures.

Assembly equipment 2710 is equipment used to assemble parts to form a product such as a chip, an integrated circuit, a multi-chip module, a computer, a signal processor, an aircraft, or some other product. Assembly equipment 2710 also can include machines and tools. These machines and tools may be at least one of a robotic arm, a spinner system, a sprayer system, and elevator system, a rail-based system, or a robot.

In this illustrative example, maintenance system 2704 includes maintenance equipment 2712. Maintenance equipment 2712 can include any equipment needed to perform maintenance on and evaluation of a product. Maintenance equipment 2712 may include tools for performing different operations on parts on a product. These operations can include at least one of disassembling parts, refurbishing parts, inspecting parts, reworking parts, manufacturing replacement parts, or other operations for performing maintenance on the product. These operations can be for routine maintenance, inspections, upgrades, refurbishment, or other types of maintenance operations.

In the illustrative example, maintenance equipment 2712 may include optical inspection devices, electron-beam imaging systems, x-ray imaging systems, surface-profile measurement systems, drills, vacuum leak checkers, and other suitable devices. In some cases, maintenance equipment 2712 can include fabrication equipment 2708, assembly equipment 2710, or both to produce and assemble parts that needed for maintenance.

Product management system 2700 also includes control system 2714. Control system 2714 is a hardware system and may also include software or other types of components. Control system 2714 is configured to control the operation of at least one of manufacturing system 2702 or maintenance system 2704. In particular, control system 2714 can control the operation of at least one of fabrication equipment 2708, assembly equipment 2710, or maintenance equipment 2712.

The hardware in control system 2714 can be implemented using hardware that may include computers, circuits, networks, and other types of equipment. The control may take the form of direct control of manufacturing equipment 2706. For example, robots, computer-controlled machines, and other equipment can be controlled by control system 2714. In other illustrative examples, control system 2714 can manage operations performed by human operators 2716 in manufacturing or performing maintenance on a product. For example, control system 2714 can assign tasks, provide instructions, display models, or perform other operations to manage operations performed by human operators 2716. In these illustrative examples, the different processes for fabricating semiconductor structures, optical structures, nonlinear optical waveguides, laser transmitters, photon generators, photon transmitters, photon detectors, ultraviolet transmission systems, point-to-point communication devices, laser infrared countermeasure sources, through water optical communication devices, or other suitable devices can be manufactured using processes implemented in control system 2714.

In the different illustrative examples, human operators 2716 can operate or interact with at least one of manufacturing equipment 2706, maintenance equipment 2712, or control system 2714.

This interaction can occur to manufacture semiconductor structures and other components for products such as semiconductor devices or components for use in products such as aircraft, spacecraft, communications systems, computation systems, and sensor systems.

Further, control system 2714 can be used to adjust manufacturing of nonlinear optical waveguides, optical waveguides, optical couplers, phase shifters, and other components dynamically in or by the waveguides during the manufacturing process. For example, many points in the process of fabricating the optical waveguide structure including the nonlinear optical waveguide as well as other components are present at which adjustments can be made to control characteristics of components in an optical waveguide structure.

Some features of the illustrative examples are described in the following clauses. These clauses are examples of features not intended to limit other illustrative examples.

Clause 1

An optical waveguide structure comprising:
a main nonlinear optical waveguide, wherein a first-wavelength light and a second-wavelength light travel in the main nonlinear optical waveguide;
a first extension optical waveguide;
a secondary optical waveguide;
a first wavelength-selective coupler that optically couples the main nonlinear optical waveguide and the first extension optical waveguide to each other such that the first-wavelength light is coupled from the main nonlinear optical waveguide to the first extension optical waveguide, and that optically couples the main nonlinear optical waveguide and the secondary optical waveguide to each other such that the second-wavelength light is coupled from the main nonlinear optical waveguide to the secondary optical waveguide;

and a second wavelength-selective coupler that optically couples the main nonlinear optical waveguide and the first extension optical waveguide to each other such that the first-wavelength light is coupled from the first extension optical waveguide to the main nonlinear optical waveguide, and that optically couples the main nonlinear optical waveguide and the secondary optical waveguide to each other such that the second-wavelength light is coupled from the secondary optical waveguide to the main nonlinear optical waveguide.

Clause 2

The optical waveguide structure according to clause 1 further comprising:

a second extension optical waveguide;

a third wavelength-selective coupler that optically couples the secondary optical waveguide and the second extension optical waveguide to each other such that the second-wavelength light is coupled from the secondary optical waveguide to the second extension optical waveguide; and a fourth wavelength-selective coupler that optically couples the secondary optical waveguide and the second extension optical waveguide to each other such that the second-wavelength light is coupled from the second extension optical waveguide to the secondary optical waveguide.

Clause 3

The optical waveguide structure according to clause 2 further comprising:

a third extension optical waveguide;

wherein the third wavelength-selective coupler optically couples the secondary optical waveguide and the third extension optical waveguide to each other such that a third-wavelength light is coupled from the secondary optical waveguide to the third extension optical waveguide and the second-wavelength light is not coupled into the third extension optical waveguide; and wherein the fourth wavelength-selective coupler optically couples the secondary optical waveguide and the third extension optical waveguide to each other such that the third-wavelength light is coupled from the third extension optical waveguide to the secondary optical waveguide.

Clause 4

The optical waveguide structure according to any of clauses 2-4, wherein the first-wavelength light travels in a first loop through a main segment between a first main location and a second main location within the main nonlinear optical waveguide, through the first extension optical waveguide, and through the first wavelength-selective coupler and the second wavelength-selective coupler, in which the first loop has a first length, and wherein the second-wavelength light travels in a second loop through the main segment between the first main location and the second main location within the main nonlinear optical waveguide, through a secondary segment in the secondary optical waveguide, through the second extension optical waveguide, and through the first wavelength-selective coupler and the second wavelength-selective coupler, in which the second loop has a second length for the second-wavelength light.

Clause 5

The optical waveguide structure according to clause 3, wherein the first-wavelength light travels in a first loop through a main segment within the main nonlinear optical waveguide, through and a first extension segment, through the first wavelength-selective coupler and the second wavelength-selective coupler, in which the first loop has a first length;

wherein the second-wavelength light travels in a second loop through a secondary segment in the secondary optical waveguide, through the second extension optical waveguide, through the first wavelength-selective coupler and the second wavelength-selective coupler, through the third wavelength-selective coupler and the fourth wavelength-selective coupler, and through the main segment in the nonlinear optical waveguide, in which the second loop has a second length for the second-wavelength light; and wherein the third-wavelength light travels in a third loop through the secondary segment in the secondary optical waveguide, through the third extension optical waveguide, through the first wavelength-selective coupler and the second wavelength-selective coupler, through the third wavelength-selective coupler and the fourth wavelength-selective coupler, and through the main segment in the nonlinear optical waveguide, in which the third loop has a third length for the third-wavelength light.

Clause 6

The optical waveguide structure according to any of clauses 2-6, wherein the first-wavelength light is a pump light and the second-wavelength light is one of a signal light and an idler light, and wherein an intensity of the first-wavelength light is greater than an intensity of the second-wavelength light.

Clause 7

The optical waveguide structure according to any of clauses 3 or 5 wherein the first-wavelength light is a pump light, the second-wavelength light is a signal light, and the third-wavelength light is an idler light; and wherein an intensity of the first-wavelength t light is greater than an intensity of the second-wavelength light and is greater than an intensity of the third-wavelength light.

Clause 8

The optical waveguide structure according to any of clauses 1-7, wherein the main nonlinear optical waveguide is comprised of an electro-optic material.

Clause 9

The optical waveguide structure according to any of clauses 2-8, wherein the second extension optical waveguide is comprised of at least one of an electro-optic material, a nonlinear optical material or a non-nonlinear optical material Clause 10

The optical waveguide structure according to any of clauses 3, 5, or 7, wherein the third extension optical waveguide is comprised of at least one of an electro-optic material, a nonlinear optical material or a non-nonlinear optical material Clause 11

The optical waveguide structure according to any of clauses 1-10, wherein the main nonlinear optical waveguide is comprised of a nonlinear optical material.

Clause 12

The optical waveguide structure according to any of clauses 2-11, wherein the second extension optical waveguide is comprised of an electro-optic material.

Clause 13

The optical waveguide structure according to any of clauses 3, 5, 7, or 10, wherein the third extension optical waveguide is comprised of an electro-optic material.

Clause 14

The optical waveguide structure according to any of clauses 2-13, wherein the first wavelength-selective coupler, the second wavelength-selective coupler, the third wavelength-selective coupler, and the fourth wavelength-selective coupler are selected from at least one of a two-waveguide coupler, a multi-mode interference coupler, a pulley coupler, a Mach-Zehnder interferometer, or a 4-port micro-optical waveguide resonator coupler.

Clause 15

The optical waveguide structure according to any of clauses 3, 5, 7, 10, or 13 further comprising:
a set of output optical waveguides that outputs output light out of at least one of the first extension optical waveguide, the second extension optical waveguide, or the third extension optical waveguide.

Clause 16

The optical waveguide structure according to any of clauses 3, 5, 7, 10, 13, or 15 further comprising:
a set of input optical waveguides that inputs input light into at least one of the first extension optical waveguide, the second extension optical waveguide, or the third extension optical waveguide.

Clause 17

The optical waveguide structure according to clause 4 further comprising:
a phase shifter located adjacent to a portion of the main nonlinear optical waveguide, wherein the phase shifter applies an activation such that a phase shifts in the first-wavelength light to achieve a resonance condition for the first-wavelength light.

Clause 18

The optical waveguide structure according to any of clauses 4 or 17 further comprising:
a phase shifter located adjacent to a portion of the second extension optical waveguide, wherein the phase shifter applies an activation such that a phase shifts in the second-wavelength light to achieve a resonance condition for the second-wavelength light.

Clause 19

The optical waveguide structure according to clause 5 further comprising:
a phase shifter located adjacent to a portion of the third extension optical waveguide, wherein the phase shifter applies an activation such that a phase shifts in the third-wavelength light to achieve the resonance condition for the third-wavelength light.

Clause 20

The optical waveguide structure according to any of clauses 1-19 further comprising:
a phase shifter located adjacent to a portion of the main nonlinear optical waveguide, wherein the phase shifter applies an activation such that a phase shifts in the first-wavelength light to achieve a round-trip phase matching condition for a nonlinear optical process involving the first-wavelength light.

Clause 21

The optical waveguide structure according to any of clauses 2-20 further comprising:
a phase shifter located adjacent to a portion of the second extension optical waveguide, wherein the phase shifter applies an activation such that a phase shifts in the second-wavelength light to achieve a round-trip phase matching condition for a nonlinear optical process involving the second-wavelength light.

Clause 22

The optical waveguide structure according to any of clauses 3, 5, 7, 10, 13, 15, or 16 further comprising:
a phase shifter located adjacent to a portion of the third extension optical waveguide, wherein the phase shifter applies an activation such that a phase shifts in the third-wavelength light to achieve a round-trip phase matching condition for a nonlinear optical process involving the third-wavelength light.

Clause 23

The optical waveguide structure according to any of clauses 1-24 further comprising:
a phase shifter located adjacent to a portion of the main nonlinear optical waveguide, wherein the phase shifter applies an activation such that a phase shifts in the first-wavelength light to achieve a phase walk-off that is an odd multiple of 180 degrees.

Clause 24

The optical waveguide structure according to any of clauses 2-23 further comprising:
- a phase shifter located adjacent to a portion of the second extension optical waveguide, wherein the phase shifter applies an activation such that a phase shifts in the second-wavelength light to achieve a phase walk-off that is an odd multiple of 180 degrees.

Clause 25

The optical waveguide structure according to any of clauses 35, 7, 10, 13, 15, 16, or 22 further comprising:
- a phase shifter located adjacent to a portion of the third extension optical waveguide, wherein the phase shifter applies an activation such that a phase shifts in the third-wavelength light to achieve a phase walk-off that is an odd multiple of 180 degrees.

Clause 26

A method for facilitating a non-linear optical process comprising:
- routing a first-wavelength light and a second-wavelength light in a main nonlinear optical waveguide;
- optically coupling, by a first wavelength-selective coupler, the main nonlinear optical waveguide and an extension optical waveguide to each other such that the first-wavelength light is coupled from the main nonlinear optical waveguide to the extension optical waveguide and the second-wavelength light is not coupled from the main nonlinear optical waveguide to the extension optical waveguide but rather is coupled to a secondary optical waveguide; and
- optically coupling, by a second wavelength-selective coupler, the main nonlinear optical waveguide and the extension optical waveguide to each other such that the first-wavelength light is coupled from the extension optical waveguide to the main nonlinear optical waveguide.

Clause 27

The method of according to clause 26 further comprising:
- optically coupling, by a third wavelength-selective coupler, the secondary optical waveguide and a second extension optical waveguide to each other such that the second-wavelength light is coupled from the secondary optical waveguide to the second extension optical waveguide, and such that a third-wavelength light is not coupled from the secondary optical waveguide to the second extension optical waveguide; and
- optically coupling, by a fourth wavelength-selective coupler, the secondary optical waveguide and the second extension optical waveguide to each other such that the second-wavelength light is coupled from the second extension optical waveguide to the secondary optical waveguide.

Clause 28

The method of according to clause 27 comprising:
- routing the third-wavelength light in the main nonlinear optical waveguide;
- optically coupling, by the third wavelength-selective coupler, the secondary optical waveguide and a third extension optical waveguide to each other such that the third-wavelength light is coupled from the secondary optical waveguide to the third extension optical waveguide and the second-wavelength light is not coupled from the secondary optical waveguide to the third extension optical waveguide; and
- optically coupling, by the fourth wavelength-selective coupler, the secondary optical waveguide and the third extension optical waveguide to each other such that the third-wavelength light is coupled from the third extension optical waveguide to the secondary optical waveguide.

Clause 29

The method according to clause 27, wherein the first-wavelength light travels in a first loop through a main segment between a first main location and a second main location within the main nonlinear optical waveguide and through a first extension segment, in which the first loop has a first length selected to achieve a resonance condition for the first-wavelength light; and
- wherein the second-wavelength light travels in a second loop through a secondary segment in the secondary optical waveguide, through the second extension optical waveguide, and through the main segment in the main nonlinear optical waveguide, in which the second loop has a second length for the second-wavelength light selected to achieve the resonance condition for the second-wavelength light.

Clause 30

The method according to clause 27, wherein the first-wavelength light travels in a first loop through a main segment between a first main location and a second main location within the main nonlinear optical waveguide and through a first extension optical waveguide, in which the first loop has a first length selected to achieve a resonance condition for the first-wavelength light;
- wherein the second-wavelength light travels in a second loop through a segment in the secondary optical waveguide, through the second extension optical waveguide, and through the main segment in the nonlinear optical waveguide, in which the second loop has a second length for the second-wavelength light selected to achieve the resonance condition for the second-wavelength light; and
- wherein the third-wavelength light travels in a third loop through the segment in the secondary optical waveguide, through the third extension optical waveguide, and through the main segment in the nonlinear optical waveguide, in which the third loop as a third length selected to achieve a resonance condition for the third-wavelength light.

Clause 31

The method according to any of clauses 27-30, wherein the first-wavelength light is a pump light, the second-wavelength light is one of a signal light and an idler light.

Clause 32

The method according to any of clauses 27-30, wherein the first-wavelength light is one of a signal light and an idler light and the second-wavelength light is a pump light.

Clause 33

The method according to any of clauses 27-30, wherein the first-wavelength light is a pump light, the second-wavelength light is a signal light, and the third-wavelength light is an idler light.

Clause 34

The method according to any of clauses 26-33 further comprising:
applying an activation to a portion of the main nonlinear optical waveguide such that a phase shifts in the first-wavelength light to achieve a resonance condition for the first-wavelength light.

Clause 35

The method according to any of clauses 27-34 further comprising:
applying an activation such to a portion of the second extension optical waveguide such that a phase shifts in the second-wavelength light to achieve a resonance condition for the second-wavelength light.

Clause 36

The method according to clause 30 further comprising:
applying an activation to a portion of the third extension optical waveguide such that such that a phase shifts in the third-wavelength light to achieve a resonance condition for the third-wavelength light.

Clause 37

The method according to any of clauses 27-36 further comprising:
applying an activation to a portion of the second extension optical waveguide such that a phase shifts in the second-wavelength light.

Clause 38

The method according to any of clauses 27-37 further comprising:
applying an activation to a portion of the main nonlinear optical waveguide such that a phase shifts in the first-wavelength light to achieve a round trip phase matching condition for a nonlinear optical process involving the first-wavelength light, the second-wavelength light, and the third-wavelength light.

Thus, the illustrative examples include the wavelength-selective couplers that enable selective coupling of light in a manner that establishes loops in which light of different wavelengths can travel. Additionally, optical waveguides in the illustrative examples are designed to manage a reversal in the sign of the nonlinear optical coefficient that occurs for the two halves of an optical waveguide structure for which the light travels in opposite directions in portions of those two halves. The optical waveguide structures in this optical waveguide structure can avoid undesired effects of the sign reversal in the nonlinear optical coefficient by removing the pump light or by having an absence of a non-linear optical material in part of the structure.

In another illustrative embodiment, loops formed from optical waveguides is unnecessary. For example, the non-linear optical waveguide structure in the different illustrative examples described above in FIGS. 1-27 can comprise triple partially overlapping loops for entanglement (TriPOLE). In this illustrative example, these partially overlapping loops for entanglement are unnecessary to obtain a desired level of performance.

The illustrative embodiments recognize and take into account a number of different considerations. Some of these considerations are recognized and taken into account as described below.

For example, the illustrative embodiments recognize and take into account that energy is conserved for a nonlinear optical process to occur. Furthermore, the illustrative embodiments recognize and take into account that the efficiency with which a nonlinear optical process generates light of a second wavelength from light of a first wavelength can be increased by achieving and maintaining phase matching for the nonlinear optical interaction to remain constructive and thereby generate more and more light of the second wavelength for longer and longer distances in which the nonlinear optical interaction occurs.

The illustrative embodiments also recognize and take into account that a problem is not how substantial the nonlinear optical conversion is, but rather whether the nonlinear optical interaction can continue to be constructive and to generate more light of the second wavelength from light of the first wavelength as the interaction distance is increased. For a closed-loop route, the interaction distance can be increased by having the light make many round trips through the closed-loop route.

The illustrative embodiments recognize and take into account that perfect phase-matching, i.e., when the phase mismatch of the optical fields participating in the nonlinear optical interaction is exactly 0, can be achieved in certain bulk crystals which exhibit birefringence. Phase-matching is achieved through angle tuning or temperature tuning and requires that at least one optical field has polarization orthogonal to another. However, if the dispersion in the linear refractive index is too big or the birefringence is too small, phase-matching may not be possible. Furthermore, for angles between the optic axis and propagation direction that are not exactly 0 or 90°, the optical fields experience significant spatial walk-off that reduces the spatial overlap of the optical fields participating in the nonlinear optical interaction and thus limits the interaction distance over which there continues to be generation of light at the second wavelength from light at the first wavelength. This spatial walk-off, and corresponding limitation on the interaction distance over which spatial overlap of the optical fields is maintained, limits the efficiency of the nonlinear optical process. In some applications, the temperatures required for phase-matching may not be practical. In addition, because one of the optical fields has different polarization, the largest nonlinear optical process coefficient cannot be utilized for all of the optical fields. As a result the efficiency of the nonlinear optical process is limited. In general, bulk crystals are fragile and large, making their use impractical in some applications.

The illustrative embodiments recognize and take into account that an alternative approach to true phase-matching in bulk crystals is quasi phase-matching. For a certain crystal, the desired wavelengths of the optical fields for some nonlinear optical process will have a nonzero phase-match, i.e., the fields will have some finite phase walk-off. When this phase walk-off exceeds $\pi$ radians or 180°, the nonlinear optical process begins to occur in reverse. Thus, instead of generating more light of the second wavelength from light of the first wavelength, the nonlinear process starts to generate light of the first wavelength from light of the second wavelength. This change in the nonlinear optical process can effectively cancel out the nonlinear optical generation of light at the second wavelength that had occurred when the phase walk-off was between 0 and $\pi$ radians. Quasi phase matching as implemented in bulk crystals utilizes a periodic reversal of the crystal axes so that when the phase walk-off is between 0 and $\pi$ radians the optical fields experience the positive value of the $\chi^{(2)}$ nonlinear optical susceptibility coefficient, and when the phase walk-off is between n and $2\pi$ radians the optical fields experience the negative value of the $\chi^{(2)}$ nonlinear optical susceptibility coefficient.

Thus, the illustrative embodiments recognize and take into account that the nonlinear optical process continues to be enhanced over many cycles of the periodic modulation of the $\chi^{(2)}$ nonlinear optical susceptibility coefficient. This technique can be advantageous in place of using regular bulk crystals because the optical fields can all have identical polarization. This technique can make use of the material's largest nonlinear optical coefficient. This technique can also reduce or eliminate spatial walk-off. However, for efficient enhancement of the nonlinear optical process the duty cycle of the poling period should be 50:50. Furthermore, the poling period typically required for quasi phase-matching ranges from 2-10 microns.

The illustrative embodiments also recognize and take into account that even with modern fabrication techniques, making periodically poled crystals with the correct duty cycle and poling period is very challenging, limiting the nonlinear optical enhancement of this strategy and its practicality. Temperature tuning can be used to compensate for imperfection in the poling period. Temperature tuning can be most effective when the poling period has a constant offset. For example, if some periods are too small and others too large, temperature tuning has reduced effectiveness or is ineffective. As with phase matching accomplished in bulk crystals, periodically poled bulk crystals for accomplishing quasi phase matching are large and fragile and may not be suitable for some applications.

The illustrative embodiments also recognize and take into account that the nonlinear optical process can be further enhanced by confining the optical fields in waveguides of the periodically poled crystal. This technique can increase the optical field amplitude, which in turn increases the efficiency of the nonlinear optical process. However, this technique still suffers from many of the issues encountered with bulk periodically poled crystals. In addition, applying the periodic poling across an entire wafer-scale substrate for mass production is currently impractical.

The illustrative embodiments recognize and take into account that instead of a periodic modulation of the crystal orientation, a periodic modulation of waveguide width or height can be used to compensate for the phase walk-off of the nonlinear optical process. However, such modulations also can induce significant reflection or scattering of the optical fields. This optical loss consequently lowers the efficiency of the nonlinear optical process by reducing the interaction distance over which a high optical-field amplitude can be sustained. In addition, the modulation typically employs sub-micron size spatial features which may require multi-step etch processes. As a result, this technique can require complex fabrication processes with very tight tolerances, but still incur significant optical losses which reduce the interaction distance over which a high optical-field amplitude can be sustained.

The illustrative embodiment provides an apparatus, system, and method that does not require periodic poling of the crystal substrate, which is costly, prone to fabrication errors, and not amenable to wafer-scale mass production. The illustrative examples use waveguide structures and components that are relatively straight-forward to fabricate and amenable to wafer-scale mass production. For example, in the illustrative examples, optical structures can be fabricated in a single etch step. This simple fabrication is not feasible with optical waveguides that use a periodic modulation of waveguide height to enhance the nonlinear optical process. The illustrative examples also do not require components which are inherently prone to significant optical losses, such as periodic modulations of the waveguide height, width, or both.

In the illustrative examples, phase-matching can also be achieved in some nonlinear optical waveguides through a process called modal phase-matching. In this method of modal phase-matching, a combination of waveguide geometry optimization and higher-order modes of the light traveling and guided in a waveguide are utilized so that the phase-matching condition is satisfied, i.e., the wave-vector mismatch is equal to zero. Modal phase matching involves using a combination of higher-order-mode optical fields for some frequencies or wavelengths of the light and fundamental-mode optical fields for other frequencies or wavelengths of the light involved in the nonlinear optical process.

Some illustrative examples have a combination of higher-order-mode optical fields for some frequencies or wavelengths of the light and fundamental-mode optical fields for other frequencies or wavelengths of the light involved in the nonlinear optical process. This combination can be selected to achieve a value for the wave-vector mismatch that achieves a desired value for the phase walk-off after a specific length or distance of nonlinear optical interaction. By using separate paths of different lengths of travel for light of different frequencies or wavelengths, the phase match can be reestablished on a periodic basis, even though there is wave-vector mismatch. This result can occur because the phase of an optical field is due to the product of the wave vector and the distance traveled by the optical field and because the phase is cyclic with a modulus of $2\pi$ radians.

In an illustrative example, open-ended optical waveguide structures can operate with the enhancement of $\chi^{(2)}$ and/or $\chi^{(3)}$ non-linear optical (NLO) processes, such as spontaneous parametric down conversion (SPDC), second harmonic generation (SHG), and spontaneous four-wave mixing (SFWM). In particular, the structures described in this illustrative example spatially separate the optical fields involved in the nonlinear optical process to enable precise phase-matching of the relevant optical fields to be reestablished at multiple locations along the route for the light traveling in a nonlinear optical waveguide structure. An illustrative example can enhance targeted nonlinear optical processes by providing portions of the waveguide structure in which both the nonlinear optical process occurs, and the phases of the propagating optical fields change and providing other portions of the waveguide structure in which the nonlinear optical process does not occur but the phases of the propagating optical field change.

In this example, wavelength-selective components are used. These wavelength selective components take the form of wavelength selective couplers that separate the optical fields involved in the nonlinear optical process into these different portions of the waveguide structure. With consideration of the phase shifts for the optical fields propagating in the different paths, this type of repeated re-establishment of phase matching can enhance the interaction distance over which the nonlinear optical process will continue to generate light of a second wavelength or frequency from light of a first wavelength or frequency, thereby increasing the efficiency of the nonlinear optical generation.

The nonlinear optical structure in these illustrative examples can be used multiple times in a single device, enabling even greater cumulative enhancement of the nonlinear optical process. In order to make the waveguide dimensions more practical or to increase the possible frequencies the optical fields can have, a higher-order waveguided mode for one or more of the optical fields involved in the nonlinear optical interaction can be used. The optical waveguide structure also can provide an optional ability to actively tune the phase of the separated optical fields to achieve a phase-matched condition. Such tuning can be used to compensate for at least one of an error in fabrication of the optical waveguide structure, a departure of a frequency of the light from a design value, and a change in an environmental condition such as the temperature. The illustrative examples recognize and take into account that current techniques either do not spatially separate the optical fields to travel in different optical waveguides based on different wavelengths of the light or require the separated optical fields to propagate in one or more closed-loop resonators.

In the illustrative examples, an optical waveguide structure comprises a nonlinear optical waveguide that is comprised of a set of segments. The optical waveguide structure also comprises a set of extension optical waveguides and a set of wavelength selective couplers. The set of wavelength selective couplers couples light between the nonlinear optical waveguide and the set of extension optical waveguides based on a wavelength of light.

In one example, the nonlinear optical waveguide has three segments, a first segment, a second segment, and a third segment. In the first segment, all of the light are present and contribute to the positive enhancement of the nonlinear optical process. For example, light traveling in the first segment comprises a first wavelength light, a second wavelength light, and a third wavelength light. The second wavelength light, and the third wavelength light are produced by a nonlinear optical interaction of the first wavelength light in the first segment. The nonlinear optical waveguide also produces a second wavelength light and a third wavelength light by the nonlinear optical interaction of the first wavelength light in the second segment. The nonlinear optical waveguide also produces a second wavelength light and a third wavelength light by the nonlinear optical interaction of the first wavelength light in the third segment.

A first wavelength selective coupler in the set of wavelength selective couplers couples the first wavelength light from a first ending point for the first segment to a second starting point for the second segment and couples the second wavelength light and the third wavelength light from the first ending point for the first segment to an extension starting point for a first extension optical waveguide in the set of extension optical waveguides. A second wavelength selective coupler in the set of wavelength selective couplers couples the second wavelength light and the third wavelength light from an extension ending point for the first extension optical waveguide to a third starting point for the third segment in the nonlinear optical waveguide.

In the illustrative example, the first segment has a first length from a first starting point to the first ending point produces a first phase walk-off that is at least one of from 0 to $\pi$ radians or from an even-numbered integer of $\pi$ radians to a next larger odd-numbered integer of $\pi$ radians for the nonlinear optical interaction in the first segment. The third segment has a third length from the third starting point to a third ending point that produces a third phase walk off that is at least one of from 0 to $\pi$ radians or from an even-numbered integer of $\pi$ radians to a next larger odd-numbered integer of $\pi$ radians for the nonlinear optical interaction in the third segment.

In this example, relative phase walk-off is the phase walk-off for all the components of light involved in the nonlinear optical process. Different components of light can have different wavelengths in these examples. The phase walk-off is defined with relation to the nonlinear optical process that occurs at two different locations or points in the nonlinear optical waveguide.

The optical fields generated from the nonlinear optical process occurring in the third segment can build upon, and be enhanced by, the optical fields generated from the nonlinear optical process occurring in the first segment. The nonlinear optical interaction in one portion of a nonlinear optical waveguide can build upon the nonlinear optical interaction that occurs in all preceding portions of the nonlinear optical waveguide. Whether "building upon or enhancement" or a constructive contribution occurs, versus a "tearing down" or "destructive" contribution from the light generated in the preceding portions of the nonlinear optical waveguide occurs depends on the values for the phase walk-off obtained for the nonlinear optical interaction occurring in those different portions of the nonlinear optical waveguide.

In this example, any optical fields generated from nonlinear optical processes occurring in the second segment can be removed to avoid reducing the enhancement. In this example, second wavelength light is removed when the phase walk-off obtained at the end of the second segment for the nonlinear optical interaction that occurs between the start point and end point of the second segment has a value of $\pi$ radians (or an odd multiple of $\pi$ radians).

The nonlinear optical enhancement can continue to increase as these sets of two segments of the nonlinear optical waveguide, an extension optical waveguide and one or more wavelength selective couplers are repeated in an optical waveguide structure. For example, the first segment and the second segment of the nonlinear optical waveguide, the first extension optical waveguide, and the associated wavelength-selective couplers can form a set of optical structures that can be repeated. Similarly, the third segment, a fourth segment, a third extension optical waveguide in the set of extension optical waveguides, and associated wavelength-selective couplers can also form a set of optical structures that can be repeated. The third segment and fourth segment are essentially a repeat of the first segment and second segment when multiple sets of sub-structures are cascaded together to form the entire optical waveguide structure.

In the illustrative examples, the first, second and third waveguides and associated wavelength-selective couplers can comprise a set of structures that can be repeated. Similarly, second, third and fourth waveguides and associated wavelength-selective couplers can also comprise a set of structure that can be repeated. In these examples, the first and fourth waveguides are essentially the same components when multiple sets of these structure are connected together to form a repeating pattern of structures.

This illustrative embodiment can be an optical waveguide structure that uses at least one material that has a sufficiently large $\chi^{(2)}$ and/or $\chi^{(3)}$ nonlinear optical (NLO) susceptibility. The material selected can be processed into suitable waveguides in an optical waveguide structure with cross-sectional structures having geometries on the order of several microns or less. These geometries can be, for example, width and height.

Light in these types of optical waveguides is able to undergo various nonlinear optical processes. Examples of $\chi^{(2)}$ nonlinear optical processes include spontaneous parametric down conversion (SPDC), second harmonic generation (SHG), sum frequency generation, and difference frequency generation. Examples of $\chi^{(3)}$ nonlinear optical processes include spontaneous four wave mixing (SFWM) and third harmonic generation (THG).

In the illustrative examples, optical waveguide structures are used that enhance $\chi^{(2)}$ nonlinear optical processes. Specifically, spontaneous parametric down conversion is used in an illustrative example, but these examples are not meant to exclude the principles of these examples from being applied to other $\chi^{(2)}$ and $\chi^{(3)}$ nonlinear optical processes.

In an illustrative example, light can be described as comprising optical fields that travel or propagate in the optical waveguide structure. The optical fields are also referred to as wavelength light of different types. A pump optical field can be referred to as a pump light; a signal optical field can be referred to as a signal light; and an idler signal optical field can be referred to as an idler light.

In nonlinear optical processes of spontaneous parametric down conversion, an input optical field, i.e., the pump, spontaneously decays or is converted into and thereby generates two other optical fields, i.e., the signal and idler. In such a process, energy is conserved, and momentum is conserved:

$$\hbar\omega_p = \hbar\omega_s + \hbar\omega_i; \quad (1)$$

$$\frac{\omega_p n_p(\omega_p)}{c} = \frac{\omega_s n_s(\omega_s)}{c} + \frac{\omega_i n_i(\omega_i)}{c}$$

In Equation 1 $\omega_p$, $\omega_s$, and $\omega_i$ are the angular frequencies of the pump, signal, and idler optical fields, respectively. For a significant nonlinear optical generation of signal and idler light from pump light to occur, the phase walk-off of the nonlinear optical process involving the pump, signal and idler optical fields is also considered. Phase walk-off in a nonlinear optical process results from wave-vector mismatch.

For convenience, we will describe this phenomenon in terms of wave vectors. The wave vector, k, of an optical field is given by:

$$k = \frac{\omega n(\omega)}{c} = \frac{2\pi n(\omega)}{\lambda} \quad (2)$$

where $n(\omega)$ is the refractive index of the material at the relevant angular frequency, or in the case of guided optical modes the effective index of that mode, c is the speed of light, and $\lambda$ is the vacuum wavelength of the optical field. Thus, the wave-vector mismatch, $\Delta k$ for nonlinear optical spontaneous parametric down conversion involving three optical fields—pump (p), signal (s) and idler (i)—can be described by:

$$\Delta k = \frac{\omega_p n_p(\omega_p)}{c} - \frac{\omega_s n_s(\omega_s)}{c} - \frac{\omega_i n_i(\omega_i)}{c} \quad (3)$$

The parameter $\Delta k$ describes the relation between the optical fields at some instantaneous point in space and time. However, it is also useful to describe how the phases of the previously generated signal and idler optical fields relative to the phase of the pump field (and thus the phases of newly generated signal and idler optical fields) change as the optical fields propagate over some distance, L. The phase relation between the optical fields as those optical fields propagate can be described by a cumulative phase walk-off, $\Phi$, which is given by:

$$\Phi(l) = L\Delta k \quad (4)$$

The change in amplitude of the idler and signal optical fields at a particular location in an optical waveguide structure, in this example of spontaneous parametric down conversion, is given by:

$$\frac{dM_{i,s}}{dl} = \frac{2id_{\mathit{eff}}\omega_{i,s}}{n_{i,s}c} M_p M_{s,i} \exp(i\Phi(l)) \quad (5)$$

Where $M_{i,s,p}$ are the amplitudes of the idler, signal, and pump optical fields, respectively, and $d_{\mathit{eff}}$ is the effective nonlinear optical coefficient for particular polarizations of the optical fields traveling in a particular direction in a nonlinear optical material.

From equation 5, the amplitude of signal and idler optical fields as the pump, signal and idler fields propagate from a point $y_1$ to another point $y_2$ is determined by:

$$M_{i,s}(y_2) = M_{i,s}(y_1) + \frac{2id_{33}\omega_{i,s}}{n_{i,s}c} M_p M_{s,i} \int_{y_1}^{y_2} \exp(i\Delta ky) dy = \quad (6)$$

$$M_{i,s}(y_1) + \frac{2id_{33}\omega_{i,s}}{n_{i,s}c} M_p M_{s,i} L_{1,2} \left[ \frac{-i\exp(i\Delta ky_2)}{\Delta k L_{1,2}} - \frac{-i\exp(i\Delta ky_1)}{\Delta k L_{1,2}} \right]$$

Where we make the slowly varying amplitude approximation. This approximation assumes that the conversion efficiency of the NLO process is relatively small, so that the terms $M_p$ and $M_{s,i}$ can be taken as constants. The parameter $L_{1,2}$ the length of the route or routes traveled by the pump, signal, and idler light from point $y_1$ to point $y_2$. The pump light, signal light and idler light can propagate through different paths or routes between point $y_1$ and point $y_2$. In this example, the pump light signal and idler light can propagate through different paths or routes between point $y_1$ and point $y_2$.

Thus, the idler and signal optical fields increase or decrease in amplitude according to the magnitude of the cumulative phase walk-off. For a given, non-zero phase mismatch the coherent interaction length of the nonlinear optical process, $L_{coh}$, is defined as the distance for which the phase walk-off becomes equal to $\pi$:

$$L_{coh} = \frac{\pi}{\Delta k} \quad (7)$$

If the spontaneous parametric down conversion process is assumed to begin at some point of origin and that the nonlinear optical coefficient in the direction of propagation is positive, then the amplitudes of the generated signal and idler optical fields increase as the value for the length or distance $L_{1,2}$ increases and reach a maximum at a length $L_{1,2} = L_{coh}$, as pump light is converted to signal and idler light. Thus, the nonlinear optical interaction is considered constructive for generation of signal light and idler light from pump light.

Beyond this length, and up to a distance of $2 \times L_{coh}$, the amplitudes of the signal and idler optical fields decrease, as the signal and idler light is converted back to pump light, and eventually reach 0 at a propagation distance of exactly $2 \times L_{coh}$. This conversion of light is a destructive nonlinear optical interaction in terms of generating signal light and idler light from pump light.

Then, from a distance of $2 \times L_{coh}$ up to $3 \times L_{coh}$ the amplitudes of the signal and idler optical fields increase again. Thus, the nonlinear optical interaction is again constructive for generation of signal and idler light from pump light. As the amplitudes of the signal and idler optical fields decrease, the amplitude of the pump optical field increases, and vice versa.

This process continues in a periodic fashion for as long as the optical fields remain in the nonlinear optical material. Without any phase-matching engineering, the amplitudes of the signal and idler optical fields can only reach a maximum value consistent with one coherent interaction length.

In order to further enhance the amplitudes of the signal and idler optical fields resulting from the nonlinear optical interaction beyond the amplitudes obtained for a single $L_{coh}$, the subsequent decrease in amplitude (after the optical fields travel one $L_{coh}$) should be avoided entirely or at least minimized. However, if some of the signal and idler optical fields are present again at the beginning of the next cycle of increasing amplitude for idler and signal optical fields, then the cumulative amplitude of the signal and idler optical fields will continue to increase and a substantial nonlinear optical process will occur, beyond the maximum expected for a single $L_{coh}$. In fact, the efficiency of the nonlinear optical process for converting pump light to signal and idler light increases as the amplitude of the signal and idler optical fields increase (assuming the decrease in the amplitude of the pump optical field relative to the value of the amplitude of the pump optical field is negligible). Typically, the signal amplitude for signal light or idler amplitude for idler light is much smaller than the pump amplitude. In this example, much smaller is at least one or two orders of magnitude smaller. For example, doubling the signal amplitude for signal light may result in only a 5 percent decrease in the pump amplitude pump light.

Thus, it is desirable to have the nonlinear optical process occur over a distance that is many coherent interaction lengths. The key to our invention which enables this phenomenon is to use a strategy of wavelength selective separation of optical fields to propagate in different waveguides followed by subsequent wavelength selective combination of the optical field in order to (i) control the relative amplitude of each optical field in every successive nonlinear optical waveguide segment of length $L_{coh}$ and (ii) control the magnitude of the cumulative phase walk-off for the nonlinear optical process that occurs in each successive nonlinear optical waveguide segment.

Figure 28:
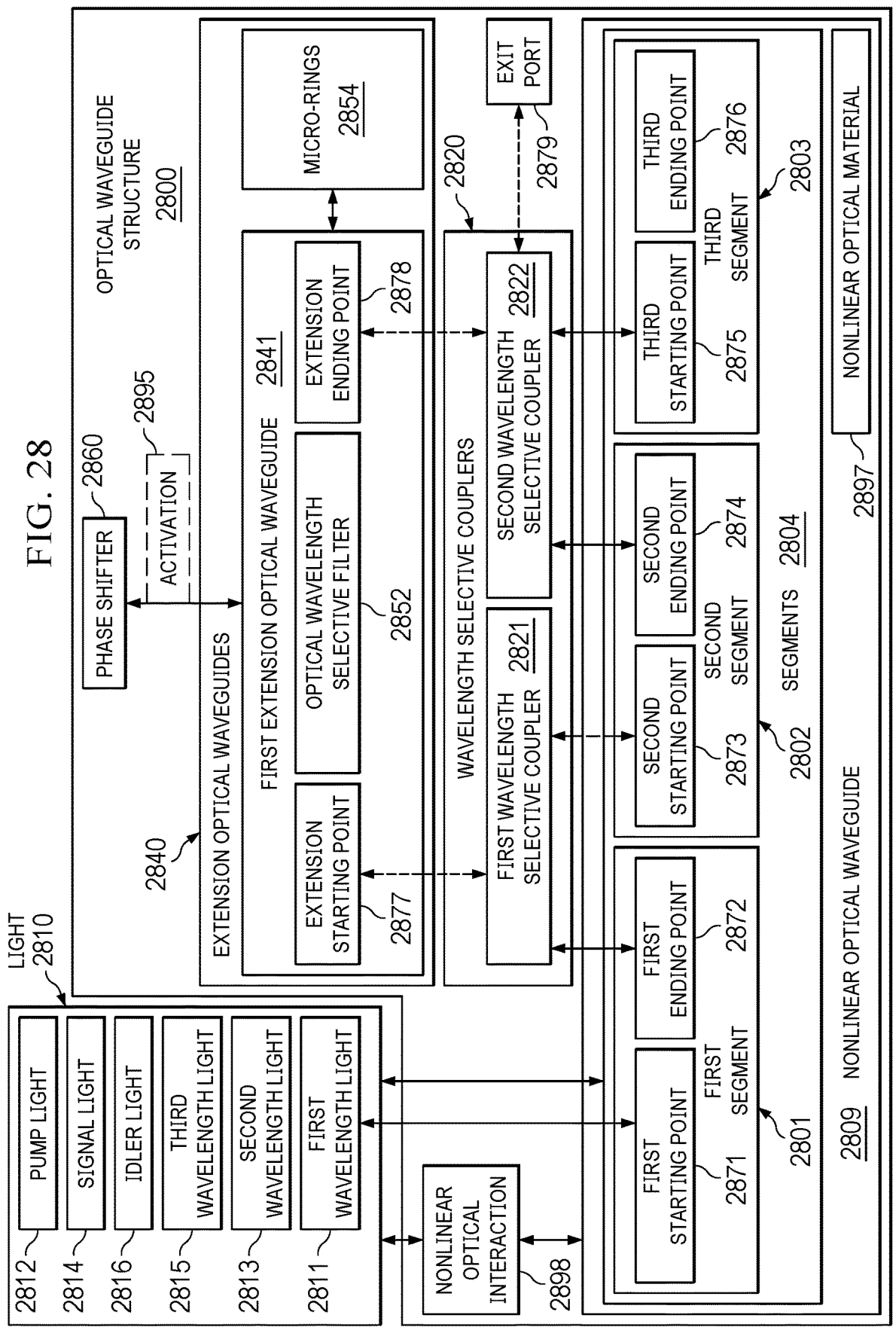
FIG. 28 is an illustration of a block diagram of an optical waveguide structure in accordance with an illustrative embodiment.

With reference now to the figures describing this illustrative example and in particular with reference to FIG. 28, an illustration of a block diagram of an optical waveguide structure is depicted in accordance with an illustrative embodiment. In this illustrative example, optical waveguide structure 2800 comprises nonlinear optical waveguide 2809 which comprises multiple segments 2804 and in which at least two segments 2804 of nonlinear optical waveguide 2809 is comprised of nonlinear optical material 2897. In this example, optical waveguide structure 2800 further comprises first extension optical waveguide 2841 of extension optical waveguides 2840.

As depicted in this example, nonlinear optical waveguide 2809 comprises first segment 2801, second segment 2802, and third segment 2803. As further depicted in this example, extension optical waveguides 2840 comprises first extension optical waveguide 2841. In this illustrative example, first segment 2801 and third segment 2803 are comprised of nonlinear optical material 2897. First extension optical waveguide 2841 and second segment 2802 can also be comprised of nonlinear optical material 2897 but also can be comprised of a non-nonlinear optical material.

In this illustrative example, first segment 2801 has first starting point 2871 and first ending point 2872. Second optical waveguide has second starting point 2873 and second ending point 2874. Third segment 2803 has third starting point 2875 and third ending point 2876. First extension optical waveguide 2841 has extension starting point 2877 and extension ending point 2878.

Additionally, optical waveguide structure 2800 also includes wavelength selective couplers 2820 such as first wavelength selective coupler 2821 and second wavelength selective coupler 2822. First wavelength selective coupler 2821 couples first ending point 2872 for first segment 2801 to extension starting point 2877 for first extension optical waveguide 2841. Second wavelength selective coupler 2822 couples extension ending point 2878 for first extension optical waveguide 2841 to third starting point 2875 for third segment 2803.

During operation of optical waveguide structure 2800, light 2810 traveling in first segment 2801 comprises first wavelength light 2811, second wavelength light 2813, and third wavelength light 2815. In this example, second wavelength light 2813 and third wavelength light 2815 are produced by nonlinear optical interaction 2898 of first wavelength light 2811 traveling within first segment 2801.

In one illustrative example, first wavelength light 2811 can be pump light 2812. In this example, second wavelength light 2813 can be signal light 2814, and third wavelength light 2815 can be idler light 2816.

As depicted, first wavelength selective coupler 2821 couples first wavelength light 2811 from first ending point 2872 for first segment 2801 to second starting point 2873 for second segment 2802. First wavelength selective coupler 2821 also couples second wavelength light 2813 and third wavelength light 2815 from first ending point 2872 for first segment 2801 to extension starting point 2877 for first extension optical waveguide 2841.

Further, second wavelength selective coupler 2822 couples second wavelength light 2813 and third wavelength light 2815 from extension ending point 2878 for first extension optical waveguide 2841 to third starting point 2875 for third segment 2803. Second wavelength selective coupler 2822 also couples first wavelength light 2811 from second ending point 2874 for second segment 2802 to third starting point 2875 for third segment 2803.

In this example, second segment 2802 comprises a nonlinear optical material, second wavelength light 2813 and third wavelength light 2815 can be generated in second segment 2802. In this example, second wavelength light 2813 and third wavelength light 2815 are produced by nonlinear optical interaction 2898 of first wavelength light 2811 traveling within second segment 2802. In this example, second wavelength light 2813 can be signal light 2814, and third wavelength light 2815 can be idler light 2816. In such cases, second wavelength selective coupler 2822 also couples second wavelength light 2813 and third wavelength light 2815 from second ending point 2874 for second segment 2802 away from third segment 2803. Second wavelength light 2813 and third wavelength light 2815 generated in the second segment 2802 are not coupled by second wavelength selective coupler 2822 into the third segment 2803. Second wavelength selective coupler 2822 also couples second wavelength light 2813 and third wavelength light 2815 from second ending point 2874 for second segment 2802 to exit port 2879.

In this example, optical waveguide structure 2800 can also comprise phase shifter 2860 located along extension optical waveguide 2841. In this example, phase shifter 2860 applies activation 2895 to light 2810 in first extension optical waveguide 2841 that produces an extension phase walk-off that is at least one of from 0 to $\pi$ radians or from an even-numbered integer of $\pi$ radians to a next larger odd-numbered integer for nonlinear optical interaction 2898 that occurs from first starting point 2871 for first segment 2801 through first extension optical waveguide 2841 and through second segment 2802 to third starting point 2875 for third segment 2803.

In this example, the phase walk-off is evaluated at the start of the third segment. The signal light and idler light generated in the first segment travels through the first extension optical waveguide. The pump light from the first segment travels through the second segment. Pump, signal, and idler light all contribute to the phase walk-off in these examples.

In yet another example, extension optical waveguides 2840 includes optical wavelength selective filter 2852. Further, first extension optical waveguide 2841 in extension optical waveguides 2840 can take the form of a set of micro-rings 2854.

Figure 29:
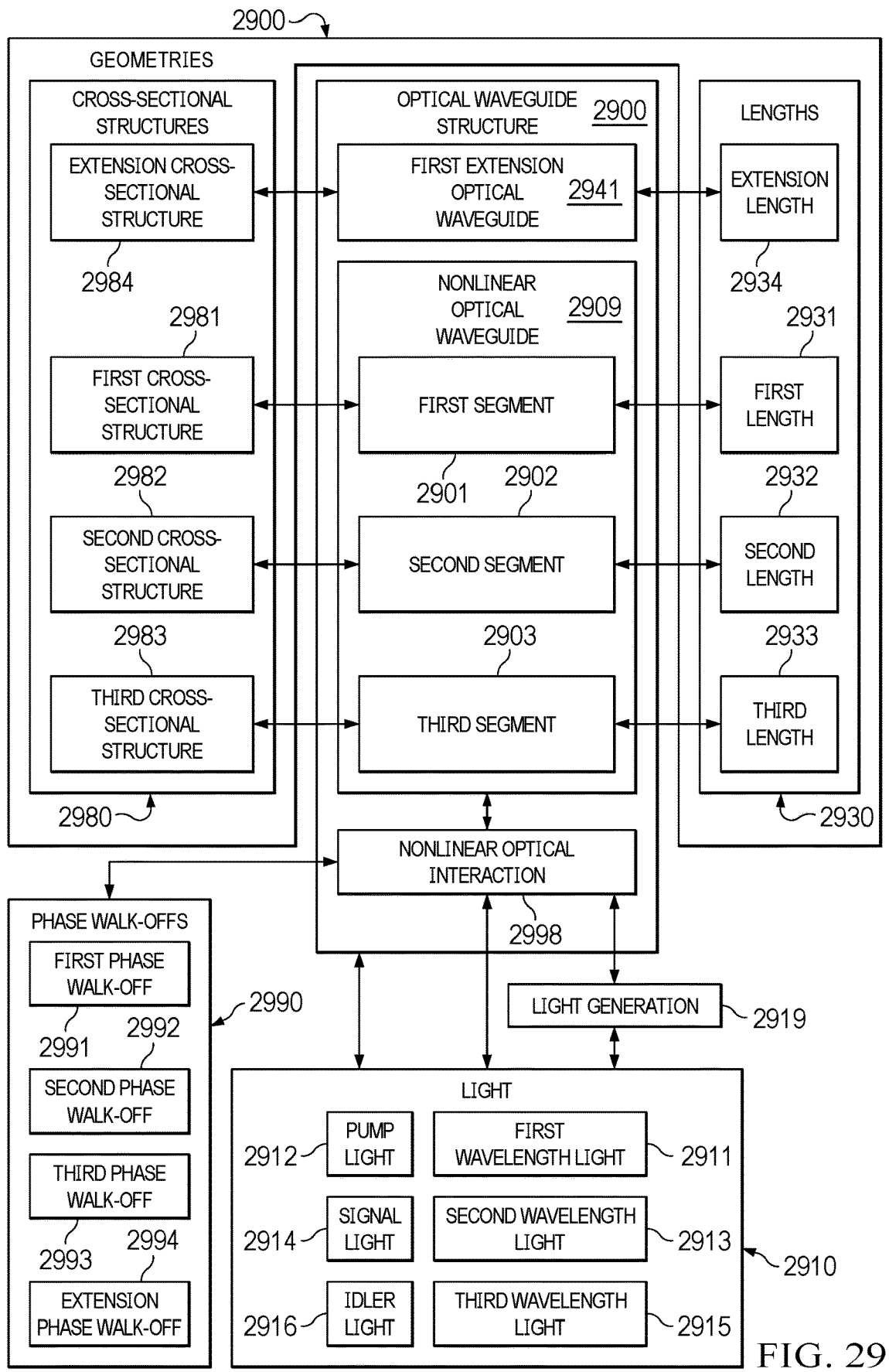
FIG. 29 is an illustration of an optical waveguide structure in accordance with an illustrative embodiment.

Turning now to FIG. 29, an illustration of block diagram of geometries for optical waveguides is depicted in accordance with an illustrative embodiment. In this illustrative example, parts in nonlinear optical waveguide 2909 have geometries 2900. Geometries 2900 comprises cross-sectional structures 2980 for segments 2804 in nonlinear optical waveguide 2909 and lengths 2930 between start points and end points defining the beginning and ending of segments 2804 in nonlinear optical waveguide 2809.

For example, first segment 2901 has first cross-sectional structure 2981 and first length 2931, and second segment 2902 has second cross-sectional structure 2982 and second length 2932. In this example, third segment 2903 has third cross-sectional structure 2983 and third length 2933. First extension optical waveguide 2941 has extension cross-sectional structure 2984 and extension length 2934.

These geometries for nonlinear optical waveguide 2909 can be selected such that phase walk-offs 2990 for light 2910 traveling through nonlinear optical waveguide 2909 have values that provide a desired level for nonlinear optical interaction 2998. These geometries can also be selected such that light generation 2919 occurs through nonlinear optical interaction 2998 that is constructive. Light 2910 can be, for example, first wavelength light 2911, pump light 2912, second wavelength light 2913, signal light 2914, third wavelength light 2915, and idler light 2916.

For example, first segment 2901 has first length 2931 from first starting point 2871 to first ending point 2872 produces a first phase walk-off 2991 that is at least one of from 0 to $\pi$ radians or from an even-numbered integer of $\pi$ radians to a next larger odd-numbered integer of $\pi$ radians for nonlinear optical interaction 2998 in first segment 2901 from first starting point 2871 to first ending point 2872. In this example, the value for first phase walk-off 2991 is from 0 to $\pi$, $2\pi$ to $3\pi$, $4\pi$ to $5\pi$, and so on. Further, first segment 2901 has first cross-sectional structure 2981 from first starting point 2871 to first ending point 2872 produces a first phase walk-off 2991 that is at least one of from 0 to $\pi$ radians or from an even-numbered integer of $\pi$ radians to a next larger odd-numbered integer of $\pi$ radians for nonlinear optical interaction 2998 in first segment 2901 from first starting point 2871 to first ending point 2872. The length of each segment is selected to obtain the desired phase walk-off.

In this example, first cross-sectional structure 2981 and first length 2931 from first starting point 2871 to first ending point 2872 produces first phase walk-off 2991 that results in light generation 2919 through nonlinear optical interaction 2998 that is constructive in first segment 2901.

As another example, second segment 2902 has second cross-sectional structure 2982 and second length 2932 from second starting point 2873 to second ending point 2874 that produces second phase walk-off 2992. Second phase walk-off 2992 can be at least one of from 0 to $\pi$ radians or from an even-numbered integer of $\pi$ radians to a next larger odd-numbered integer of $\pi$ radians for nonlinear optical interaction 2998 in first segment 2901 and second segment 2902 from first starting point 2871 to second ending point 2874. This second phase walk-off results in light generation 2919 through nonlinear optical interaction 2998 that is constructive at the start of third segment 2903. In this example, the geometry of second segment 2902 affects nonlinear optical interaction 2998 in second segment 2902 and in third segment 2903.

In another example, third segment 2903 has third cross-sectional structure 2983 and third length 2933 from third starting point 2875 to third ending point 2876 that produces third phase walk-off 2993 that is at least one of from 0 to $\pi$ radians or from an even-numbered integer of $\pi$ radians to a next larger odd-numbered integer of $\pi$ radians for nonlinear optical interaction 2998 in third segment 2903 from third starting point 2875 to third ending point 2876. The length of the third segment is selected to obtain the desired third phase walk-off. This third phase walk-off can result in light generation 2919 through nonlinear optical interaction 2998 that is constructive in third segment 2903.

In yet another example, first extension optical waveguide 2941 has extension cross-sectional structure 2984 with extension length 2934 from extension starting point 2877 to extension ending point 2878 that produces extension phase walk-off 2994 that is at least one of from 0 to $\pi$ radians or from an even-numbered integer of $\pi$ radians to a next larger odd-numbered integer of $\pi$ radians for nonlinear optical interaction 2998 in first segment 2901 and third segment 2903. Extension phase walk-off 2994 can result in light generation 2919 through nonlinear optical interaction 2998 that is constructive in third segment 2903. The geometry of first extension optical waveguide 2941 affects nonlinear optical interaction 2998 in third segment 2903. The length of the extension optical waveguide is selected to accomplish a desired nonlinear optical generation in segments in the nonlinear optical waveguide, which are separate from that extension optical waveguide.

In yet another example, first extension optical waveguide 2941 has extension cross-sectional structure 2984 with extension length 2934 from extension starting point 2877 to extension ending point 2878 that produces extension phase walk-off 2994 that is at least one of from 0 to $\pi$ radians or from an even-numbered integer of $\pi$ radians to a next larger odd-numbered integer of $\pi$ radians for nonlinear optical interaction 2998 that occurs from first starting point 2871 for first segment 2901 to third ending point 2876 for third segment 2903. As another example, first extension optical waveguide 2841 has extension cross-sectional structure 2984 with extension length 2934 from extension starting point 2877 to extension ending point 2878 of first extension optical waveguide 2941 that produces extension phase walk-off 2994 that is at least one of from 0 to $\pi$ radians or from an even-numbered integer of $\pi$ radians to a next larger odd-numbered integer for nonlinear optical interaction 2998 that occurs from first starting point 2871 to first ending point 2872 for first segment 2901 and from third starting point 2875 to third ending point 2876 for third segment 2903.

Values for the length of the extension optical waveguide depends on the nonlinear optical interaction that occurs through both the entire first segment and the entire third segment. However, the value for the length of the extension optical waveguide can be selected to provide a selected phase walk-off for the nonlinear optical interaction that occurs through the length of the first segment and that resumes again at the start of the third segment but does not include the length of the third segment.

As another example, first extension optical waveguide 2941 has extension cross-sectional structure 2984 with extension length 2934 from extension starting point 2877 to extension ending point 2878 of first extension optical waveguide 2941 that produces extension phase walk-off 2994 that is at least one of 0 radians or an even-numbered integer of $\pi$ radians for nonlinear optical interaction 2998 that occurs from first starting point 2871 to first ending point 2872 for first segment 2901 involving pump, signal and idler light, propagation of pump light through first segment 2901, and propagation of signal light and idler light through first extension optical waveguide 2941. In another example, phase shifter 2860 is located in first extension optical waveguide 2941. Phase shifter 2860 can apply activation 2895 to light 2910 propagating in first extension optical waveguide 2941 such that extension phase walk-off 2994 is at least one of from 0 to $\pi$ radians or from an even-numbered integer of $\pi$ radians to a next larger odd-numbered integer for nonlinear optical interaction 2998 that occurs from first starting point 2871 for first segment 2901 to third ending point 2876 for third segment 2903

The optical waveguide structure depicted in FIGS. 28 and 29 can include nonlinear optical processes used in applications that require frequency conversion of an input optical field or optical fields, such that part or all of the output contains one or more optical field(s) whose frequency is different from the frequency of the input optical field(s). For example, nonlinear optical processes can be used to generate at least one of high purity single photons or entangled photon pairs. However, the efficiencies of current nonlinear optical processes are typically quite low, making enhancing nonlinear optical processes highly desirable.

In one illustrative example, complicated, error-prone fabrication processes such as periodic poling or multi-etch steps (e.g., periodically grooved phase matching waveguides) are unnecessary to fabricate the optical waveguide structure. The illustrative example can use optical waveguides and components that are relatively straight-forward to fabricate and amenable to wafer-scale mass production. The illustrative examples do not need components which are inherently prone to significant optical losses, such as periodic modulations of at least one of the waveguide height or width.

In another example, optional phase tuning elements, such as phase shifters, can be included in the optical waveguide structure to provide an ability to compensate for fabrication tolerances and errors. For example, at least one of fabrication tolerances or errors can limit the coherent interaction distance to less than 1 mm. Phase shifters can be used in various locations in the optical waveguide structure to compensate for at least one of these tolerances or errors. As a result, the distance for a cumulative coherent interaction can extend far beyond 1 mm.

In some illustrative examples, the optical waveguide structure can operate at temperatures near room temperature all the way down to cryogenic temperatures. Phase shifters in some optical waveguide structures can provide activations in the form of heat, which might not be practical in certain applications, such as at cryogenic temperatures or when heat-sensitive components are nearby. In some optical waveguide structures that are intended to operate at cryogenic temperatures, phase shifters can provide activations in the form of an electric field or a stress that changes the effective index of a guided optical mode in an extension optical waveguide or a segment of a nonlinear optical waveguide.

In another illustrative example, nonlinear optical enhancement does not occur in a resonator. For example, in a micro-ring resonator designed for spontaneous four wave mixing, the frequency of signal and idler must not only meet requirements for energy conservation but must also match a resonant mode of the micro-ring. Thus, engineering a resonator for specific, targeted nonlinear optical frequencies can be difficult with current techniques.

In an illustrative example, a narrow bandwidth of output optical fields is enabled because over the many iterations or repeats of segments of nonlinear optical waveguide, extension optical waveguide and associated wavelength selective couplers, optical fields that are not at the target wavelength will develop an increasingly large phase walk-off and therefore the nonlinear optical process for frequencies outside the narrow bandwidth will not be enhanced.

Also, the illustrative example, does not rely on any changes in the sign of the nonlinear optical coefficients in order to enhance the nonlinear optical process. For isotropic media, such as silicon, quasi-phase-matching approaches based on changing the sign of the nonlinear optical coefficient is not possible because the $\chi^{(3)}$ nonlinear optical coefficients are equivalent in all directions. As a result, an additional feature in the illustrative example is compatibility with both $\chi^{(2)}$ and $\chi^{(3)}$ nonlinear optical processes. Thus, the illustrative example in FIGS. 28 and 29 provides a robust, efficient solution for the enhancement of nonlinear optical processes on a chip-scale platform.

Figure 30:
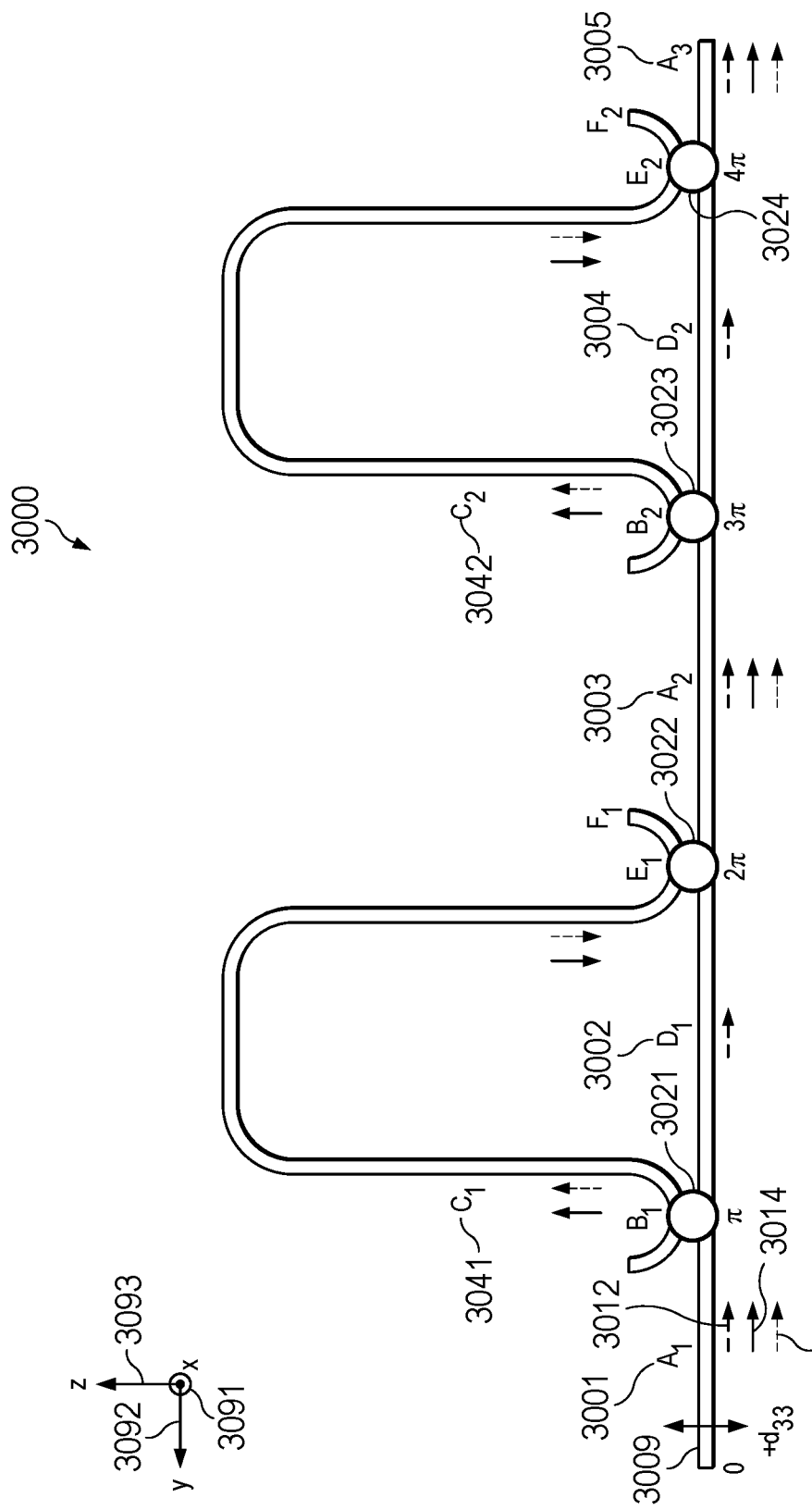
FIG. 30 is an illustration of an optical waveguide structure using optical waveguides in accordance with an illustrative embodiment.

With reference next to FIG. 30, an illustration of an optical waveguide structure using optical waveguides is depicted in accordance with an illustrative example. In this illustrative example, optical waveguide structure 3000 comprises nonlinear optical waveguide 3009, first extension optical waveguide $C_1$ 3041, second extension optical waveguide $C_2$ 3042, first wavelength selective coupler $B_1$ 3021, second wavelength selective coupler $E_1$ 3022, third wavelength selective coupler $B_2$ 3023, and fourth wavelength selective coupler $E_2$ 3024.

Nonlinear optical waveguide 3009 is comprised of segments. As depicted, nonlinear optical waveguide 3009 comprises first segment $A_1$ 3001, second segment $D_1$ 3002, third segment $A_2$ 3003, fourth segment $D_2$ 3004, and fifth segment $A_3$ 3005.

In this illustrative example, optical waveguide structure 3000 and other components in optical waveguide structure 3000 are formed on a yz plane defined by z-axis 3093 and y-axis 3092 in which an x-axis 3091 is perpendicular to the plane. In an illustrative example, the nonlinear optical waveguides can be fabricated from a nonlinear optical material such as x-cut lithium niobate. In other examples, the nonlinear optical waveguides could be fabricated from other nonlinear optical materials such as z-cut lithium niobate, c-axis SiC, and aluminum nitride.

With x-cut lithium niobate, these axes shown in FIG. 30 are crystal axes for x-cut lithium niobate that can be used to describe the propagation direction and polarization orientation of light in the optical waveguide structure 3000. In the example of an optical waveguide structure fabricated in x-cut lithium niobate, x-axis 3091 of the structure corresponds to the x-axis of the lithium niobate crystal. The nonlinear optical waveguide segments, extension optical waveguides and wavelength selective couplers in optical waveguide structure 3000 are oriented along a yz plane of the lithium niobate crystal. For an input light, such as pump light 3012 with transverse electric (TE) polarization, propagation in the y direction enables the nonlinear optical process to utilize the nonlinear optical coefficient of lithium niobate in optical waveguide structure 3000 that has the greatest magnitude, namely, $d_{33}$. Thus, an incremental change in the amplitudes of signal light 3014 and/or idler light 3016 that result from a second-order nonlinear optical interaction such as parametric down conversion (PDC), difference frequency generation (DFG) or sum frequency generation (SFG) occurring at a given point in the nonlinear optical waveguide can be described by:

$$\frac{dM_s}{dy} = \frac{2id_{33}\omega_s}{n_s c} M_p M_i \exp(i\Delta ky) \qquad (9)$$

and by $$\frac{dM_i}{dy} = \frac{2id_{33}\omega_i}{n_i c} M_p M_s \exp(i\Delta ky);$$

or equivalently, $$\frac{dM_{i,s}}{dy} = \frac{2id_{33}\omega_{i,s}}{n_{i,s} c} M_p M_{s,i} \exp(i\Delta ky)$$

These expressions illustrate that both the pump light and the idler light contribute to the generation of signal light by their nonlinear optical interaction with the nonlinear optical waveguide. Likewise, both the pump light and the signal light contribute to the generation of idler light by their nonlinear optical interaction with the nonlinear optical waveguide. As described in equations 9, the incremental change in the signal light resulting from the nonlinear optical interaction, and/or the incremental change in the idler light resulting from the nonlinear optical interaction, also depends on the match, $\Delta ky$, between the phase of the previously generated light that has propagated to the given point in the nonlinear optical waveguide and the phases of the contributing light at that point, which determine, as a result of momentum conservation, the phase of the light newly generated at that given point. The amplitude $M_s$ of signal light 3014 and/or the amplitude $M_i$ of idler light 3016 at point $y_2$ that results from the nonlinear optical process that occurs in the optical waveguide structure from a point $y_1$ to the point $y_2$ can be described by:

$$M_s(y_2) = M_s(y_1) + \frac{2i\omega_s}{c} \int_{y_1}^{y_2} \frac{d_{33}}{n_s} M_p M_i \exp(i\Delta ky) dy,$$

and $$M_i(y_2) = M_i(y_1) + \frac{2i\omega_i}{c} \int_{y_1}^{y_2} \frac{d_{33}}{n_i} M_p M_s \exp(i\Delta ky) dy;$$

or, equivalently, $$M_{i,s}(y_2) = M_{i,s}(y_1) + \frac{2i\omega_{i,s}}{c} \int_{y_1}^{y_2} \frac{d_{33}}{n_{i,s}} M_p M_{s,i} \exp(i\Delta ky) dy$$

(10)

Where the slowly varying amplitude approximation is made. This approximation assumes that the conversion efficiency of the nonlinear optical process is relatively small, so that the terms $M_p$ and $M_{s,i}$ within the integral can be taken as constants for a given portion of the optical waveguide structure between points $y_1$ and $y_2$. Equation 10 illustrates that the amplitude of the generated signal light at point $y_2$ depends on the amplitude of the signal light at point $y_1$ and on the nonlinear optical interaction occurring between points $y_1$ and $y_2$. Likewise, the amplitude of the generated idler light at point $y_2$ depends on the amplitude of the idler light at point $y_1$ and on the nonlinear optical interaction occurring between points $y_1$ and $y_2$. For the special case of spontaneous parametric down conversion (SPDC), only pump light is supplied initially into the optical waveguide structure. Thus, the terms $M_{s,i}$ in the integral often can be described by expressions that include the photon energy of the signal or idler photon and a spectral bandwidth over which the spontaneously generated idler or signal photons are evaluated. The center frequency of the spectral bandwidth typically corresponds to a frequency at which phase matching (or momentum conservation) of the nonlinear optical process is achieved. In most cases of spontaneous parametric down conversion, once the amplitude of the electromagnetic wave of the generated light exceeds the amplitude associated with the spontaneous generation, additional generation of signal or idler light can be described by equation 10.

As described in equation 10, for each portion of the optical waveguide structure in which nonlinear optical generation of idler and/or signal light is being considered, both nonlinear optical material must be present (i.e., $d_{33}$ is non-zero) and pump light must be present ($M_p$ is non-zero) in order for nonlinear optical generation of idler light and/or signal light to occur. Furthermore, the phase walk-off affects the nonlinear optical generation, as described by the expression $\int_{y_1}^{y_2} \exp(i\Delta ky) dy$.

In one example, optical waveguide structure 3000 can be designed so that after each segment '$A_i$' in nonlinear optical waveguide 3009, the amplitude of the optical fields of signal light and idler light reach a maximum value allowed by the phase walk-off. For a given nonlinear optical waveguide segment '$A_i$', the nonlinear optical generation process can be described by the expression $$M_{i,s}(y_2) = \qquad (11)$$
$$M_{i,s}(y_1) + \frac{2id_{33}\omega_{i,s}}{n_{i,s}c} M_p M_{s,i} L_{A_i} \left[ \frac{-i\exp(i\Delta ky_2)}{\Delta k L_{A_i}} - \frac{-i\exp(i\Delta ky_1)}{\Delta k L_{A_i}} \right]$$

Expression 11 is obtained by integrating expression 10 over the route taken by the light through segment '$A_i$'. For this expression, point $y_1$ is the starting point of segment '$A_i$' and point $y_2$ is the ending point of segment. To achieve maximum generation of signal idler and/or idler light, the length $L_{Ai}$ of segments '$A_i$' satisfies the following equation:

$$L_{Ai}\Delta k = m_A \pi \qquad (12)$$

where $m_A$ is an odd, positive integer.

For the example of optical waveguide structure 3000, a wavelength-selective coupler separates at least one of the signal light and idler light from the others at the end of each of these segments '$A_i$' and routes the separated parts of the light into different waveguides of the optical waveguide structure 3000. In the example illustrated in FIG. 30, signal light 3014 and idler light 3016 are separated from the pump light 3012 by a wavelength-selective coupler '$B_i$' and are routed into extension waveguides '$C_i$'. Also, the pump optical field is routed by wavelength-selective coupler '$B_i$' to continue into the subsequent nonlinear optical waveguide segment '$D_i$'. Another wavelength-selective coupler '$E_i$' is used to recombine all of the optical fields, for pump, signal, and idler, back into another segment '$A_{i+1}$' of the nonlinear optical waveguide. In this example, a wavelength-selective coupler '$E_i$' is used to couple signal light 3014 and idler light 3016 from extension optical waveguide '$C_i$' into the starting point of segment '$A_{i+1}$', and also is used to couple the pump light 3012 from the ending point of segment '$D_i$' into the starting point of segment '$A_{i+1}$'.

To make the amplitude of the generated signal light 3014 and/or idler light 3016 continue to increase as efficiently as possible in both segments '$A_i$' and '$A_{i+1}$', the cumulative phase walk-off for the nonlinear optical interaction involving pump light 3012, signal light 3014, and idler light 3016 a point at the start of segment '$A_i$' to a point at the start of segment '$A_{i+1}$' should be an even multiple of $\pi$, or should be a multiple of $2\pi$. Now, if the length of segment '$A_i$' is chosen such that the phase walk-off from the starting point of segment '$A_i$' to the ending point of the same segment '$A_i$' is and odd multiple of $\pi$, this constraint means the cumulative phase walk-off for pump light 3012, signal light 3014 and idler light 3016 traversing the optical waveguide structure from the ending point of segment '$A_i$' to the starting point of segment '$A_{i+1}$' should be an odd multiple of $\pi$. The extension waveguides '$C_i$' are used to control the relative phase walk-off for the pump light 3012 that travels through segment '$A_i$', wavelength selective coupler '$B_i$', segment '$D_i$' and wavelength selective coupler '$E_i$' to the starting point of segment '$A_{i+1}$', and for the signal light 3014 and idler light 3016 that travel through the segment '$A_i$', wavelength selective coupler '$B_i$', extension optical waveguide '$C_i$' and wavelength selective coupler '$E_i$' to the starting point of segment '$A_{i+1}$'. The extension optical waveguides '$C_i$' in optical waveguide structure 3000 are designed to achieve a value for this cumulative phase walk-off from the starting point of segment '$A_i$' to the starting point of segment '$A_{i+1}$' that is a multiple of $2\pi$. Thus, the nonlinear optical process that occurs in successive segments '$A_i$' is always constructive. For example, being constructive can be when the amplitude of signal and idler optical fields continually increases. The design parameters for these extension optical waveguides are the length and the cross-sectional structure, which can be selected to achieve a desired value for the phase walk-off.

Referring again to FIG. 30, the amplitudes $M_s$ of signal light 3014 and $M_i$ of idler light 3016 can be described for different points in optical waveguide structure 3000. In nonlinear optical waveguide first segment $A_1$ 3001 of optical waveguide structure 3000, the amplitude of generated signal light 3014 and/or idler light 3016, obtained by integrating Equation 10 over the distance travelled through first segment $A_1$, is given by:

$$M_{i,s}(A_1) = \frac{2id_{33}\omega_{i,s}}{n_{i,s}c} M_p M_{s,i} \int_0^{L_{A1}} \exp(i\Delta ky)dy = \quad (13)$$

$$\frac{2id_{33}\omega_{i,s}}{n_{i,s}c} M_p M_{s,i} L_{A1}\left[\frac{\exp(i\Delta k L_{A1}) - 1}{\Delta k L_{A_i}}\right]$$

For nonlinear optical waveguide first segment $A_1$ 3001, pump light 3012 as well as signal light 3014 and/or idler light 3016 are present through the entire length of segment $A_1$. Nonlinear optical material as described by nonlinear optical coefficient $d_{33}$ also is present through the entire length of segment $A_1$. The length $L_{A1}$ is the distance along first segment $A_1$ between its starting point and its ending point. The intensity $P_s$ of the generated signal light 3014 and/or the intensity $P_i$ of the generated idler light at the end of segment $A_1$ can be described by:

$$P_{i,s}(A_1) = 2n_{i,s}\varepsilon_0 c \left|\frac{2id_{33}\omega_{i,s}}{n_{i,s}c}\right|^2 |M_p|^2 |M_{s,i}|^2 L_{A1}^2 \left|\left(\frac{\exp(i\Delta k L_{A1}) - 1}{i\Delta k L_{A1}}\right)\right|^2 = \quad (14)$$

$$4n_{i,s}\varepsilon_0 c \left|\frac{2id_{33}\omega_{i,s}}{n_{i,s}c}\right|^2 |M_p|^2 |M_{s,i}|^2 L_{A1}^2 \frac{[1 - \cos(\Delta k L_{A1})]}{(\Delta k L_{A1})^2} =$$

$$2n_{i,s}\varepsilon_0 c \left|\frac{2id_{33}\omega_{i,s}}{n_{i,s}c}\right|^2 |M_p|^2 |M_{s,i}|^2 L_{A1}^2 \frac{\sin^2\left(\frac{\Delta k L_{A1}}{2}\right)}{\left(\frac{\Delta k L_{A1}}{2}\right)^2}$$

In this expression, the intensity of the signal or idler wave is given by the magnitude of its time averaged Poynting vector. The phase walk-off $\Delta k L_{A1}$ of the nonlinear optical interaction between the starting point of segment $A_1$ and the ending point of segment $A_1$ affects this generation of the signal light and/or idler light in segment $A_1$. The wave-vector mismatch $\Delta k$ for the light in an optical waveguide can be described for the case of parametric down conversion or difference frequency generation from pump light to signal light and/or idler light by:

$$\Delta k = \frac{1}{c}(\omega_p n_p - \omega_s n_s - \omega_i n_i) \quad (15)$$

The parameters $n_p$, $n_s$ and $n_i$ are the effective refractive indices for the pump light, signal light and idler light, respectively, traveling in that optical waveguide. The cross-sectional structure of the optical waveguide can be designed to achieve specific values for the effective refractive indices. Examples of design parameters associated with the cross-sectional structure of an optical waveguide include the width and height of the core region, the refractive index of the material comprising the core region, the refractive index of the material comprising the cladding region, the relative placement of the core region and the cladding region, and the height of the cladding region. In this case, the optical waveguide is first segment $A_1$.

In one example, first segment $A_1$ 3001 of nonlinear optical waveguide 3009 is designed to have a length, $L_{A1}$, and a cross-sectional structure, which affect $\Delta k$, that results in a cumulative phase walk-off that is an odd multiple of $\pi$. In other words, $$L_{A1}\Delta k = m_A \pi \quad (16)$$

with $m_A$ being any odd, positive integer. When this condition is met, the intensity of the generated signal light and/or idler light is the maximum value consistent with the non-zero wave-vector mismatch $\Delta k$. In another example, first segment $A_1$ 3001 of nonlinear optical waveguide 3009 is designed to have a length, $L_{A1}$, and a cross-sectional structure, which affect $\Delta k$, that results in a cumulative phase walk-off that does not exceed $\pi$. In other words, $$0 \leq L_{A1} \Delta k \leq \pi \tag{17}$$

When this condition is met, the nonlinear optical interaction in the first segment $A_1$ remains constructive for the generation of signal light and/or idler light.

Figure 31:
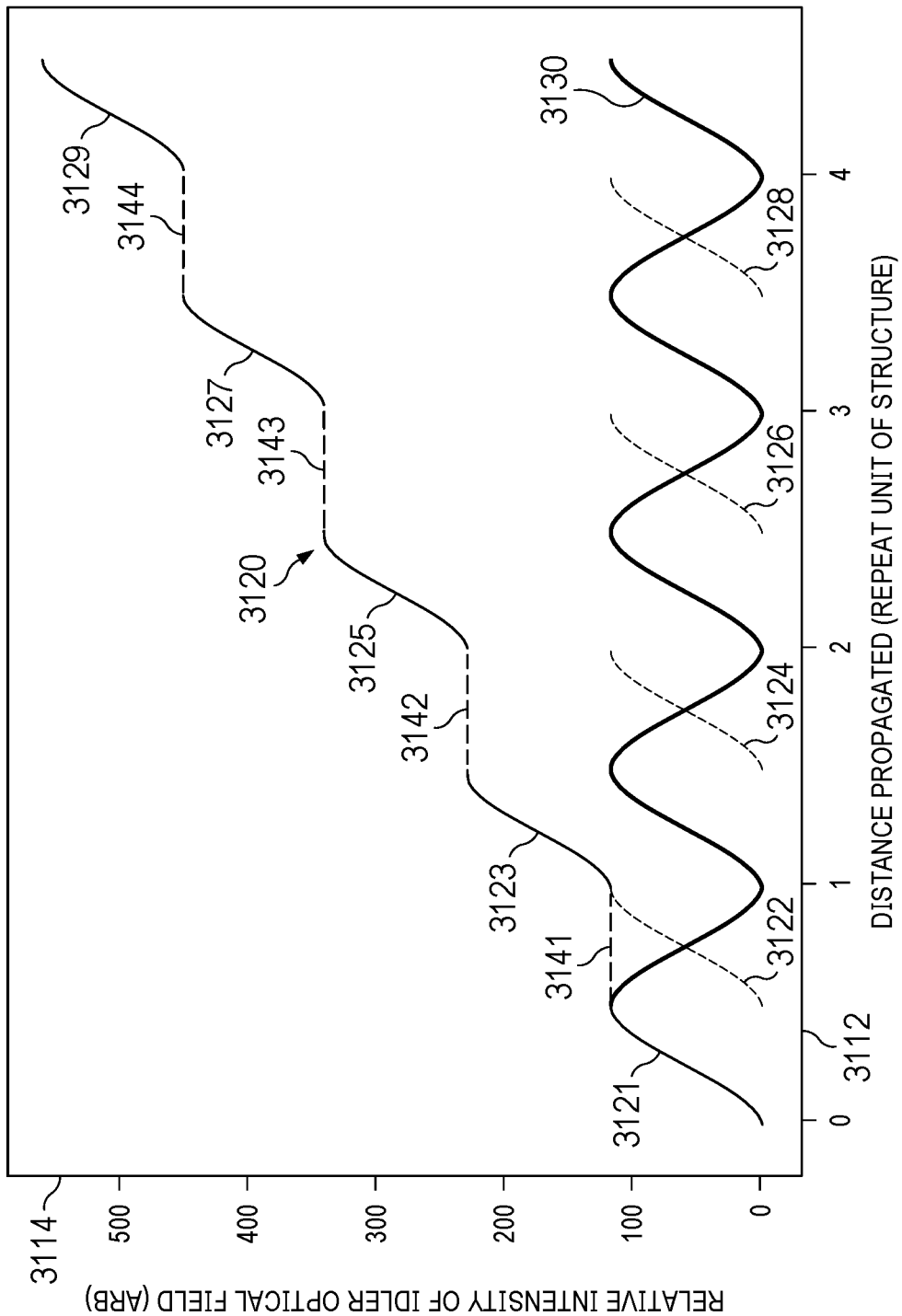
FIG. 31 is an illustration of a graph of the amplitude of the idler light in an optical waveguide structure in accordance with an illustrative embodiment.

Turning next to FIG. 31, an illustration of a graph of the amplitude of the idler light in an optical waveguide structure is depicted in accordance with an illustrative embodiment. As depicted, graph 3100 has x-axis 3112 for distance propagated as the repeated unit of the structure. Graph 3100 also has y-axis 3114 that indicates the relative intensity of idler light. Such idler light could be generated, for example, by second order nonlinear optical processes such as parametric down conversion or difference frequency generation and by spontaneous parametric down conversion. In this illustrative example, graph 3100 comprises lines that indicate the intensity of idler light in the different portions of an optical waveguide structure. In this depicted example, the optical waveguide structure has a configuration with a nonlinear optical waveguide that includes segment $A_1$, segment $D_1$, segment $A_2$, segment $D_2$, segment $A_3$, segment $D_3$, segment $A_4$, segment $D_4$, and segment $A_5$. The optical waveguide structure also has four extension optical waveguides $C_1$, $C_2$, $C_3$ and $C_4$.

In the optical waveguide structure represented by graph 3100, the generation of idler light is significant only in segments '$A_i$' and '$D_i$' since pump light is present only in those segments of nonlinear optical waveguide and is not present in the extension optical waveguides. In this example, the distance is normalized to the length of one repeat unit of optical waveguide structure 3000, such as $L_{Ai}+L_{Di}$. As depicted, line 3121 represents light in first segment $A_1$; line 3122 to represents light in second segment $D_1$, line 3123 represents light in third segment $A_2$; line 3124 represents light in fourth segment $D_2$; line 3125 represents light in fifth segment $A_3$; line 3126 represents light in sixth segment $D_3$; line 3127 represents light in seventh segment $A_4$; line 3128 represents light in eighth segment $D_4$; and line 3129 represents light in ninth segment $A_5$. As depicted, line 3141 represents idler light in first extension optical waveguide $C_1$; line 3142 to represents idler light in second extension optical waveguide $C_2$; line 3143 represents idler light in third extension optical waveguide $C_3$; line 3144 represents idler light in fourth extension optical waveguide $C_4$. Line 3120, which includes line 3121, line 3141, line 3123, line 3142, line 3125, line 3143, line 3127, line 3144, and line 3129, represents the intensity of idler light that receives an enhanced nonlinear optical generation when the wavelength selective couplers couple the light generated in segments '$A_i$' to and from the extension optical waveguides '$C_i$' and when the condition for phase walk-off is met to achieve a constructive interaction of the idler light generation in the multiple segments '$A_i$'. Line 3130 represents the intensity of idler light that would be present in the segments of nonlinear optical waveguide if the wavelength selective couplers did not couple any of the idler light and signal light between the segments of nonlinear optical waveguide and the extension optical waveguides and all of the idler light and signal light remained in the segments of nonlinear optical waveguide.

In graph 3100, the intensity values of the idler light were calculated using expressions for the nonlinear optical process described herein and a model of the optical waveguide structure 3000 in FIG. 30. Some of the parameters and values for this model are speed of light=299792458 m/s, $d_{33}$=31.5 pm/V, pump light wavelength=655 nm, $n_p$=2.0, signal light wavelength=1130 nm, $n_s$=1.8, idler light wavelength=1558 nm, $n_i$=1.6, $M_p$=1, $M_i$=1, $M_s$=1, $\eta_p$=$\eta_s$=$\eta_i$=0.99, $m_A$=1, $m_C$=1, and $m_D$=1.

The nonlinear optical generation of idler light from pump light and signal light through a process such as parametric down conversion or difference frequency generation would result in an intensity of the generated idler optical field that increases as the square of the length of the distance propagated in a nonlinear optical waveguide if the wave-vectors are always matched to the momentum conservation condition, which means $\Delta k$=0. This is the condition commonly referred to as that of perfect phase matching. However, when perfect phase matching is not achieved, and $\Delta k \neq 0$, the intensity of the idler optical field will vary in an oscillatory manner with increasing distance propagated and the idler intensity does not exceed a maximum value, as illustrated by line 3130 and as described by equations 11 and 14. When the intensity of the idler field increases, the nonlinear optical interaction is considered to be constructive for the generation of idler light from pump light. When the intensity of the idler field decreases, the nonlinear optical interaction is considered to be destructive for the generation of idler light from pump light. For the example of optical waveguide structure 3000, the length of first segment $A_1$ can be selected such that distance propagated is sufficiently short to ensure the nonlinear optical interaction remains constructive for the generation of idler light, as illustrated by line 3121.

At the end of first segment $A_1$, a wavelength selective coupler $B_1$ removes the idler light that was generated in segment $A_1$ and couples that idler light as well as signal light, but not pump light, into extension optical waveguide $C_1$. This wavelength selective coupler $B_1$ also couples the pump light, but not idler light or signal light, from first segment $A_1$ into second segment $D_1$. Since no pump light is coupled into extension optical waveguide $C_1$, there is no generation of idler light in that extension optical waveguide. With respect to signal light 3014 and idler light 3016 that is coupled into extension optical waveguide $C_1$, there is no additional increase in the intensity of that signal light and idler light while they propagate in extension optical waveguide $C_1$, as illustrated by line 3141, since essentially no pump light is present. There could be some generation of idler light in second segment $D_1$ of nonlinear optical waveguide since pump light is present in that segment. However, since the previously generated idler light is removed before the starting point of second segment $D_1$, the intensity of the idler light must again grow from a value of zero, as illustrated by line 3122.

Thus, in second segment $D_1$, the amplitude of signal light 3014 and idler light 3016 can be described by:

$$M_{i,s}(D_1) = (1 - \eta_{i,s})M_{i,s}(A_1) + \\ \frac{2id_{33}\omega_{i,s}}{n_{i,s}c}\eta_p M_p(1-\eta_{i,s})M_{s,i}\int_{B_1}^{E_1} \exp(i(\Phi_{A1} + \Delta ky))dy = \\ (1-\eta_{i,s})M_{i,s}(A_1) + \frac{2id_{33}\omega_{i,s}}{n_{i,s}c}\eta_p M_p(1-\eta_{i,s}) \\ M_{s,i}\left(\frac{-i\times\exp(i\Delta k(L_{A1}+L_{D1}))+i\times\exp(i\Delta k(L_{A1}))}{\Delta k}\right) \tag{18}$$

where the integral is taken only over segment 'D$_1$' which starts at its junction with wavelength selective coupler B$_1$ and ends at its junction with wavelength selective coupler E$_1$. Because it is unlikely under actual operating and fabrication conditions that the wavelength-selective couplers are able to completely remove signal light 3014 and idler light 3016, the factors $\eta_{p,s,i}$ are included. The factors $\eta_{s,i}$ account for the percent of the signal optical field or idler optical field that is coupled into extension optical waveguide 'C$_i$' by wavelength selective coupler 'B$_i$', which we also take to be the percent of signal optical field or idler optical field that is coupled from extension optical waveguide 'C$_i$' into another segment of nonlinear optical waveguide by wavelength selective coupler 'E$_i$'. The factor $\eta_p$ accounts for the percent of the pump optical field that is coupled from a segment such as segment 'A$_i$' into a subsequent segment such as segment 'D$_i$'.

In the illustrative example, signal light 3014 and/or idler light 3016 generated in second segment D$_1$ and in other segments 'D$_i$' are coupled by a wavelength selective coupler E$_1$ and other couplers 'E$_i$' away from the subsequent segments 'A$_{i+1}$'. Thus, signal light 3014 and/or idler light 3016 generated in segments 'D$_i$' do not impact the signal and idler fields generated in segments 'A$_{i+1}$'. Instead, the generation of signal light and/or idler light in a segment 'A$_{i+1}$' is affected only by the signal light and/or idler light generated in the preceding segments 'A$_i$', 'A$_{i-1}$', 'A$_{i-2}$', . . . .

Turning again to FIG. 30, consider an example of difference frequency generation in which idler light is generated in optical waveguide structure 3000 from pump light and signal light that is supplied to optical waveguide structure 3000 at a starting point in first segment A$_1$ 3001 of the nonlinear optical waveguide 3009. Specifically, signal light 3014, supplied to segment A$_1$ and idler light 3016 generated in segment A$_1$ will traverse through first segment A$_1$ 3001 then be coupled by first wavelength selective coupler B$_1$ 3021 into first extension optical waveguide C$_1$ 3041, and travel through extension waveguide C$_1$ 3041 and then be coupled by second wavelength selective coupler E$_1$ 3022 into a starting point of third segment A$_2$ 3002. Meanwhile, the pump light 3012 supplied to segment A$_1$ 3001 will traverse through segment A$_1$ 3001 and be coupled by wavelength selective coupler B$_1$ 3021 into second segment D$_1$ 3002; travel through second segment D$_1$ and be coupled by wavelength selective coupler E$_1$ 3022 in the starting point of third segment A$_2$ 3002. Signal light 3014 and idler light 3016 are recombined with pump light 3012 at the starting point of third segment A$_2$. Segment A$_1$, coupler B$_1$, segment D$_1$ and extension waveguide C$_1$, and coupler E$_1$ to the starting point of subsequent segment A$_2$ can together be considered as comprising a basic cell of optical waveguide structure 3000. This basic cell can be repeated multiple times to construct the overall optical waveguide structure.

For the amplitude of signal light 3014 and idler light 3016 to continue to increase in second segment A$_2$ 3003, the cumulative phase walk-off for nonlinear optical interaction of pump light 3012, signal light 3014 and idler light 3016 from the starting point of segment A$_1$ to the starting point of segment A$_2$ should be an even multiple of $\pi$. This condition on the cumulative phase walk-off ensures that the relative phase difference between the signal light and/or idler light generated at the start of third segment A$_2$ and the signal light and/or idler light generated at the start of first segment A$_1$ is zero, since phase has a modulus of $2\pi$. Thus, the nonlinear optical generation that occurs in third segment A$_2$ 3003 can be constructive and build upon the nonlinear optical generation that occurs in first segment A$_1$ 3001. The pump light 3012 traverses a different route to the starting point of segment A$_2$ than the route traversed by the signal light 3014 and idler light 3016. The cumulative phase walk-off between the pump light 3012, signal light 3014 and idler light 3016 from the starting point of first segment A$_1$ to the starting point of third segment A$_2$ is thus given by:

$$\Phi_{A2,start} = (k_p - k_i - k_s)L_{A1} + k_p L_{D1} - k_{i,C}L_{C1} - k_{s,C}L_{C1} \tag{19}$$

The pump light 3012, signal light 3014 and idler light 3016 all travel through first segment 'A$_1$' from its starting point to its ending point. Pump light 3012 then travels through second segment 'D$_1$' whereas signal light 3014 and idler light 3016 travel through extension optical waveguide 'C$_1$'. The wave vectors $k_{i,C}$ and $k_{s,C}$ are used to reflect the fact that the effective index of signal light 3014 and idler light 3016 in an extension optical waveguide 'C$_i$' may not be the same as their effective index in segments 'A$_i$' and 'D$_i$' of the nonlinear optical waveguide 3009. For simplicity, and without loss of generality, the model assumes that the effective indices for pump light 3012, signal light 3014 and idler light 3016 in different segments 'A$_i$' and 'D$_i$' of nonlinear optical waveguide 3009 are identical so that the wave-vectors in the segments 'A$_i$' and 'D$_i$' can be described by $k_p$, $k_s$ and $k_i$.

The nonlinear optical process can generate more signal light and/or idler light in third segment A2 if a proper phase walk-off is achieved. The amplitude of signal light 3014 and idler light 3016 in segment A$_2$ 3003 can be described by:

$$M_{i,s}(A_2) = \tag{20}$$

$$M_{i,s}(A_{2,start}) + \frac{2id_{33}\omega_{i,s}}{n_{i,s}c} \eta_p \eta_p M_p \eta_{s,i} \eta_{s,i} M_{s,i} \int_{E_1}^{B_2} \exp(i(\Phi_{A2,start} + \Delta ky)) dy =$$

$$M_{i,s}(A_{2,start}) + \frac{2id_{33}\omega_{i,s}}{n_{i,s}c} \eta_p \eta_p M_p \eta_{s,i} \eta_{s,i}$$

$$M_{s,i}\left(\frac{-i \times \exp(i\Phi_{A2,start} + \Delta kL_{A2}) + i \times \exp(i\Phi_{A2,start})}{\Delta k}\right)$$

$$\Phi_{A2,start} = (k_p - k_i - k_s)L_{A1} + k_p L_{D1} - k_{i,C}L_{C1} - k_{s,C}L_{C1} = m_C 2\pi \tag{21}$$

It is desirable for the phase walk-off at the starting point of segment A$_2$ to be reset to zero (modulo $2\pi$) as discussed above. Thus, $$\Phi_{A2,start} = (k_p - k_i - k_s)L_{A1} + k_p L_{D1} - k_{i,C}L_{C1} - k_{s,c}L_{C1} = m_C 2\pi \tag{21}$$

where $m_C$ is any positive integer. The length of extension optical waveguide C$_1$ is therefore given by the following equation:

$$L_{C1} = \frac{(k_p - k_i - k_s)L_{A1} + k_p L_{D1} - m_C 2\pi}{k_{i,C} + k_{s,C}} \tag{22}$$

From here similar equations can be produced to describe the increase in amplitude of signal light 3014 and idler light 3016 for many iterations of the basic cell in optical waveguide structure 3000.

Turning again to FIG. 31, graph 3100 illustrates the greater intensity of generated idler light that can be achieved when the condition described in equation 21 is met for the phase walk-off obtained in the segment A$_2$ 3002 in the nonlinear optical waveguide. Equation 21 describes constraints on the phase walk-off at the starting point of third segment $A_2$ 3002, which can be set by adjusting the length $L_{C_1}$ of the extension optical waveguide $C_1$ and/or the length $L_{D_1}$ of the second segment $D_1$, and by adjusting the cross-sections of those portions of optical waveguide structure 3000 in order to obtain desired values for the wave-vectors for the pump, signal and idler light traveling in those portions. When the condition for phase walk-off is met, the nonlinear optical generation of idler light in segment $A_2$ is constructive with the nonlinear optical generation of idler light in segment $A_1$. Thus, the intensity of the idler light in segment $A_2$ can continue to increase, as illustrated by line 3123 in FIG. 31. If the constraint of equation 21 also is met for additional iterations of the basic cell, such as by properly selecting the lengths and cross-sectional structures of the segments '$D_i$' and the lengths and cross-sectional structures of the extension optical waveguides '$C_i$', even more idler light can be generated and the intensity of the idler can be greater and greater for successive iterations of the basic cell, as illustrated by line 3125, line 3127, and line 3129 in FIG. 31.

In optical waveguide structure 3000 in FIG. 30, the wavelength selective couplers '$B_i$' and '$E_i$' can be implemented using at least one of a directional coupler, a Mach-Zehnder interferometer, a multi-mode interference coupler, a micro-ring add coupler, a micro-ring drop coupler, or some other suitable optical coupler that can couple one set of wavelengths of light from a first waveguide to a second waveguide while coupling another set of wavelength of light from the first waveguide to a third waveguide instead of to the second waveguide.

In optical waveguide structure 3000, a type of coupler such as the types listed above can be selected to implement a wavelength selective coupler '$E_i$' that can transfers pump light 3012 from segment '$D_i$' to segment '$A_{i+1}$' and signal light 3014 and idler light 3016 from extension optical waveguide '$C_i$' to segment '$A_{i+1}$'. Further, the same type of coupler or a different type of coupler can be selected to implement a wavelength selective coupler '$B_i$' that can transfer pump light 3012 from segment '$A_i$' to segment '$D_i$' and signal light 3014 and idler light 3016 from segment '$A_i$' to extension optical waveguide '$C_i$'. The coupling will occur over some distance and may induce a phase shift of its own. These effects can be included in the model without loss of generality but were omitted for simplicity.

In another illustrative example, the effective refractive indices of the pump light, signal light and idler light, which determine the wave-vector mismatch, such as $\Delta k = k_p - k_s - k_i$ relevant for parametric down conversion and difference frequency generation, can be modified by changing the cross-sectional geometry of the nonlinear optical waveguide. The wave-vector mismatch also can be modified by changing the shape and arrangement of the cladding material that surrounds the core region of the main nonlinear optical waveguide, which are segment '$A_i$' and segment '$D_i$' in nonlinear optical waveguide 3009. For example, when viewed at a cross-section through nonlinear optical waveguide 3009, the core region comprises a material that has an appreciable second or third order nonlinear optical coefficient. However, the cladding that surrounds the core region comprises a material that has a lower refractive index than the refractive index of the material comprising the core region. For the waveguides of this invention, the material of the cladding does not have an appreciable second or third order nonlinear optical coefficient. In another example, the cross-sectional geometry of the nonlinear optical waveguide can be selected to involve a higher-order transverse mode of the pump light in the nonlinear optical waveguide involved in the nonlinear optical process. Use of a higher-order transverse mode for the pump light could be beneficial when the wavelength of the pump light is very different from the wavelengths of the signal light and the idler light.

In some illustrative examples, the cladding can comprise multiple regions of two different materials having different refractive index. By adjusting the dimensions and locations of these multiple regions of the cladding, the dispersion of the waveguide can be configured to decrease the wave-vector mismatch when such a cladding induces a greater change in effective index for the optical fields of some frequencies of light (such as for the idler light) than for the optical fields of other frequencies of light (such as for the pump light or signal light). In some illustrative examples, the higher index cladding portion covers the two sides of the core region but does not cover the top or bottom of the core region. In other illustrative examples, the higher index cladding portion covers only the bottom and top of the core region but not the two sides. In yet other examples, the higher index cladding portion is displaced from the core region, with a lower index cladding portion immediately adjacent to the core region.

In some illustrative examples, an optical waveguide structure has an outline whose shape or aspect ratio is more like a square than like a long rectangle. In this type of implementation, two or more nonlinear optical waveguides can be connected by an optical waveguide.

Figure 32:
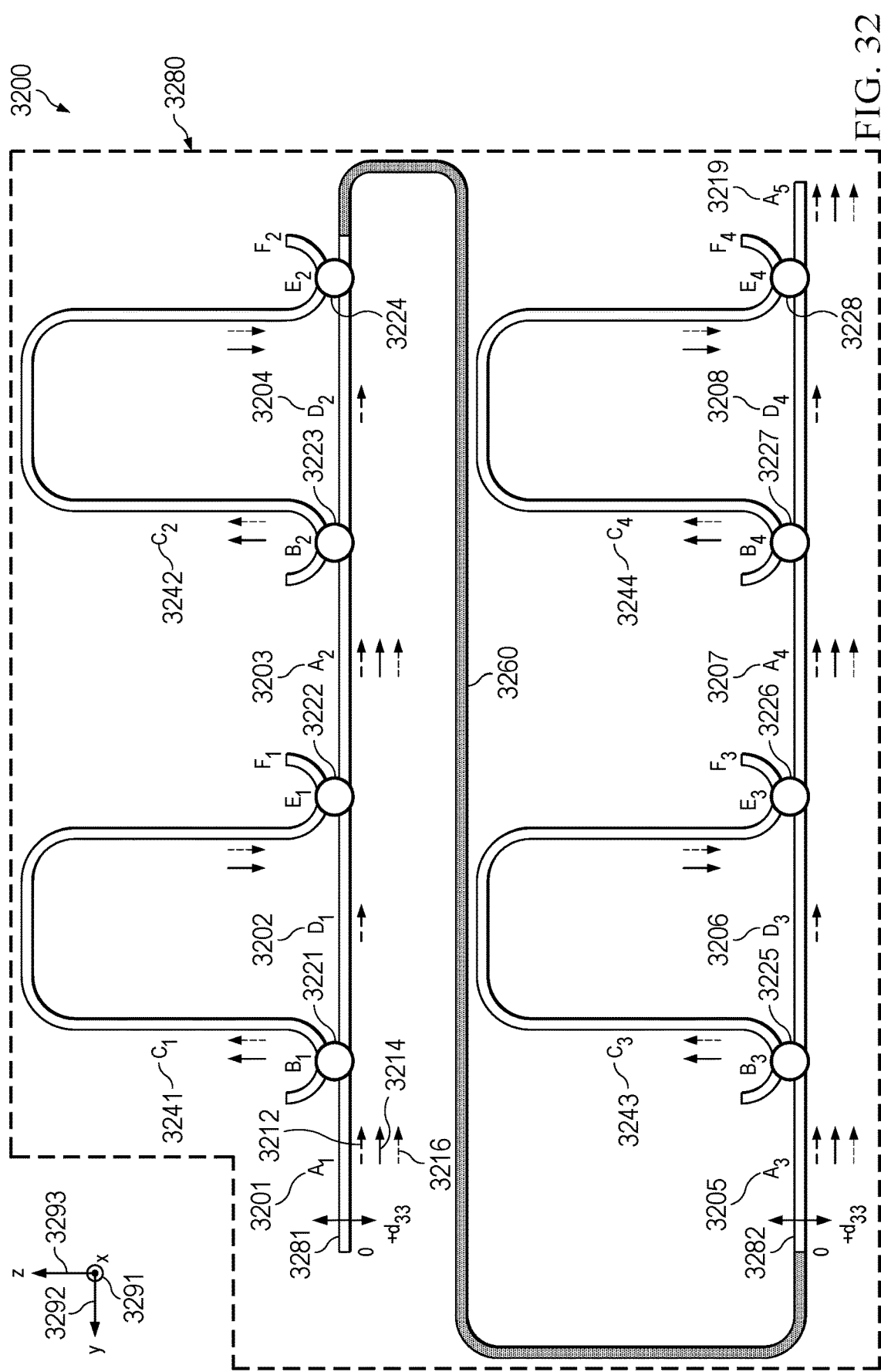
FIG. 32 is an illustration of an optical waveguide structure having two sets of nonlinear optical waveguides and extension optical waveguides connected by an optical waveguide in accordance with an illustrative embodiment.

With reference to FIG. 32, an illustration of an optical waveguide structure having two sets of nonlinear optical waveguides and extension optical waveguides connected by an optical waveguide is depicted in accordance with an illustrative embodiment.

As depicted, optical waveguide structure 3200 comprises nonlinear optical waveguide 3280 with first portion 3281 and second portion 3282, first extension optical waveguide $C_1$ 3241, second extension optical waveguide $C_2$ 3242, first wavelength selective coupler 3221, second wavelength selective coupler 3222, third wavelength selective coupler 3223, fourth wavelength selective coupler 3224. Optical waveguide structure also comprises third extension optical waveguide $C_3$ 3243, fourth extension optical waveguide $C_4$ 3244, fifth wavelength selective coupler 3225, sixth wavelength selective coupler 3226, seventh wavelength selective coupler 3227, and eight wavelength selective coupler 3228.

In this illustrative example, first portion 3281 of nonlinear optical waveguide 3280 comprises first segment $A_1$ 3201, second segment $D_1$ 3202, third segment $A_2$ 3203, and fourth segment $D_2$ 3204. Idler light 3216 is generated by the nonlinear optical process in first segment $A_1$. First wavelength selective coupler $B_1$ 3221 couples generated idler light 3216 and signal light 3214 from first segment $A_1$ into extension optical waveguide 3241 and couples pump light 3212 from first segment $A_1$ into second segment $D_1$ 3202. Second wavelength selective coupler $E_1$ 3222 couples idler light 3216 and signal light 3214 from extension optical waveguide 3241 into third segment $A_2$ 3203 and also couples pump light 3212 from second segment $D_1$ into third segment $A_2$ 3203. The coupling of pump light 3212, signal light 3214, and idler light 3216 continues through optical waveguide structure 3200 using wavelength selective couplers and extension optical waveguides from third segment $A_2$ 3203 to ninth segment $A_5$ 3219 as depicted in FIG. 32.

Some practical implementations of first wavelength selective coupler $B_1$ 3221 may allow some pump light 3212 to also couple into extension optical waveguide 3241. Extension optical waveguide 3241 has an optical filter that removes pump light 3212 and allows only idler light 3216 and signal light 3214 to reach wavelength selective coupler $E_1$ 3222 and be coupled by coupler $E_1$ into third segment $A_2$ 3203.

Second portion 3282 of nonlinear optical waveguide 3280 comprises fifth segment $A_3$ 3205, sixth segment $D_3$ 3206, seventh segment $A_4$ 3207, and eight segment $D_4$ 3208, and ninth segment $A_5$ 3219.

As depicted, optical waveguide 3260 connects fourth segment $D_2$ 3204 in first portion 3281 to fifth segment $A_3$ 3205 in second portion 3282. In this illustrative example, optical waveguide 3260 is configured with a material and dimensions such that the nonlinear optical process does not occur. The configuration of optical waveguide 3260 is such that light is propagated with high fidelity. For example, light is propagated without undesired optical losses.

In this illustrative example, optical waveguide structure 3200 and other components in optical waveguide structure 3200 are formed on a yz plane defined by z-axis 3293 and y-axis 3292 in which an x-axis 3291 is perpendicular to the plane. In this illustrative example, first portion 3281 and second portion 3282 begin at some −y position on y-axis 3292 of the substrate, end at some position in the +y direction on y-axis 3292, and are offset from each other by some distance relative to z-axis 3293

In this illustrative example, the length of a connecting optical waveguide 3260 can be selected to reset the phase walk-off such that the nonlinear optical process is efficiently enhanced in the subsequent '$A_i$' segments in second portion 3282.

When optical waveguide structure 3200 is fabricated in nonlinear optical material such as z-cut lithium niobate, the light with transverse magnetic (TM) polarization experiences the largest nonlinear optical coefficient, such as, $d_{33}$. Because the nonlinear optical coefficient does not change with waveguide orientation, direction, both orientation and direction, segments '$A_i$' and segments '$D_i$' do not have to be aligned with a particular crystallographic direction or even to maintain that direction over multiple iterations of the waveguide sections to achieve the maximum nonlinear optical enhancement. This selection of materials for optical waveguide structure 3200 provides increased flexibility in the design of waveguides and can be used to reduce the overall device footprint of optical waveguide structure 3200.

In some illustrative examples, the aspect ratio for the optical waveguide structure can be shaped more like a square than like a long rectangle. Additionally, in some illustrative examples, multiple segments such as '$A_i$' and '$A_{i+1}$' could be displaced or offset laterally from each other.

Figure 33:
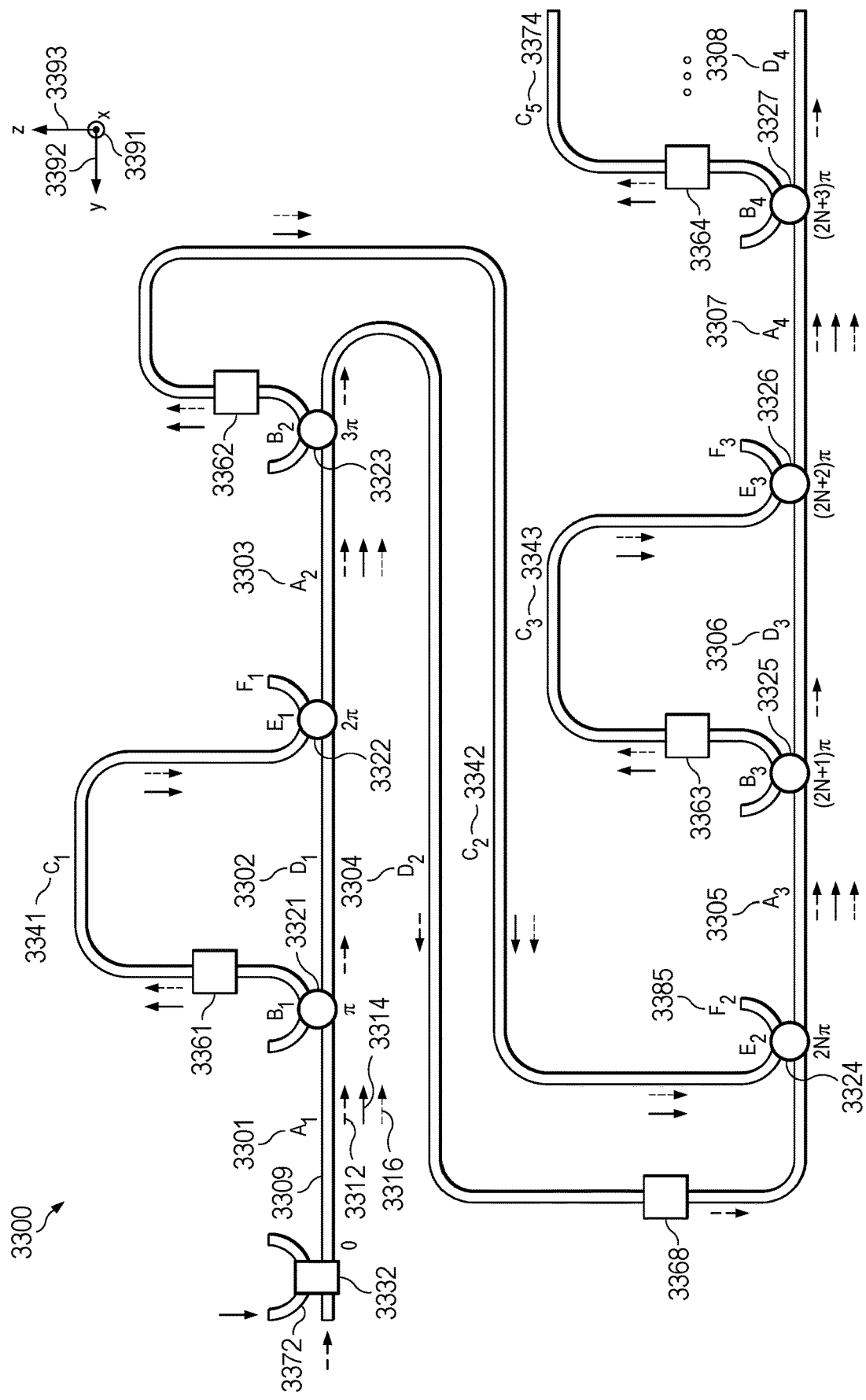
FIG. 33 is an illustration of an optical waveguide structure with square-shaped aspect ratio obtained by having extension optical waveguides and segments displaced or offset laterally in accordance with an illustrative embodiment.

With reference now to FIG. 33, an illustration of an optical waveguide structure with square-shaped aspect ratio obtained by having extension optical waveguides and segments displaced or offset laterally is depicted in accordance with an illustrative embodiment.

As depicted, optical waveguide structure 3300 comprises nonlinear optical waveguide 3309, first extension optical waveguide $C_1$ 3341, second extension optical waveguide $C_2$ 3342, third extension optical waveguide $C_3$ 3343, first wavelength selective coupler 3321, second wavelength selective coupler 3322, third wavelength selective coupler 3323, fourth wavelength selective coupler 3324, fifth wavelength selective coupler 3325, six wavelength selective coupler 3326, seventh wavelength selective coupler 3327, input coupler 3332, input waveguide 3372, output waveguide 3374, first pump removing filter 3361, second pump removing filter 3362, signal/idler removing filter 3368, third pump removing filter 3363, and fourth pump removing filter 3364.

In this illustrative example, nonlinear optical waveguide 3309 comprises segments. As depicted, the segments are first segment $A_1$ 3301, second segment $D_1$ 3302, third segment $A_2$ 3303, fourth segment $D_2$ 3304, fifth segment $A_3$ 3305, sixth segment $D_3$ 3306, seventh segment $A_4$ 3307, and eighth segment $D_4$ 3308. In this example, first wavelength selective coupler 3321, second wavelength selective coupler 3322, third wavelength selective coupler 3323, fourth wavelength selective coupler 3324, fifth wavelength selective coupler 3325 and sixth wavelength selective coupler 3326 couple idler light 3316 between segments of the nonlinear optical waveguide 3309 and extension optical waveguide 3341, extension optical waveguide 3342, and extension optical waveguide 3343. The same wavelength selective couplers couple pump light 3312 and signal between a segment of the nonlinear optical waveguide and a succeeding segment of the nonlinear optical waveguide, such as between first segment 3301 and second segment 3302 and between second segment 3302 and third segment 3303.

In this illustrative example, optical waveguide structure 3300 and other components in optical waveguide structure 3300 are formed on a yz plane defined by z-axis 3393 and y-axis 3392 in which an x-axis 3391 is perpendicular to the plane.

In this depicted example, third segment $A_2$ 3303 and fifth segment $A_3$ 3305 are not co-linear. Instead, these two segments are offset laterally from each other. Further, second extension optical waveguide $C_2$ 3342 and fourth segment $D_2$ 3304 have bends and a "switchback" configuration that provide connection between third segment $A_2$ 3303 and fifth segment $A_3$ 3305 through third wavelength selective coupler $B_2$ 3323 and through fourth wavelength selective coupler $E_2$ 3324. In this example, third wavelength selective coupler $B_2$ couples idler light 3316 from third segment $A_2$ 3303 into second extension optical waveguide $C_2$ 3342 and also couples pump light 3312 and signal light 3314 from third segment $A_2$ 3303 into fourth segment $D_2$ 3304. Fourth wavelength selective coupler $E_2$ then couples idler light 3316 from second extension optical waveguide $C_2$ 3342 into fifth segment $A_3$ 3305 and also couples pump light 3312 and signal light 3314 from fourth segment $D_2$ 3304 into fifth segment $A_3$ 3305. The length of second extension optical waveguide $C_2$ 3342 and the length of fourth segment $D_2$ 3304 can be selected such that the phase walk-off for the nonlinear optical interaction from the starting point of first segment $A_1$ 3301 to the starting point of fifth segment $A_3$ 3305 is an even multiple of $\pi$.

In another example, third wavelength selective coupler $B_2$ 3323 does not couple idler light 3316 from third segment $A_2$ 3303 into fourth segment $D_2$ 3304. Thus, any idler light traveling in fourth segment $D_2$ 3304 is generated in fourth segment $D_2$ by the nonlinear optical process occurring in that fourth segment $D_2$. Fourth wavelength selective coupler $E_2$ 3324 does not couple the idler light generated in fourth segment $D_2$ 3304 into fifth segment $A_3$ 3305 but, instead, couples that idler light, generated in fourth segment $D_2$ into an output port $F_2$ 3385. Thus, idler light generated in fourth segment $D_2$ 3304 is prevented from affecting the nonlinear optical process that occurs in fifth segment $A_3$ 3305.

In another illustrative example, segments '$D_i$' of the nonlinear optical waveguide 3309 can be comprised of a different material or cross-sectional structure from segments '$A_i$' of the nonlinear optical waveguide 3309 This selection of material or cross-sectional structure for segments '$D_i$' can be made such that an effective coefficient for the nonlinear optical interaction in segments '$D_i$', which depends on the overlap of the optical fields in segments '$D_i$' with the nonlinear optical material in segments '$D_i$' is smaller by at least a factor of 3 compared to an effective coefficient for the nonlinear optical interaction in segments '$A_i$'. Alternatively, the loss for the generated idler light 3316 in segments '$D_i$' can be much higher as compared to the loss for idler light in segments '$A_i$'. In some examples, selective loss for the idler signal light traveling in a segment '$D_i$' can be achieved by an optional filter such as signal/idler removing filter 3368 shown in segment $D_2$ 3304 of the nonlinear optical waveguide 3309. Thus, the amplitude of idler light 3316 in the segments '$D_i$' remains sufficiently small to not impact the nonlinear optical process occurring in a subsequent segment '$A_{i+1}$' even if the wavelength selective coupler '$E_i$' allows some idler light from segment '$D_i$' to be coupled in the subsequent segment '$A_{i+1}$' of the nonlinear optical waveguide.

In this depicted example, extension optical waveguides '$C_i$' can have first pump removing filter 3361, second pump removing filter 3362, third pump removing filter 3363 and fourth pump removing filter 3364 to remove the pump light 3312. As depicted, first pump removing filter 3361 is connected to first extension optical waveguide $C_1$ 3341; second pump removing filter 3362 is connected to second extension optical waveguide $C_2$ 3342; third pump removing filter 3363 is connected to third extension optical waveguide $C_3$ 3343; and a fourth pump removing filter 3364 can be connected to output waveguide 3374. In this example, seventh wavelength selective coupler 3327 couples idler light 3316 from seventh segment $A_4$ 3307 into an output waveguide 3374. Seventh wavelength selective coupler 3327 also couples pump light 3312 and signal light 3314 into eighth segment $D_5$ 3308.

In other illustrative examples different segments '$A_i$' can have different lengths or cross-sectional structures. Similarly, different segments '$D_i$' or different extension optical waveguides '$C_i$' can have different lengths or cross-sectional structures. As long as the condition to achieve the appropriate phase walk-off is met, such as described in Expression 12 or Expression 21, a net enhancement of the nonlinear optical generation process can still occur.

Figure 34:
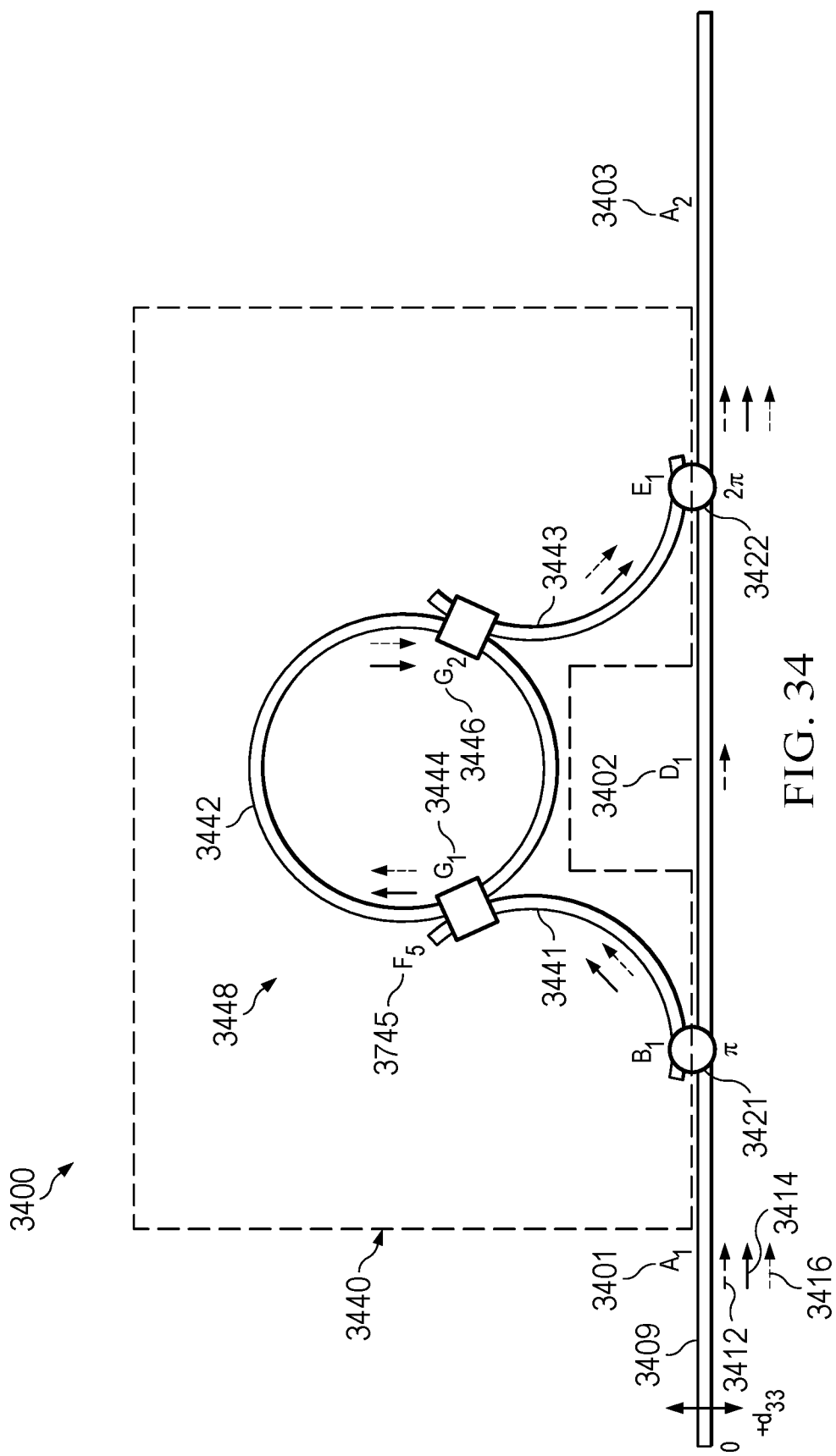
FIG. 34 is an illustration of an optical waveguide structure in accordance with an illustrative example.

With reference now to FIG. 34, an illustration of an optical waveguide structure is depicted that implements a filter in an extension optical waveguide is depicted in accordance with an illustrative embodiment.

In this example, optical waveguide structure 3400 has a nonlinear optical waveguide 3409 comprising first segment $A_1$ 3401, second segment $D_1$ 3402 and third segment $A_2$ 3403. Idler light 3416 is generated by the nonlinear optical process in first segment $A_1$. First wavelength selective coupler $B_1$ 3421 couples generated idler light 3416 and signal light 3414 from first segment $A_1$ into extension optical waveguide 3440 and couples pump light 3412 from first segment $A_1$ into second segment $D_1$ 3402. Second wavelength selective coupler $E_1$ 3422 couples idler light 3416 and signal light 3414 from extension optical waveguide 3440 into third segment $A_2$ 3403 and also couples pump light 3412 from second segment $D_1$ into third segment $A_2$. Some practical implementations of first wavelength selective coupler $B_1$ 3421 may allow some pump light 3412 to also couple into extension optical waveguide 3440. Extension optical waveguide 3440 has an optical filter that removes pump light 3412 and allows only idler light 3416 and signal light 3414 to reach wavelength selective coupler $E_1$ 3422 and be coupled by coupler $E_1$ into third segment $A_2$ 3403.

As depicted in FIG. 34, extension optical waveguide 3440 comprises first waveguide portion 3441, first coupler $G_1$ 3444, ring resonator 3442, second coupler $G_2$ 3446 and second waveguide portion 3443. In one example of extension optical waveguide 3440, first coupler $G_1$ 3444, ring resonator 3442 and second coupler $G_2$ 3446 comprise a ring resonator 3448. Ring resonator is designed such that both the wavelength of idler light 3416 and the wavelength of signal light 3414 are equal to resonant wavelengths of ring resonator 3448 and such that the wavelength of pump light 3412 is not equal to any resonant wavelength of ring resonator 3448. Thus, idler light 3416 and signal light 3414 are coupled through first coupler $G_1$ 3444, ring resonator 3442 and second coupler $G_2$ 3446 from first waveguide portion 3441 of extension optical waveguide 3440 into second waveguide portion 3443 of extension optical waveguide 3440. However, any pump light 3412 that is coupled into first waveguide portion 3441 is coupled into a pump dump port $F_5$ 3475 rather than into second waveguide portion 3443. The combination of first coupler $G_1$ 3444, ring resonator 3442 and second coupler $G_2$ 3446 can function as a pump removing filter such as first pump removing filter 3361, second pump removing filter 3362, third pump removing filter 3363, and fourth pump removing filter 3364 in optical waveguide structure 3300. For extension optical waveguide 3440, the lengths of first waveguide portion 3441 and of second waveguide portion 3443 can be selected to achieve a desired phase walk-off for the nonlinear optical process at the starting point of third segment $A_2$ 3403.

For a nonlinear optical generation process such as parametric down conversion or difference frequency generation that involves generation of, for example, idler light from both pump light and signal light that are supplied to the optical waveguide structure, the specific wavelength (or the optical frequency) of the generated idler light is constrained by the specific wavelengths of the supplied pump light and the supplied signal light, because of the condition for conservation of energy. However, for a nonlinear optical process such as spontaneous parametric down conversion (SPDC), only the pump light is supplied and both signal light and idler light are generated from the supplied pump light. For SPDC, the condition of conservation of energy constrains the relative wavelengths of the generated signal light and idler light. However, the specific wavelength of the generated signal light, and of the generated idler light, can have values within a broad spectral span, which is constrained by the condition for momentum conservation or phase-matching. An optical filter, such as the ring resonator 3448, can impose a constraint on the wavelengths of signal light and idler light that has a narrow spectral span, since only the span of wavelength matching the resonance condition of the ring resonator will be coupled into the next segment of the nonlinear optical waveguide with appropriate phase walk-off and thereby experience the enhancement of the nonlinear optical generation process.

In another illustrative example, one or more of the extension optical waveguides can be comprised of n+1 micro-rings where n is some even, positive integer.

Figure 35:
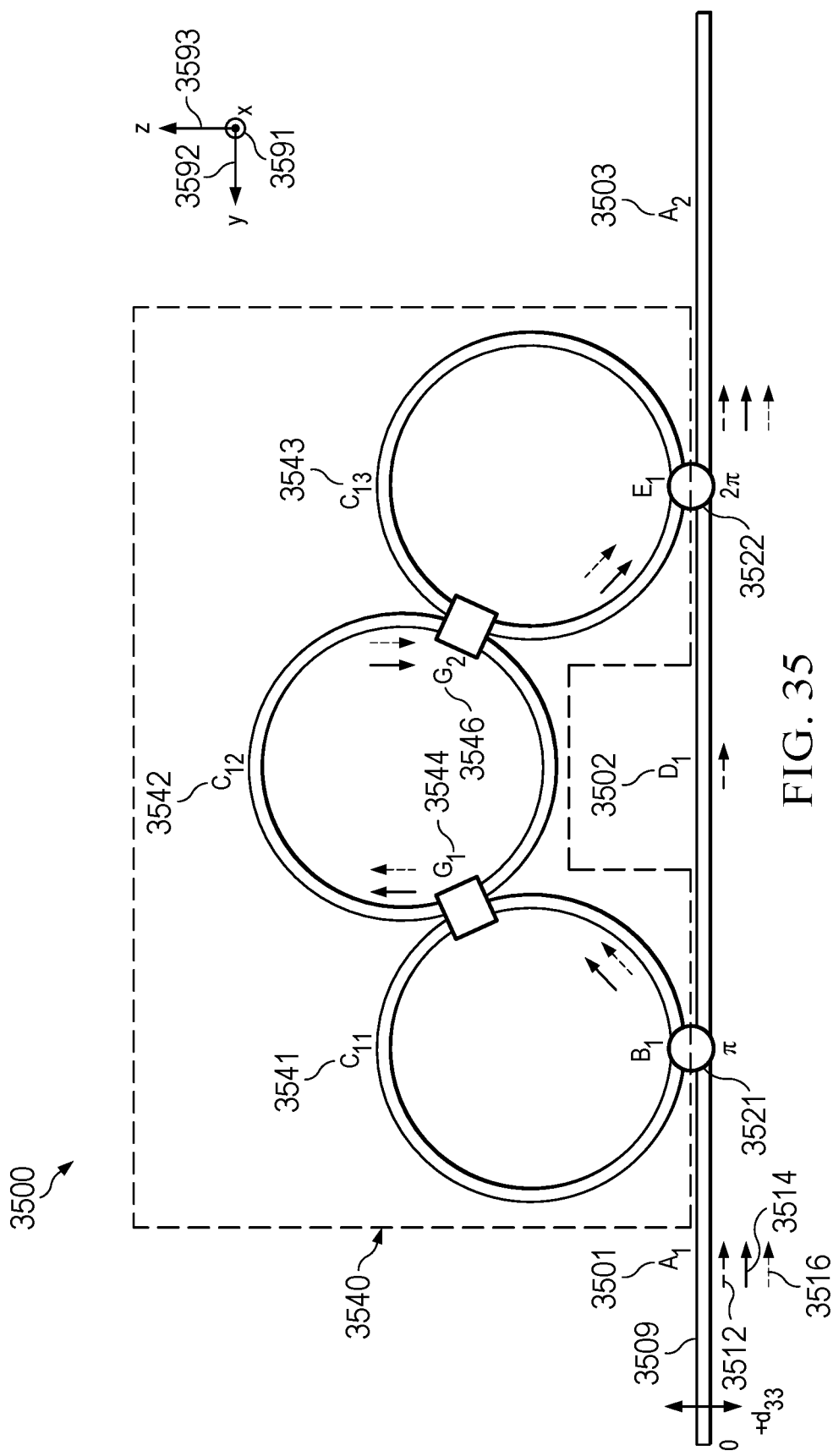
FIG. 35 is an illustration of an optical waveguide structure with three coupled micro-rings for an extension optical waveguide in accordance with an illustrative example.

With reference now to FIG. 35, an illustration of an optical waveguide structure with three coupled micro-rings for an extension optical waveguide is depicted in accordance with an illustrative embodiment. In this illustrative example, optical waveguide structure 3500 comprises nonlinear optical waveguide 3509, extension optical waveguide 3540, first wavelength selective coupler $B_1$ 3521, and second wavelength selective coupler $E_1$ 3522.

In this illustrative example, nonlinear optical waveguide 3509 is comprised of segments. As depicted, the segments are first segment $A_1$ 3501, second segment $D_1$ 3502, and third segment $A_2$ 3503. Extension optical waveguide 3540 is comprised of micro-rings that are coupled to each other. In this example, three micro-rings are present in extension optical waveguide 3540: first micro-ring $C_{11}$ 3541, second micro-ring $C_{12}$ 3542, and third micro-ring $C_{13}$ 3543. First micro-ring $C_{11}$ and second micro-ring $C_{12}$ are coupled together via first coupler $G_1$ 3544. Second micro-ring $C_{12}$ and third micro-ring $C_{13}$ are coupled together via second coupler $G_2$ 3546. The circumference of first micro-ring $C_1$ 3541, second micro-ring $C_2$ 3542, and third micro-ring $C_3$ 3543 can be selected in a similar manner to selecting lengths for extension optical waveguides comprised of a single optical waveguide, with the object being to achieve a desired condition for the phase walk-off at the starting point of the next segment of the nonlinear optical waveguide, such as third segment $A_2$ 3503 for this example. The length of second segment $D_1$ 3502 likewise can be selected to achieve the desired condition for the phase walk-off at the starting point of third segment $A_2$ 3503 of the nonlinear optical waveguide. In this illustrative example, optical waveguide structure 3500 and other components in optical waveguide structure 3500 are formed on a yz plane defined by z-axis 3593 and y-axis 3592 in which an x-axis 3591 is perpendicular to the plane.

$$\Phi_{A2,start}=(k_p-k_i-k_s)L_{A1}+k_pL_{D1}-\Phi_{C1,i}-\Phi_{C1s}=m_C2\pi \quad (23)$$

In the example of optical waveguide structure 3500, the first wavelength selective coupler $B_1$ 3521 is designed to couple signal light 3514 and idler light 3516 from first segment $A_1$ 3501 into first micro-ring $C_{11}$ 3541 and to couple pump light 3512 into second segment $D_1$ 3502. The second wavelength selective coupler $E_1$ 3522 is designed to couple signal light 3514 and idler light 3516 from third micro-ring $C_{13}$ 3543 into third segment $A_2$ 3503 and to couple pump light from second segment $D_1$ 3502 into third segment $A_2$ 3503. Signal light 3514 and idler light 3516 with wavelengths over a fairly broad spectral range could be coupled by first wavelength selective coupler $B_1$ and by second wavelength selective coupler $E_1$ to/from the extension optical waveguide 3540. However, the combination of coupled ring resonators $C_{11}$, $C_{12}$ and $C_{13}$ can impose a narrower spectral range for the specific wavelengths of the signal light 3514 and idler light 3516 that are transmitted through the resonator structure comprising those coupled micro-rings. Wavelengths that are not resonant with the coupled micro-ring resonator structure comprising extension optical waveguide 3540 are not coupled through that resonator structure to third segment $A_3$ 3503. Instead, those non-resonant wavelengths are coupled into second segment $D_1$ 3502 and then from second segment $D_1$ 3502 into third segment $A_2$ 3503. The length and cross-sectional structure of second segment $D_1$ 3502 can be selected such that the phase walk-off at the starting point of segment $A_2$ is reset to zero (modulo $2\pi$) as discussed above. Thus, $$\Phi_{A2,start}=(k_p-k_i-k_s)L_{A1}+k_pL_{D1}-\Phi_{C1,i}-\Phi_{C1s}=m_C2\pi \quad (23)$$

where $m_C$ is any positive integer.

In some example, the condition for phase walk-off at the starting point of segment $A_2$ 3503 is met for those wavelengths of signal light 3514 and idler light 3516 that are transmitted through the coupled micro-rings in extension optical waveguide 3540 so that there is enhancement of the nonlinear optical generation occurring for those wavelength of signal light 3514 and idler light 3516. However, for light of other wavelengths that might be generated in first segment $A_1$ 3501, through a process such as spontaneous parametric down conversion, and that is not coupled through extension optical waveguide 3540 into third segment $A_2$ 3503, but rather that must traverse through second segment $D_1$ 3502, the condition for phase walk-off described in Expression 23 is not met. As a result, nonlinear optical generation in third segment $A_2$ 3503 is not enhanced for the light of those other wavelengths.

The illustration of the different examples in FIGS. 30 thru 35 are provided as examples of some of the dictations for optical waveguide structures to provide light generation. These examples are not meant to limit the manner in which other illustrative examples can be implemented. For example, in the optical waveguide structure depicted in FIG. 30, both the signal light and the idler light are coupled to/from the extension optical waveguides. However, in a different example of this optical waveguide structure, only the idler light would be coupled to/from the extension optical waveguide and both the signal light and the pump light would not. For another example, in the optical waveguide structure depicted in FIG. 33, the idler light is coupled to/from the extension optical waveguides. However, in a different example of this optical waveguide structure, both the idler light and the signal light would be coupled to/from the extension optical waveguide and only the pump light would not. For example, although the examples of optical waveguide structures have been described with respect to second order, $\chi^{(2)}$, nonlinear optical processes such as difference frequency generation (DFG), spontaneous parametric down conversion (SPDC), sum frequency generation (SFG) and second harmonic generation (SHG), other illustrative examples can be applied to other nonlinear optical processes such as third order, $\chi^{(3)}$, nonlinear optical processes such as spontaneous four wave mixing (SFWM) and third harmonic generation (THG). With third order nonlinear optical process, the design of optical waveguide structures can apply taking into account the desired modifications or values for nonlinear optical coefficients and phase-matching conditions.

The illustrative embodiments described herein by FIGS. 30 thru 35 and associated descriptions are of an optical waveguide structure comprising a nonlinear optical waveguide and extension waveguides. The nonlinear optical waveguide comprises multiple segments. As discussed above, the generation of generated light from source light through a nonlinear optical process occurring in at least some of those multiple segments is made constructive by suitably selecting the cross-sectional structure and length of the segments as well as the cross-sectional structure and length of one or more extension waveguides. As a result, the effective length of the constructive nonlinear optical generation accomplished by the nonlinear optical waveguide structure can be much longer than the length of a single nonlinear optical waveguide segment. In general, the length of each nonlinear optical waveguide segment is kept no larger than the coherent interaction distance or coherent interaction length $L_{coh}$. A benefit of the nonlinear optical waveguide structure described herein is that the length of nonlinear optical waveguide for which a constructive nonlinear optical generation occurs can be much greater than the coherent interaction length. As a result, the efficiency of the nonlinear optical generation can be increased, and the intensity of the generated light can be increased.

Figure 36:
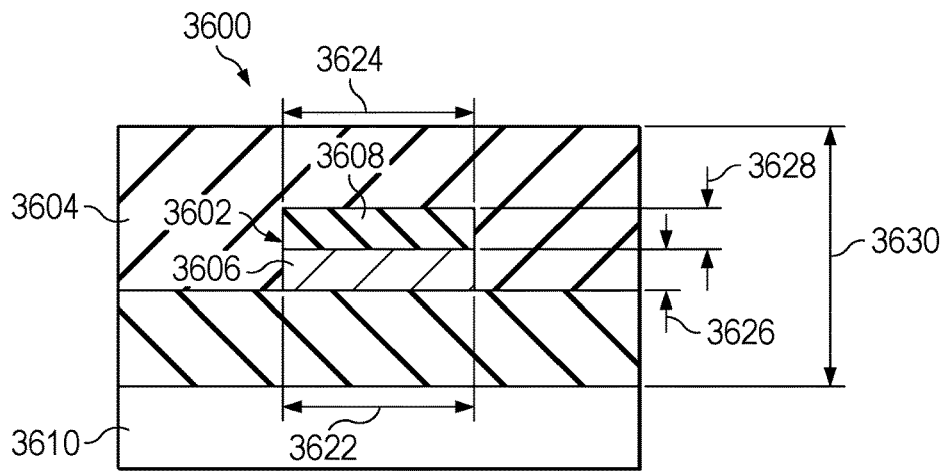
FIG. 36 is an illustration of a cross-section of an optical waveguide in accordance with an illustrative embodiment.
Figure 37:
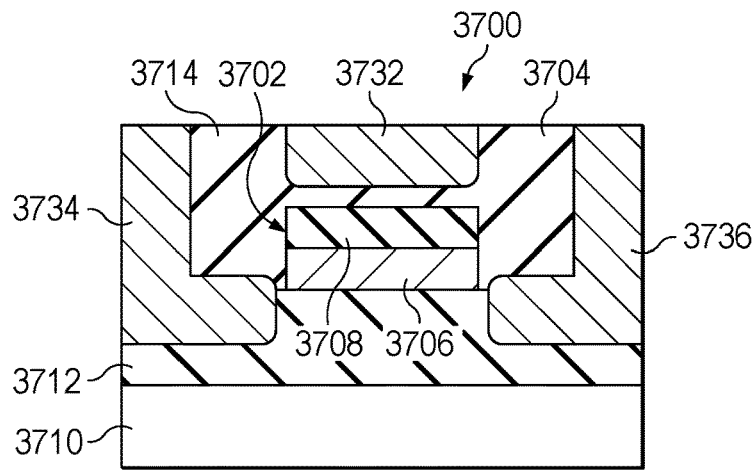
FIG. 37 is an illustration of a cross-section of an optical waveguide in accordance with an illustrative embodiment.
Figure 38:
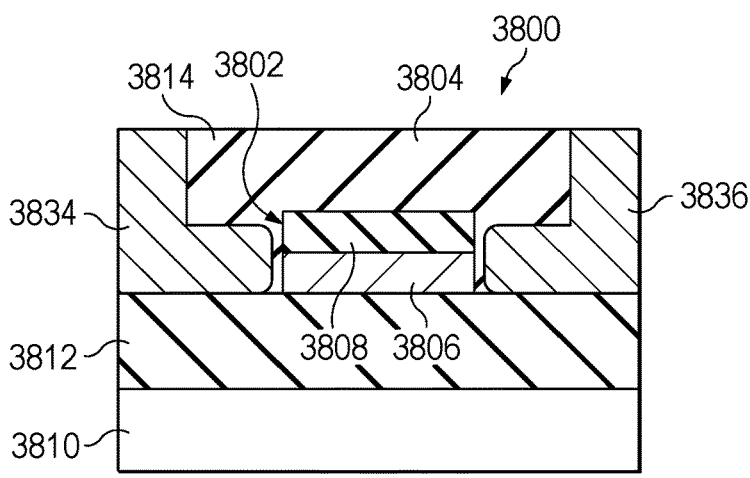
FIG. 38 is an illustration of a cross-section an optical waveguide in accordance with an illustrative embodiment.

In the examples discussed above, the source light includes pump light, and the generated light includes one or both of signal light and idler light. One way to increase the coherent interaction length $L_{coh}$, especially when the wavelengths of the pump light, signal light and idler light are very different from each other and when there is substantial dispersion in the spectral characteristics of the nonlinear optical waveguide, is to use modal phase matching. In one example of modal phase matching, the pump light is guided in a higher-order mode of the nonlinear optical waveguide segments for the wavelength of the pump light, and the signal light and idler light are guided in the fundamental mode of the nonlinear optical waveguide for those wavelength of the signal light and idler light. FIGS. 36 thru 38 show examples of the cross-sectional structure of a nonlinear optical waveguide segment and the cross-sectional structure of an extension optical waveguide.

Turning to FIG. 36, an illustration of a cross-section of an optical waveguide or of an extension optical waveguide is depicted in accordance with an illustrative embodiment. Optical waveguide structure 3600 can be used in at least one of a nonlinear optical waveguide or of an extension optical waveguide.

As depicted, optical waveguide structure 3600 comprises core region 3602 and cladding region 3604 formed on substrate 3610. The refractive index of core region 3602 is higher than the refractive index of cladding region 3604.

In this example, core region 3602 comprises first core portion 3606 and second core portion 3608.

First core portion 3606 comprises a nonlinear optical material. Second core portion 3608 comprises a non-nonlinear optical material. For example, with a second-order nonlinear optical process such as parametric down conversion, the nonlinear optical material can be lithium niobate and the non-nonlinear optical material can be silicon nitride, or the nonlinear optical material can be silicon carbide and the non-nonlinear optical material can be aluminum nitride, gallium nitride or gallium aluminum nitride.

An example of the material comprising cladding region 3604 is silicon dioxide. First core portion 3606 can be located between second core portion 3608 and substrate 3610, as depicted in FIG. 36, or vice versa.

As depicted, first core portion has width 3622 and height 3626. Second core region has width 3624 and height 3628. Cladding region has thickness 3630. These dimensions of the nonlinear optical waveguide or of the extension optical waveguide can be adjusted to achieve a desired value for the phase walk-off in the nonlinear optical process that occurs between two specified points along the nonlinear optical waveguide, as discussed above.

In one illustrative example, the width and height of the first core portion and the width and height of the second core portion are selected such that the nonlinear optical waveguide can support both the fundamental mode and a first higher-order mode for the pump light, assumed to have a wavelength that is shorter than the wavelengths of the signal light and the idler light. Also, that nonlinear optical waveguide can support only the fundamental mode for the signal light and can support only the fundamental mode for the idler light.

The first higher-order mode for the pump light has an optical-field profile with two peaks that corresponds to regions of maximum optical-field intensity or maximum optical-field magnitude and a null (or zero-crossing). The two peaks of the optical field profile are aligned such that one peak overlaps with the first core portion and the other peak overlaps with the second core portion, and the null is located near the interface between the first core portion and the second core portion. This selection of core-region widths and heights can achieve nonlinear optical generation of signal light and/or idler light from pump light with greater efficiency.

With reference to FIG. 37, an illustration of a cross-section of an optical waveguide is depicted in accordance with an illustrative embodiment. Optical waveguide structure 3700 can be used in at least one of a nonlinear optical waveguide or of an extension optical waveguide.

As depicted, optical waveguide structure 3700 comprises core region 3702 and cladding region 3704 formed on substrate 3710. The refractive index of core region 3702 is higher than the refractive index of cladding region 3704. Core region 3702 comprises first core portion 3706 and second core portion 3708. Cladding region 3704 comprises lower cladding portion 3712 and upper cladding portion 3714.

At least one of first core portion 3706 or second core portion 3708 comprises a nonlinear optical material whose nonlinear optical parameter, such as $\chi^{(2)}$, is much larger than the nonlinear optical parameter of the material comprising the other core portion, which is considered a non-nonlinear optical material. To be considered much larger, the value for the nonlinear optical parameter would be at least three times larger and preferably at least ten times larger.

Optical waveguide structure 3700 further comprises top electrode 3732, and at least one of side electrode 3734 and side electrode 3736. Top electrode 3732 is aligned above core region 3702. In the cross-section view of optical waveguide structure 3700, side electrode 3734 and side electrode 3736 are recessed into lower cladding portion 3712 and are aligned below the level of the portion of core region 3702 that comprises nonlinear optical material. In some examples, top electrode 3732 and side electrodes 3734 and 3736 are separated from core region 3702 by a portion of cladding region 3704. Optical waveguide structure 3700 is especially suitable for a phase shifter, which can be located along an extension optical waveguide or along a segment of the nonlinear optical waveguide. The combination of a top electrode and one or more recessed side electrodes is especially suitable for applying an electro-optic activation when first core portion 3706 or second core portion 3708 has an electro-optic coefficient that is larger for light whose polarization is aligned perpendicular to the interface between substrate 3710 and cladding region 3704. In a variation (not shown) of optical waveguide structure 3700, only top electrode 3732 is present and side electrode 3734 and side electrode 3736 are not present. Such a variation, comprising only top electrode 3732, is especially suitable for applying a thermo-optic activation or a stress or elasto-optic activation.

Turning to FIG. 38, an illustration of a cross-section of an optical waveguide is depicted in accordance with an illustrative embodiment. Optical waveguide structure 3800 can be used in at least one of a nonlinear optical waveguide or an extension optical waveguide.

As depicted, optical waveguide structure 3800 comprises core region 3802 and cladding region 3804 that are formed on substrate 3810. The refractive index of core region 3802 is higher than the refractive index of cladding region 3804. Core region 3802 comprises first core portion 3806 and second core portion 3808. Cladding region 3804 comprises lower cladding portion 3812 and upper cladding portion 3814.

At least one of first core portion 3806 or second core portion 3808 comprises a nonlinear optical material whose nonlinear optical parameter, such as $\chi^{(2)}$, is much larger than the nonlinear optical parameter of the material comprising the other core portion, which is considered a non-nonlinear optical material.

Optical waveguide structure 3800 further comprises side electrode 3834 and side electrode 3836. In the cross-section view of optical waveguide structure 3800, side electrode 3834 and side electrode 3836 are aligned approximately level with the portion of core region 3802 that comprises nonlinear optical material. In some examples, side electrodes 3834 and 3836 are separated from core region 3802 by a portion of cladding region 3804. Optical waveguide structure 3800 is especially suitable for a phase shifter, which can be located along an extension optical waveguide or along a segment of the nonlinear optical waveguide. A small portion of the side electrode 3834 and side electrode 3836 can be recessed slightly into lower cladding portion 3812. This structure with two side electrodes is especially suitable for applying an electro-optic activation when first core portion 3806 or second core portion 3808 has an electro-optic coefficient that is larger for light whose polarization is aligned parallel to the interface between substrate 3810 and cladding region 3804.

Some features of the illustrative examples are described in the following clauses. These clauses are examples of features and are not intended to limit other illustrative examples.

Clause 1

An optical waveguide structure comprising:
a nonlinear optical waveguide comprising a set of segments;
a set of extension optical waveguides; and
a set of wavelength selective couplers couples light between the set of segments in the nonlinear optical waveguide and the set of extension optical waveguides based on a wavelength of light.

Clause 2

The optical waveguide structure according to clause 1, further comprising:
a first segment in the set of segments in the nonlinear optical waveguide, wherein the light traveling in the first segment comprises a first wavelength light, a second wavelength light, and a third wavelength light and wherein the second wavelength light, and the third wavelength light are produced by a nonlinear optical interaction of the first wavelength light in the first segment;
a second segment in the set of segments in the nonlinear optical waveguide, wherein the second wavelength light and the third wavelength light are produced by the nonlinear optical interaction of the first wavelength light in the second segment;
a third segment in the set of segments in the nonlinear optical waveguide, wherein the second wavelength light and the third wavelength light are produced by the nonlinear optical interaction of the first wavelength light in the third segment;
a first wavelength selective coupler in the set of wavelength selective couplers couples the first wavelength light from a first ending point for the first segment to a second starting point for the segment and couples the second wavelength light and the third wavelength light from the first ending point for the first segment to an extension starting point for an extension optical waveguide in the set of extension optical waveguides; and
a second wavelength selective coupler in the set of wavelength selective couplers couples the second wavelength light and the third wavelength light from an extension ending point for the extension optical waveguide to a third starting point for the third segment in the nonlinear optical waveguide.

Clause 3

The optical waveguide structure according to clause 2, wherein the first segment has a first length from a first starting point to the first ending point selected to produce a first phase walk-off that is at least one of from 0 to $\pi$ radians or from an even-numbered integer of $\pi$ radians to a next larger odd-numbered integer of $\pi$ radians for the nonlinear optical interaction in the first segment.

Clause 4

The optical waveguide structure according to one of clauses 2 or 3, wherein the third segment has a third length from the third starting point to a third ending point selected to produce a third phase walk-off that is at least one of from 0 to $\pi$ radians or from an even-numbered integer of $\pi$ radians to a next larger odd-numbered integer of $\pi$ radians for the nonlinear optical interaction in the third segment.

Clause 5

The optical waveguide structure according to one of clauses 2, 3, or 4, wherein the first segment has a first cross-sectional structure and a first length from a first starting point to the first ending point produces a first phase walk-off that results in a light generation through the nonlinear optical interaction that is constructive in the first segment.

Clause 6

The optical waveguide structure according to clause 5, wherein the third segment has a third cross-sectional structure and a third length from the third starting point to a third ending point selected to produce a third phase walk-off that results in the light generation through the nonlinear optical interaction that is constructive in the third segment.

Clause 7

The optical waveguide structure according to one of clauses 5 or 6, wherein the second segment has a second cross-sectional structure and a second length from the second starting point to a second ending point that are selected to produce a second phase walk-off that results in the light generation through the nonlinear optical interaction that is constructive in the third segment.

Clause 8

The optical waveguide structure according to one of clauses 5, 6, or 7, wherein the extension optical waveguide has an extension cross-sectional structure and an extension length from the extension starting point to the extension ending point that are selected to produce an extension phase walk-off that results in the light generation through the nonlinear optical interaction that is constructive in the third segment.

Clause 9

The optical waveguide structure according to one of clauses 5, 6, 7, or 8, wherein the extension optical waveguide has an extension cross-sectional structure with an extension length from the extension starting point to the extension ending point that are selected to produce an extension phase walk-off that is at least one of from 0 to $\pi$ radians or from an even-numbered integer of $\pi$ radians to a next larger odd-numbered integer for the nonlinear optical interaction that occurs from the first starting point for the first segment to the third starting point for the third segment.

Clause 10

The optical waveguide structure according to one of clauses 2, 3, 4, 5, 6, 7, 8, or 9, wherein the second segment has a second cross-sectional structure with a second length from the second starting point to a second ending point of the nonlinear optical waveguide that are selected to produce a second phase walk-off that is at least one of from 0 to $\pi$ radians or from an even-numbered integer of $\pi$ radians to a next larger odd-numbered integer for the nonlinear optical interaction that occurs from a first starting point for the first segment to the third starting point for the third segment.

Clause 11

The optical waveguide structure according to one of clauses 2, 3, 4, 5, 6, 7, 8, 9, or 10, wherein the first wavelength light is a pump light, the second wavelength light is a signal light, and the third wavelength light is an idler light.

Clause 12

The optical waveguide structure according to one of clauses 2, 3, 4, 5, 6, 7, 8, 9, 10, or 11, wherein the first segment has a first cross-sectional structure from a first starting point to the first ending point that is selected to produce a first phase walk-off for the light that is at least one of from 0 to $\pi$ radians or from an even-numbered integer of $\pi$ radians to a next larger odd-numbered integer of $\pi$ radians for the nonlinear optical interaction in the first segment.

Clause 13

The optical waveguide structure according to one of clauses 2, 3, 4, 5, 6, 7, 8, 9, 10, 11, or 12, wherein the second wavelength selective coupler couples the second wavelength light and the third wavelength light from a second ending point for the second segment away from the third segment.

Clause 14

The optical waveguide structure according to one of clauses 2, 3, 4, 5, 6, 7, 8, 9, 10, 11, 12, or 13, wherein the extension optical waveguide includes an optical wavelength-selective filter.

Clause 15

The optical waveguide structure according to one of clauses 2, 3, 4, 5, 6, 7, 8, 9, 10, 11, 13, or 14, wherein the extension optical waveguide comprises a set of micro-rings.

Clause 16

The optical waveguide structure according to one of clauses 1, 2, 3, 4, 5, 6, 7, 8, 9, 10, 11, 13, 14, or 15, wherein the nonlinear optical waveguide comprises a core region and a cladding region and wherein the core region comprises a first core portion and a second core portion,
wherein the first core portion comprises a nonlinear optical material and the second core portion comprises a non-nonlinear optical material.

Clause 17

The optical waveguide structure according to clause 16, further comprising a top electrode.

Clause 18

The optical waveguide structure according to clause 17, further comprising a side electrode.

Clause 19

The optical waveguide structure according to one of clauses 16, 17, or 18, further comprising a side electrode.

Clause 20

An optical waveguide structure comprising:
a nonlinear optical waveguide comprising a first segment having a first starting point and a first ending point, wherein a nonlinear optical interaction results in a generation of a second wavelength light from a first wavelength light traveling through the first segment; a second segment having a second starting point and a second ending point; a third segment having a third starting point and a third ending point;
an extension optical waveguide;
a first wavelength selective coupler that couples the second wavelength light from the first segment at the first ending point into the extension optical waveguide; and
a second wavelength selective coupler that couples the second wavelength light from the extension optical waveguide into the third segment at the third starting point,
wherein the first wavelength light travels from the first ending point to the third starting point through the second segment; the second wavelength light travels from the first ending point to the third starting point through the extension optical waveguide; both the first wavelength light and the second wavelength light travel from the third starting point of the third segment to the third ending point.

Clause 21

The optical waveguide structure according to clause 20, wherein the first wavelength light is a pump light and the second wavelength light is at least one of a signal light or an idler light.

Clause 22

The optical waveguide structure according to one of clauses 20 or 21, wherein the nonlinear optical interaction results in the generation of a third wavelength light from the first wavelength light traveling through the first segment.

Clause 23

The optical waveguide structure according to one of clauses 20, 21, or 22, wherein the first wavelength selective coupler couples the second wavelength light and the third wavelength light from the nonlinear optical waveguide at the first ending point into the extension optical waveguide,
wherein the second wavelength selective coupler couples the second wavelength light and the third wavelength light into the third segment at the third starting point.

Clause 24

The optical waveguide structure according to one of clauses 20, 21, 22, or 23, wherein the first wavelength light is a pump light, the second wavelength light is a signal light, and a third wavelength light is an idler light.

Clause 25

A method for facilitating a non-linear optical process comprising:
routing a first wavelength light traveling through a first segment in a nonlinear optical waveguide having a first starting point and a first ending point;
generating a second wavelength light and a third wavelength light by a nonlinear optical interaction of the first wavelength light between the first starting point and the first ending point in the first segment;
coupling, by a first wavelength selective coupler, the first wavelength light from the first ending point to a second starting point for a second segment in the nonlinear optical waveguide;
coupling, by the first wavelength selective coupler, the second wavelength light and the third wavelength light from the first ending point to an extension starting point for an extension optical waveguide;
coupling, by a second wavelength selective coupler, the second wavelength light and the third wavelength light from an extension ending point for the extension optical waveguide to a third starting point for a third segment in the nonlinear optical waveguide; and
coupling, by the second wavelength selective coupler, the first wavelength light from the second segment in the nonlinear optical waveguide to the third starting point for the third segment in the nonlinear optical waveguide.

Clause 26

The method according to clause 25, wherein the first segment has a first cross-sectional structure and a first length from the first starting point to the first ending point produces a first phase walk-off that results in a light generation through the nonlinear optical interaction that is constructive in the first segment.

Clause 27

The method according to clause 26, wherein the second segment has a second cross-sectional structure and a second length from the second starting point to a second ending point produces a second phase walk-off that results in the light generation through the nonlinear optical interaction that is constructive in the third segment.

Clause 28

The method according to clause 27, wherein the extension optical waveguide has an extension cross-sectional structure and an extension length from the extension starting point to the extension ending point that produces an extension phase walk-off that results in the light generation through the nonlinear optical interaction that is constructive in the third segment.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An optical waveguide structure comprising:
a nonlinear optical waveguide comprising a set of segments;
a set of extension optical waveguides; and
a set of wavelength selective couplers that couples light between the set of segments in the nonlinear optical waveguide and the set of extension optical waveguides based on a wavelength of light, wherein the set of segments comprise:
a first segment in the set of segments in the nonlinear optical waveguide, wherein the light traveling in the first segment comprises a first wavelength light, a second wavelength light, and a third wavelength light and wherein the second wavelength light, and the third wavelength light are produced by a nonlinear optical interaction of the first wavelength light in the first segment;
a second segment in the set of segments in the nonlinear optical waveguide, wherein the second wavelength light and the third wavelength light are produced by the nonlinear optical interaction of the first wavelength light in the second segment;
a third segment in the set of segments in the nonlinear optical waveguide, wherein the second wavelength light and the third wavelength light are produced by the nonlinear optical interaction of the first wavelength light in the third segment;
wherein the set of wavelength selective couplers comprise:
a first wavelength selective coupler in the set of wavelength selective couplers couples the first wavelength light from a first ending point for the first segment to a second starting point for the first segment and couples the second wavelength light and the third wavelength light from the first ending point for the first segment to an extension starting point for an extension optical waveguide in the set of extension optical waveguides; and a second wavelength selective coupler in the set of wavelength selective couplers couples the second wavelength light and the third wavelength light from an extension ending point for the extension optical waveguide in the set of extension optical waveguides to a third starting point for the third segment in the nonlinear optical waveguide.

2. The optical waveguide structure of claim 1, wherein the first segment has a first length from a first starting point to the first ending point selected to produce a first phase walk-off that is at least one of from 0 to π radians or from an even-numbered integer of π radians to a next larger odd-numbered integer of π radians for the nonlinear optical interaction in the first segment.

3. The optical waveguide structure of claim 1, wherein the third segment has a third length from the third starting point to a third ending point selected to produce a third phase walk-off that is at least one of from 0 to π radians or from an even-numbered integer of π radians to a next larger odd-numbered integer of π radians for the nonlinear optical interaction in the third segment.

4. The optical waveguide structure of claim 1, wherein the first segment has a first cross-sectional structure and a first length from a first starting point to the first ending point produces a first phase walk-off that results in a light generation through the nonlinear optical interaction that is constructive in the first segment.

5. The optical waveguide structure of claim 4, wherein the third segment has a third cross-sectional structure and a third length from the third starting point to a third ending point selected to produce a third phase walk-off that results in the light generation through the nonlinear optical interaction that is constructive in the third segment.

6. The optical waveguide structure of claim 4, wherein the extension optical waveguide in the set of extension optical waveguides has an extension cross-sectional structure and an extension length from the extension starting point to the extension ending point that are selected to produce an extension phase walk-off that results in the light generation through the nonlinear optical interaction that is constructive in the third segment.

7. The optical waveguide structure of claim 4, wherein the extension optical waveguide in the set of extension optical waveguides has an extension cross-sectional structure with an extension length from the extension starting point to the extension ending point that are selected to produce an extension phase walk-off that is at least one of from 0 to π radians or from an even-numbered integer of π radians to a next larger odd-numbered integer for the nonlinear optical interaction that occurs from the first starting point for the first segment to the third starting point for the third segment.

8. The optical waveguide structure of claim 1, wherein the second segment has a second cross-sectional structure and a second length from the second starting point to a second ending point that are selected to produce a second phase walk-off that results in the light generation through the nonlinear optical interaction that is constructive in the third segment.

9. The optical waveguide structure of claim 1, wherein the second segment has a second cross-sectional structure with a second length from the second starting point to a second ending point of the nonlinear optical waveguide that are selected to produce a second phase walk-off that is at least one of from 0 to π radians or from an even-numbered integer of π radians to a next larger odd-numbered integer for the nonlinear optical interaction that occurs from a first starting point for the first segment to the third starting point for the third segment.

10. The optical waveguide structure of claim 1, wherein the first wavelength light is a pump light, the second wavelength light is a signal light, and the third wavelength light is an idler light.

11. The optical waveguide structure of claim 1, wherein the first segment has a first cross-sectional structure from a first starting point to the first ending point that is selected to produce a first phase walk-off for the light that is at least one of from 0 to π radians or from an even-numbered integer of π radians to a next larger odd-numbered integer of π radians for the nonlinear optical interaction in the first segment.

12. The optical waveguide structure of claim 1, wherein the second wavelength selective coupler couples the second wavelength light and the third wavelength light from a second ending point for the second segment away from the third segment.

13. The optical waveguide structure of claim 1, wherein the extension optical waveguide in the set of extension optical waveguides includes an optical wavelength-selective filter.

14. The optical waveguide structure of claim 1, wherein the extension optical waveguide in the set of extension optical waveguides comprises a set of micro-rings.

* * * * *